(12) United States Patent
Nakahori

(10) Patent No.: US 7,558,092 B2
(45) Date of Patent: *Jul. 7, 2009

(54) SWITCHING POWER SUPPLY UNIT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 11/711,114

(22) Filed: Feb. 27, 2007

(65) Prior Publication Data

US 2007/0201250 A1    Aug. 30, 2007

(30) Foreign Application Priority Data

Feb. 28, 2006  (JP) .............................. 2006-053649
Feb. 28, 2006  (JP) .............................. 2006-053650

(51) Int. Cl.
  *H02M 7/493*   (2007.01)
  *H02M 3/335*   (2006.01)
(52) U.S. Cl. ......................................... 363/71; 363/17
(58) Field of Classification Search .................. 363/17, 363/65, 67, 68, 69, 71, 132, 98, 142
See application file for complete search history.

(56) References Cited

U.S. PATENT DOCUMENTS 6,169,676 B1 *    1/2001   Dahler et al. ................. 363/71
6,317,336 B1     11/2001   Jiang et al.
6,320,764 B1     11/2001   Jiang et al.
6,370,047 B1 *    4/2002   Mallory ........................ 363/65
6,411,527 B1 *    6/2002   Reinold ........................ 363/17
7,262,980 B2 *    8/2007   Phadke et al. ................. 363/89
7,414,869 B2 *    8/2008   Nakahori ...................... 363/71

FOREIGN PATENT DOCUMENTS

| JP | A-11-136939   | 5/1999 |
| JP | A-11-262258   | 9/1999 |
| JP | A-2002-112548 | 4/2002 |
| JP | A-2005-086936 | 3/2005 |
| JP | A-2005-224067 | 8/2005 |

OTHER PUBLICATIONS

"Guest Viewpoint: Rejuvenated Electric Power Systems Bring 2.3 W/cm³ AC-DC Converters into Life"; Nikkei Electronics; Oct. 10, 2005; pp. 109-118.

* cited by examiner

*Primary Examiner*—Gary L Laxton
(74) *Attorney, Agent, or Firm*—Oliff & Berridge, PLC

(57) ABSTRACT

A switching power supply unit is provided, in which a convertible voltage range can be more widened. A transformer having four windings at a high-voltage side, the windings having the number of turns equal to one another, and four inductors are provided in correspondence with four switching circuits. Four current paths assume one of the states of a 4-parallel connection state, a 4-series connection state, or a 2-series/2-parallel connection state with one another depending on magnitude of an input voltage in forward operation, and a target voltage value of an output voltage in reverse operation.

37 Claims, 65 Drawing Sheets

| VH | S51, S61 | S52, S62 | S53, S63 | CONNECTION STATE | TURN RATIO (np/ns) |
|---|---|---|---|---|---|
| HIGH ($V_H \geq V_{th12}$) | OFF | OFF | OFF | 4-SERIES | 4n |
| MIDDLE ($V_{th12} > V_H \geq V_{th11}$) | OFF | ON | OFF | 2SERIES/ 2-PARALLEL | 2n |
| LOW ($V_{th11} > V_H$) | ON | ON | ON | 4-PARALLEL | n |

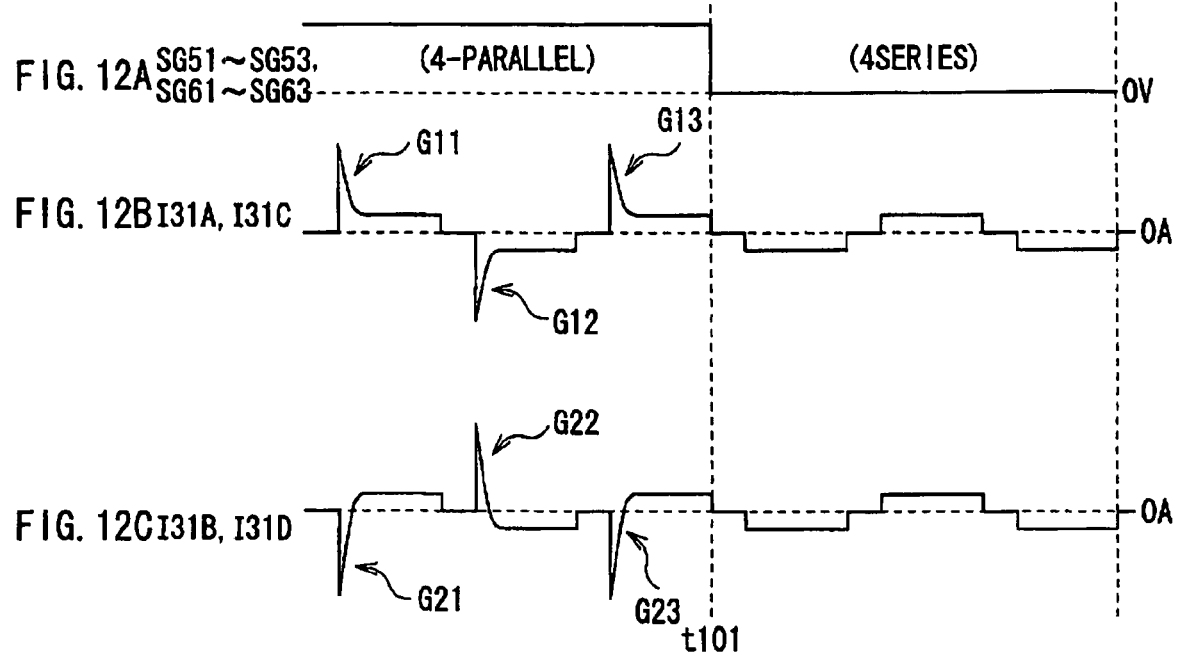
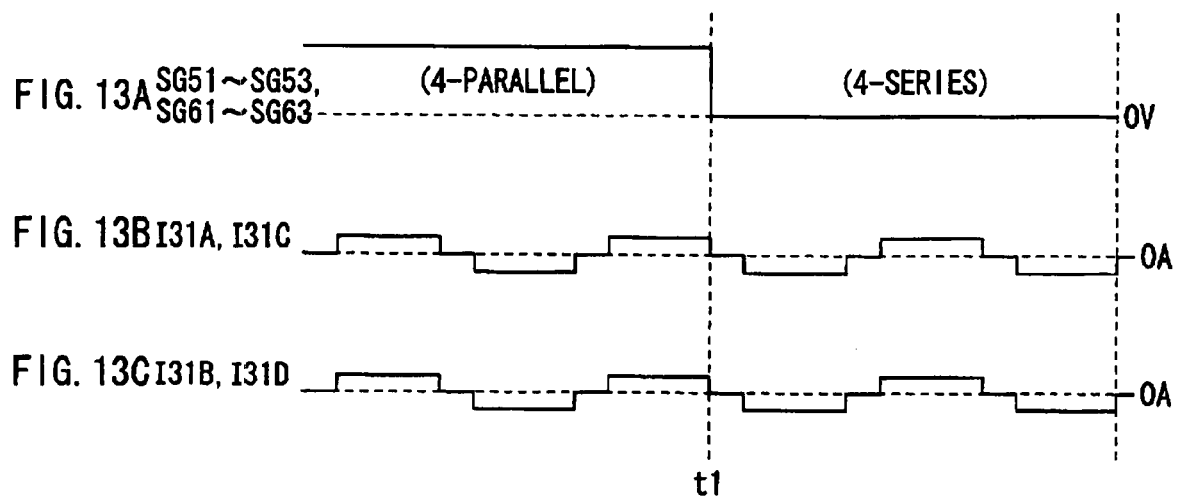

| $V_H$ | S51, S61 | S52, S62 | S53, S63 | S54, S64 | S55, S65 | CONNECTION STATE | TURN RATIO (np/ns) |
|---|---|---|---|---|---|---|---|
| HIGH ($V_H \geqq V_{th33}$) | OFF | OFF | OFF | OFF | OFF | 6-SERIES | 6n |
| MIDDLE HIGH ($V_{th33} > V_H \geqq V_{th32}$) | OFF | OFF | ON | OFF | OFF | 3-SERIES/ 2-PARALLEL | 3n |
| MIDDLE LOW ($V_{th32} > V_H \geqq V_{th31}$) | OFF | ON | OFF | ON | OFF | 2-SERIES/ 3PARALLEL | 2n |
| LOW ($V_{th31} > V_H$) | ON | ON | ON | ON | ON | 6-PARALLEL | n |

FIG. 25

| $V_H$ | S51~S54, S61~S64 | CONNECTION STATE | TURN RATIO ($n_p/n_s$) |
|---|---|---|---|
| HIGH ($V_H \geq V_{th5}$) | OFF | 5-SERIES | 5n |
| LOW ($V_{th5} > V_H$) | ON | 5-PARALLEL | n |

| VH | CONNECTION STATE | TURN RATIO (np/ns) |
|---|---|---|
| HIGH ↑ | 24-SERIES | 24n |
| | 12-SERIES/ 2-PARALLEL | 12n |
| | 8-SERIES/ 3-PARALLEL | 8n |
| | 6-SERIES/ 4-PARALLEL | 6n |
| | 4-SERIES/ 6-PARALLEL | 4n |
| | 3-SERIES/ 8-PARALLEL | 3n |
| | 2-SERIES/ 12-PARALLEL | 2n |
| LOW | 24-PARALLEL | n |

| $V_H$ | S11~S14 S21~S24 S31~S34 S41~S44 | S51, S61 | S52, S62 | S53, S63 | CONNECTION STATE | TURN RATIO (np/ns) |
|---|---|---|---|---|---|---|
| HIGH ($V_H \geq V_{thH}$) | PWM (VARIED IN DUTY RATIO) | OFF | OFF | OFF | 4-SERIES | $4n$ |
| MIDDLE HIGH ($V_{thH} > V_H \geq V_{thM}$) | PWM (CONSTANT IN DUTY RATIO) | OFF | PWM (VARIED IN DUTY RATIO) | OFF | 4-SERIES or 2SERIES /2-PARALLEL | $4n \sim 2n$ |
| MIDDLE LOW ($V_{thM} > V_H \geq V_{thL}$) | PWM (CONSTANT IN DUTY RATIO) | PWM (VARIED IN DUTY RATIO) | ON | PWM (VARIED IN DUTY RATIO) | 2-SERIES/ 2-PARALLEL or 4-PARALLEL | $2n \sim n$ |
| LOW ($V_{thL} > V_H$) | PWM (VARIED IN DUTY RATIO) | ON | ON | ON | 4-PARALLEL | $n$ |

FIG. 33

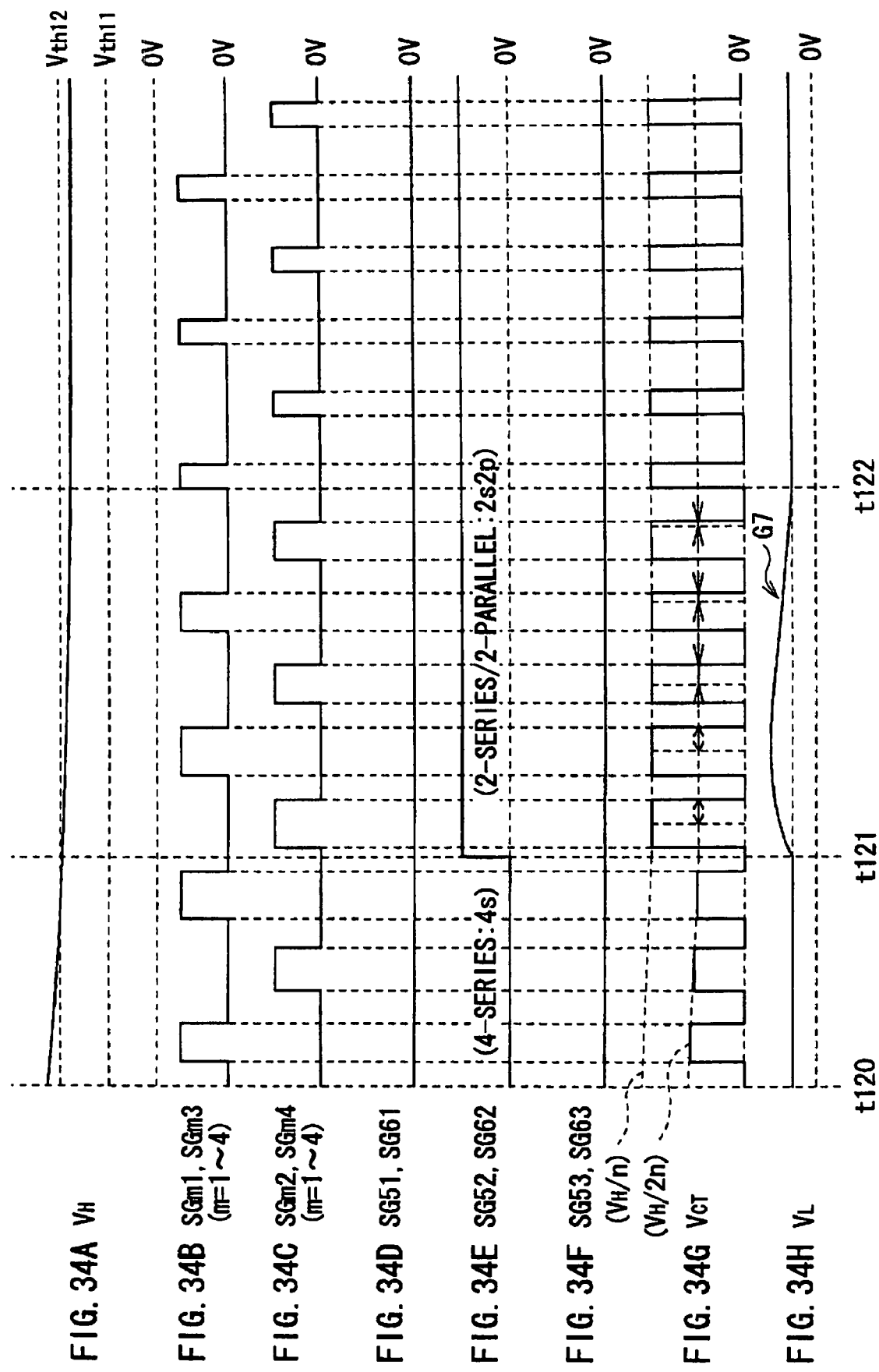

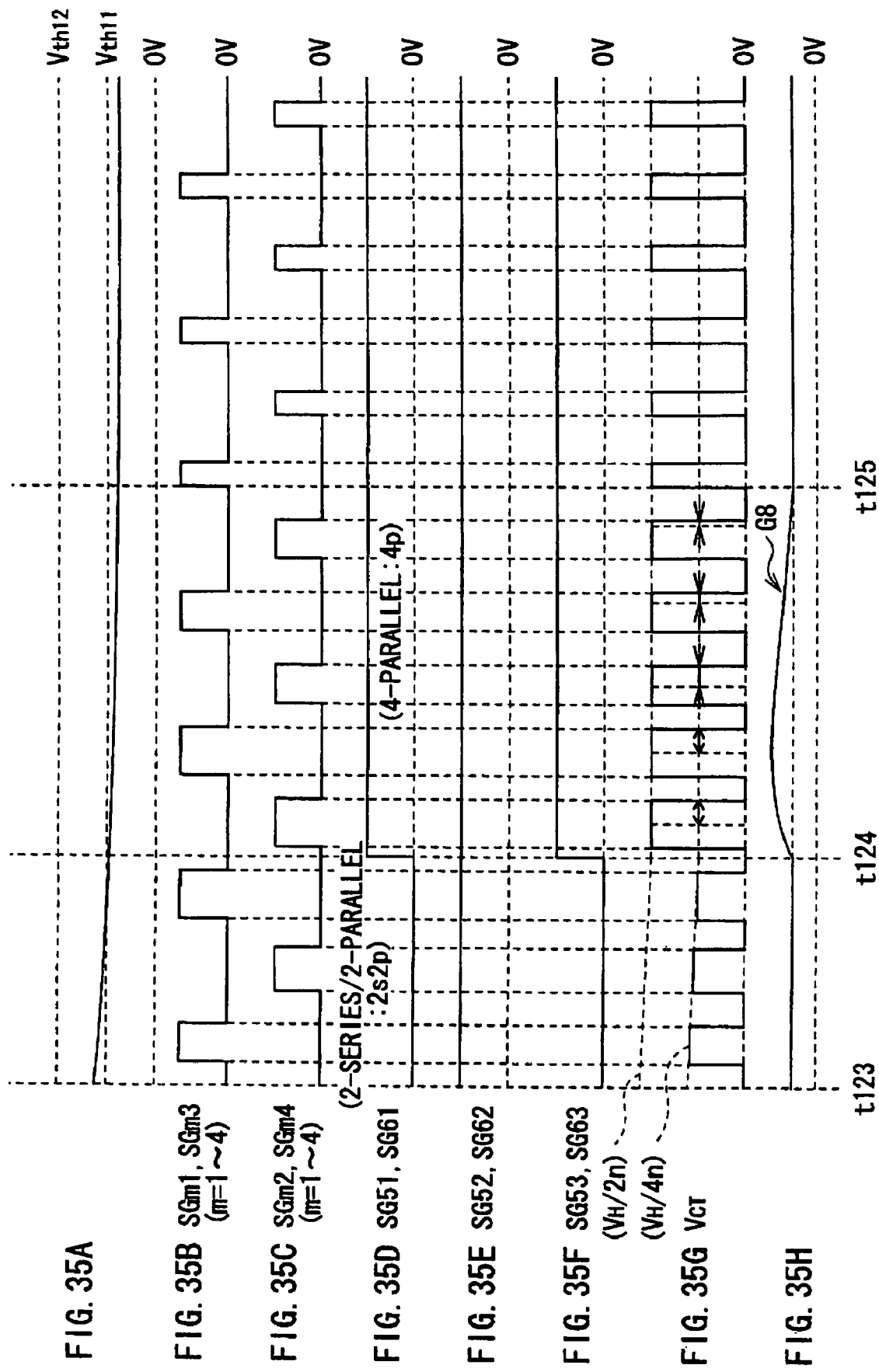

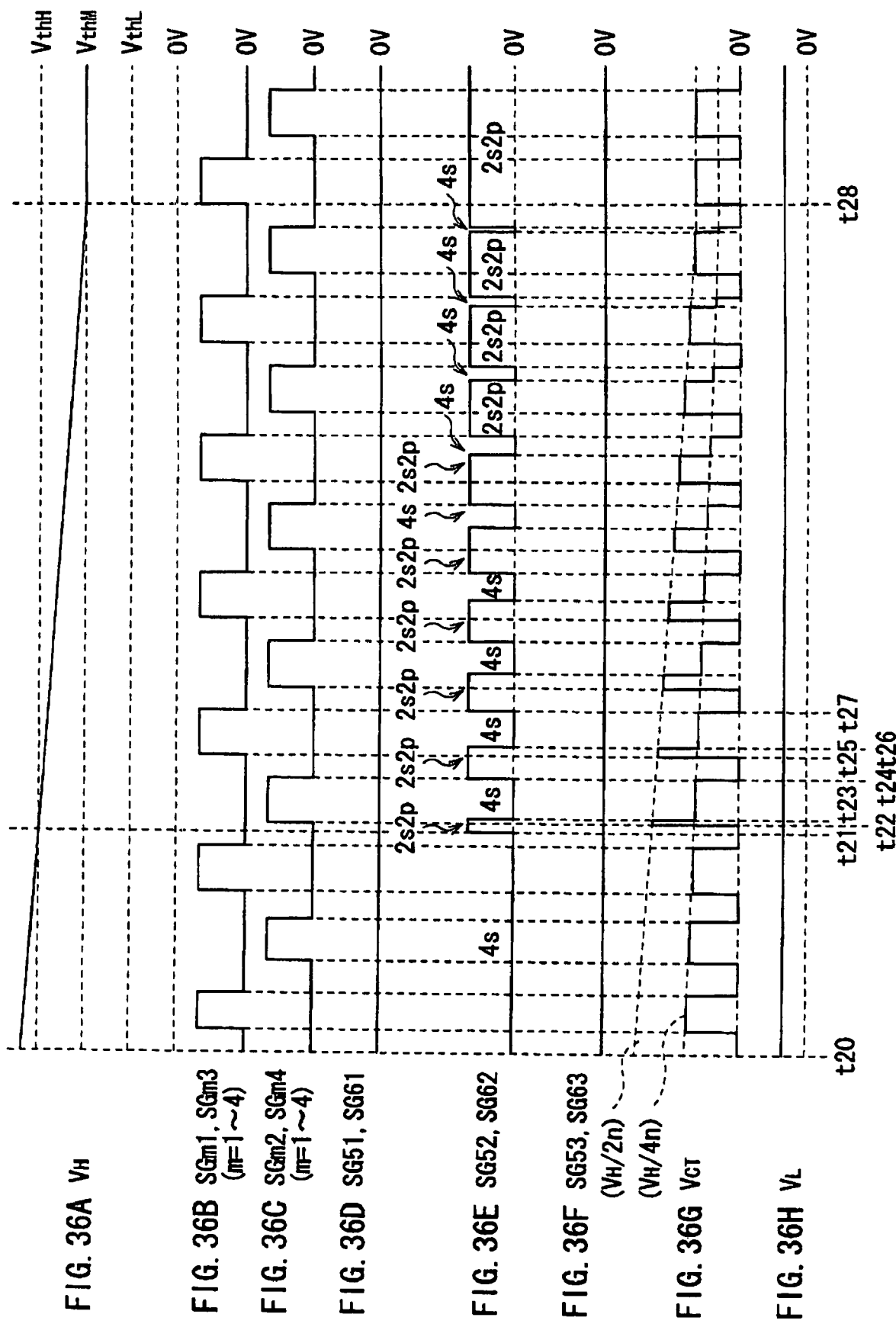

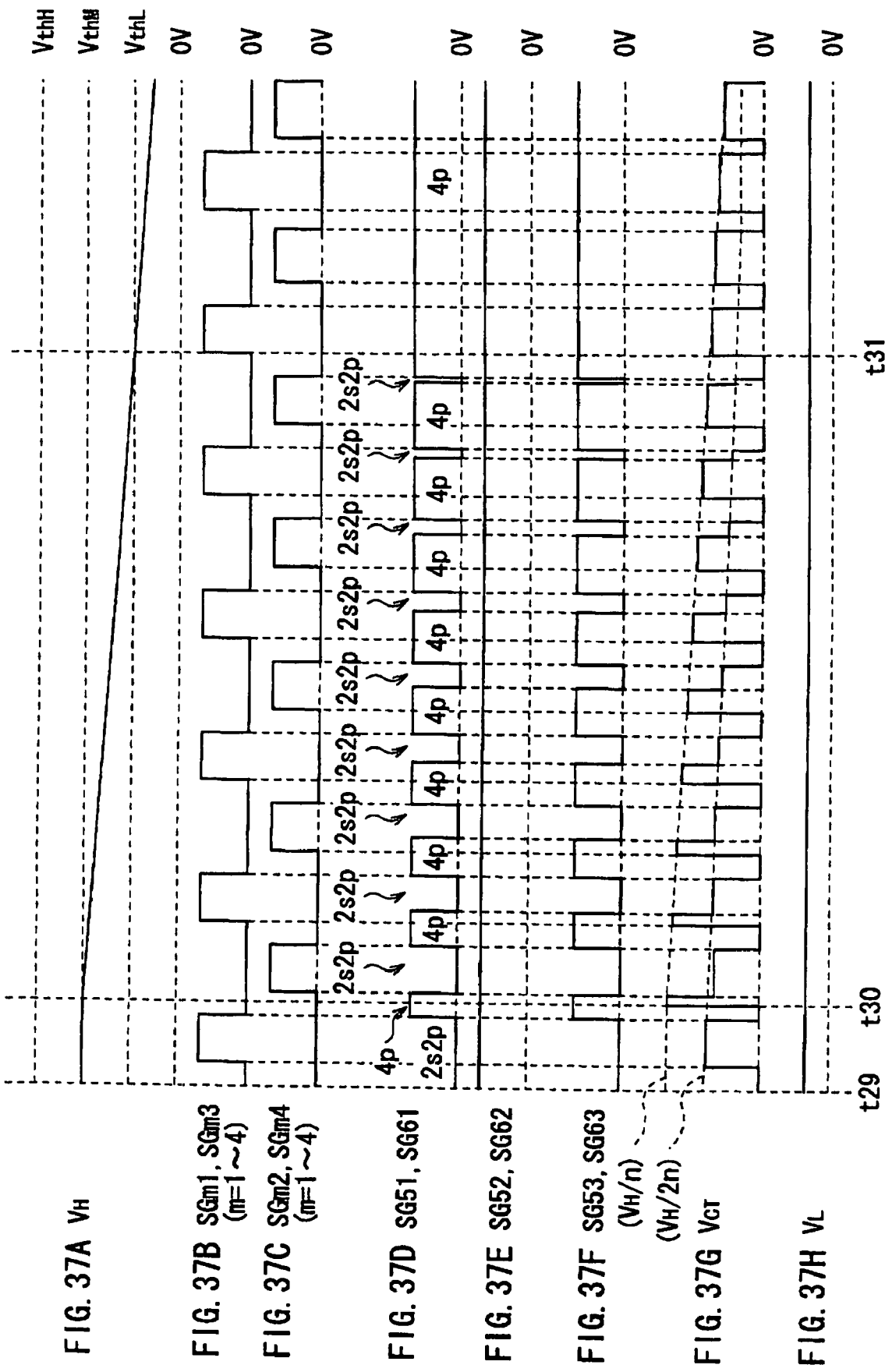

| VH | S51, S61 | S52, S62 | S53, S63 | CONNCTION STATE | TURN RATIO (np/ns) |
|---|---|---|---|---|---|
| HIGH ($V_H \geq V_{th12}$) | OFF | OFF | OFF | 4-PARALLEL | 4n |
| MIDDLE ($V_{th12} > V_H \geq V_{th11}$) | ON | OFF | ON | 2-SERIES/ 2-PARALLEL | 2n |
| LOW ($V_{th11} > V_H$) | ON | ON | ON | 4-SERIES | n |

| V$_H$ | S1~S4 | S51, S61 | S52, S62 | S53, S63 | CONNECTION STATE | TURN RATIO (np/ns) |
|---|---|---|---|---|---|---|
| HIGH (V$_H$ ≧ V$_{thH}$) | PWM (VARIED IN DUTY RATIO) | OFF | OFF | OFF | 4-PARALLEL | 4n |
| MIDDLE HIGH (V$_{thH}$ > V$_H$ ≧ V$_{thM}$) | PWM (CONSTANT IN DUTY RATIO) | PWM (VARIED IN DUTY RATIO) | OFF | PWM (VARIED IN DUTY RATIO) | 4-PARALLEL or 2-SERIES/ 2-PARALLEL | 4n~2n |
| MIDDLE LOW (V$_{thM}$ > V$_H$ ≧ V$_{thL}$) | PWM (CONSTANT IN DUTY RATIO) | ON | PWM (VARIED IN DUTY RATIO) | ON | 2-SERIES/ 2-PARALLEL or 4-SERIES | 2n~n |
| LOW (V$_{thL}$ > V$_H$) | PWM (VARIED IN DUTY RATIO) | ON | ON | ON | 4-SERIES | n |

FIG. 59

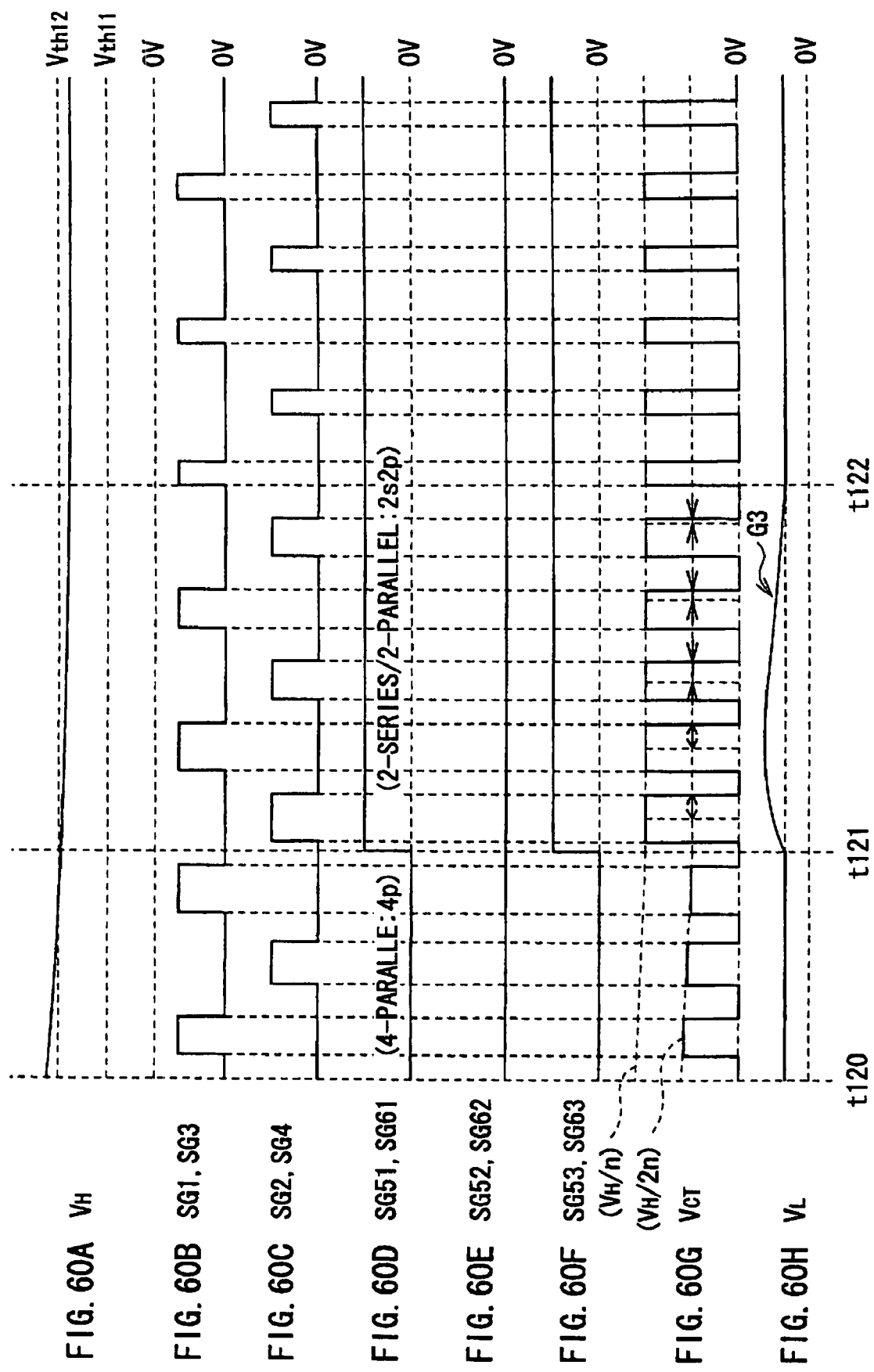

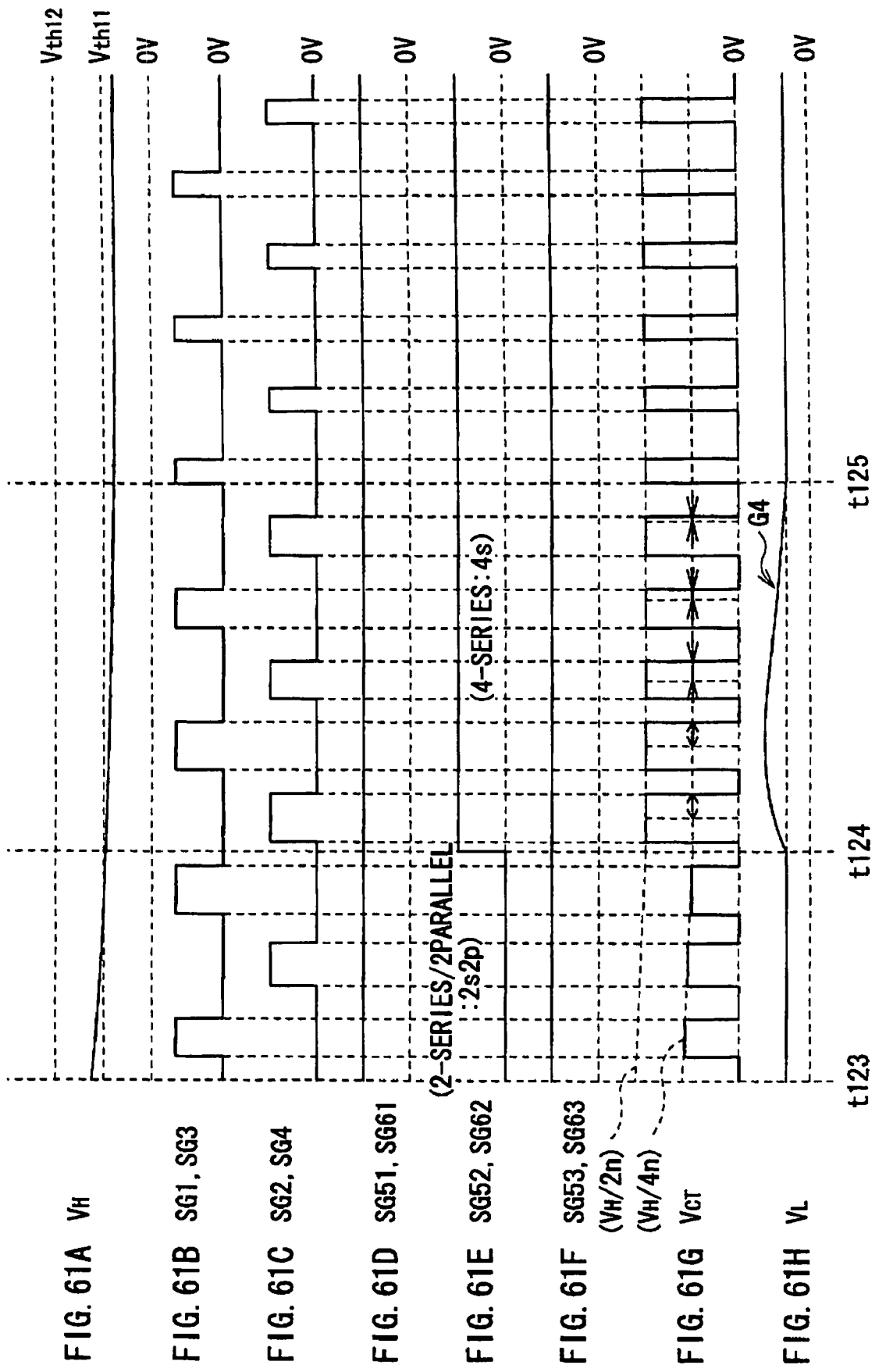

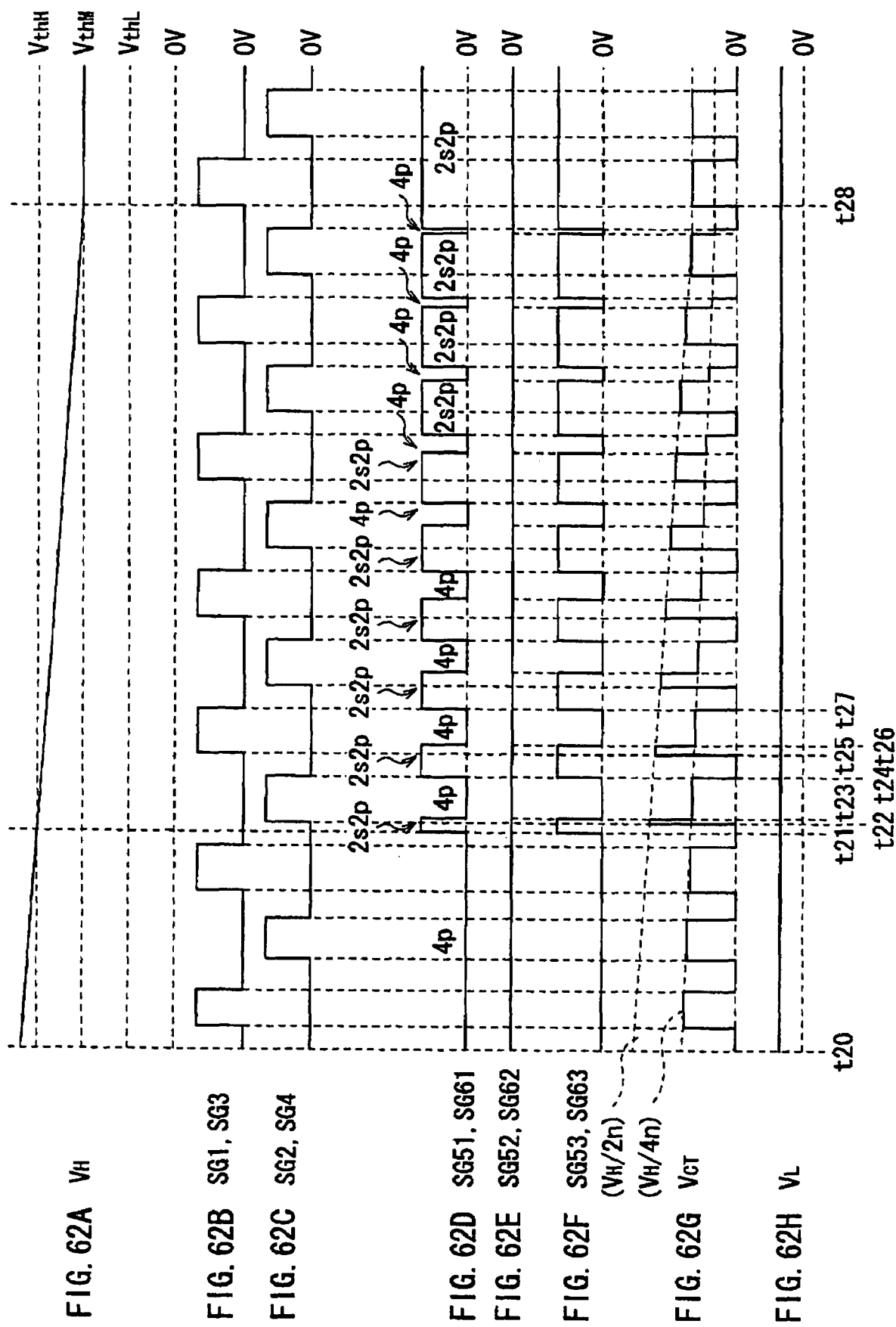

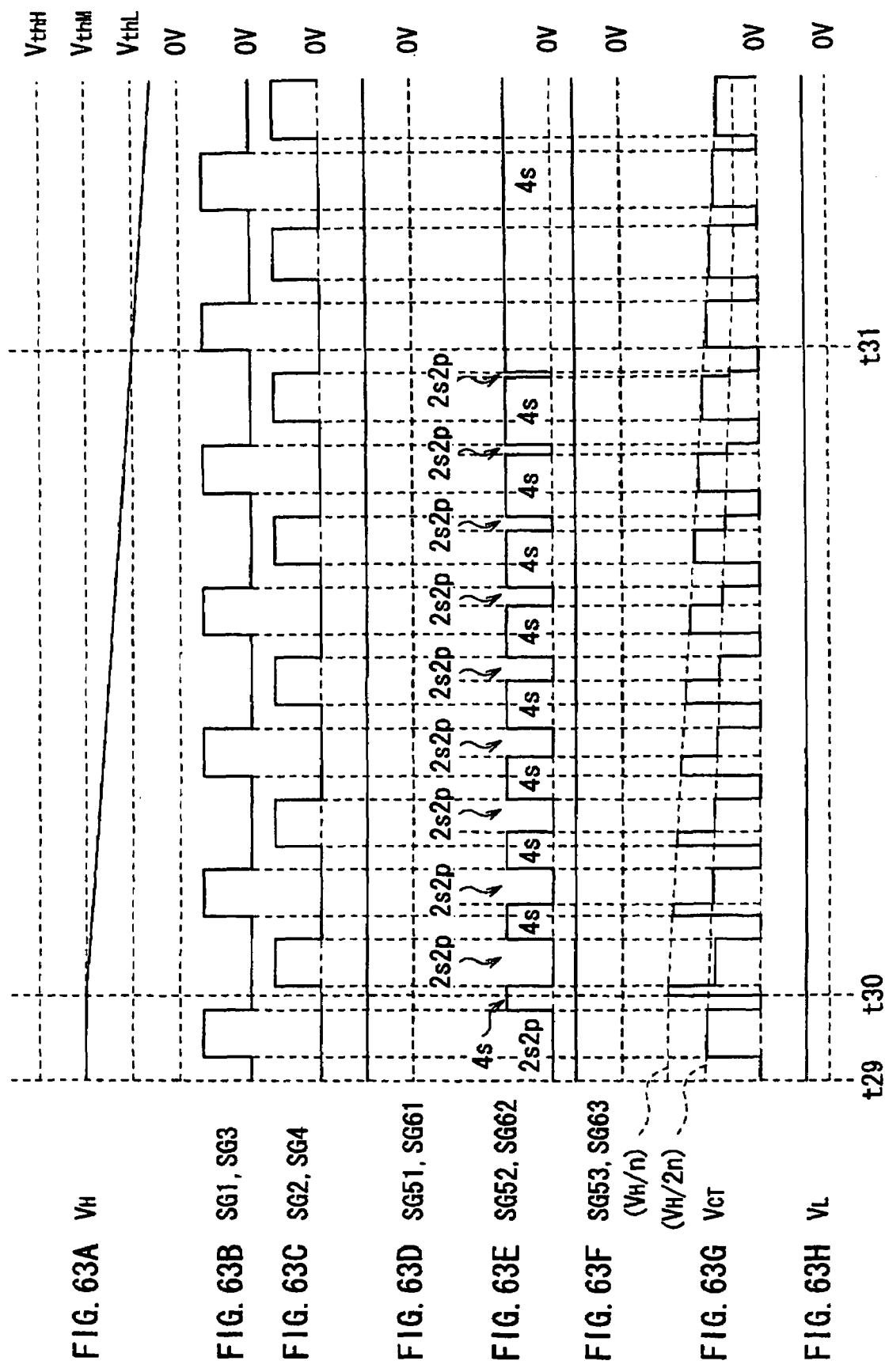

| VH | S5, S6 | CONNECTION STATE | TURN RATIO (np/ns) |
|---|---|---|---|
| HIGH (VH≧Vth3) | OFF | 2-PARALLEL | 2n |
| LOW (Vth3>VH) | ON | 2-SERIES | n |

SWITCHING POWER SUPPLY UNIT

BACKGROUND OF THE INVENTION

1. Field of the Invention

The present invention relates to a switching power supply unit configured such that switching output obtained by switching an input DC voltage is drawn out from an output winding of a power conversion transformer.

2. Description of the Related Art

Hitherto, various types of switching power supply units have been proposed and provided for practical use. Most of them are in a type where an input DC voltage is switched by switching operation of a switching circuit connected to an input winding of a power conversion transformer, and switching output is drawn out from an output winding of the power conversion transformer. A voltage induced on the output winding in association with such switching operation of the switching circuit is rectified by a rectifier circuit, the rectified voltage is converted to a DC voltage by a smoothing circuit, and the smoothed voltage is outputted.

In a switching power supply unit of this type, it is desirable to widen an input voltage range in which an output voltage can be kept constant. Thus, for example, Japanese Unexamined Patent Publication No. 11-136939 proposes a switching power supply unit in which two windings having the same number of turns are provided at a primary side of a transformer correspondingly to two switching elements (switching circuits), and the two primary windings are connected in series or parallel with each other depending on magnitude of an input voltage.

SUMMARY OF THE INVENTION

According to a technique of the Japanese Unexamined Patent Publication No. 11-136939, a turn ratio between a primary winding and a secondary winding of a transformer can be changed depending on magnitude of the input voltage, so that an input voltage range, in which an output voltage can be kept constant, seems to be widened.

However, in the switching power supply unit, since there are only two states of a series connection state and a parallel connection state as connection states between windings, it has been difficult to sufficiently widen a convertible voltage range.

Moreover, in the switching power supply unit, there has been a difficulty that when two primary windings are connected in parallel with each other, if control timings between two switching circuits in parallel operation (timings of on/off operation between switching elements) are shifted from each other even slightly due to variation in manufacturing between elements, an excessive surge current flows due to difference in impedance between the switching circuits. When the excessive surge current is produced, the switching elements or the like may be broken. Moreover, the control timings are actually hard to be perfectly made equal between them. As a result, an element having a large current capacity must be used, and since an element tends to be increased in size with increase in current capacity, a unit as a whole has been hardly reduced in size.

Moreover, in the switching power supply unit, there has been a difficulty that when connection changeover is performed between the series connection state and the parallel connection state, a turn ratio between a primary winding and a secondary winding of a transformer is abruptly changed, therefore in the case that an element having a slow response speed exists in a unit, the element can not follow the change of the turn ratio, consequently an output voltage becomes unstable (output voltage is hard to be kept constant).

In view of foregoing, it is desirable to provide a switching power supply unit, in which the convertible voltage range can be more widened.

It is further desirable to provide a switching power supply unit, in which widening of the convertible voltage range can be achieved while suppressing production of the surge current.

It is still further desirable to provide a switching power supply unit, in which an output voltage can be stabilized independently of response speed of each element in the unit.

A first switching power supply unit of an embodiment of the invention, which includes first and second terminal pairs, and performs voltage conversion between a first DC voltage at the first terminal pair side and a second DC voltage at the second terminal pair side, has a transformer having a plurality of first windings disposed at the first terminal pair side, the first windings having the number of turns equal to one another, and a second winding disposed at the second terminal pair side; a plurality of first switching circuits of a full-bridge type, the circuits being provided correspondingly to the plurality of first windings, and including four switching elements respectively; and a connection changeover unit performing connection changeover such that a plurality of current paths are in parallel connection, series connection, or mixed connection of series and parallel with one another, the current paths including the plurality of first circuits and the first windings corresponding to the plurality of first circuits respectively.

In the first switching power supply unit of an embodiment of the invention, each of the plurality of first circuits operates as an inverter circuit or a rectifier circuit, and voltage conversion is performed between the first DC voltage at the first terminal pair side and the second DC voltage at the second terminal pair side by a transformation function of the transformer. Moreover, the connection changeover unit performs the connection changeover such that the plurality of current paths are in the parallel connection, series connection, or mixed connection of series and parallel with one another. Here, since the plurality of first windings of the transformer are corresponding to the plurality of first circuits respectively, and have the number of turns equal to one another, a turn ratio between the first windings and the second winding is larger in order of the parallel connection, mixed connection, and series connection.

In the first switching power supply unit of an embodiment of the invention, when the first DC voltage is inputted and subjected to voltage conversion to output the second DC voltage, that is, when each of the plurality of first circuits operates as the inverter circuit, the connection changeover unit may perform connection changeover depending on magnitude of the first DC voltage. Specifically, the connection changeover unit may perform connection changeover in order of the parallel connection, mixed connection, and series connection with increase in the first DC voltage. In the case of such a configuration, since the turn ratio between the first windings and the second winding is increased with increase in the first DC voltage, a range of an input voltage (first DC voltage) in which a constant output voltage (second DC voltage) can be kept is widened compared with a usual case.

Conversely, when the second DC voltage is inputted and subjected to voltage conversion to output the first DC voltage, that is, when each of the plurality of first circuits operates as the rectifier circuit, the connection changeover unit may perform connection changeover depending on magnitude of the second DC voltage. Specifically, the connection changeover unit may perform connection changeover in order of the series connection, mixed connection, and parallel connection with increase in the second DC voltage. In the case of such a configuration, since the turn ratio between the first windings and the second winding is decreased with increase in the second DC voltage, a range of an input voltage (second DC voltage) in which a constant output voltage (first DC voltage) can be kept is widened compared with a usual case.

In these cases, the connection changeover unit may include a plurality of connection changeover elements, a voltage detection circuit for detecting the first DC voltage or the second DC voltage, and a first control section for controlling an on/off state of each of the plurality of connection changeover elements depending on magnitude of the first or second DC voltage detected by the voltage detection circuit.

In the first switching power supply unit of an embodiment of the invention, the connection changeover unit may make a comparison on magnitude between a value of the first or second DC voltage and a value of each of predetermined, several threshold voltages, and perform connection changeover based on a result of the comparison, or may perform connection changeover such that at least two of a relative period in the parallel connection state, a relative period in the mixed connection state, and a relative period in the series connection state are changed depending on the magnitude of the first or second DC voltage respectively. In the latter case, since the relative periods in the relevant connection states are changed depending on the magnitude of the first or second DC voltage, values of them are not abruptly changed (continuously changed). In the latter case, it can be configured that the connection changeover unit changes the relative periods in the relevant connection states such that the turn ratio between the first windings and the second winding is continuously increased with increase in the first DC voltage, and the turn ratio is continuously decreased with increase in the second DC voltage.

In the first switching power supply unit of an embodiment of the invention, when the second DC voltage is inputted and subjected to voltage conversion to output the first DC voltage, the connection changeover unit may perform connection changeover such that a value of the first DC voltage corresponds to a predetermined, target voltage vale. In the case of such a configuration, a range of an output voltage (first DC voltage) that can be converted from a constant input voltage (second DC voltage) is widened compared with a usual case.

In this case, the connection changeover unit may include a plurality of connection changeover elements, and a second control section for controlling an on/off state of each of the plurality of connection changeover elements depending on magnitude of the target voltage value. The connection changeover unit preferably performs connection changeover in order of the parallel connection, mixed connection, and series connection with increase in the target voltage value. In the case of such a configuration, the turn ratio between the first windings and the second winding is increased with increase in the target voltage value of the output voltage (first DC voltage).

The first switching power supply unit of an embodiment of the invention can be configured to include four first circuits, and have a 4-parallel connection state, mixed connection state of 2-series and 2-parallel, and 4-series connection state as connection states between four current paths corresponding to the first circuits. Moreover, it can be configured to include six first circuits, and have a 6-parallel connection state, mixed connection state of 2-series and 3-parallel, mixed connection state of 3-series and 2-parallel, and 6-series connection state as connection states between six current paths corresponding to the first circuits. When the number of first circuits is assumed as N (natural number of 4 or more) as in the cases, at least 3 divisors of N preferably exist. In the case of such a configuration, the number of possible connection states between the current paths is increased as the number of divisors of N is increased.

In the first switching power supply unit of an embodiment of the invention, each of the four switching elements may perform on/off operation at any time independently of a connection state between the plurality of current paths, or may be in an on/off operation state or an on state depending on a connection state between the plurality of current paths. In the case of a configuration as the former, the four switching elements are controlled more easily compared with that of the latter.

In the first switching power supply unit of an embodiment of the invention, a second circuit of a center-tap type or a push-pull type may be provided at the second terminal pair side, or a second circuit of a full-bridge type may be provided. In the case of the second circuit of the center-tap type, the circuit operates as a rectifier circuit. On the other hand, in the case of the second circuit of the push-pull type, the circuit operates as an inverter circuit. In the case of the second circuit of the full-bridge type, the circuit operates as the rectifier circuit or the inverter circuit.

A second switching power supply unit of an embodiment of the invention, which includes first and second terminal pairs, and performs voltage conversion between a first DC voltage at the first terminal pair side and a second DC voltage at the second terminal pair side, has a transformer having a plurality of first windings disposed at the first terminal pair side, the first windings having the number of turns equal to one another, and a second winding disposed at the second terminal pair side; a plurality of circuits of a full-bridge type provided at the first terminal pair side correspondingly to the plurality of first windings, the circuits including four switching elements respectively; a drive circuit for driving the plurality of circuits in synchronization with one another; a plurality of inductors provided correspondingly to the plurality of circuits; and a connection changeover unit performing connection changeover such that a plurality of current paths are in parallel connection or series connection with one another, the current paths including the plurality of circuits and the first windings corresponding to the plurality of circuits respectively.

In the second switching power supply unit of an embodiment of the invention, the plurality of circuits operating in synchronization with one another operate as inverter circuits or rectifier circuits respectively, and voltage conversion is performed between the first DC voltage at the first terminal pair side and the second DC voltage at the second terminal pair side by a transformation function of the transformer. Moreover, the connection changeover unit performs connection changeover such that the plurality of current paths are in parallel connection or series connection with one another. Here, since the plurality of first windings of the transformer are corresponding to the plurality of circuits respectively, and have the number of turns equal to one another, a turn ratio between the first windings and the second winding is large in a case that the plurality of current paths are connected in series to one another compared with a case that they are connected in parallel to one another. Moreover, since the plurality of inductors are provided correspondingly to the plurality of switching circuits respectively, a current is gently changed in the circuits by an effect of keeping a level of the current by the inductors.

A third switching power supply unit of an embodiment of the invention, which includes first and second terminal pairs, and performs voltage conversion between a first DC voltage at the first terminal pair side and a second DC voltage at the second terminal pair side, has a transformer having a first winding disposed at the first terminal pair side, and a plurality of second windings disposed at the second terminal pair side, the second windings having the number of turns equal to one another; a plurality of circuits provided at a side of the plurality of second windings correspondingly to the plurality of second windings respectively; and a connection changeover unit performing connection changeover such that a plurality of current paths are in parallel connection, series connection, or mixed connection of series and parallel with one another, the current paths including the plurality of circuits and second windings corresponding to the plurality of circuits respectively.

In the third switching power supply unit of an embodiment of the invention, each of the plurality of circuits operates as an inverter circuit or a rectifier circuit, and voltage conversion is performed between the first DC voltage at the first terminal pair side and the second DC voltage at the second terminal pair side by a transformation function of the transformer. Moreover, the connection changeover unit performs connection changeover such that the plurality of current paths are in the parallel connection, series connection, or mixed connection of series and parallel with one another. Here, since the plurality of second windings of the transformer are corresponding to the plurality of circuits respectively, and have the number of turns equal to one another, a turn ratio between the first winding and the second windings is larger in order of the series connection, mixed connection, and parallel connection.

In the third switching power supply unit of an embodiment of the invention, when the first DC voltage is inputted and subjected to voltage conversion to output the second DC voltage, that is, when each of the plurality of switching circuits operates as the rectifier circuit, the connection changeover unit may perform connection changeover depending on magnitude of the first DC voltage. Specifically, the connection changeover unit may perform connection changeover in order of the series connection, mixed connection, and parallel connection with increase in the first DC voltage. In the case of such a configuration, since the turn ratio between the first winding and the second windings is increased with increase in the first DC voltage, a range of an input voltage (first DC voltage) in which a constant output voltage (second DC voltage) can be kept is widened compared with a usual case.

Conversely, when the second DC voltage is inputted and subjected to voltage conversion to output the first DC voltage, that is, when each of the plurality of first circuits operates as the inverter circuit, the connection changeover unit may perform connection changeover depending on magnitude of the second DC voltage. Specifically, the connection changeover unit may perform connection changeover in order of the parallel connection, mixed connection, and series connection with increase in the second DC voltage. In the case of such a configuration, since the turn ratio between the first winding and the second windings is decreased with increase in the second DC voltage, a range of an input voltage (second DC voltage) in which a constant output voltage (first DC voltage) can be kept is widened compared with a usual case.

In these cases, the connection changeover unit may include a plurality of connection changeover elements, a voltage detection circuit for detecting the first DC voltage or the second DC voltage, and a first control section for controlling an on/off state of each of the plurality of connection changeover elements depending on magnitude of the first or second DC voltage detected by the voltage detection circuit.

In the third switching power supply unit of an embodiment of the invention, the connection changeover unit may make a comparison on magnitude between a value of the first or second DC voltage and a value of each of predetermined, several threshold voltages, and perform connection changeover based on a result of the comparison, or it may perform the connection changeover such that at least two of a relative period of the parallel connection state, a relative period of the mixed connection state, and a relative period of the series connection state depending on the magnitude of the first or second DC voltage. In the latter case, since the relative periods in the relevant connection states are changed depending on the magnitude of the first or second DC voltage, values of them are not abruptly changed (continuously changed). In the latter case, it can be configured that the connection changeover unit changes the relative periods in the relevant connection states such that a turn ratio between the first winding and the second windings is continuously increased with increase in the first DC voltage, and the turn ratio is continuously decreased with increase in the second DC voltage.

In the third switching power supply unit of an embodiment of the invention, when the second DC voltage is inputted and subjected to voltage conversion to output the first DC voltage, the connection changeover unit may perform connection changeover such that a value of the first DC voltage corresponds to a predetermined, target voltage vale. In the case of such a configuration, a range of an output voltage (first DC voltage) that can be converted from a constant input voltage (second DC voltage) is widened compared with a usual case.

In this case, the connection changeover unit may include a plurality of connection changeover elements, and a second control section for controlling an on/off state of each of the plurality of connection changeover elements depending on magnitude of the target voltage value. The connection changeover unit preferably performs connection changeover in order of the series connection, the mixed connection, and the parallel connection with increase in the target voltage value. In the case of such a configuration, the turn ratio between the first winding and the second windings is increased with increase in the target voltage value of the output voltage (first DC voltage).

In the third switching power supply unit of an embodiment of the invention, a second circuit of a full-bridge type or half-bridge type may be provided at the first terminal pair side. In the case of such a configuration, the circuit operates as an inverter circuit or a rectifier circuit. In addition, each of the plurality of circuits may be a circuit of a center-tap type or a push-pull type, or may be a circuit of a full-bridge type. In the case of the circuit of the center-tap type, the circuit operates as the rectifier circuit. On the other hand, in the case of the circuit of the push-pull type, the circuit operates as the inverter circuit. In the case of the circuit of the full-bridge type, the circuit operates as the rectifier circuit or the inverter circuit.

A fourth switching power supply unit of an embodiment of the invention, which includes first and second terminal pairs, and performs voltage conversion between a first DC voltage at the first terminal pair side and a second DC voltage at the second terminal pair side, has a transformer having a first winding disposed at the first terminal pair side, and two second windings disposed at the second terminal pair side, the second windings having the number of turns equal to each other; two circuits provided at a side of the two second windings correspondingly to the two second windings respectively, each of the circuits having a plurality of switching elements; and a connection changeover unit performing connection changeover such that a relative period in a parallel connection state where two current paths are in parallel connection with each other, the current paths including the two circuits and the second windings corresponding to the two circuits respectively, and a relative period in a series connection state where the two current paths are in series connection with each other are changed depending on magnitude of the first DC voltage.

In the fourth switching power supply unit of an embodiment of the invention, each of the two circuits operates as an inverter circuit or a rectifier circuit, and voltage conversion is performed between the first DC voltage at the first terminal pair side and the second DC voltage at the second terminal pair side by a transformation function of the transformer. Moreover, the connection changeover unit performs connection changeover such that the two current paths are in parallel connection or series connection with each other. Here, since the two second windings of the transformer are corresponding to the two circuits respectively, and have the number of turns equal to each other, a turn ratio between the first winding and the second windings is larger in order of the series connection and parallel connection. Moreover, since the relative periods in the parallel connection state and the series connection state are changed depending on the magnitude of the first DC voltage respectively, the turn ratio is not abruptly changed (continuously changed).

According to the first switching power supply unit of an embodiment of the invention, a transformer having a plurality of first windings having the number of turns equal to one another is provided correspondingly to the plurality of first circuits respectively, and the plurality of current paths are in parallel connection, series connection, or mixed connection of series and parallel with one another by the connection changeover unit. Therefore, the turn ratio between the first windings and the second winding can be made larger in order of parallel connection, mixed connection, and series connection, consequently a convertible voltage range can be widened compared with a usual case.

According to the second switching power supply unit of an embodiment of the invention, a transformer having a plurality of first windings having the number of turns equal to one another and the plurality of inductors are provided correspondingly to the plurality of circuits operating in synchronization with one another respectively, and the plurality of current paths are in parallel connection or series connection with one another by the connection changeover unit. Therefore, the turn ratio between the first windings and the second winding can be increased in the case of the series connection compared with the case of the parallel connection, and a current can be gently changed in the circuits. Accordingly, the turn ratio of the transformer can be changed, and tolerance for shift in timing between the circuits can be increased, consequently widening of a convertible voltage range can be achieved while suppressing production of a surge current.

According to the third switching power supply unit of an embodiment of the invention, a transformer having a plurality of second windings having the number of turns equal to one another are provided correspondingly to the plurality of circuits respectively, and the plurality of current paths are in parallel connection, series connection, or mixed connection of series and parallel with one another by the connection changeover unit. Therefore, the turn ratio between the first winding and the second windings can be made larger in order of parallel connection, mixed connection, and series connection, consequently a convertible voltage range can be widened compared with a usual case.

According to the fourth switching power supply unit of an embodiment of the invention, since the relative periods in the parallel connection state and the series connection state are changed depending on magnitude of the first DC voltage respectively, the turn ratio can be continuously changed, and prevented from being abruptly changed. Accordingly, even if an element having a slow response speed exists in a unit, the turn ratio can be changed without any difficulty, consequently the output voltage can be stabilized independently of response speed of each element.

Other and further objects, features and advantages of the invention will appear more fully from the following description.

BRIEF DESCRIPTION OF THE DRAWINGS

FIGS. 12A to 12C are timing waveform views for explaining forward operation of the switching power supply unit according to the comparative example;

FIG. 13A to 13C are timing waveform views for explaining forward operation of the switching power supply unit of FIG. 1;

FIG. 25 is a view for explaining a connection state according to a second embodiment of the invention;

FIG. 33 is a view for explaining connection changeover operation by the control section of FIG. 32;

FIGS. 34A to 34H are timing waveform views for explaining the connection changeover operation by the control section of FIG. 2;

FIGS. 35A to 35H are timing waveform views for explaining the connection changeover operation following FIGS. 34A to 34H;

FIGS. 36A to 36H are timing waveform views for explaining the connection changeover operation by the control section of FIG. 32;

FIGS. 37A to 37H are timing waveform views for explaining the connection changeover operation following FIGS. 36A to 36H;

FIG. 59 is a view for explaining connection changeover operation by the control section of FIG. 58;

FIGS. 60A to 60H are timing waveform views for explaining the connection changeover operation by the control section of FIG. 42;

FIGS. 61A to 61H are timing waveform views for explaining the connection changeover operation following FIG. 60;

FIGS. 62A to 62H are timing waveform views for explaining the connection changeover operation by the control section of FIG. 58;

FIGS. 63A to 63H are timing waveform views for explaining the connection changeover operation following FIG. 62;

DETAILED DESCRIPTION OF THE PREFERRED EMBODIMENTS

Hereinafter, the best mode for carrying out an embodiment of the invention (hereinafter, simply called embodiment) will be described in detail with reference to drawings.

First Embodiment

Figure 1:
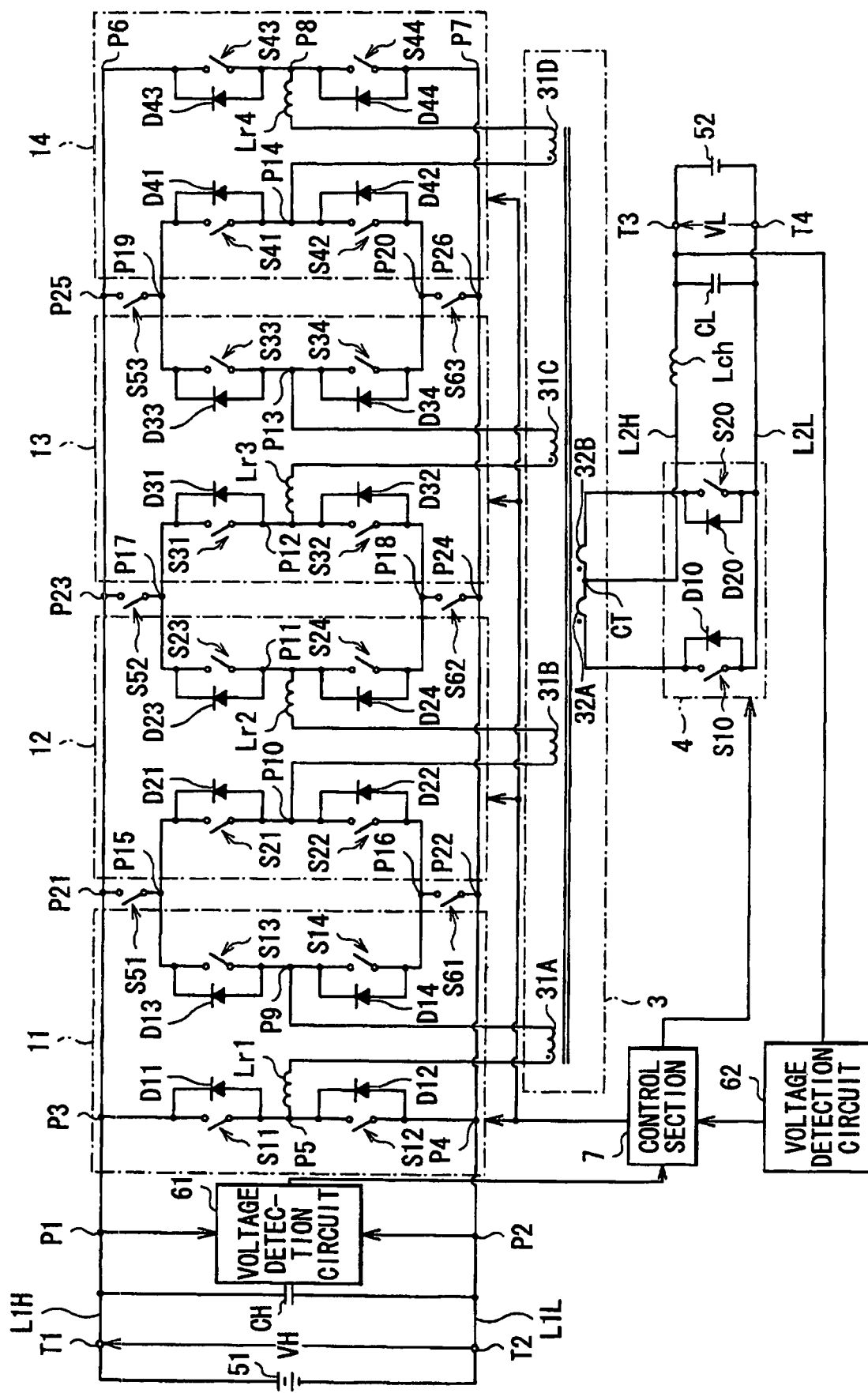
FIG. 1 is a circuit diagram showing a configuration of a switching power supply unit according to a first embodiment of the invention.

FIG. 1 shows a configuration of a switching power supply unit according to a first embodiment of the invention. The switching power supply unit is a switching power supply unit of a bidirectional type (DC-DC converter) that can perform forward operation of generating a low DC voltage VL based on a high DC voltage VH applied between input/output terminals T1 and T2 from a high-voltage battery 51, and outputting the low DC voltage from input/output terminals T3 and T4 to supply it to a low-voltage battery 52, and a reverse operation of conversely generating a high DC voltage VH based on a low DC voltage VL applied between the input/output terminals T3 and T4 from the low-voltage battery 52, and outputting the high DC voltage from the input/output terminals T1 and T2 to supply it to the high-voltage battery 51.

The switching power supply unit includes a smoothing capacitor CH provided between a high-voltage line L1H and a low-voltage line CL at a side of the high-voltage battery 51 (high-voltage side); four switching circuits 11 to 14; connection changeover switches S51 to S53 and S61 to S63; four inductors Lr1 to Lr4; a transformer 3 having windings 31A to 31D at the high-voltage side and windings 32A, 32B at a side of the low-voltage battery 52 (low-voltage side); a switching circuit 4, an inductor Lch, and a smoothing capacitor CL provided at the low-voltage side; a voltage detection circuit 61 for detecting a high DC voltage VH; a voltage detection circuit 62 for detecting a low DC voltage VL; and a control section 7 for controlling operation of the switching circuits 11 to 14 and the connection changeover switches S51 to S53, S61 to S63 respectively.

The smoothing capacitor CH is for smoothing the high DC voltage VH.

The switching circuit 11 has four switching elements S11 to S14, and diodes D11 to D14 connected in parallel with the switching elements S11 to S14 respectively, that is, it is in a circuit configuration of a full-bridge type. Specifically, one end of the switching element S11 and one end of the switching element S12 are connected to each other at a connection point P5, and one end of the switching element S13 and one end of the switching element S14 are connected to each other at a connection point P9. Moreover, the other end of the switching element S11 and the other end of the switching element S13 are connected to each other at a connection point P3 (P21) via a connection changeover switch S51, and the other end of the switching element S12 and the other end of the switching element S14 are connected to each other at a connection point P4 (P22) via a connection changeover switch S61, and the other ends of them are connected to the input/output terminals T1 and T2 respectively.

Similarly, the switching circuit 12 has four switching elements S21 to S24, and diodes D21 to D24 connected in parallel with the switching elements S21 to S24 respectively, that is, it is in a circuit configuration of the full-bridge type. Specifically, one end of the switching element S21 and one end of the switching element S22 are connected to each other at a connection point P10, and one end of the switching element S23 and one end of the switching element S24 are connected to each other at a connection point P11. Moreover, the other end of the switching element S21 and the other end of the switching element S23 are connected to each other at a connection point P21 (P23) via a connection changeover switches S51 and S52, and the other end of the switching element S22 and the other end of the switching element S24 are connected to each other at a connection point P22 (P24) via a connection changeover switches S61 and S62, and the other ends of them are connected to the input/output terminals T1 and T2 respectively.

Similarly, the switching circuit 13 has four switching elements S31 to S34, and diodes D31 to D34 connected in parallel with the switching elements S31 to S34 respectively, that is, it is in a circuit configuration of the full-bridge type. Specifically, one end of the switching element S31 and one end of the switching element S32 are connected to each other at a connection point P12, and one end of the switching element S33 and one end of the switching element S34 are connected to each other at a connection point P13. Moreover, the other end of the switching element S31 and the other end of the switching element S33 are connected to each other at a connection point P23 (P25) via a connection changeover switches S52 and S53, and the other end of the switching element S32 and the other end of the switching element S34 are connected to each other at a connection point P24 (P26) via a connection changeover switches S62 and S63, and the other ends of them are connected to the input/output terminals T1 and T2 respectively.

Similarly, the switching circuit 14 has four switching elements S41 to S44, and diodes D41 to D44 connected in parallel with the switching elements S41 to S44 respectively, that is, it is in a circuit configuration of the full-bridge type. Specifically, one end of the switching element S41 and one end of the switching element S42 are connected to each other at a connection point P14, and one end of the switching element S43 and one end of the switching element S44 are connected to each other at a connection point P8. Moreover, the other end of the switching element S41 and the other end of the switching element S43 are connected to each other at a connection point P25 (P6) via a connection changeover switch S53, and the other end of the switching element S42 and the other end of the switching element S44 are connected to each other at a connection point P26 (P7) via a connection changeover switch S63, and the other ends of them are connected to the input/output terminals T1 and T2 respectively.

According to such a configuration, the switching circuits 11 to 14, 21 to 24, 31 to 34, and 41 to 44 operate as inverter circuits of the full-bridge type in forward operation, but operate as rectifier circuits of the full-bridge type in reverse operation, according to drive signals (drive signals SG11 to SG14, SG21 to SG24, SG31 to SG34, and SG41 to SG44) supplied from the control section 7, as described later.

The switching elements S11 to S14, S21 to S24, S31 to S34, and S41 to S44 include a switch element such as a field effect transistor (MOS-FET; Metal Oxide Semiconductor-Field Effect Transistor) or IGBT (Insulated Gate Bipolar Transistor) When MOS-FET is used for the switch element, the diodes D11 to D14, D21 to D24, D31 to D34, and D41 to D44 can be configured by a parasitic diode of the MOS-FET respectively. In such a configuration, the diodes D11 to D14, D21 to D24, D31 to D34, and D41 to D44 need not be provided separately from the switch element, consequently a circuit configuration can be simplified. Moreover, when the diodes D11 to D14, D21 to D24, D31 to D34, and D41 to D44 are configured by the parasitic diode of the MOS-FET respectively, the MOS-FET itself is preferably in an on state in synchronization with a period while the parasitic diode of the MOS-FET is conductive. This is because rectification can be made with smaller voltage drop.

The connection changeover switch S51 is disposed between a connection point P15 and a connection point P21, the connection changeover switch S52 is disposed between a connection point P17 and a connection point P23, and the connection changeover switch S53 is disposed between a connection point P19 and a connection point P25. The connection changeover switch S61 is disposed between a connection point P16 and a connection point P26, the connection changeover switch S62 is disposed between a connection point P18 and a connection point P24, and the connection changeover switch S63 is disposed between a connection point P20 and a connection point P26. In the connection changeover switches S51 to S53 and S61 to S63, an on/off state is controlled by drive signals (drive signals SG51 to SG53 and SG61 to SG63) supplied from the control section 7, so that connection between current paths in the switching circuits 11 to 14 is changed, which is described in detail later. The connection changeover switches S51 to S53 and S61 to S63 also include the switching element such as MOS-FET or IGBT.

The inductor Lr1 is connected to the connection point P5 at one end, and connected to the connection point P9 at the other end via a winding 31A of the transformer 3, so that it is in H-bridge connection with a bridge circuit (switching circuit 11) including the switching elements S11 to S14. The inductor Lr2 is connected to the connection point P11 at one end, and connected to the connection point P10 at the other end via a winding 31B of the transformer 3, so that it is in H-bridge connection with a bridge circuit (switching circuit 12) including the switching elements S21 to S24. The inductor Lr3 is connected to the connection point P12 at one end, and connected to the connection point P13 at the other end via a winding 31C of the transformer 3, so that it is in H-bridge connection with a bridge circuit (switching circuit 13) including the switching elements S31 to S34. The inductor Lr4 is connected to the connection point P8 at one end, and connected to the connection point P14 at the other end via a winding 31D of the transformer 3, so that it is in H-bridge connection with a bridge circuit (switching circuit 14) including the switching elements S41 to S44.

The transformer 3 has four windings at the high-voltage side 31A to 31D provided correspondingly to the switching circuits 11 to 14, and two windings 32A and 32B at the low-voltage side. Among them, the winding at the high-voltage side 31A is connected to the other end of the inductor Lr1 at one end, and connected to the connection point P9 at the other end, so that it is in H-bridge connection with the bridge circuit (switching circuit 11) including the switching elements S11 to S14. The winding 31B is connected to the connection point P10 at one end, and connected to the other end of the inductor Lr2 at the other end, so that it is in H-bridge connection with the bridge circuit (switching circuit 12) including the switching elements S21 to S24. The winding 31C is connected to the other end of the inductor Lr3 at one end, and connected to the connection point P13 at the other end, so that it is in H-bridge connection with the bridge circuit (switching circuit 13) including the switching elements S31 to S34. The winding 31D is connected to the connection point P14 at one end, and connected to the other end of the inductor Lr4 at the other end, so that it is in H-bridge connection with the bridge circuit (switching circuit 14) including the switching elements S41 to S44. On the other hand, one end of the winding 32A and one end of the winding 32B are connected to each other at a center-tap CT which is led to the input/output terminal T3 on a high-voltage line L2H at the low-voltage side via the inductor Lch. According to such a configuration, the transformer 3 steps down input AC voltages generated by the switching circuits 11 to 14 or a switching circuit 4 described later, and outputs output AC voltages different in phase by 180 degrees from one another from respective ends of the windings 32A and 32B or respective ends of the windings 31A to 31D. A level of step-down or step-up in this case is determined by a turn ratio between the windings 31A to 31D and the windings 32A and 32B.

The switching circuit 4 has two switching elements S10 and S20, and diodes D10 and D20 connected in parallel with the switching elements S10 and S20, so that it is in a circuit configuration of a push-pull type. When the diodes D10 and D20 are specifically seen, a cathode of the diode D10 is connected to the other end of the winding 32A of the transformer 3, and a cathode of the diode D20 is connected to the other end of the winding 32B of the transformer 3. An anode of the diode D10 and an anode of the diode D20 are connected to each other, and connected to a low-voltage line L2L at the low voltage side. That is, the diodes D10 and D20 of the switching circuit 4 are in a configuration in anode common connection of a center-tap type. According to such a configuration, the switching circuit 4 operates as a rectifier circuit of the center-tap type in forward operation, but operates as an inverter circuit of the push-pull type in reverse operation as described later.

The switching elements S10 and S20 also include a switch element such as MOS-FET or IGBT. When MOS-FET is used for the switch element, the diodes D10 and D20 can be configured by a parasitic diode of the MOS-FET respectively. Again in the case of such a configuration, the diodes D10 and D20 need not be provided separately from the switch element, consequently a circuit configuration can be simplified. Moreover, when the diodes D10 and D20 are configured by the parasitic diode of the MOS-FET respectively, the MOS-FET itself is preferably in an on state in synchronization with a period while the parasitic diode of the MOS-FET is conductive. This is because rectification can be made with smaller voltage drop.

The inductor Lch is disposed in an insertional manner on the high-voltage line L2H, and connected to the center-tap CT at one end, and connected to the input/output terminal T3 at the other end. The smoothing capacitor CL is provided between the high-voltage line L2H (specifically, the other end of the inductor Lch) and the low-voltage line L2L. The input/output terminal T4 is provided at an end of the low-voltage line L2L. According to such a configuration, the inductor Lch operates as a chalk coil in forward operation, and configures a smoothing circuit with the smoothing capacitor CL to smooth a DC voltage rectified by the switching circuit 4 to generate a low DC voltage VL, and supplies the low DC voltage to the low-voltage battery 52 from the input/output terminals T3 and T4.

The voltage detection circuit 61 is disposed in an insertional manner between the connection point P1 on the high-voltage line L1H at the high-voltage side and the connection point P2 on the low-voltage line L1L, and connected to the control section 7. According to such a configuration, the voltage detection circuit 61 detects the high DC voltage VH and outputs a voltage corresponding to magnitude of the high DC voltage VH to the control section 7. As a specific circuit configuration of the voltage detection circuit 61, for example, a configuration is given, in which a voltage-dividing resistance (not shown) disposed between the connection point P1 and the connection point P2 is used to detect the high DC voltage VH, and generates a corresponding voltage.

The voltage detection circuit 62 is disposed in an insertional manner between a connection point on a high-voltage line L2H at the low-voltage side (specifically, a connection point between the other end of the inductor Lch and the input/output terminal T3) and the control section 7. According to such a configuration, the voltage detection circuit 62 detects the low DC voltage VL and outputs a voltage corresponding to magnitude of the low DC voltage VL to the control section 7. Similarly as in the case of the voltage detection circuit 61, as a specific circuit configuration of the voltage detection circuit 62, for example, a configuration is given, which detects the low DC voltage VL using a voltage-dividing resistance (not shown) disposed between the connection point on the high-voltage line L2H and ground, and generates a corresponding voltage.

Figures 2, 3:
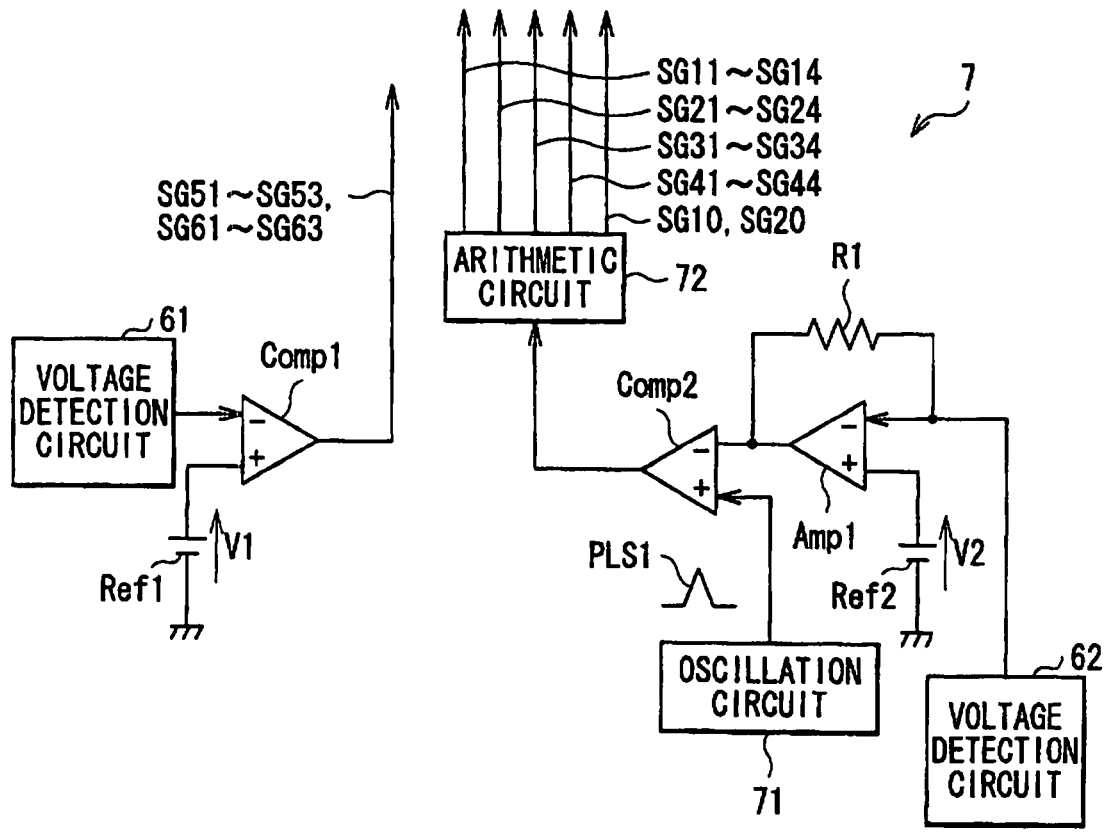
FIG. 2 is a circuit diagram showing a configuration of a control section in FIG. 1.
FIG. 3 is a view for explaining a connection state according to the first embodiment.

Here, the control section 7 is described in detail with reference to FIG. 2 and FIG. 3. FIG. 2 shows a circuit configuration of the control section 7, and FIG. 3 shows detail of control of connection changeover between current paths by the control section 7.

As shown in FIG. 2, the control section 7 has an oscillation circuit 71, an arithmetic circuit 72, comparators Comp1 and Comp2, a differential amplifier (error amplifier) Amp1, a reference power supply Ref1 for the comparator Comp1, a reference power supply Ref2 for the differential amplifier Amp1, and a resistor R1. A plus input terminal of the comparator Comp1 is connected to one end of the reference power supply Ref1, a minus input terminal of the comparator Comp1 is connected to an output terminal of the voltage detection circuit 61, and an output terminal is connected to the connection changeover switches S51 to S53 and S61 to S63. A plus input terminal of the differential amplifier Amp1 is connected to one end of the reference power supply Ref2, a minus input terminal is connected to an output terminal of the voltage detection circuit 62, and an output terminal is connected to a minus input terminal of the comparator Comp2. A plus input terminal of the comparator Comp2 is connected to an output terminal of the oscillator 71, and an output terminal is connected to an input terminal of the arithmetic circuit 72. Five output terminals of the arithmetic circuit 72 are connected to the switching circuits 11 to 14 and the switching circuit 4 respectively. The resistor R1 is disposed between the minus input terminal and output terminal of the differential amplifier Amp1, and the other end of the reference power supply Ref1 and the other end of the reference power supply Ref2 are grounded respectively.

The comparator Comp1 compares reference potential V1 from the reference power supply Ref1 corresponding to potential of a threshold voltage $V_{th11}$ or threshold voltage $V_{th12}$, with potential of a voltage corresponding to the high DC voltage VH outputted from the voltage detection circuit 61, and outputs drive signals SG51 to SG53 and SG61 to SG63 for the connection changeover switches S51 to S53 and S61 to S63 based on a result of the comparison respectively. Specifically, when the high DC voltage VH is higher than the threshold voltage $V_{th11}$, the drive signals SG51, SG53, SG61 and SG63 are in an "L" level. Conversely, when the high DC voltage VH is lower than the threshold voltage $V_{th11}$, the drive signals SG51, SG53, SG61 and SG63 are in an "H" level. When the high DC voltage VH is higher than the threshold voltage $V_{th12}$, the drive signals SG52 and SG62 are in the "L" level. Conversely, when the high DC voltage VH is lower than the threshold voltage $V_{th12}$, the drive signals SG52 and SG62 are in the "H" level.

The differential amplifier Amp1 amplifies potential difference between reference potential V2 from the reference power supply Ref2, and potential of a voltage corresponding to the low DC voltage VL outputted from the voltage detection circuit 62, and outputs the amplified potential difference.

The comparator Comp2 compares potential of a pulse voltage PLS1 outputted from the oscillation circuit 71 with potential of an output voltage from the differential amplifier Amp1, and outputs a pulse voltage as an origin of drive signals SG11 to SG14, SG21 to SG24, SG31 to SG34, and SG41 to SG44 for the switching elements S11 to S14, S21 to S24, S31 to S34, and S41 to S44 based on a result of the comparison. Specifically, when the output voltage from the differential amplifier Amp1 is higher than the pulse voltage PLS1, output of the comparator is in the "L" level. Conversely, when the output voltage from the differential amplifier Amp1 is lower than the pulse voltage PLS1, the output for DC input is in the "H" level.

The arithmetic circuit 72 performs logic operation to a pulse voltage signal outputted from the comparator Comp2, and outputs the drive signals SG11 to SG14, SG21 to SG24, SG31 to SG34, and SG41 to SG44 for the switching elements S11 to S14, S21 to S24, S31 to S34, and S41 to S44. Furthermore, the arithmetic circuit 72 outputs the drive signals SG10 and SG20 for the switching elements S10 and S20.

According to such a configuration, the control section 7 controls operation of the switching elements S11 to S14 in the switching circuit 11, operation of the switching elements S21 to S24 in the switching circuit 12, operation of switching elements S31 to S34 in the switching circuit 13, operation of switching elements S41 to S44 in the switching circuit 14, and operation of switching elements S10 and S20 in the switching circuit 4 respectively. Specifically, in forward operation, the switching elements S11 to S14, S21 to S24, S31 to S34, and S41 to S44 are subjected to on/off control using the drive signals SG11 to SG14, SG21 to SG24, SG31 to SG34, and SG41 to SG44, so that the low DC voltage VL is stabilized (kept constant). More specifically, when the low DC voltage VL detected by the voltage detection circuit 62 is increased, duty ratios of the drive signals SG11 to SG14, SG21 to SG24, SG31 to SG34, and SG41 to SG44 outputted from the control section 7 are reduced. When the detected low DC voltage VL is conversely decreased, the duty ratios of the drive signals SG11 to SG14, SG21 to SG24, SG31 to SG34, and SG41 to SG44 are increased. Consequently, the low DC voltage VL is kept constant. When the control section 7 controls the switching elements S11 to S14, S21 to S24, S31 to S34, and S41 to S44, and the switching elements S10 and S20 such that the switching elements are in an on state in synchronization with periods while the diodes D11 to D14, D21 to D24, D31 to D34, and D41 to D44 in the switching circuits 11 to 14, and the diodes D10 and D20 in the switching circuit 4 are conductive (synchronous rectification), power loss in the diodes D11 to D14, D21 to D24, D31 to D34, D41 to D44, D10 and D20 can be reduced.

Moreover, in forward operation, the control section 7 controls operation of the connection changeover switches S51 to S53 and S61 to S63 using the drive signals SG51 to SG53 and SG61 to SG63 according to magnitude of a voltage corresponding to the high DC voltage VH outputted from the voltage detection circuit 61, so that a connection state between a current path (first current path) passing through the switching circuit 11 and the winding 31A, a current path (second current path) passing through the switching circuit 12 and the winding 31B, a current path (third current path) passing through the switching circuit 13 and the winding 31C, and a current path (fourth current path) passing through the switching circuit 14 and the winding 31D is changed. On the other hand, in reverse operation, the control section 7 changes the connection state in the same way as in the forward operation depending on magnitude of a predetermined target voltage value so that a value of the high DC voltage VH being an output voltage corresponds to the target voltage value.

Specifically, as shown in FIG. 3, first, in forward operation, when the high DC voltage VH detected by the input voltage detection circuit 61 (the target voltage value of the high DC voltage VH in the reverse operation) is lower than the predetermined threshold voltage $V_{th11}$ (the predetermined threshold voltage $V_{th21}$ in the reverse operation), the control section 7 controls the connection changeover switches S51 to S53 and S61 to S63 to be in an on state. Then, the first to fourth current paths are in a parallel connection state to one another (4-parallel connection state). When the detected, high DC voltage VH (the target voltage value of the high DC voltage VH in the reverse operation) is equal to or higher than the predetermined threshold voltage $V_{th11}$ (the threshold voltage $V_{th21}$ in reverse operation) and lower than the predetermined threshold voltage $V_{th12}$ (the predetermined threshold voltage $V_{th22}$ in reverse operation), the control section 7 controls the connection changeover switches S51, S61, S53 and S63 to be in an off state respectively. Then, the first and second current paths are in a series connection state, and the third and fourth current paths are in a series connection state, and the two kinds of series connection are in a parallel connection state with each other. That is, the first to fourth current paths are in a mixed connection state of series and parallel with one another (2-series/2-parallel connection state). Furthermore, when the detected, high DC voltage VH (the target voltage value of the high DC voltage VH in the reverse operation) is equal to or higher than the threshold voltage $V_{th12}$ (the threshold voltage $V_{th22}$ in the reverse operation), the control section 7 controls all the connection changeover switches S51 to S53 and S61 to S63 to be in the off state. Then, the first to fourth current paths are in a series connection state to one another (4-series connection state). Here, when a turn ratio (np/ns) of the number of turns np of the windings 31A to 31D to the number of turns ns of the windings 32A, 32B of the transformer 3 is compared between the 4-parallel connection state, 2-series/2-parallel connection state, and 4-series connection state, the turn ratio is four times larger in the 4-series connection state (turn ratio=4n) than in the 4-parallel connection state (turn ratio=n), and two times larger in the 2-series/2-parallel connection state (turn ratio=2n) than in the 4-parallel connection state. Detail of such connection changeover control by the control section 7 is described later.

Here, the switching elements S11 to S14, the switching elements S21 to S24, the switching elements S31 to S34, and the switching elements S41 to S44 correspond to a specific example of the "four switching elements" in an embodiment of the invention, respectively, and the switching circuits 11 and 14 correspond to a specific example of the "plurality of first circuits" and the "plurality of circuits" in an embodiment of the invention. The windings 31A to 31D correspond to a specific example of the "first winding" in an embodiment of the invention, and the windings 32A and 32B correspond toga specific example of the "second windings" in an embodiment of the invention. The control section 7 corresponds to a specific example of the "drive circuit", "first control section", and "second control section" in an embodiment of the invention. The inductors Lr1 to Lr4 correspond to a specific example of the "plurality of inductors" in an embodiment of the invention. The connection changeover switches S51 to S53 and S61 to S63 correspond to a specific example of the "plurality of connection changeover elements" in an embodiment of the invention. The connection changeover switches S51 to S53 and S61 to S63, voltage detection circuits 61, 62, and control section 7 correspond to a specific example of the "connection changeover unit" in an embodiment of the invention. The input/output terminals T1 and T2 correspond to a specific example of the "first terminal pair" in an embodiment of the invention, and the input/output terminals T3 and T4 correspond to a specific example of the "second terminal pair" in an embodiment of the invention. The high DC voltage VH corresponds to a specific example of the "first DC voltage" in an embodiment of the invention, and the low DC voltage VL corresponds to a specific example of the "second DC voltage" in an embodiment of the invention.

Next, operation of the switching power supply unit configured as above is described. First, basic operation of the switching power supply unit is described separately in forward operation and reverse operation.

First, in forward operation (step-down operation from the high DC voltage VH to the low DC voltage VL), the switching elements S11 to S14, S21 to S24, S31 to S34, and S41 to S44 in the switching circuits 11 to 14 perform on/off operation according to the drive signals SG11 to SG14, SG21 to SG24, SG31 to SG34, and SG41 to SG44 from the control section 7 respectively, so that the switching circuits operate as inverter circuits. On the other hand, the switching elements S10 and S20 in the switching circuit 4 are in an off state according to the drive signals SG10 and SG20, so that the switching circuits operate as rectifier circuits. The inductor Lch operates as a chalk coil. In the case of the synchronous rectification, the switching elements S10 and S20 also perform on/off operation.

Accordingly, in the forward operation, the unit performs the following basic operation. First, the high-voltage battery 51 applies the high DC voltage VH between the input/output terminals T1 and T2, and then an input AC voltage is generated by the switching circuits 11 to 14 operating as the inverter circuits.

Next, the input AC voltage is inputted into the windings 31A to 31D of the transformer 3, the voltage is transformed (in this case, stepped-down), and output AC voltage is outputted from the windings 32A and 32B. Then, the output AC voltage is rectified by the diodes D10 and D20 in the switching circuit 4 operating as the rectifier circuit, and then smoothed by the inductor Lch operating as the chalk coil and the smoothing capacitor CL, and the smoothed voltage is outputted as the low DC voltage VL from the input/output terminals T3 and T4, and supplied to the low-voltage battery 52.

On the other hand, in reverse operation (step-up operation from the low DC voltage VL to the high DC voltage VH), the switching elements S11 to S14, S21 to S24, S31 to S34, and S41 to S44 in the switching circuits 11 to 14 are in an off state according to the drive signals SG11 to SG14, SG21 to SG24, SG31 to SG34, and SG41 to SG44 respectively, so that the switching circuits operate as rectifier circuits. On the other hand, the switching elements S10 and S20 in the switching circuit 4 perform an on/off operation according to the drive signals SG10 and SG20, so that the switching circuits operate as inverter circuits. The inductor Lch operates as a step-up inductor. In the case of the synchronous rectification, the switching elements S11 to S14, S21 to S24, S31 to S34, and S41 to S44 also perform on/off operation.

Accordingly, in the reverse operation, the unit performs the following basic operation. First, the low-voltage battery 52 applies the low DC voltage VL between the input/output terminals T3 and T4, and then an input AC voltage is generated by the inductor Lch operating as the step-up inductor and the switching circuit 4 operating as the inverter circuit.

Next, when the input AC voltage is inputted into the windings 32A to 32B of the transformer 3 respectively, the voltage is transformed (in this case, stepped-up), and output AC voltage is outputted from the windings 31A to 31D. Then, the output AC voltage is rectified by the diodes D11 to D14, D21 to D24, D31 to D34, and D41 to D44 in the switching circuits 11 to 14 operating as the rectifier circuits, then the rectified voltage is outputted as the high DC voltage VH from the input/output terminals T1 and T2, and supplied to the high-voltage battery 51.

In this way, the forward operation and the reverse operation are performed in the switching power supply unit of the embodiment.

Next, connection changeover operation between current paths as a main feature of an embodiment of the invention is described in detail separately in forward operation and reverse operation with reference to FIGS. 3 to 20.

Connection Changeover Operation in Forward Operation

First, connection changeover operation between current paths in forward operation is described with reference to FIGS. 4 to 13.

Figure 4:
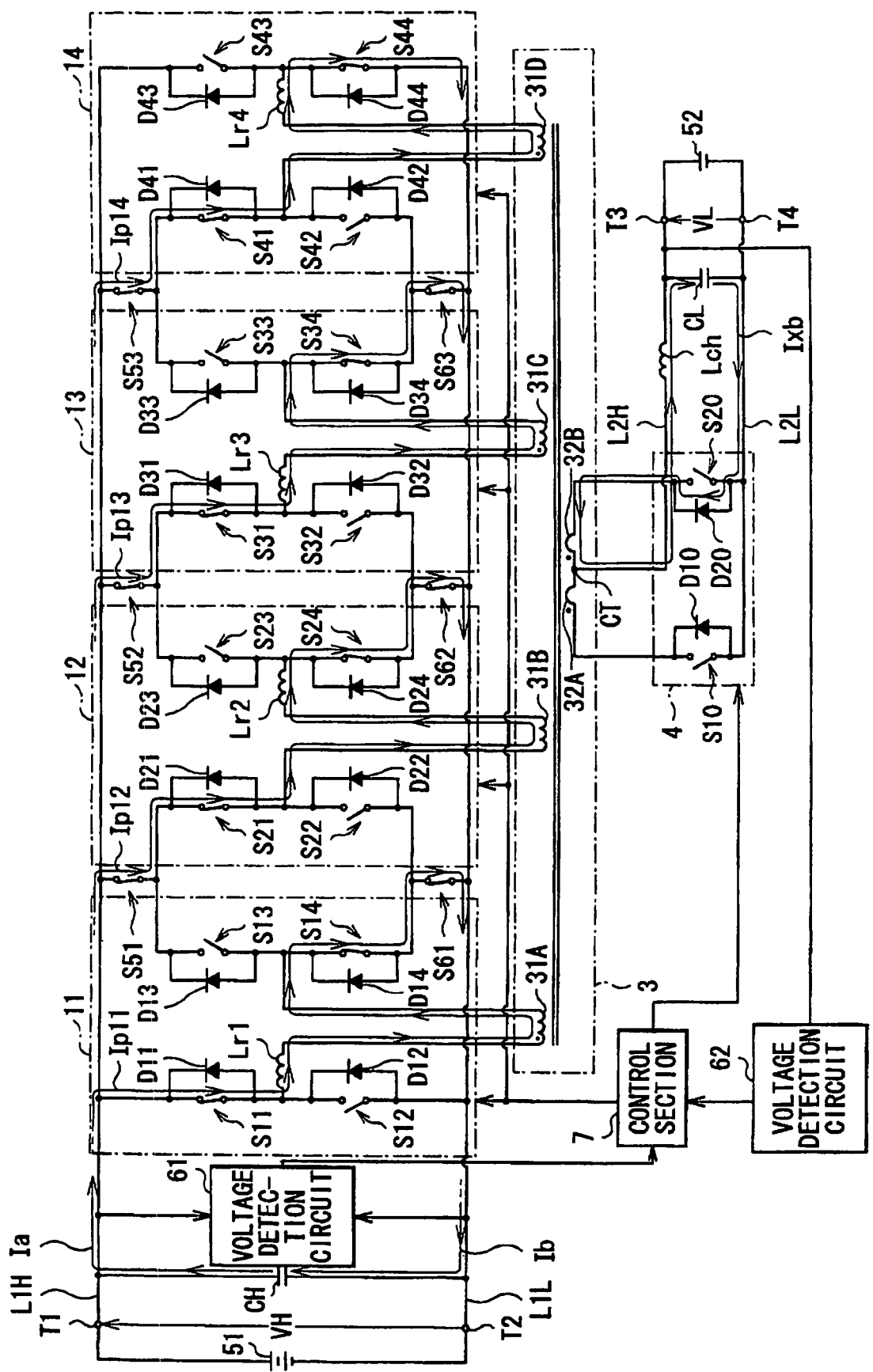
FIG. 4 is a circuit diagram for explaining operation in 4-parallel connection state in forward operation of the switching power supply unit of FIG. 1.
Figure 5:
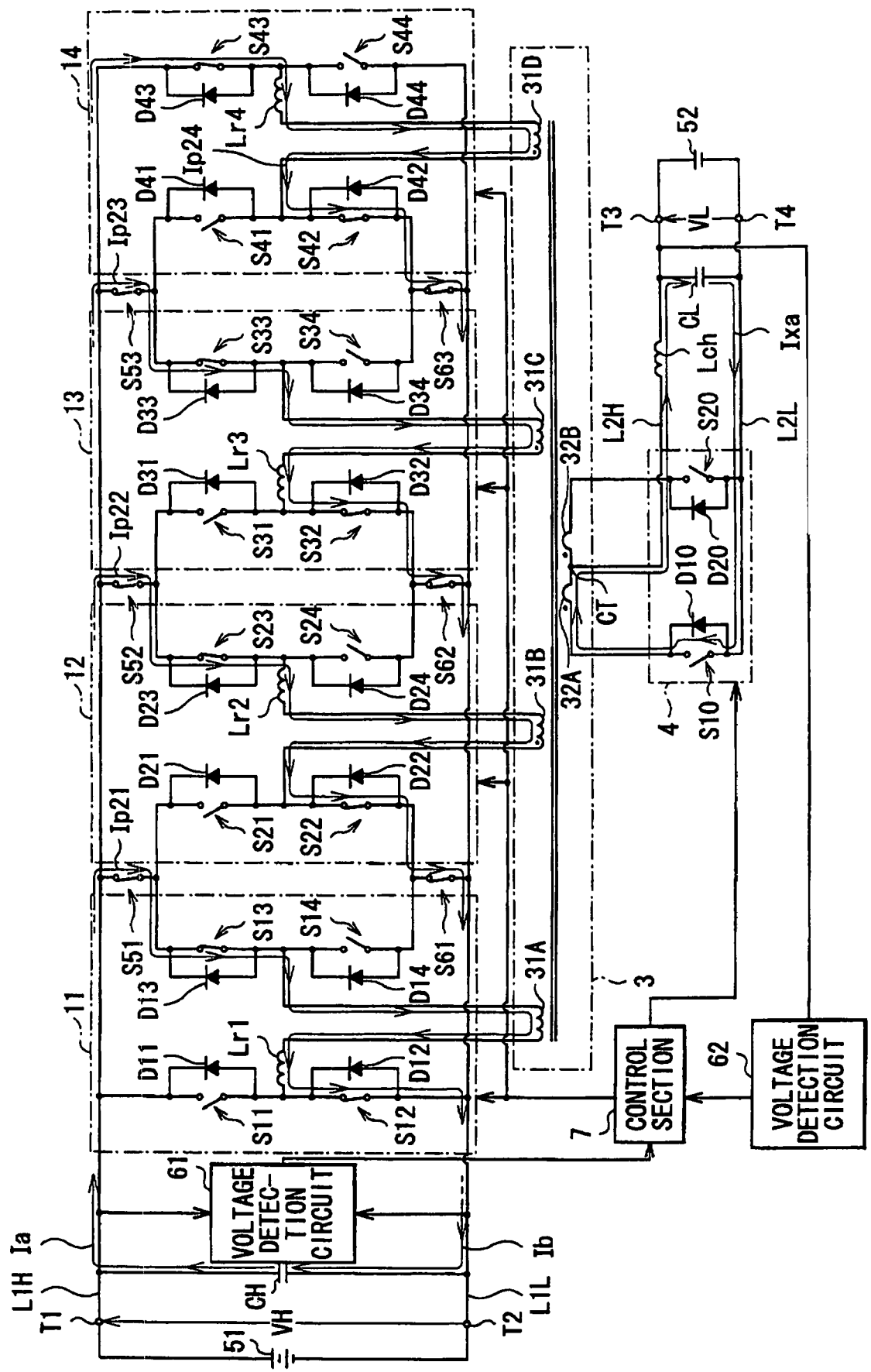
FIG. 5 is a circuit diagram for explaining operation in 4-parallel connection state in forward operation following FIG. 4.
Figure 6:
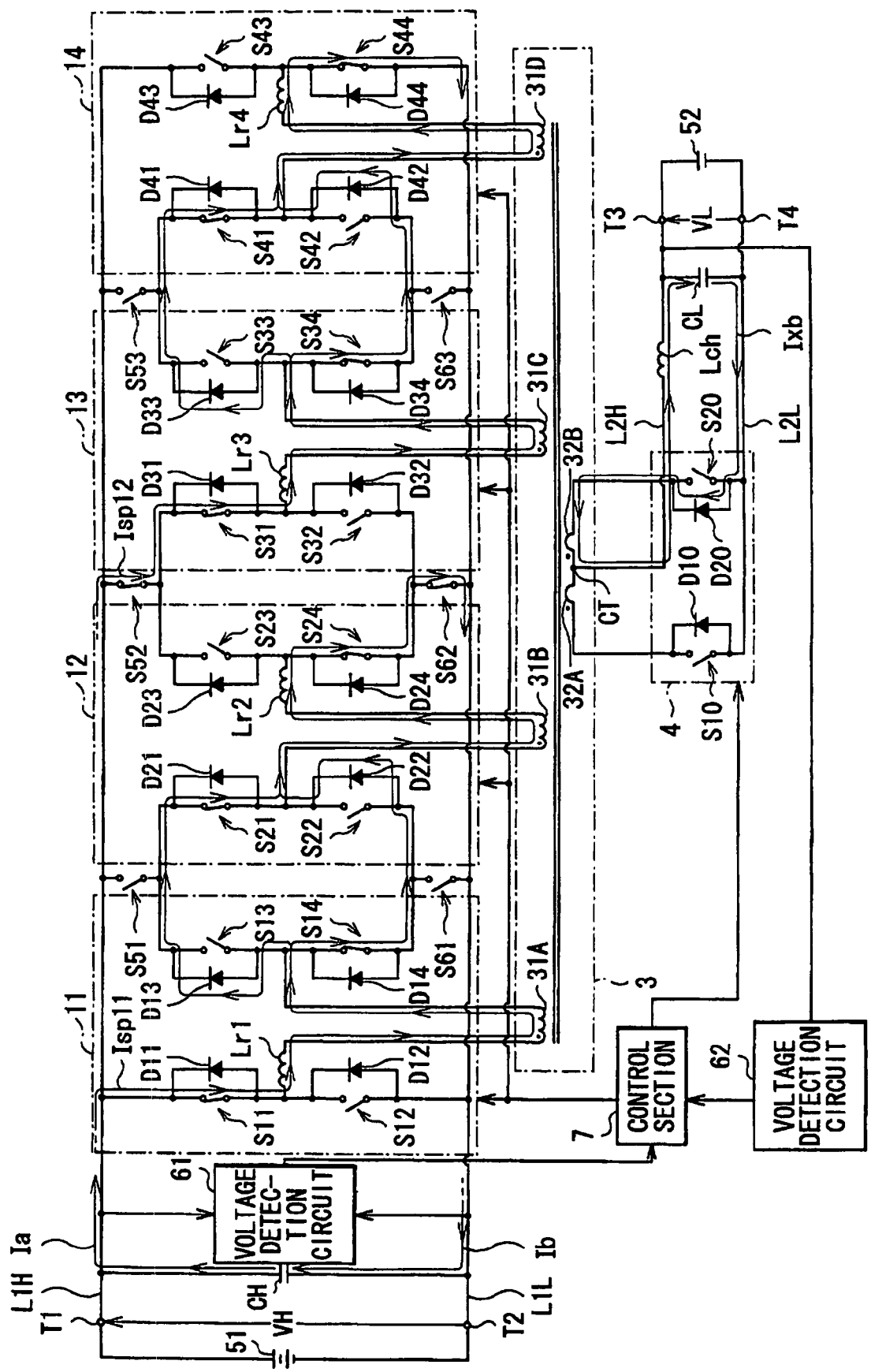
FIG. 6 is a circuit diagram for explaining operation in 2-series/2-parallel connection state in forward operation of the switching power supply unit of FIG. 1.
Figure 7:
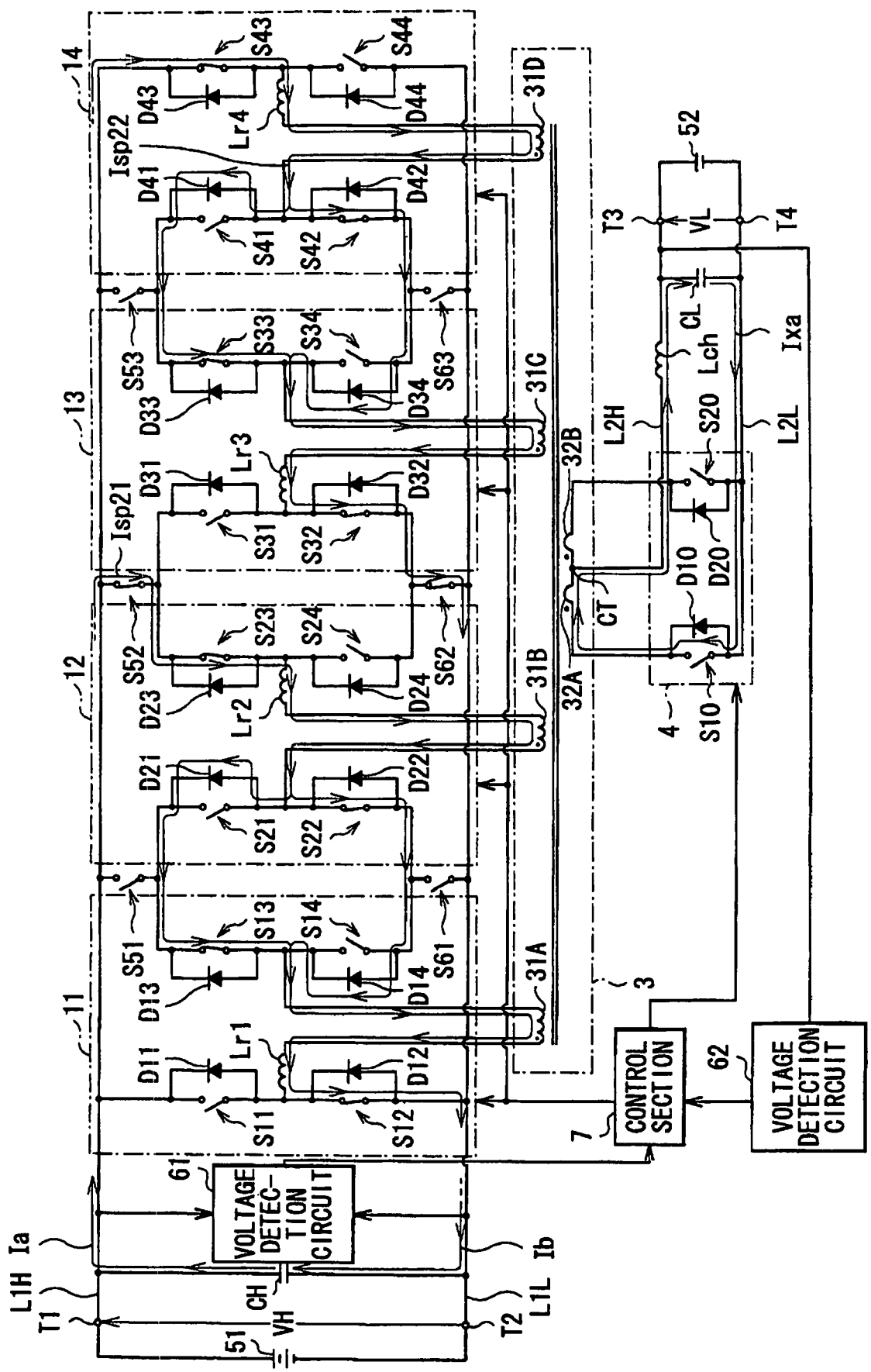
FIG. 7 is a circuit diagram for explaining operation in 2-series/2-parallel connection state in forward operation following FIG. 6.
Figure 8:
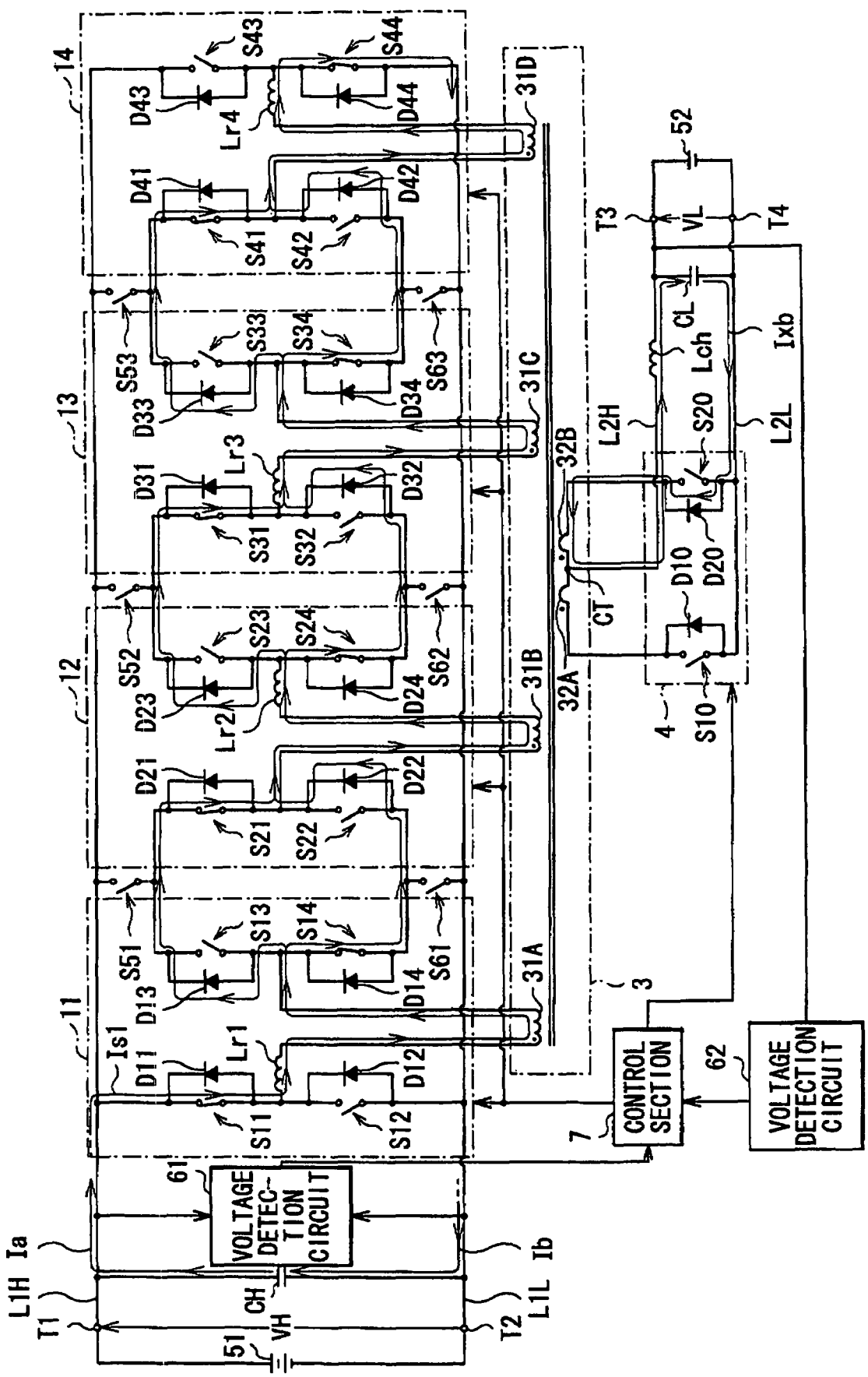
FIG. 8 is a circuit diagram for explaining operation in 4-series connection state in forward operation of the switching power supply unit of FIG. 1.
Figure 9:
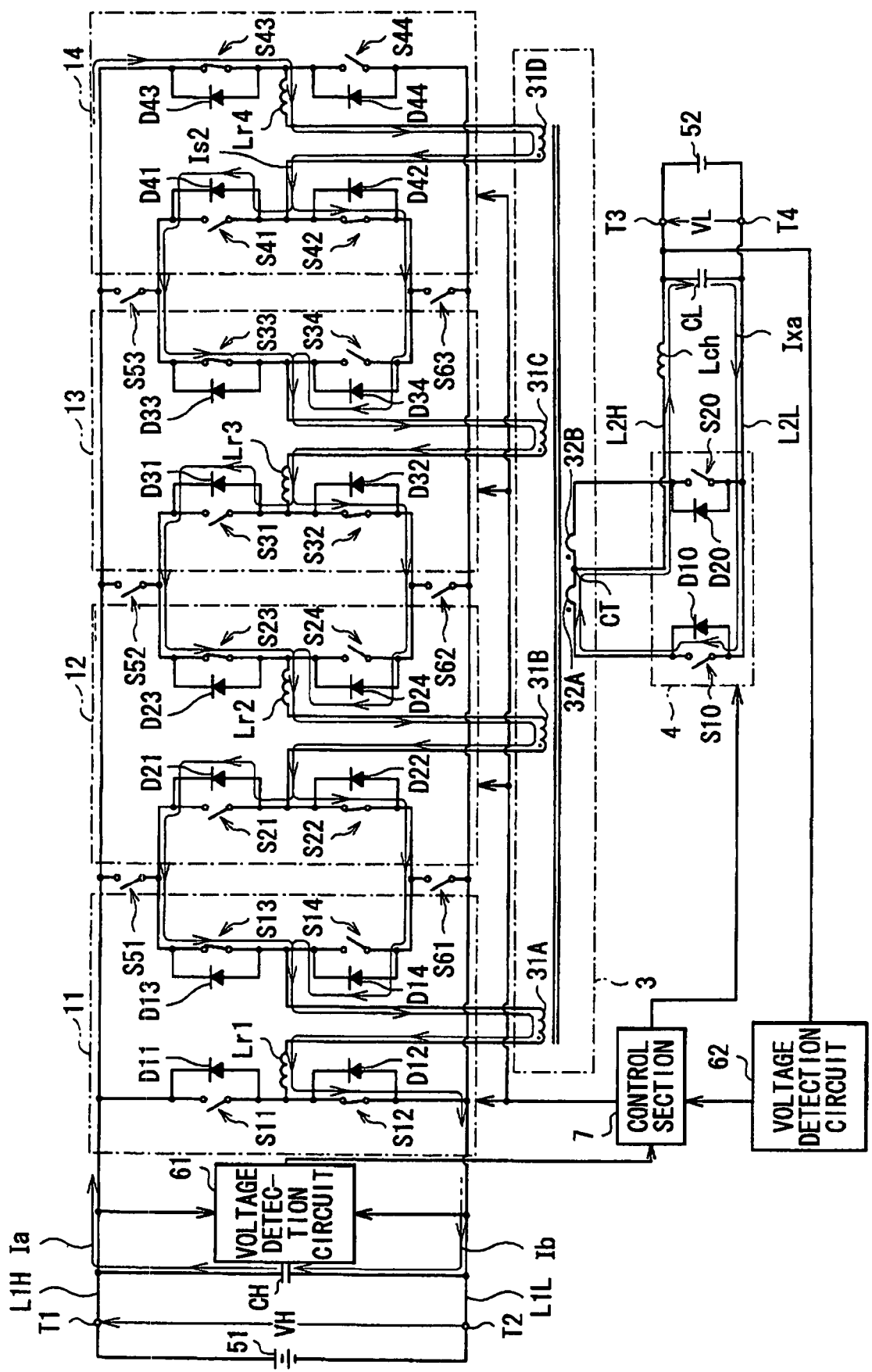
FIG. 9 is a circuit diagram for explaining operation in 4-series connection state in forward operation following FIG. 8.
Figure 10:
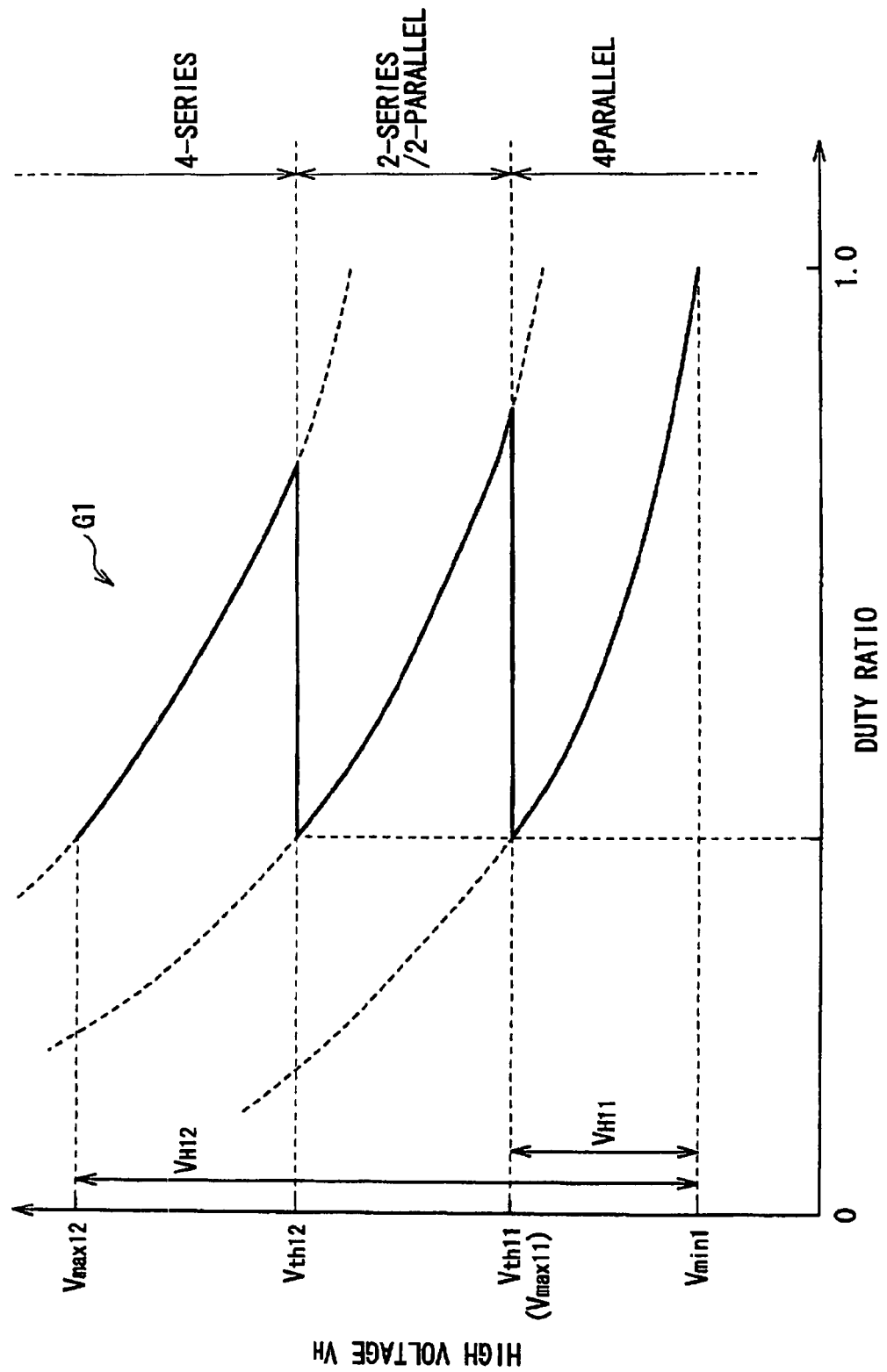
FIG. 10 is a characteristic view showing a relationship between an input voltage, a duty ratio, and a connection state in forward operation in the first embodiment.

FIGS. 4 to 9 show operation mode in forward operation of the switching power supply unit of the embodiment respectively. Among them, FIG. 4 and FIG. 5 show a case that the first to fourth current paths are in the 4-parallel connection state with one another. FIG. 6 and FIG. 7 show a case that they are in the 2-series/2-parallel connection state with one another. FIG. 8 and FIG. 9 show a case that they are in the 4-series connection state with one another. FIG. 10 shows a relationship between the high DC voltage VH and duty ratios (on-duty ratios of the drive signals SG11 to SG14, SG21 to SG24, SG31 to SG34, and SG41 to SG44) in the forward operation in the 4-parallel connection state, 2-series/2-parallel connection state, and 4-series connection state respectively.

First, the 4-parallel connection state as shown in FIG. 4 and FIG. 5 corresponds to a case that the high DC voltage VH detected by the voltage detection circuit 61 is lower than the threshold voltage $V_{th11}$, for example, as shown in FIG. 10. In this case, the control section 7 sets the connection changeover switches S51 to S53 and S61 to S63 to be in an on state respectively (see FIG. 3), so that the switching circuits 11 to 14 perform parallel operation independently of one another.

Specifically, in an operation mode as shown in FIG. 4, a current path Ip11 (corresponding to the first current path) passing through the smoothing capacitor CH, switching element S11, inductor Lr1, winding 31A, switching element S14, and connection changeover switch S61, a current path Ip12 (corresponding to the second current path) passing through the smoothing capacitor CH, connection changeover switch S51, switching element S21, winding 31B, inductor Lr2, switching element S24 and connection changeover switch S62, a current path Ip13 (corresponding to the third current path) passing through the smoothing capacitor CH, connection changeover switch S52, switching element S31, inductor Lr3, winding 31C, switching element S34 and connection changeover switch S63, and a current path Ip14 (corresponding to the fourth current path) passing through the smoothing capacitor CH, connection changeover switch S53, switching element S41, winding 31D, inductor Lr4, and switching element S44 are in the parallel connection state with one another.

In an operation mode as shown in FIG. 5, a current path Ip21 (corresponding to the first current path) passing through the smoothing capacitor CH, connection changeover switch S51, switching element S13, winding 31A, inductor Lr1, and switching element S12, and a current path Ip22 (corresponding to the second current path) passing through the smoothing capacitor CH, connection changeover switch S52, switching element S23, inductor Lr2, winding 31B, switching element S22 and connection changeover switch S61, a current path Ip23 (corresponding to the third current path) passing through the smoothing capacitor CH, connection changeover switch S53, switching element S33, winding 31C, inductor Lr3, switching element S32 and connection changeover switch S62, and a current path Ip24 (corresponding to the fourth current path) passing through the smoothing capacitor CH, connection changeover switch S43, inductor Lr4, winding 31D, switching element S42 and connection changeover switch S63 are in the parallel connection state with one another.

Here, the four windings 31A to 31D at the high-voltage side of the transformer 3 are corresponding to the four switching circuits 11 to 14 respectively, and have the number of turns equal to one another. Therefore, a turn ratio between the number of turns np of the windings 31A to 31D at the high voltage side and the number of turns ns of the windings 32A, 32B at the low voltage side in the 4-parallel connection state can be simply expressed as (np/ns) (which is assumed as n) (see FIG. 3).

The 2-series/2-parallel connection state as shown in FIG. 6 and FIG. 7 corresponds to a case that the high DC voltage VH detected by the voltage detection circuit 61 is equal to or higher than the threshold voltage $V_{th11}$ and lower than the threshold voltage $V_{th12}$, for example, as shown in FIG. 10. In this case, the control section 7 sets the connection changeover switches S51, S61, S53, and S63 to be in the off state, respectively (see FIG. 3), so that the switching circuits 11, 12 and the switching circuits 13, 14 perform parallel operation independently of each other.

Specifically, in an operation mode as shown in FIG. 6, a current path (corresponding to the first current path) passing through the smoothing capacitor CH, switching element S11, inductor Lr1, and winding 31A, and a current path (corresponding to the second current path) passing through the winding 31B, inductor Lr2, switching element S24, and connection changeover switch S62 are coupled with each other by a current path passing through a diode D13 and the switching element S21 and a current path passing through the switching element S14 and a diode D22, so that they are in a series connection state with each other. Moreover, a current path (corresponding to the third current path) passing through the smoothing capacitor CH, connection changeover switch S52, switching element S31, inductor Lr3, and winding 31C, and a current path (corresponding to the fourth current path) passing through the winding 31D, inductor Lr4, and switching element S44 are coupled with each other by a current path passing through a diode D33 and the switching element S41 and a current path passing through the switching element S34 and a diode D42, so that they are in a series connection state with each other. That is, a current path Isp11 passing through the smoothing capacitor CH, switching element S11, inductor Lr1, winding 31A, switching element S14 and diode D22 (or diode D13 and switching element S21), winding 31B, inductor Lr2, switching element S24 and connection changeover switch S62, and a current path Isp12 passing through the smoothing capacitor CH, connection changeover switch S52, switching element S31, inductor Lr3, winding 31C, switching element S34 and diode D42 (or diode D33 and switching element S41), winding 31D, inductor Lr4, and switching element S44 are formed.

In the operation mode as shown in FIG. 7, a current path (corresponding to the second current path) passing through the smoothing capacitor CH, connection changeover switch S52, switching element S23, inductor Lr2, and winding 31B, and a current path (corresponding to the first current path) passing through the winding 31A, inductor Lr1, and switching element S12 are coupled with each other by a current path passing through a diode D21 and the switching element S13 and a current path passing through the switching element S22 and a diode D14, so that they are in a series connection state with each other. Moreover, a current path (corresponding to the fourth current path) passing through the smoothing capacitor CH, switching element S43, inductor Lr4, and winding D31, and a current path (corresponding to the third current path) passing through the winding 31C, inductor Lr3, switching element S32 and connection changeover switch S62 are coupled with each other by a current path passing through a diode D41 and the switching element S33 and a current path passing through the switching element S42 and a diode D34, so that they are in a series connection state with each other. That is, a current path Isp21 passing through the smoothing capacitor CH, connection changeover switch S52, switching element S23, inductor Lr2, winding 31B, switching element S22 and diode D14 (or diode D21 and switching element S13), winding 31A, inductor Lr1, and switching element S12, and a current path Isp22 passing through the smoothing capacitor CH, switching element S43, inductor Lr4, winding 31D, switching element S42 and diode D34 (or diode D41 and switching element S33), winding 31C, inductor Lr3, switching element S32, and connection changeover switch S62 are formed.

Here, the windings 31A to 31D of the transformer 3 correspond to the four switching circuits 11 to 14 respectively, and have the number of turns equal to one another. Therefore, a turn ratio between the number of turns np of the windings 31A to 31D at the high-voltage side and the number of turns ns of the windings 32A, 32B at the low-voltage side in the 2-series/2-parallel connection state is 2*(np/ns)=2n (see FIG. 3). That is, the turn ratio in the 2-series/2-parallel connection state is twice as large as that in the case of the 4-parallel connection state (turn ratio=n).

The 4-series connection state as shown in FIG. 8 and FIG. 9 corresponds to a case that the high DC voltage VH detected by the voltage detection circuit 61 is equal to or higher than the threshold voltage $V_{th12}$, for example, as shown in FIG. 10. In this case, the control section 7 sets the connection changeover switches S51 to S53 and S61 to S63 to be in an off state respectively (see FIG. 3), so that the switching circuits 11 to 14 perform series operation coupled with one another.

Specifically, in an operation mode as shown in FIG. 8, a current path (corresponding to the first current path) passing through the smoothing capacitor CH, switching element S11, inductor Lr1, and winding 31A, and a current path (corresponding to the second current path) passing through the winding 31B and inductor Lr2, a current path (corresponding to the third current path) passing through the inductor Lr3 and winding 31C, and a current path (corresponding to the fourth current path) passing through the winding 31D, inductor Lr4, and switching element S44 are coupled with one another by a current path passing through the diode D13 and the switching element S21, a current path passing through the switching element S14 and the diode D22, a current path passing through a diode D23 and the switching element S31, a current path passing through the switching element S24 and a diode D32, a current path passing through the diode D33 and the switching element S41, and a current path passing through the switching element S34 and the diode D42, so that they are in a series connection state with one another. That is, a current path Is1 is formed, which passes the smoothing capacitor CH, switching element S11, inductor Lr1, winding 31A, switching element S14 and diode D22 (or diode D13 and switching element S21), winding 31B, inductor Lr2, switching element S24 and diode D32 (or diode D23 and switching element S31), inductor Lr3, winding 31C, switching element S34 and diode D42 (or diode D33 and switching element S41), winding 31D, inductor Lr4, and switching element S44.

In the operation mode as shown in FIG. 9, a current path (corresponding to the fourth current path) passing through the smoothing capacitor CH, switching element S43, inductor Lr4, and winding 31D, a current path (corresponding to the third current path) passing through the winding 31C and the inductor Lr3, a current path (corresponding to the second current path) passing through the inductor Lr2 and the winding 31B, and a current path (corresponding to the first current path) passing through the winding 31A, inductor Lr1, and switching element S12 are coupled with one another by a current path passing through a diode D41 and the switching element S33, a current path passing through the switching element S42 and a diode D34, a current path passing through a diode D31 and the switching element S23, a current path passing through the switching element S32 and a diode D24, a current path passing through the diode D21 and the switching element S13, and a current path passing through the switching element S22 and the diode D14, so that they are in a series connection state with one another. That is, a current path Is2 is formed, which passes the smoothing capacitor CH, switching element S43, inductor Lr4, winding 311D, switching element S42 and diode D34 (or diode D41 and switching element S33), winding 31C, inductor Lr3, switching element S32 and diode D24 (or diode D31 and switching element S23), inductor Lr2, winding 31B, switching element S22 and diode D14 (or diode D21 and switching element S13), winding 31A, inductor Lr1, and switching element S12.

Here, the windings 31A to 31D of the transformer 3 correspond to the four switching circuits 11 to 14 respectively, and have the number of turns equal to one another, as described before. Therefore, a turn ratio between the number of turns np of the windings 31A to 31D at the high-voltage side and the number of turns ns of the windings 32A, 32B at the low-voltage side in the 4-series connection state is 4*(np/ns)=4n (see FIG. 3). That is, the turn ratio in the 4-series connection state is four times as large as that in the case of the 4-parallel connection state (turn ratio=n).

In this way, for example, as shown in a graph G1 of FIG. 10, when the high DC voltage VH being the input voltage is high in the 2-series/2-parallel connection state compared with the 4-parallel connection state, and high in the 4-series connection state compared with the 2-series/2-parallel connection state, the on-duty ratios of the drive signals SG11 to SG14, SG21 to SG24, SG31 to SG34, and SG41 to SG44 can be kept high, and a range of the input voltage (high DC voltage VH) in which a constant output voltage (low DC voltage VL) can be kept is increased through such connection changeover control (the range is widened from an input voltage range VH11 between a voltage $V_{min1}$ and a voltage $V_{max11}$ to an input voltage range VH12 between a voltage $V_{min1}$ and a voltage $V_{max12}$).

Figure 11:
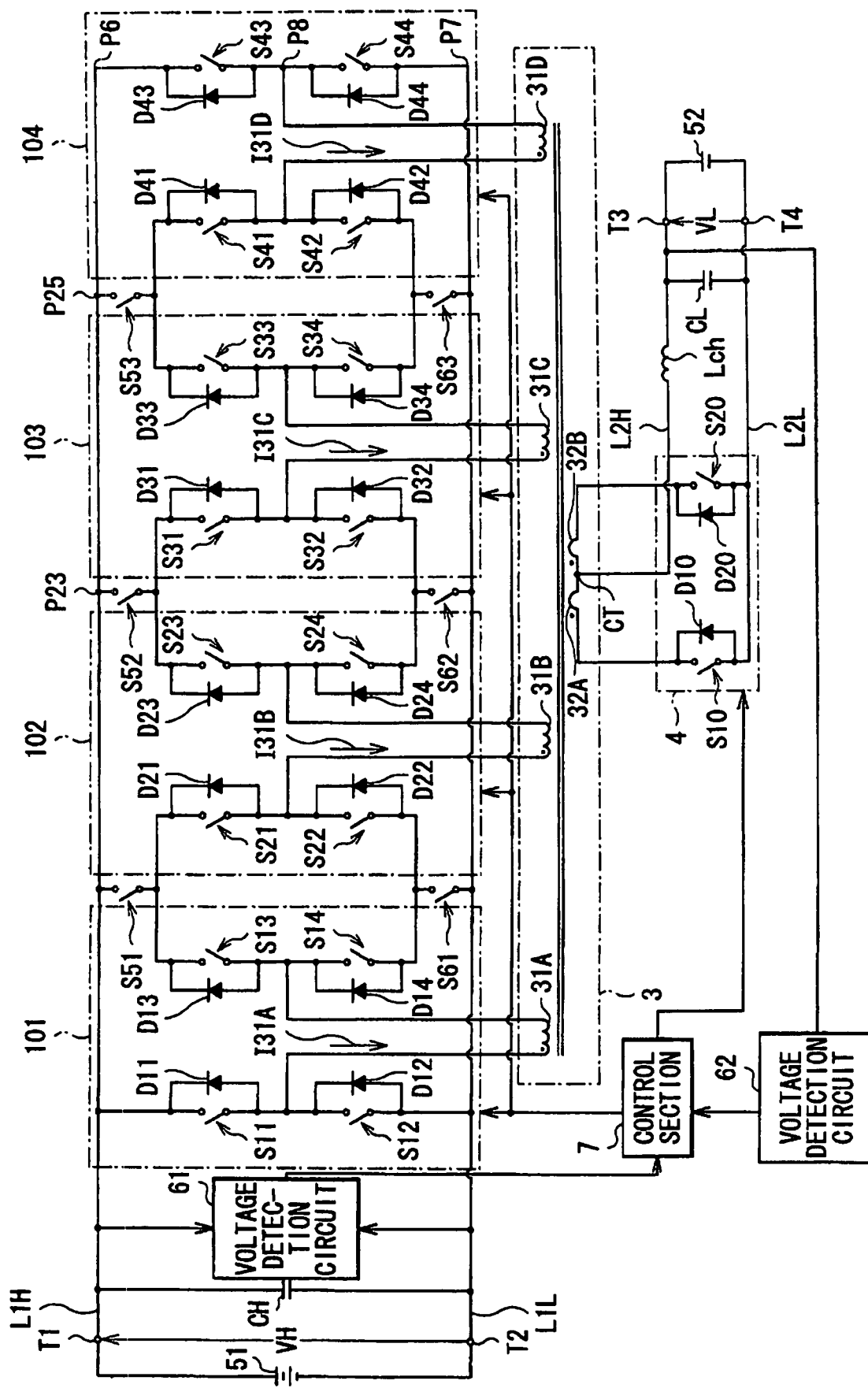
FIG. 11 is a circuit diagram showing a configuration of a switching power supply unit according to a comparative example.

Next, description is made on presence of a surge current in circuits in forward operation with reference to FIGS. 11 to 13, while being compared between the switching power supply unit of the embodiment and a usual switching power supply unit (comparative example).

Here, FIG. 11 shows a configuration of a switching power supply unit according to the comparative example. Specifically, the inductors Lr1 to Lr4 are removed from the switching power supply unit of the embodiment as shown in FIG. 1. FIGS. 12A to 12C and FIGS. 13A to 13C show timing waveforms of currents flowing through the primary windings 31A to 31D of the transformer 3 in the switching power supply units according to the comparative example and the embodiment respectively. Specifically, FIGS. 12A and 13A show drive signals SG51 to SG53 and SG61 to SG63 for the connection changeover switches S51 to S53 and S61 to S63, FIGS. 12B and 13B show a current I31A and a current I31C flowing through the windings 31A and 31C at the high-voltage side, and FIGS. 12C and 13C show a current I31B and a current I31D flowing through the windings 31B and 31D at the high-voltage side, respectively. In the currents I31A to I31D, a direction of arrows shown in FIG. 11 is assumed as a positive direction.

First, in the comparative example shown in FIGS. 12A to 12C, it is found that when the drive signals SG51 to SG53 and SG61 to SG63 are in the "H" level, that is, the connection changeover switches S51 to S53 and S61 to S63 are in the on state to be in the 4-parallel connection state (a state before timing t101), surge waveforms as shown by signs G11 to G13 and G21 to G23 appear in the current waveforms of the currents I31A to I31D. The surge current waveforms are due to shift in timing between the drive signals SG11 to SG14, SG21 to SG24, SG31 to SG34, and SG41 to SG44, that is, shift in operation timing between switching circuits 101 to 104 operating in synchronization with one another. If the timings are perfectly synchronized, the surge waveforms may not appear. However, this is actually difficult because of parasitic resistance or parasitic capacitance of wiring. Here, in the comparative example, since the inductors Lr1 to Lr4 are not provided as described before, tolerance for such shift in operation timing is small, consequently such a surge current is produced even by slight shift.

On the contrary, in the embodiment shown in FIGS. 13A to 13C, the surge waveforms do not appear in current waveforms of currents I31A to I31D even in the case of the 4-parallel connection state before the timing t1. The reason for this is that since the switching power supply unit of the embodiment has the four inductors Lr1 to Lr4 corresponding to the four switching circuits 11 to 14 respectively as described before, a current is gently changed in a circuit by an effect of keeping a level of a current by the inductors, as a result, tolerance for shift in operation timing is increased. In this way, in the embodiment having the inductors Lr1 to Lr4, the tolerance for shift in timing between the switching circuits 11 to 14 in parallel operation is increased compared with the comparative example (usual case) in which the inductors are not provided, consequently production of surge current is avoided.

Connection Changeover Operation in Reverse Operation

Next, connection changeover operation between current paths in reverse operation is described with reference to FIGS. 14 to 20.

Figure 14:
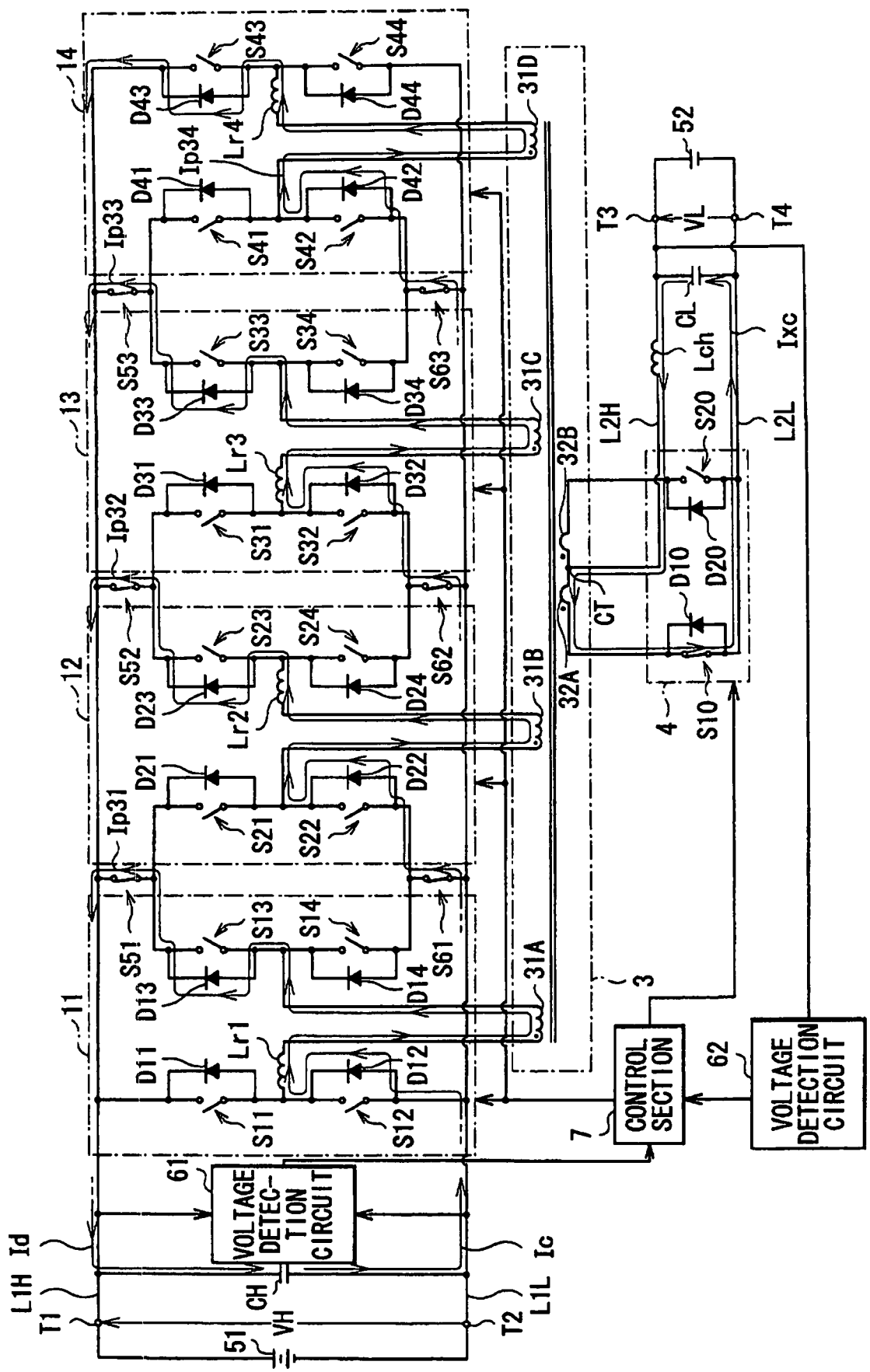
FIG. 14 is a circuit diagram for explaining operation in 4-parallel connection state in reverse operation of the switching power supply unit of FIG. 1.
Figure 15:
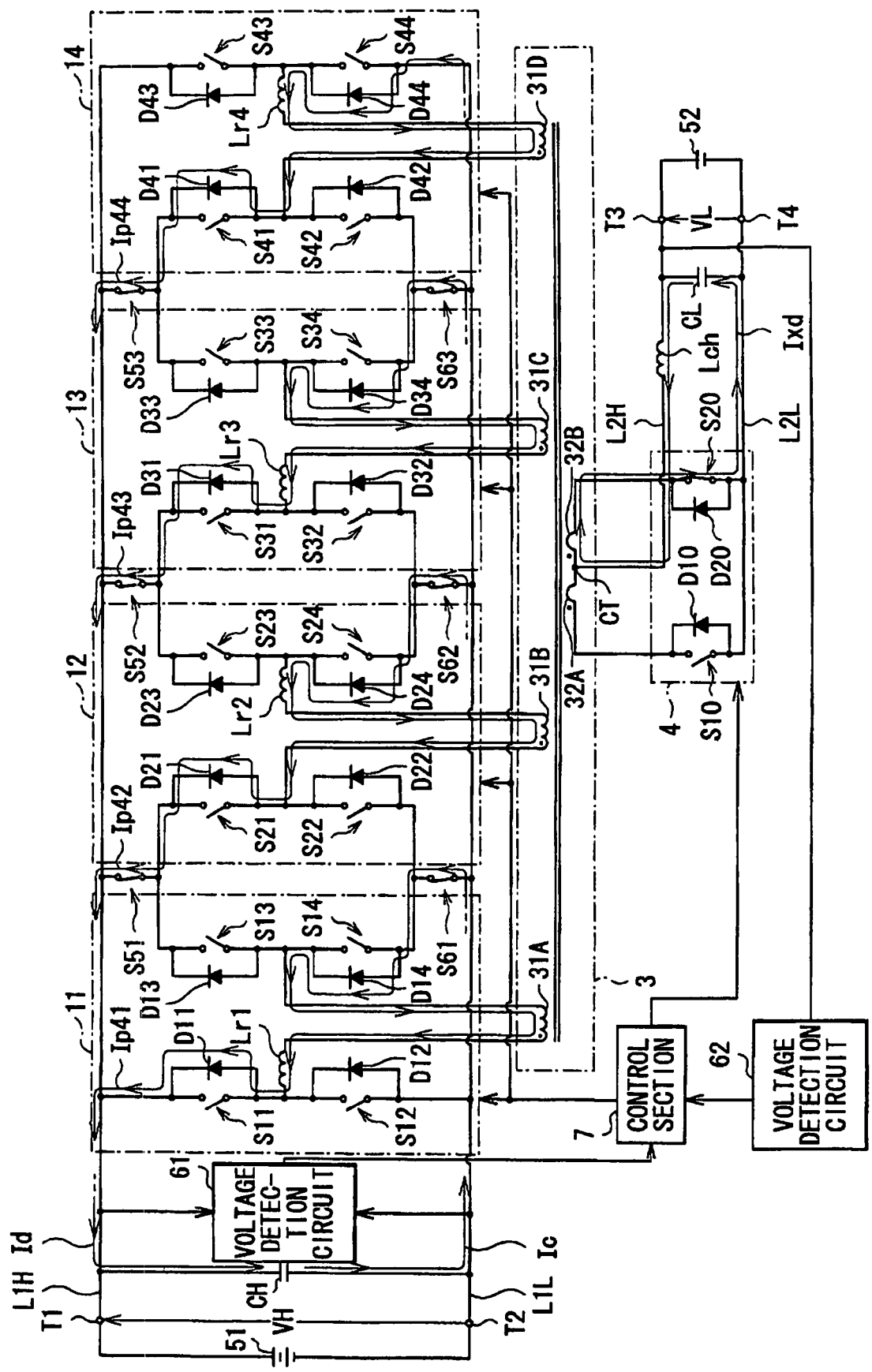
FIG. 15 is a circuit diagram for explaining operation in 4-parallel connection state in reverse operation following FIG. 14.
Figure 16:
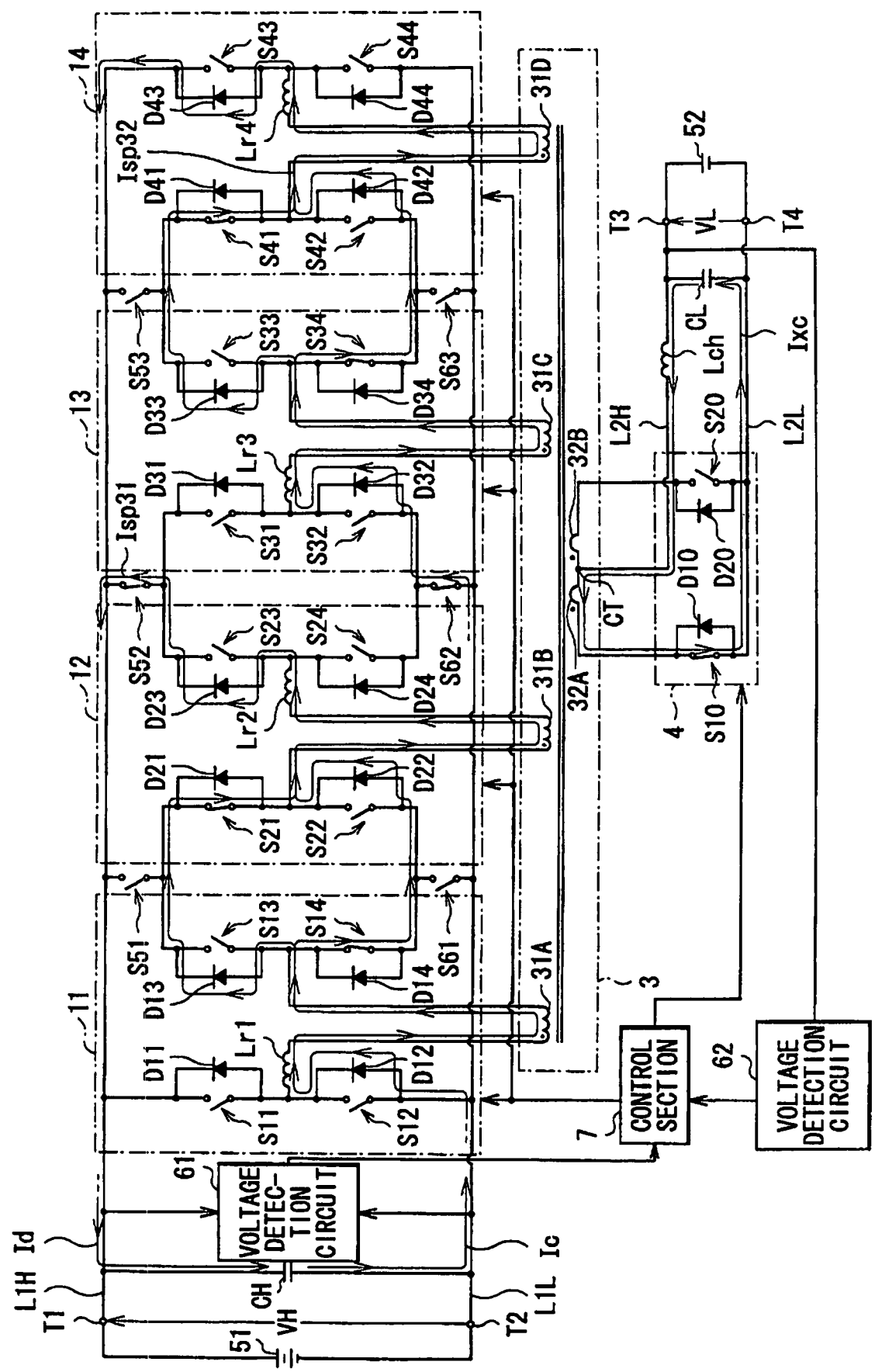
FIG. 16 is a circuit diagram for explaining operation in 2-series/2-parallel connection state in reverse operation of the switching power supply unit of FIG. 1.
Figure 17:
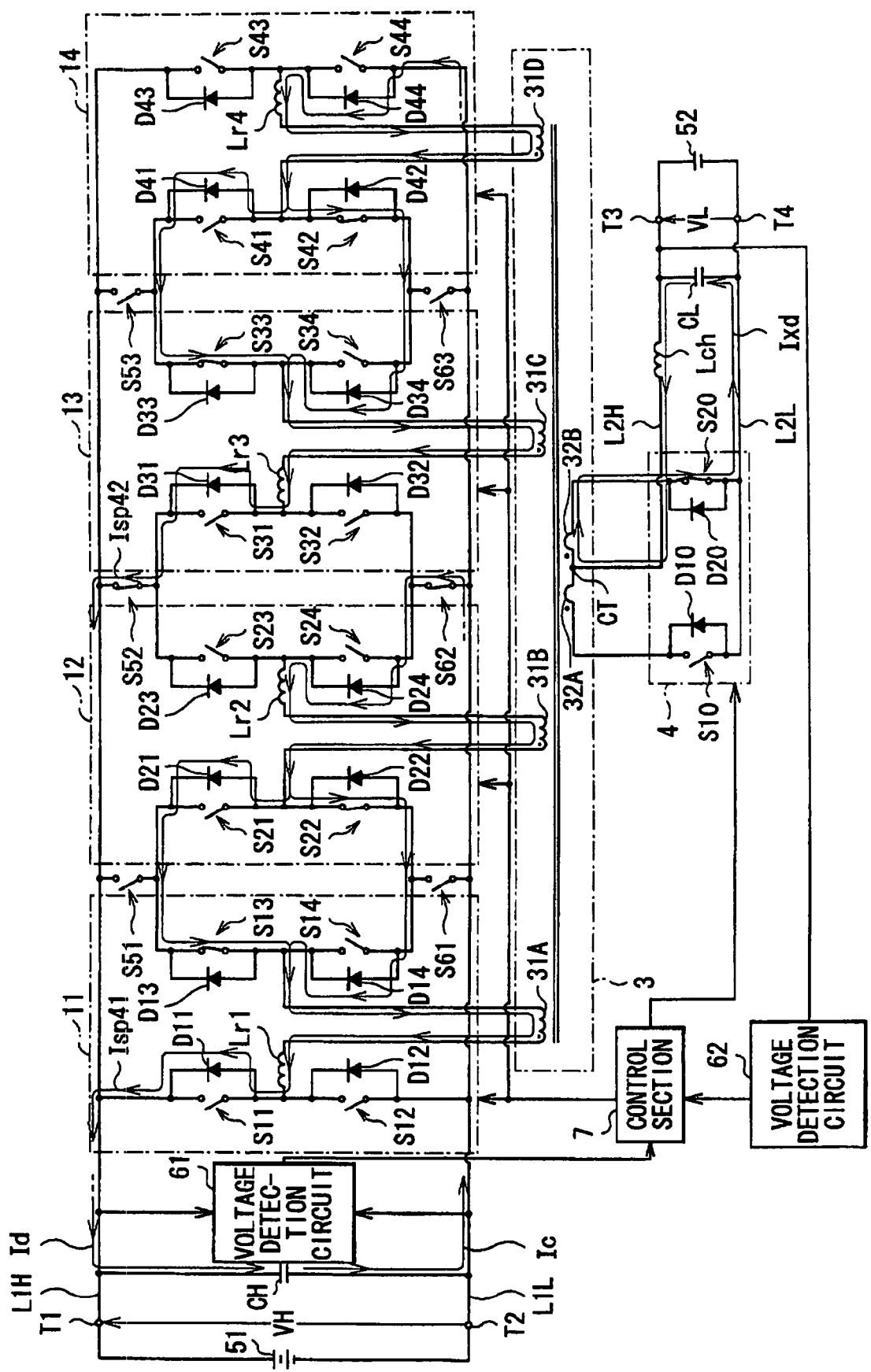
FIG. 17 is a circuit diagram for explaining operation in 2-series/2-parallel connection state in reverse operation following FIG. 16.
Figure 18:
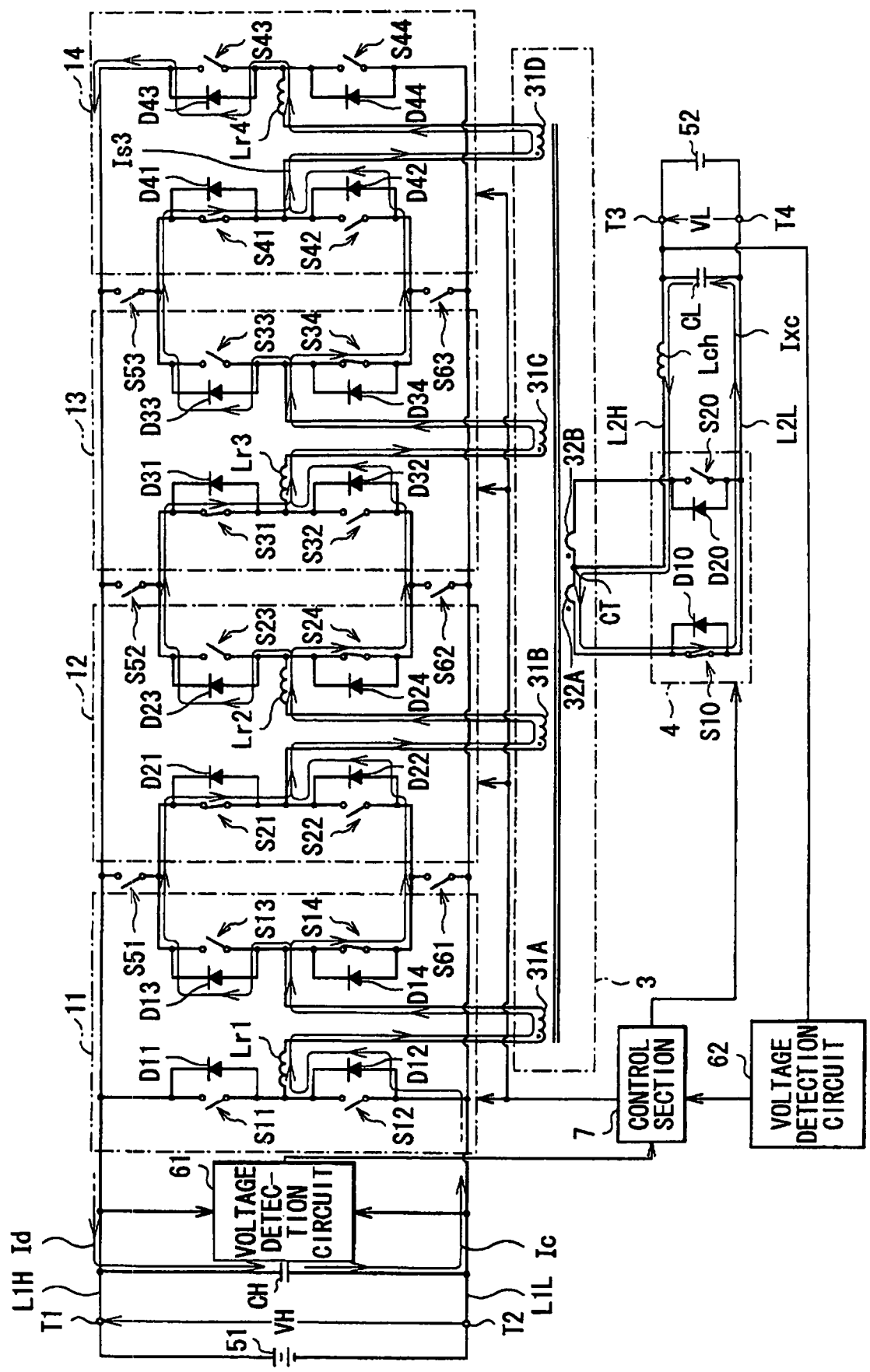
FIG. 18 is a circuit diagram for explaining operation in 4-series connection state in reverse operation of the switching power supply unit of FIG. 1.
Figure 19:
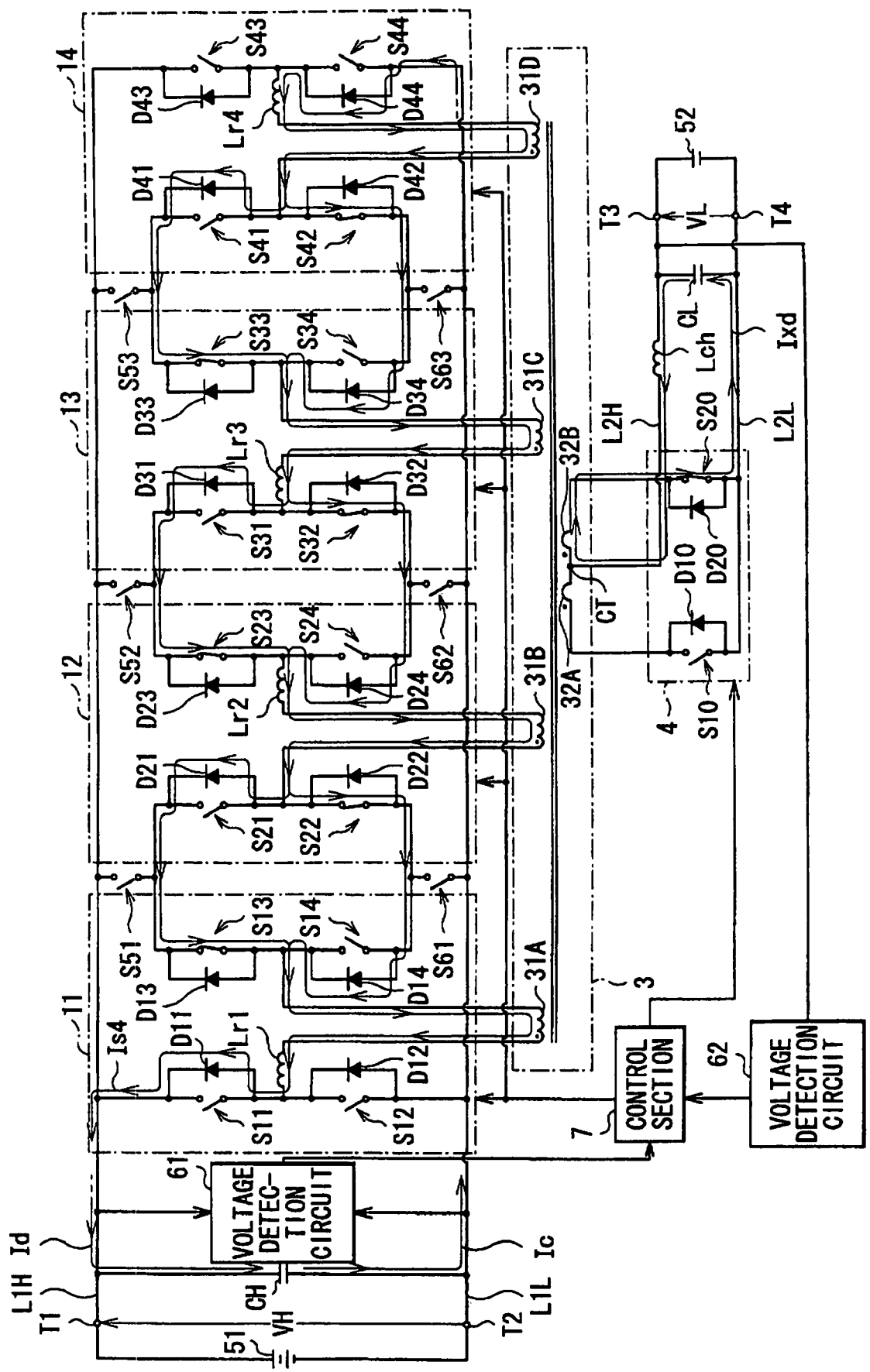
FIG. 19 is a circuit diagram for explaining operation in 4-series connection state in the reverse operation following FIG. 18.
Figure 20:
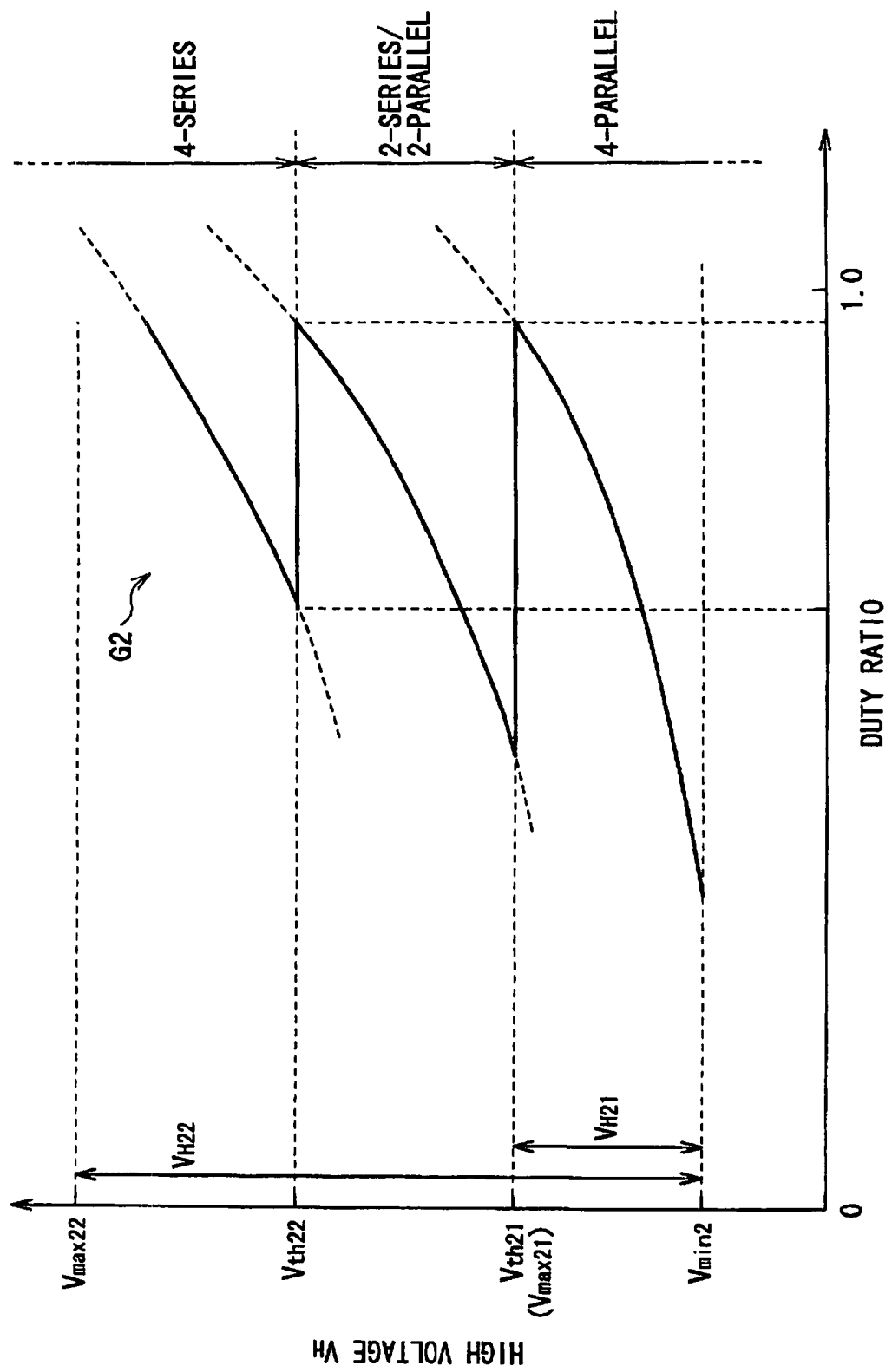
FIG. 20 is a characteristic view showing a relationship between an input voltage, a duty ratio, and a connection state in reverse operation in the first embodiment.

FIGS. 14 to 19 show operation mode in the reverse operation of the switching power supply unit of the embodiment respectively. Among them, FIG. 14 and FIG. 15 show a case that the first to fourth current paths are in the 4-parallel connection state with one another. FIG. 16 and FIG. 17 show a case that they are in the 2-series/2-parallel connection state with one another. FIG. 18 and FIG. 19 show a case that they are in the 4-series connection state with one another. FIG. 20 shows a relationship between a high DC voltage VH and duty ratios (on-duty ratios of the drive signals SG11 to SG14, SG21 to SG24, SG31 to SG34, and SG41 to SG44) in the reverse operation in the 4-parallel connection state, 2-series/2-parallel connection state, and 4-series connection state.

First, the 4-parallel connection state as shown in FIG. 14 and FIG. 15 corresponds to a case that a target voltage value of the high DC voltage VH is lower than a value of the threshold voltage $V_{th21}$, for example, as shown in FIG. 20. In this case, the control section 7 sets the connection changeover switches S51 to S53 and S61 to S63 to be in the on state respectively, so that the switching circuits 11 to 14 perform parallel operation independently of one another.

Specifically, in an operation mode as shown in FIG. 14, a current path Ip31 (corresponding to the first current path) passing through the smoothing capacitor CH, diode D12, inductor Lr1, winding 31A, diode D13, and connection changeover switch S51, a current path Ip32 (corresponding to the second current path) passing through the smoothing capacitor CH, connection changeover switch S61, diode D22, winding 31B, inductor Lr2, diode D23, and connection changeover switch S52, a current path Ip33 (corresponding to the third current path) passing through the smoothing capacitor CH, connection changeover switch S62, diode D32, inductor Lr3, winding 31C, diode D33, and connection changeover switch S53, and a current path Ip34 (corresponding to the fourth current path) passing through the smoothing capacitor CH, connection changeover switch S63, diode D42, winding 31D, inductor Lr4, and diode D43 are in the parallel connection state with one another.

In an operation mode as shown in FIG. 15, a current path Ip41 (corresponding to the first current path) passing through the smoothing capacitor CH, connection changeover switch S61, diode D14, winding 31A, inductor Lr1, and diode D11, and a current path Ip42 (corresponding to the second current path) passing through the smoothing capacitor CH, connection changeover switch S62, diode D24, inductor Lr2, winding 31B, diode D21 and connection changeover switch S51, a current path Ip43 (corresponding to the third current path) passing through the smoothing capacitor CH, connection changeover switch S63, diode D34, winding 31C, inductor Lr3, diode D31 and connection changeover switch S52, and a current path Ip44 (corresponding to the fourth current path) passing through the smoothing capacitor CH, diode D44, inductor Lr4, winding 31D, diode D41 and connection changeover switch S53 are in the parallel connection state with one another.

Here, as in the forward operation, since the windings 31A to 31D of the transformer 3 are corresponding to the four switching circuits 11 to 14, and have the number of turns equal to one another, a turn ratio between the number of turns np of the windings 31A to 31D at the high voltage side and the number of turns ns of the windings 32A, 32B at the low voltage side in the 4-parallel connection state can be simply expressed as (np/ns) (which is assumed as n).

The 2-series/2-parallel connection state as shown in FIG. 16 and FIG. 17 corresponds to a case that the target value of the high DC voltage VH is higher than the value of the threshold voltage $V_{th21}$ and lower than a value of the threshold voltage $V_{th22}$, for example, as shown in FIG. 20. In this case, while the connection changeover switches S51, S61, S53, and S63 are set to be in the off state by the control section 7 respectively, the connection changeover switches S52 and S62 are set to be in the on state respectively, so that the switching circuits 11, 12 and the switching circuits 13, 14 perform parallel operation independently of each other.

Specifically, in an operation mode as shown in FIG. 16, a current path (corresponding to the first current path) passing through the smoothing capacitor CH, diode D12, inductor Lr1, and winding 31A, and a current path (corresponding to the second current path) passing through the winding 31B, inductor Lr2, diode D23, and connection changeover switch S52 are coupled with each other by a current path passing through the diode D13 and the switching element S21 and a current path passing through the switching element S14 and the diode D22, so that they are in a series connection state with each other. Moreover, a current path (corresponding to the third current path) passing through the smoothing capacitor CH, connection changeover switch S62, diode D32, inductor Lr3, and winding 31C, and a current path (corresponding to the fourth current path) passing through the winding 31D, inductor Lr4, and diode D43 are coupled with each other by a current path passing through the diode D33 and the switching element S41 and a current path passing through the switching element S34 and the diode D42, so that they are in a series connection state with each other. That is, a current path Isp31 passing through the smoothing capacitor CH, diode D12, inductor Lr1, winding 31A, switching element S14 and diode D22 (or diode D13 and switching element S21), winding 31B, inductor Lr2, diode D23 and connection changeover switch S52, and a current path Isp32 passing through the smoothing capacitor CH, connection changeover switch S62, diode D32, inductor Lr3, winding 31C, switching element S34 and diode D42 (or diode D33 and switching element S41), winding 31D, inductor Lr4, and diode D43 are formed.

In the operation mode as shown in FIG. 17, a current path (corresponding to the second current path) passing through the smoothing capacitor CH, connection changeover switch S62, diode D24, inductor Lr2, and winding 31B, and a current path (corresponding to the first current path) passing through the winding 31A, inductor Lr1, and diode D11 are coupled with each other by a current path passing through the diode D21 and the switching element S13 and a current path passing through the switching element S22 and the diode D14, so that they are in a series connection state with each other. Moreover, a current path (corresponding to the fourth current path) passing through the smoothing capacitor CH, diode D44, inductor Lr4, and winding 31D, and a current path (corresponding to the third current path) passing through the winding 31C, inductor Lr3, diode D31 and connection changeover switch S52 are coupled with each other by a current path passing through the diode D41 and the switching element S33 and a current path passing through the switching element S42 and the diode D34, so that they are in a series connection state with each other. That is, a current path Isp41 passing through the smoothing capacitor CH, connection changeover switch S62, diode D24, inductor Lr2, winding 31B, switching element S22 and diode D14 (or diode D21 and switching element S13), winding 31A, inductor Lr1, and diode D11, and a current path Isp42 passing through the smoothing capacitor CH, diode D44, inductor Lr4, winding 31D, switching element S42 and diode D34 (or diode D41 and switching element S33), winding 31C, inductor Lr3, diode D31, and connection changeover switch S52 are formed.

Here, as in the forward operation, since the windings 31A to 31D of the transformer 3 are corresponding to the four switching circuits 11 to 14 respectively, and have the number of turns equal to one another, a turn ratio between the number of turns np of the windings 31A to 31D at the high-voltage side and the number of turns ns of the windings 32A, 32B at the low-voltage side in the 2-series/2-parallel connection state is 2*(np/ns)=2n. That is, a turn ratio in the 2-series/2-parallel connection state is twice as large as that in the case of the 4-parallel connection state (turn ratio=n).

The 4-series connection state as shown in FIG. 18 and FIG. 19 corresponds to a case that the target value of the high DC voltage VH is higher than a value of a threshold voltage $V_{th22}$, for example, as shown in FIG. 20. In this case, the control section 7 sets the connection changeover switches S51 to S53 and S61 to S63 to be in the off state respectively, so that the switching circuits 11 to 14 perform series operation coupled with one another.

Specifically, in an operation mode as shown in FIG. 18, a current path (corresponding to the first current path) passing through the smoothing capacitor CH, diode D12, inductor Lr1, and winding 31A, and a current path (corresponding to the second current path) passing through the winding 31B and inductor Lr2, a current path (corresponding to the third current path) passing through the inductor Lr3 and winding 31C, and a current path (corresponding to the fourth current path) passing through the winding 31D, inductor Lr4, and diode D43 are coupled with one another by a current path passing through the diode D13 and the switching element S21, a current path passing through the switching element S14 and the diode D22, a current path passing through the diode D23 and the switching element S31, a current path passing through the switching element S24 and a diode D32, a current path passing through the diode D33 and the switching element S41, and a current path passing through the switching element S34 and the diode D42, so that they are in a series connection state with one another. That is, a current path Is3 is formed, which passes the smoothing capacitor CH, diode D12, inductor Lr1, winding 31A, switching element S14 and diode D22 (or diode D13 and switching element S21), winding 31B, inductor Lr2, switching element S24 and diode D32 (or diode D23 and switching element S31), inductor Lr3, winding 31C, switching element S34 and diode D42 (or diode D33 and switching element S41), winding 31D, inductor Lr4, and diode D43.

In the operation mode as shown in FIG. 19, a current path (corresponding to the fourth current path) passing through the smoothing capacitor CH, diode D44, inductor Lr4, and winding 31D, a current path (corresponding to the third current path) passing through the winding 31C and the inductor Lr3, a current path (corresponding to the second current path) passing through the inductor Lr2 and the winding 31B, and a current path (corresponding to the first current path) passing through the winding 31A, inductor Lr1, and diode D11 are coupled with one another by a current path passing through a diode D41 and the switching element S33, a current path passing through the switching element S42 and the diode D34, a current path passing through the diode D31 and the switching element S23, a current path passing through the switching element S32 and the diode D24, a current path passing through the diode D21 and the switching element S13, and a current path passing through the switching element S22 and the diode D14, so that they are in a series connection state with one another. That is, a current path Is4 is formed, which passes the smoothing capacitor CH, diode D44, inductor Lr4, winding 31D, switching element S42 and diode D34 (or diode D41 and switching element S33), winding 31C, inductor Lr3, switching element S32 and diode D24 (or diode D31 and switching element S23), inductor Lr2, winding 31B, switching element S22 and diode D14 (or diode D21 and switching element S13), winding 31A, inductor Lr1, and diode D11.

Here, as in the forward operation, since the windings 31A to 31D of the transformer 3 are corresponding to the four switching circuits 11 to 14 respectively, and have the number of turns equal to one another, a turn ratio between the number of turns np of the windings 31A to 31D at the high-voltage side and the number of turns ns of the windings 32A, 32B at the low-voltage side in the 4-series connection state is 4*(np/ns)=4n. That is, a turn ratio in the 4-series connection state is four times as large as that in the case of the 4-parallel connection state (turn ratio=n).

In this way, for example, as shown in a graph G2 of FIG. 20, again in the reverse operation, when the high DC voltage VH being the output voltage is set high in the 2-series/2-parallel connection state compared with the 4-parallel connection state, and high in the 4-series connection state compared with the 2-series/2-parallel connection state, the on-duty ratios of the drive signals SG11 to SG14, SG21 to SG24, SG31 to SG34, and SG41 to SG44 can be kept low, and a range of an output voltage (high DC voltage VH) that can be generated from a constant input voltage (low DC voltage VL) is increased through such connection changeover control (the range is widened from an output voltage range VH21 between a voltage $V_{min2}$ and a voltage $V_{max21}$ to an input voltage range VH22 between the voltage $V_{min2}$ and a voltage $V_{max22}$).

As hereinbefore, in the embodiment, the transformer 3 having the four windings 31A to 31D at the high-voltage side having the number of turns equal to one another, and the four inductors Lr1 to Lr4 are provided correspondingly to the four switching circuits 11 to 14 operating in synchronization with one another, respectively, and the four current paths are in the 4-parallel connection, 4-series connection, or mixed connection of series and parallel (2-series/2-parallel connection) with one another depending on the input voltage (high DC voltage VH) in the forward operation, and the target voltage value of the output voltage (high DC voltage VH) in the reverse operation, by the voltage detection circuit 61, control section 7, and connection changeover switches S51 to S53 and S61 to S63. Therefore, the turn ratio between the windings 31A to 31D and the windings 32A, 32B can be made larger in order of the 4-parallel connection, 2-series/2-parallel connection, and 4-series connection. Consequently, a conversable voltage range (input voltage range in the forward operation, and output voltage range in the reverse operation) can be widened compared with a usual case in which voltage can be converted only between series connection and parallel connection).

Moreover, change in current in circuits can be made gentle by an effect of the inductors Lr1 to Lr4. Accordingly, tolerance for shift in timing between the switching circuits 11 to 14 can be increased. Consequently, widening of a convertible voltage range can be achieved while suppressing production of the surge current.

Moreover, by suppressing production of the surge current, loss in each element in the circuits can be reduced, and efficiency of the unit can be improved. Furthermore, heat generation in the element can be suppressed by reducing the loss. Furthermore, by suppressing production of the surge current, an element having low withstanding voltage can be used, consequently component price can be reduced, in addition, reduction in size of the unit as a whole can be achieved.

Figure 21:
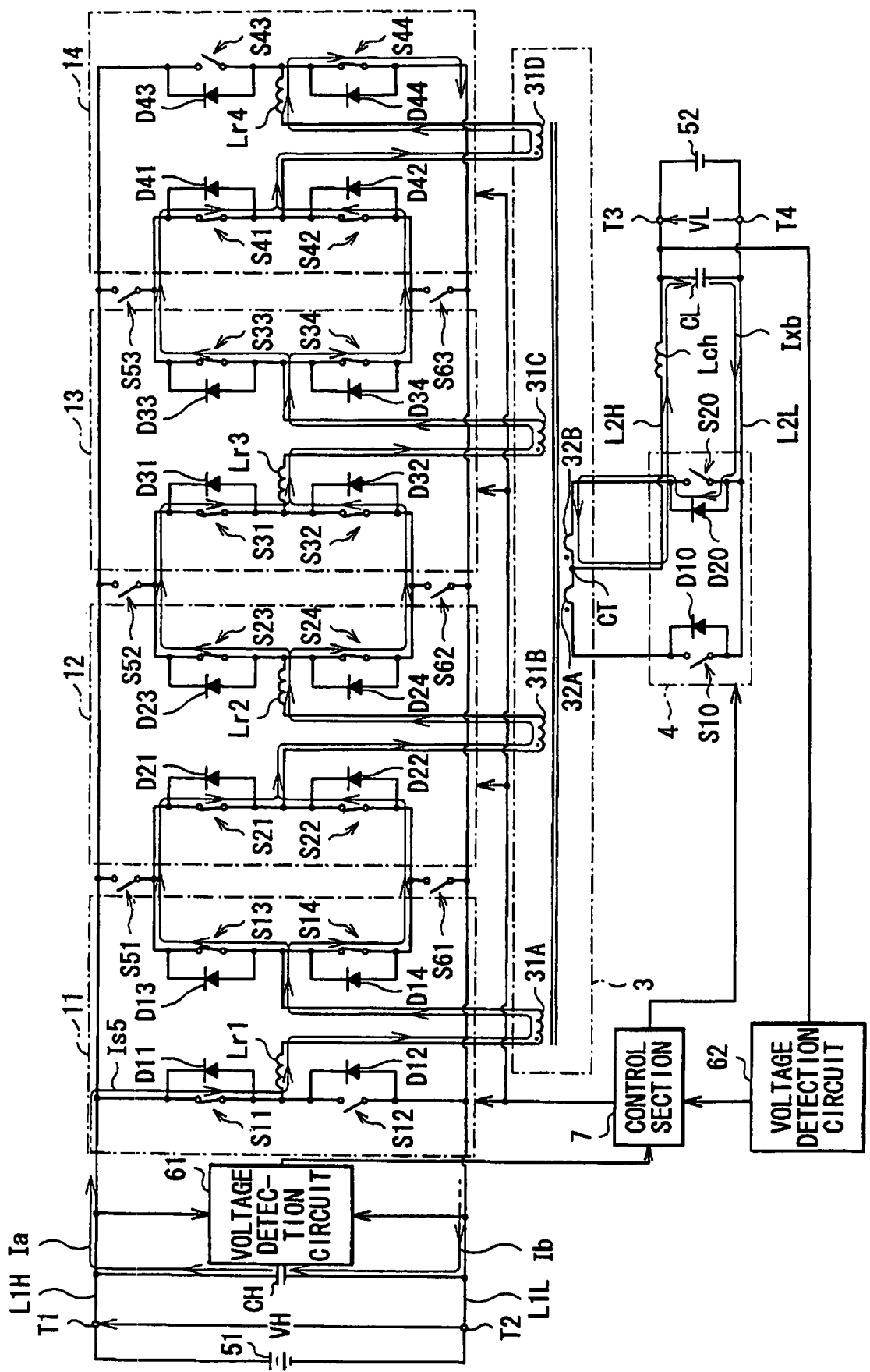
FIG. 21 is a circuit diagram for explaining operation in 4-series connection state in forward operation according to a modification of the first embodiment.
Figure 22:
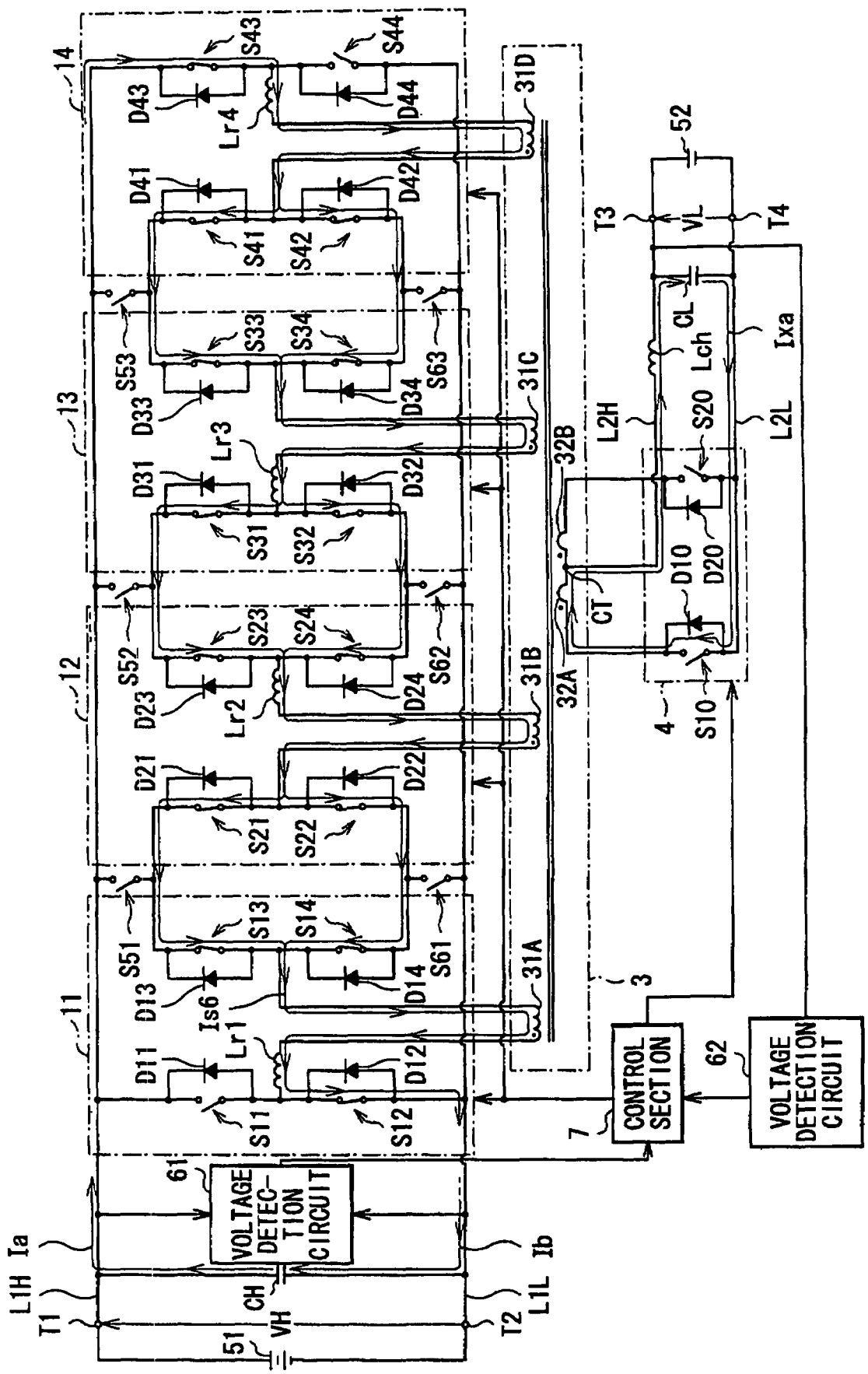
FIG. 22 is a circuit diagram for explaining operation in 4-series connection state in forward operation following FIG. 21.
Figure 23:
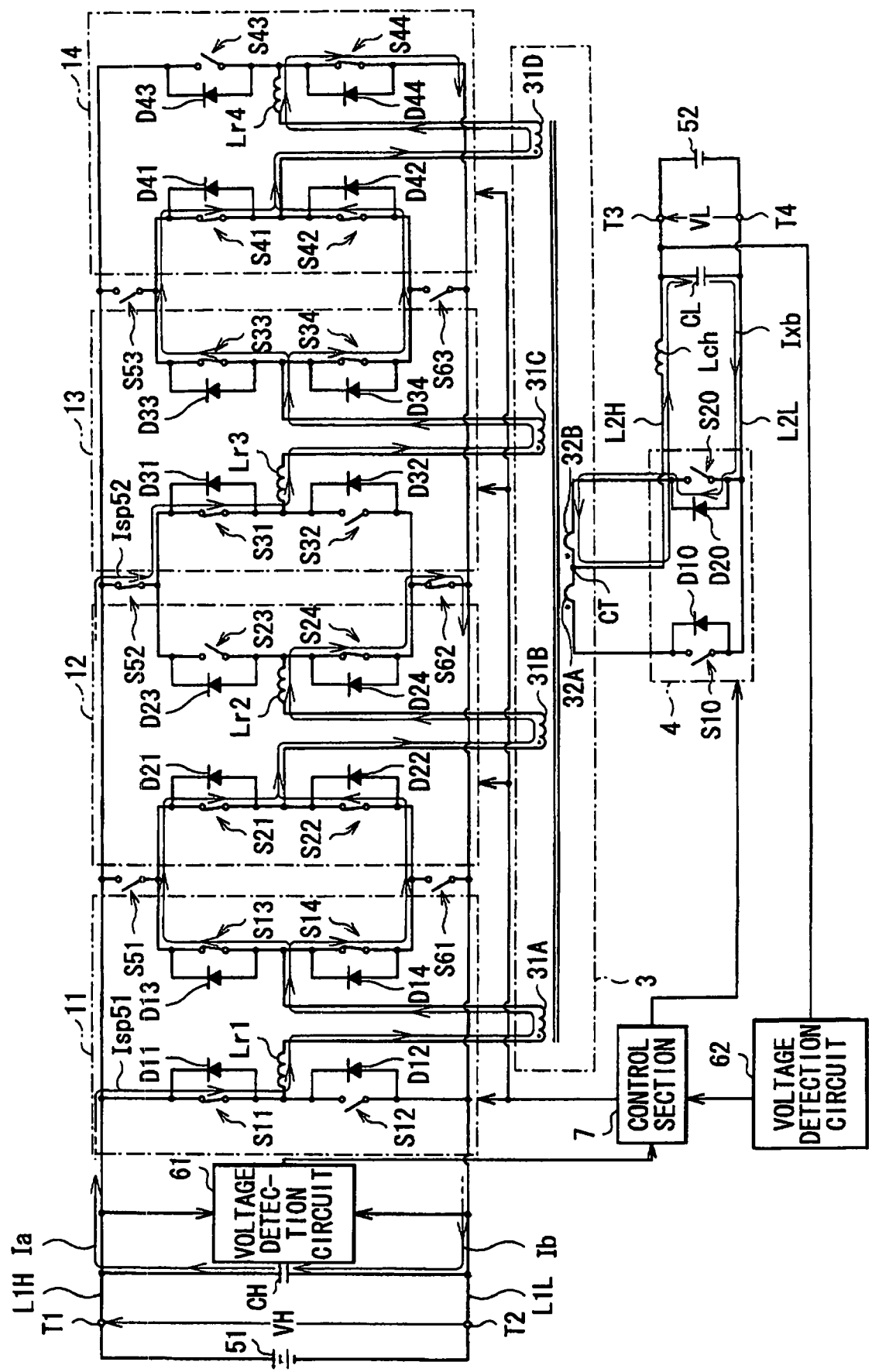
FIG. 23 is a circuit diagram for explaining operation in 2-series/2-parallel connection state in forward operation according to the modification of the first embodiment.
Figure 24:
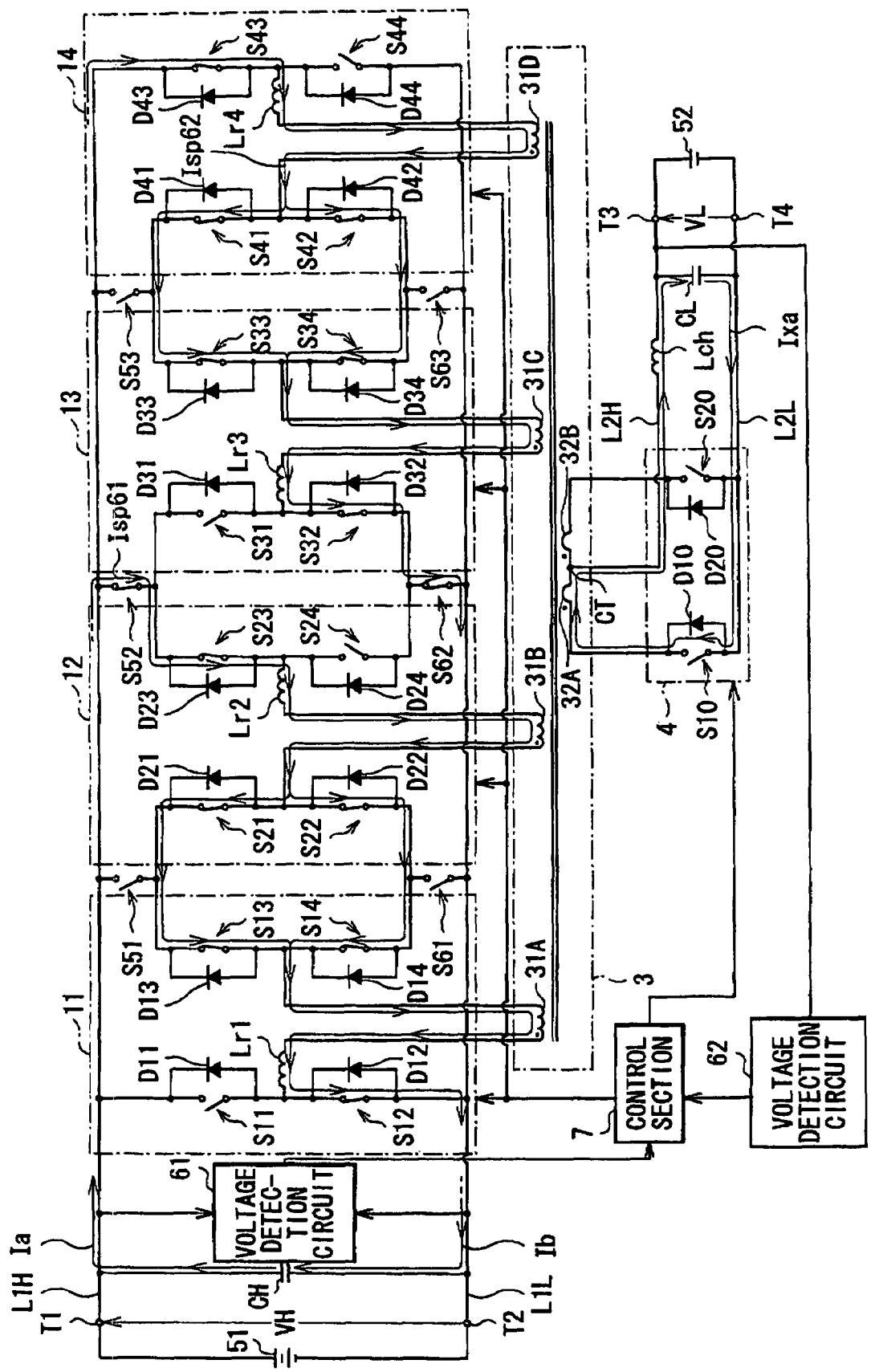
FIG. 24 is a circuit diagram for explaining operation in 2-series/2-parallel connection state in forward operation following FIG. 23.

Furthermore, irrespective of a connection state, since the switching elements S11 to S14, S21 to S24, S31 to S34, and S41 to S44 perform switching operation (on/off operation) at any time, the control section 7 can easily control the switching elements S11 to S14 and S21 to S24, for example, compared with the case as shown in FIG. 21 and FIG. 22 (corresponding to the 4-series connection state in the forward operation), or the case as shown in FIG. 23 and FIG. 24 (corresponding to the 2-series/2-parallel connection state in the forward operation). That is, the switching elements need not be subjected to mode change between an on/off switching mode in which the switching elements perform on/off operation at any time depending on a connection state, and a normally-on mode or normally-off mode in which they are fixed in the on state or off state at any time. Consequently, connection changeover between the parallel connection state and the series connection state can be performed only by control of the connection changeover switches S51 to S53 and S61 to S63.

In the embodiment, while description was made on a case that in the respective switching elements S11 to S14 and S21 to S24 in the switching circuits 11 and 12, on/off operation was performed in synchronization with each other between the switching elements S11 and S14 or switching elements S12 and S13, and between the switching elements S21 and S24 or switching elements S22 and S23, the switching elements may perform phase shift operation to one another (phase difference φ and dead time Td). In the case of such a configuration, the inductors Lr1, Lr2 and capacitors C11 to C14 and C21 to C24 configure an LC resonance circuit, and perform resonance operation. Accordingly, the switching elements S11 to S14 and S21 to S24 perform so-called ZVS (Zero Volt Switching) operation respectively. Consequently, in addition to the advantages of the embodiment, short loss in the switching elements is suppressed, thereby efficiency of the unit can be further improved.

Second Embodiment

Next, a second embodiment of the invention is described. In the switching power supply unit of the first embodiment, four switching circuits 11 to 14, four windings 31A to 31D at the high-voltage side of the transformer 3 and four inductors Lr1 to Lr4 corresponding to the switching circuits respectively, and connection changeover switches S51 to S53 and S61 to S63 were provided. However, the switching power supply unit of the embodiment has six switching circuits 11 to 16, six windings 31A to 31F at the high-voltage side of the transformer 3 and six inductors Lr1 to Lr6 corresponding to the switching circuits respectively, and connection changeover switches S51 to S55 and S61 to S65. Other configurations are the same as configurations shown in FIG. 1.

FIG. 25 shows detail of connection changeover control of current paths by the control section 7 in the embodiment. In the figure, the same components or functions as those shown in FIG. 3 are marked with the same references, and appropriately omitted to be described.

In the connection changeover control of the embodiment, first, in the forward operation, when the high DC voltage VH detected by the voltage detection circuit 61 (target voltage value of the high DC voltage VH in the reverse operation) is lower than a predetermined threshold voltage $V_{th31}$ (predetermined threshold voltage $V_{th41}$ in the reverse operation), the connection changeover switches S51 to S55 and S61 to S65 are in an on state by the control section 7 respectively. Then, six current paths (first to sixth current paths) corresponding to the six switching circuits 11 to 16 and the six windings 31A to 31F at the high-voltage side respectively are in a parallel connection state (6-parallel connection state) with one another.

When the detected high DC voltage VH (the target voltage value of the high DC voltage VH in the reverse operation) is equal to or higher than the threshold voltage $V_{th31}$ (the threshold voltage $V_{th41}$ in the reverse operation) and lower than a predetermined threshold voltage $V_{th32}$ (predetermined threshold voltage $V_{th42}$ in the reverse operation), while the connection changeover switches S51, S61, S53, S63, S55 and S65 are set to be in the off state by the control section 7 respectively, the connection changeover switches S52, S62, S54, and S64 are set to be in the on state respectively. Then, the first and second current paths, the third and fourth current paths, and the fifth and sixth current paths are in a series connection state respectively, and these series connection states are in a parallel connection state with one another. That is, the first to sixth current paths corresponding to the six switching circuits 11 to 16 are in a mixed connection state of series and parallel (2-series/3-parallel connection state) with one another.

When the detected high DC voltage VH (the target voltage value of the high DC voltage VH in the reverse operation) is equal to or higher than the threshold voltage $V_{th32}$ (the threshold voltage $Vth_{42}$ in the reverse operation) and lower than a predetermined threshold voltage $V_{th33}$ (predetermined threshold voltage $V_{th43}$ in the reverse operation), while the connection changeover switches S53 and S63 are set to be in the on state by the control section 7 respectively, the connection changeover switches S51, S61, S52, S62, S54, S64, S55, and S65 are set to be in the off state respectively. Then, first to third current paths, and fourth to sixth current paths are in a series connection state respectively, and these series connection states are in a parallel connection state with one another. That is, the first to sixth current paths are in a mixed connection state of series and parallel (3-series/2-parallel connection state) with one another.

Furthermore, when the detected high DC voltage VH (the target voltage value of the high DC voltage VH in the reverse operation) is equal to or higher than the threshold voltage $V_{th33}$ (the threshold voltage $V_{th43}$ in the reverse operation), all the connection changeover switches S51 to S55 and S61 to S65 are in the off state by the control section 7. Then, the first to sixth current paths are in a series connection state (6-series connection state) with one another.

S. According to such a configuration, in the switching power supply unit of the embodiment, when a turn ratio (np/ns) between the number or turns np of the windings 31A to 31F of the transformer 3 and the number or turns ns of the windings 32A and 32B is compared between the 6-parallel connection state, 2-series/3-parallel connection state, 3-series/2-parallel connection state, and 6-series connection state, the turn ratio in the 6-series connection state (turn ratio=6n) is six times as large as that in the 6-parallel connection state (turn ratio=n). In the 3-series/2-parallel connection state (turn ratio=3n), the turn ratio is three times as large as in the 6-parallel connection state, and in the 2-series/3-parallel connection state (turn ratio=2n), it is two times as large as in the 6-parallel connection state.

Figure 26:
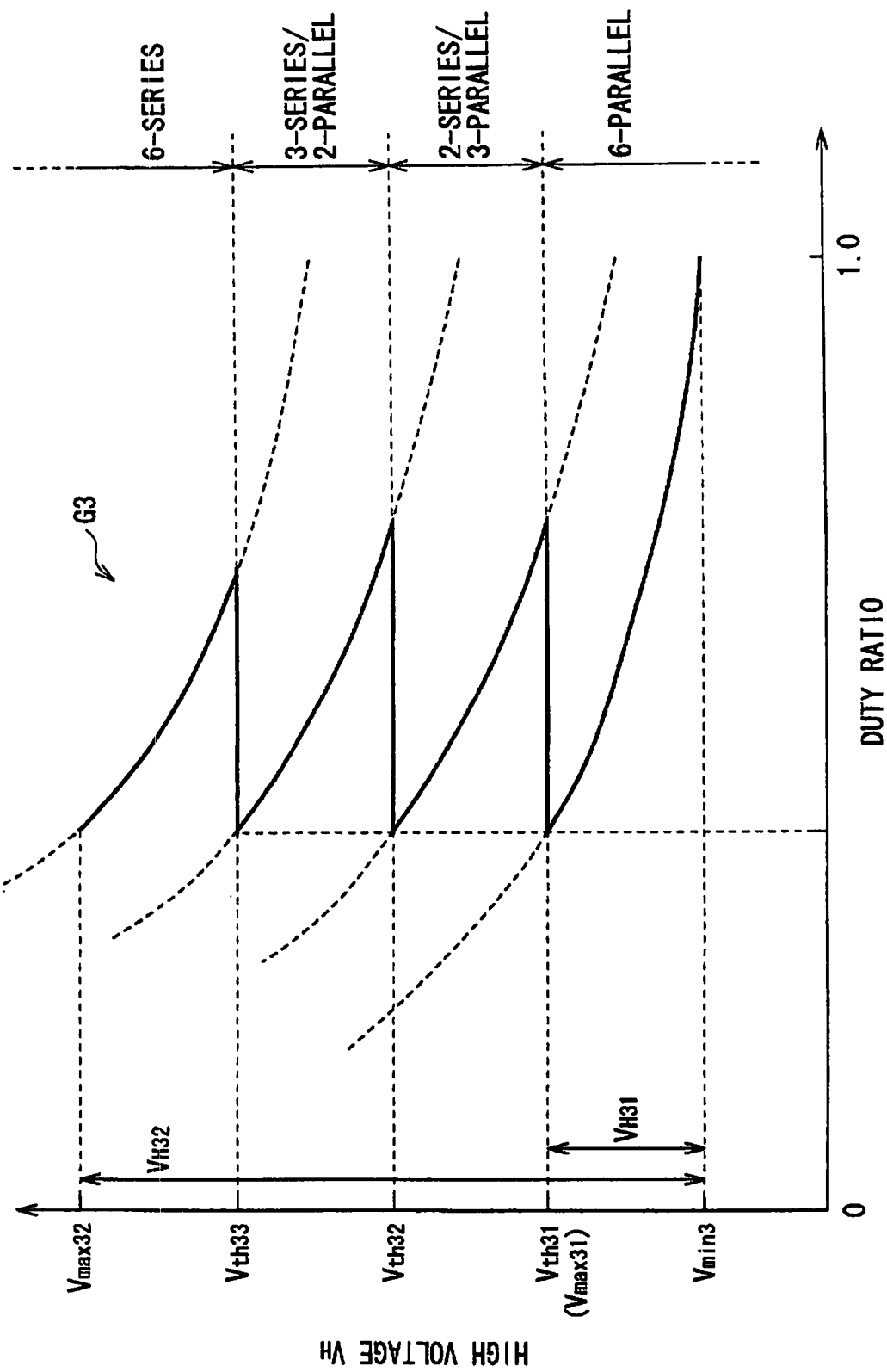
FIG. 26 is a characteristic view showing a relationship between an input voltage, a duty ratio, and a connection state in forward operation in the second embodiment.

Accordingly, for example, as shown in a graph G3 of FIG. 26, in the forward operation, when the high DC voltage VH being the input voltage is high in the 2-series/3-parallel connection state compared with the 6-parallel connection state, and high in the 3-series/2-parallel connection state compared with the 2-series/3-parallel connection state, and still high in the 6-series connection state compared with the 3-series/2-parallel connection state, the on-duty ratios of the drive signals SG11 to SG14, SG21 to SG24, SG31 to SG34, SG41 to SG44, SG51 to SG54, and SG61 to SG64 can be kept high, and a range of the input voltage (high DC voltage VH) in which a constant output voltage (low DC voltage VL) can be kept is increased through such connection changeover control (the range is widened from an input voltage range VH31 between a voltage $V_{min3}$ and a voltage $V_{max31}$ to an input voltage range VH32 between the voltage $V_{min3}$ and a voltage $V_{max32}$).

Figure 27:
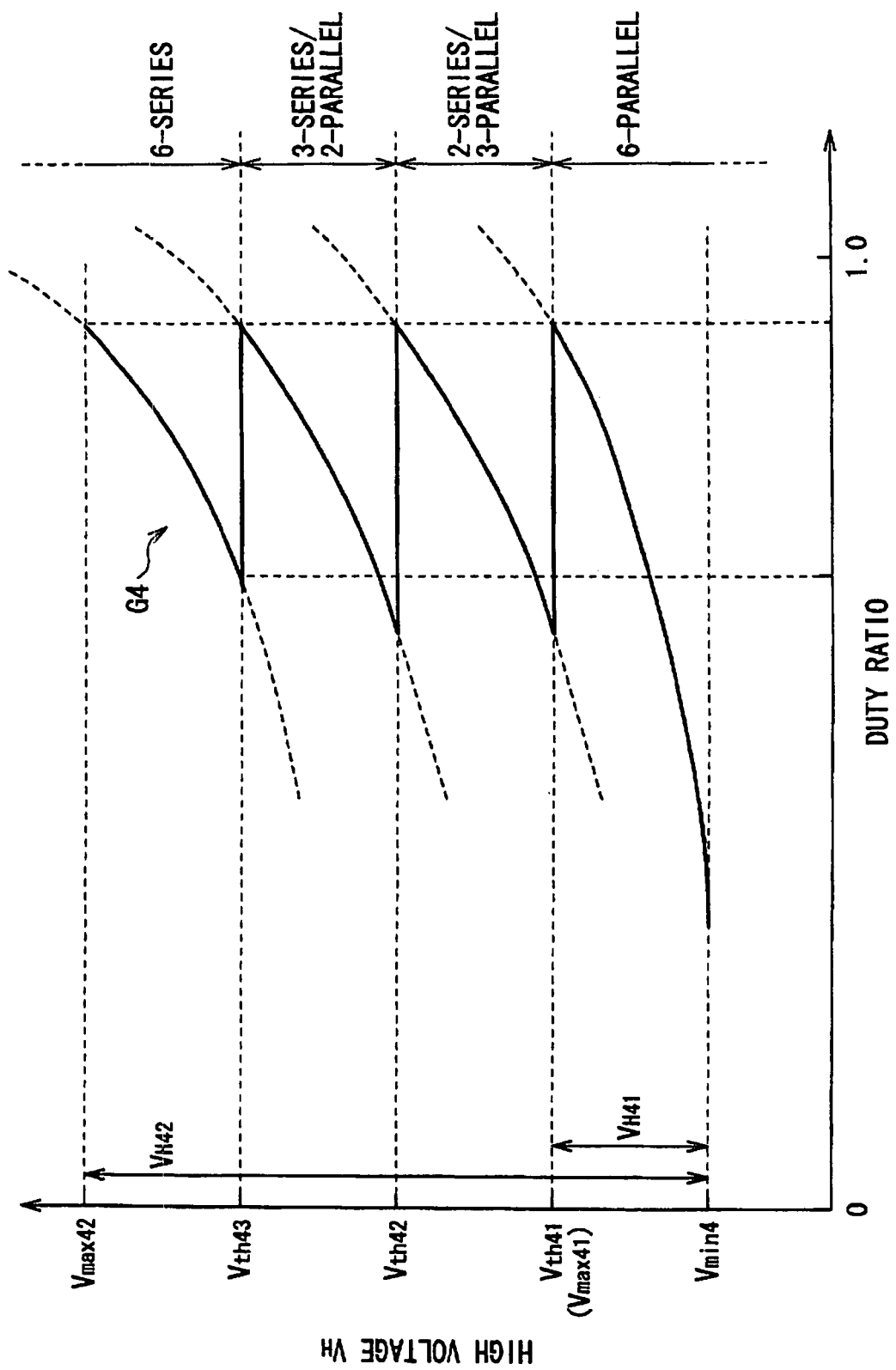
FIG. 27 is a characteristic view showing a relationship between an input voltage, a duty ratio, and a connection state in reverse operation in the second embodiment.

Moreover, for example, as shown in a graph G4 of FIG. 27, similarly in the reverse operation, when the high DC voltage VH being the input voltage is set high in the 2-series/3-parallel connection state compared with the 6-parallel connection state, and high in the 3-series/2-parallel connection state compared with the 2-series/3-parallel connection state, and still high in the 6-series connection state compared with the 3-series/2-parallel connection state, the on-duty ratios of the drive signals SG11 to SG14, SG21 to SG24, SG31 to SG34, SG41 to SG44, SG51 to SG54, and SG61 to SG64 can be kept low, and a range of the output voltage (high DC voltage VH) that can be generated from a constant input voltage (low DC voltage VL) is increased through such connection changeover control (the range is widened from an output voltage range VH41 between a voltage $V_{min4}$ and a voltage $V_{max41}$ to an output voltage range VH42 between voltage $V_{min4}$ and a voltage $V_{max42}$).

As hereinbefore, in the embodiment, since the six switching circuits 11 to 16, six windings 31A to 31F at the high-voltage side and six inductors Lr1 to Lr6 corresponding to the switching circuits respectively, and connection changeover switches S51 to S55 and S61 to S65 are provided, the turn ratio between the windings 31A to 31F and the windings 32A, 32B can be made larger in order of four connection states of 6-parallel connection, 2-series/3-parallel connection, 3-series/2-parallel connection, and 6-series connection. Consequently, a convertible voltage range can be further widened compared with the first embodiment in which the turn ratio can be increased in order of three connection states (4-parallel connection, 2-series/2-parallel connection, and 4-series connection).

Again in the embodiment, change in current in circuits can be made gentle by an effect of the inductors Lr1 to Lr6, as in the first embodiment. Accordingly, tolerance for shift in timing between the switching circuits 11 to 16 can be increased, consequently widening of a convertible voltage range can be achieved while suppressing production of the surge current.

Third Embodiment

Next, a third embodiment of the invention is described. In the switching power supply unit of the embodiment, as an odd number, five switching circuits 11 to 15, five windings 31A to 31E at the high-voltage side of the transformer 3 and five inductors Lr1 to Lr5 corresponding to the switching circuits respectively, and respective four connection changeover switches S51 to S54 and S61 to S64 are provided. Other configurations are the same as configurations shown in FIG. 1.

Figures 28, 29:
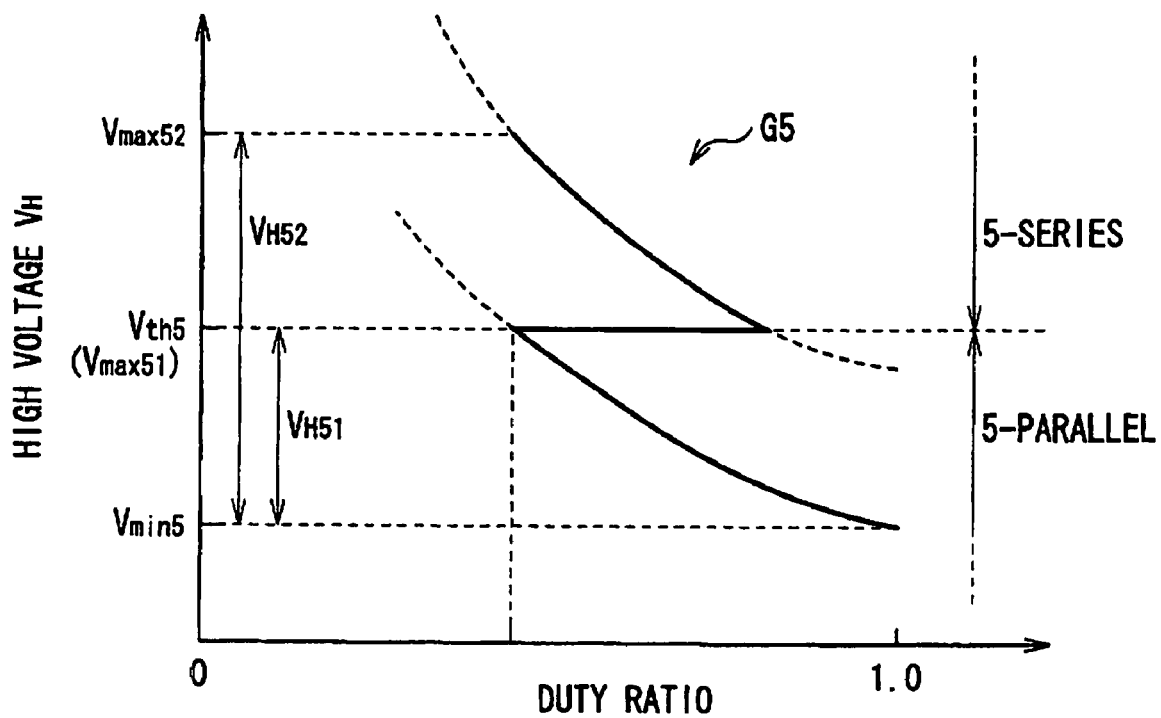
FIG. 28 is a view for explaining a connection state according to a third embodiment of the invention.
FIG. 29 is a characteristic view showing a relationship between an input voltage, a duty ratio, and a connection state in forward operation in the third embodiment.

FIG. 28 shows detail of connection changeover control of current paths by the control section 7 in the embodiment. In the figure, the same components or functions as those shown in FIG. 3 are marked with the same references, and appropriately omitted to be described.

In the connection changeover control of the embodiment, first, in the forward operation, when the high DC voltage VH detected by the voltage detection circuit 61 (target voltage value of the high DC voltage VH in the reverse operation) is lower than a predetermined threshold voltage $V_{th5}$ (predetermined threshold voltage $V_{th6}$ in the reverse operation), the connection changeover switches S51 to S54 and S61 to S64 are in the on state by the control section 7 respectively. Then, five current paths (first to fifth current paths) corresponding to the five switching circuits 11 to 15 and the five windings 31A to 31E at the high-voltage side respectively are in a parallel connection state with one another (5-parallel connection state).

On the other hand, when the detected high DC voltage VH (target voltage value of the high DC voltage VH in the reverse operation) is equal to or higher than the threshold voltage $V_{th5}$ (threshold voltage $V_{th6}$ in the reverse operation), all the connection changeover switches S51 to S54 and S61 to S64 are in the off state by the control section 7. Then, the first to fifth current paths are in a series connection state with one another (5-series connection state).

According to such a configuration, in the switching power supply unit of the embodiment, when a turn ratio (np/ns) between the number or turns np of the windings 31A to 31E and the number or turns ns of the windings 32A and 32B of the transformer 3 is compared between the 5-parallel connection state and 5-series connection state, the turn ratio in the 5-series connection state (turn ratio=5n) is five times as large as that in the 5-parallel connection state (turn ratio=n).

Accordingly, for example, as shown in a graph G5 of FIG. 29, in the forward operation, when the high DC voltage VH being the input voltage is high in the 5-series connection state compared with the 5-parallel connection state, the on-duty ratios of the drive signals SG11 to SG14, SG21 to SG24, SG31 to SG34, SG41 to SG44, and SG51 to SG54 can be kept high, and a range of the input voltage (high DC voltage VH) in which a constant output voltage (low DC voltage VL) can be kept is increased through such connection changeover control (the range is widened from an input voltage range VH51 between a voltage $V_{min5}$ and a voltage $V_{max51}$ to an input voltage range VH52 between the voltage $V_{min5}$ and a voltage $V_{max52}$).

Figures 30, 31:
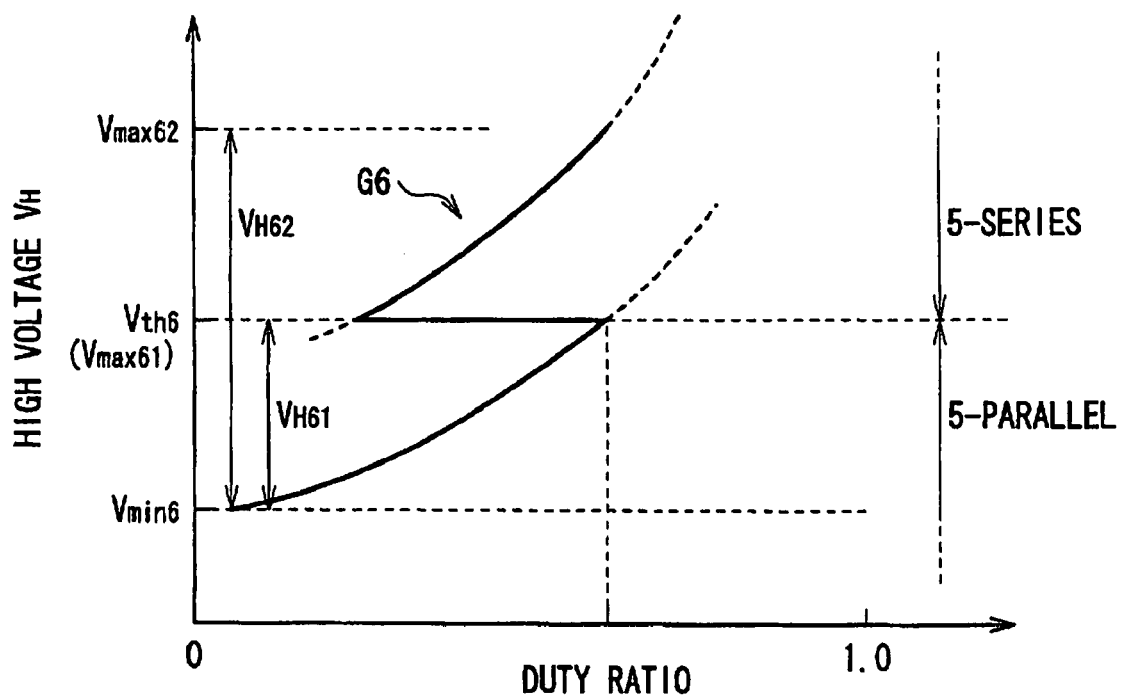
FIG. 30 is a characteristic view showing a relationship between an input voltage, a duty ratio, and a connection state in reverse operation in the third embodiment.
FIG. 31 is a view for explaining a connection state according to a fourth embodiment of the invention.

Moreover, for example, as shown in a graph G6 of FIG. 30, similarly in the reverse operation, when the high DC voltage VH being the output voltage is set high in the 5-series connection state compared with the 5-parallel connection state, the on-duty ratios of the drive signals SG11 to SG14, SG21 to SG24, SG31 to SG34, SG41 to SG44, and SG51 to SG54 can be kept low, and a, range of the output voltage (high DC voltage VH) that can be generated from a constant input voltage (low DC voltage VL) is increased through such connection changeover control (the range is widened from an output voltage range VH61 between a voltage $V_{min6}$ and a voltage $V_{max61}$ to an output voltage range VH62 between the voltage $V_{min6}$ and a voltage $V_{max62}$).

As hereinbefore, in the embodiment, since the five switching circuits 11 to 15, five windings 31A to 31E at the high-voltage side and five inductors Lr1 to Lr5 corresponding to the switching circuits respectively, and connection changeover switches S51 to S54 and S61 to S64 are provided, change in current in circuits can be made gentle by an effect of the inductors Lr1 to Lr5, as in the first and second embodiments. Accordingly, tolerance for shift in timing between the switching circuits 11 to 15 can be increased, consequently widening of a convertible voltage range can be achieved while suppressing production of the surge current.

Fourth Embodiment

Next, a fourth embodiment of the invention is described. The switching power supply unit of the embodiment corresponds to a case that the number of switching circuits is further increased compared with the first to third embodiments, which includes 24 switching circuits, 24 windings at the high-voltage side of the transformer 3 and 24 inductors Lr1 to Lr24 corresponding to the switching circuits respectively, and respective 23 connection changeover switches. Other configurations are the same as configurations shown in FIG. 1.

FIG. 31 shows detail of connection changeover control of current paths by the control section 7 in the embodiment. In the figure, the same components or functions as those shown in FIG. 2 are marked with the same references, and appropriately omitted to be described.

In the connection changeover control of the embodiment, in the forward operation, as the high DC voltage VH detected by the voltage detection circuit 61 (target voltage value of the high DC voltage VH in the reverse operation) is increased, a connection state of 24 current paths (first to twenty-fourth current paths) corresponding to the 24 switching circuits and the 24 windings at the high-voltage side respectively is changed as shown in FIG. 31 by on/off control of the connection changeover switches by the control section 7.

That is, as the detected high DC voltage VH (or target voltage value of the high DC voltage VH) is increased, the connection state of the current paths is changed in order of a 24-parallel connection state, 2-series/12-parallel connection state, 3-series/8-parallel connection state, 4-series/6-parallel connection state, 6-series/4-parallel connection state, 8-series/3-parallel connection state, 12-series/2-parallel connection state, and 24-series connection state.

According to such a configuration, in the switching power supply unit of the embodiment, as a turn ratio (np/ns) between the number of turns np of the windings at the high-voltage side of the transformer 3 and the number of turns ns of the windings 32A and 32B at the low-voltage side, turn ratios of n, 2n, 3n, 4n, 6n, 8n, 12n, and 24n are given in order from the 24-parallel connection state to the 24-series connection state, that is, the turn ratio in the 24-series connection state is 24 times as large as in the 24-parallel connection state.

Accordingly, in the forward operation, a range of the input voltage (high DC voltage VH) in which a constant output voltage (low DC voltage VL) can be kept is further increased. In the reverse operation, a range of the output voltage (high DC voltage VH) that can be generated from a constant input voltage (low DC voltage VL) is further increased.

As hereinbefore, in the embodiment, since the 24 switching circuits, 24 windings at the high-voltage side and 24 inductors Lr1 to Lr24 corresponding to the switching circuits respectively, and respective 23 connection changeover switches are provided, the turn ratio between the windings at the high-voltage side and the windings 32A, 32B at the low-voltage side can be made larger in order of 8 connection states of 24-parallel connection state, 2-series/12-parallel connection state, 3-series/8-parallel connection state, 4-series/6-parallel connection state, 6-series/4-parallel connection state, 8-series/3-parallel connection state, 12-series/2-parallel connection state, and 24-series connection state. Consequently, a convertible voltage range can be further widened compared with the first embodiment in which the turn ratio can be increased in order of three connection states (4-parallel connection, 2-series/2-parallel connection, and 4-series connection), and the second embodiment in which the turn ratio can be increased in order of four connection states (6-parallel connection, 2-series/3-parallel connection, 3 series/2 parallel connection, and 6-series connection).

Fifth Embodiment

Next, fifth embodiment of the invention is described. In a switching power supply unit of the embodiment, a control section 70 is provided in place of the control section 7 in the switching power supply unit of the first embodiment.

Figure 32:
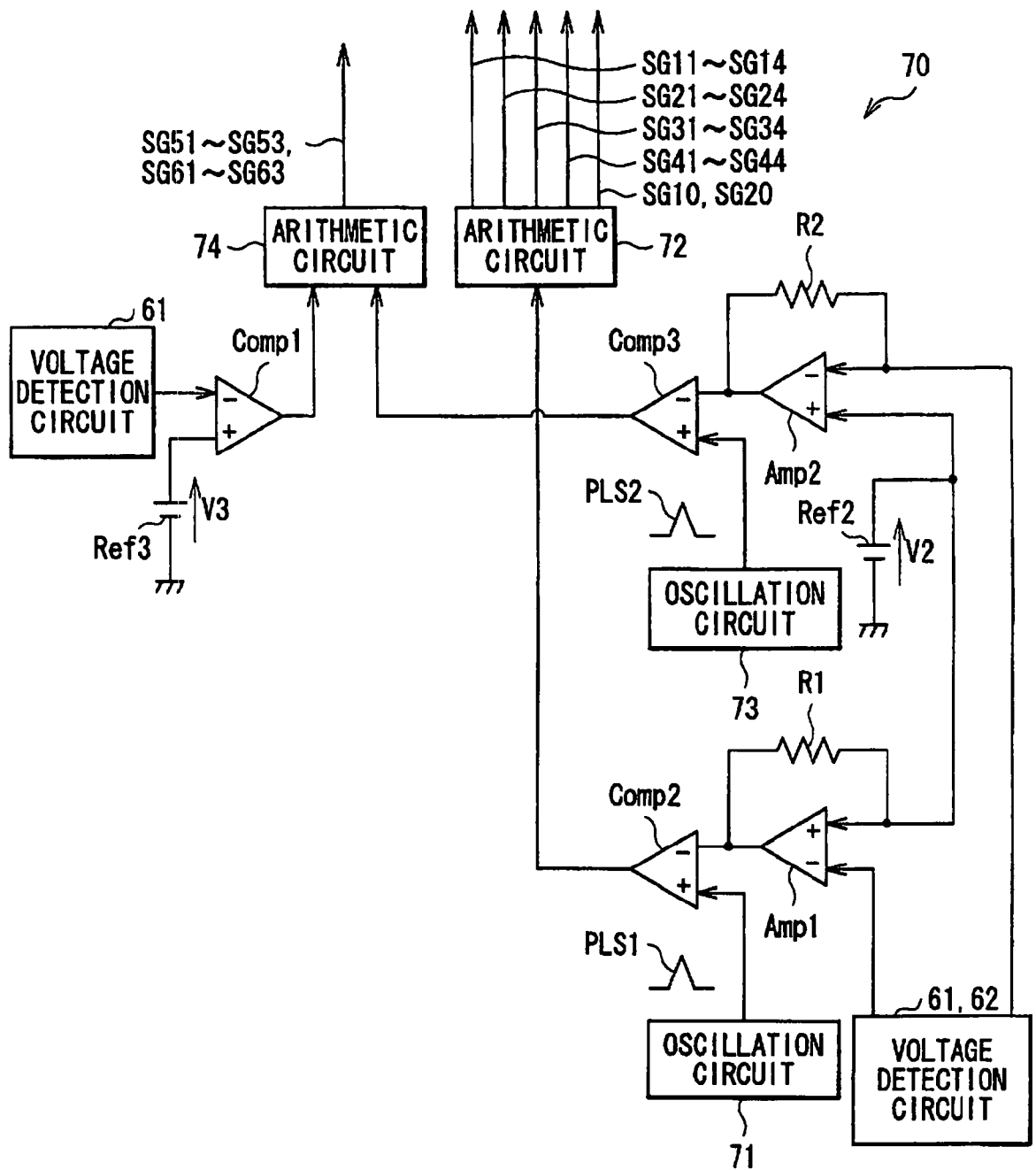
FIG. 32 is a circuit diagram showing a configuration of a control section of a switching power supply unit according to a fifth embodiment of the invention.

FIG. 32 shows a configuration of the control section 70 according to the embodiment. In the figure, the same components as components shown in FIG. 2 are marked with the same references, and appropriately omitted to be described. In the control section 70, a reference power supply Ref3, an oscillation circuit 73, a differential amplifier Amp2, a resistor R2, a comparator Comp3, and an arithmetic circuit 74 are additionally provided in the control section 7 in the first embodiment.

The plus input terminal of the comparator Comp1 is connected to one end of the reference power supply Ref3 instead of the reference power supply Ref1. A plus input terminal of the differential amplifier Amp2 is connected to one end of the reference power supply Ref2, a minus input terminal is connected to an output terminal of the output voltage detection circuit 62, and an output terminal is connected to the minus input terminal of the comparator Comp3. However, a voltage to be supplied to the minus input terminal of the differential amplifier Amp2 is set slightly high compared with a voltage to be supplied to the minus input terminal of the differential amplifier Amp1, for example, due to difference in voltage-drawing position from the voltage-dividing resistance in the voltage detection circuit 62. A plus input terminal of the comparator Comp3 is connected to an output terminal of the oscillator 73, and an output terminal is connected to an input terminal of the arithmetic circuit 74. Two input terminals of the arithmetic circuit 74 are connected to the output terminal of the comparator Comp3 and the output terminal of the comparator Comp1. The resistor R2 is disposed between the minus input terminal and the output terminal of the differential amplifier Amp2.

The comparator Comp1 of the embodiment compares reference potential V3 from the reference power supply Ref3 corresponding to potential of a voltage $V_{thH}$ or voltage $V_{thL}$ described later, with potential of a voltage corresponding to the high DC voltage VH outputted from the voltage detection circuit 61, and outputs a result of the comparison to the arithmetic circuit 74. Specifically, when the high DC voltage VH is higher than the voltage $V_{thH}$, the drive signals SG51 to SG53 and SG61 to SG63 are in the "L" level. Conversely, when the high DC voltage VH is lower than the voltage $V_{thL}$, the drive signals SG51 to SG53 and SG61 to SG63 are in the "H" level.

The differential amplifier Amp2 amplifies potential difference between the reference potential V2 from the reference power supply Ref2, and potential of a voltage corresponding to the low DC voltage VL outputted from the voltage detection circuit 62, and outputs the amplified potential difference.

The comparator Comp3 compares potential of a pulse voltage PLS2 outputted from the oscillation circuit 73 with potential of an output voltage from the differential amplifier Amp2, and outputs a pulse voltage as an origin of the drive signals SG51 to SG53 and SG61 to SG63 for the connection changeover switches S51 to S53 and S61 to S63 based on a result of the comparison. Specifically, when the output voltage from the differential amplifier Amp2 is higher than the pulse voltage PLS2, output of the comparator is in the "L" level. Conversely, when the output voltage from the differential amplifier Amp2 is lower than the pulse voltage PLS2, the output for DC input of the comparator is in the "H" level.

The arithmetic circuit 74 performs logic operation based on an output signal ("H" or "L") from the comparator Comp1 and an output signal (pulse voltage signal) from the comparator Comp3, and outputs the drive signals SG51 to SG53 and SG61 to SG63 for the connection changeover switches S51 to S53 and S61 to S63.

Here, connection changeover operation by the control section 70 in the forward operation is described in detail with reference to FIG. 33. FIG. 33 shows operation states of the switching elements S11 to S14, S21 to S24, S31 to S34, and S41 to S44, and operation states of the connection changeover switches S51 to S53 and S61 to S63, connection states of the first to fourth current paths, and the turn ratio (np/ns) between the number of turns np of the windings 31A to 31D and the number of turns ns of the windings 32A, 32B of the transformer 3 respectively.

First, when the high DC voltage VH is higher than the voltage $V_{thH}$ (VH≧$V_{thH}$), as in the first embodiment, the arithmetic circuit 72 outputs drive signals SG11 to SG14, SG21 to SG24, SG31 to SG34, and SG41 to SG44 such that the switching elements S11 to S14, S21 to S24, S31 to S34, and S41 to S44 perform PWM (Pulse Width Modulation) operation in which a duty ratio is varied depending on magnitude of the high DC voltage VH, respectively. Moreover, the arithmetic circuit 74 outputs drive signals SG51 to SG53 and SG61 to SG63 such that all the connection changeover switches S51 to S53 and S61 to S63 are in the off state, and the first to fourth current paths are in the 4-series connection state with one another, respectively. In this case, since the current paths are in the 4-series connection state, the turn ratio is 4n.

As in the first embodiment, when the high DC voltage VH is lower than the voltage $V_{thL}$ ($V_{thL}$>VH), the arithmetic circuit 72 outputs drive signals SG11 to SG14, SG21 to SG24, SG31 to SG34, and SG41 to SG44 such that the switching elements S11 to S14, S21 to S24, S31 to S34, and S41 to S44 perform PWM operation in which a duty ratio is varied depending on magnitude of the high DC voltage VH, respectively. Moreover, the arithmetic circuit 74 outputs drive signals SG51 to SG53 and SG61 to SG63 such that all the connection changeover switches S51 to S53 and S61 to S63 are in the on state, and the first to fourth current paths are in the 4-parallel connection state with one another, respectively. In this case, since the current paths are in the 4-parallel connection state, the turn ratio is n.

On the other hand, when the high DC voltage VH is between the voltage $V_{thH}$ and a voltage $V_{thM}$ ($V_{thH}$>VH≧$V_{thM}$), the arithmetic circuit 72 outputs drive signals SG11 to SG14, SG21 to SG24, SG31 to SG34, and SG41 to SG44 such that the switching elements S11 to S14, S21 to S24, S31 to S34, and S41 to S44 perform PWM operation in which a duty ratio is constant independently of magnitude of the high DC voltage VH, respectively. Moreover, the arithmetic circuit 74 outputs drive signals SG51 to SG53 and SG61 to SG63 such that the connection changeover switches S51, S53, S61 and S63 are in the off state respectively, but outputs drive signals SG52 and SG62 such that the connection changeover switches S52 and S62 perform PWM operation in which a duty ratio is varied depending on magnitude of the high DC voltage VH, respectively. Therefore, when the high DC voltage VH is in this voltage range, a connection state of the first to fourth current paths is temporally changed between 4-series and 2-series/2-parallel depending on whether the connection changeover switches S52 and S62 are in the on state or off state, and thus the turn ratio is continuously changed between 4n to 2n.

When the high DC voltage VH is between the voltage $V_{thM}$ and the voltage $V_{thL}$ ($V_{thM}$>VH≧$V_{thL}$), the arithmetic circuit 72 outputs drive signals SG11 to SG14, SG21 to SG24, SG31 to SG34, and SG41 to SG44 such that the switching elements S11 to S14, S21 to S24, S31 to S34, and S41 to S44 perform PWM operation in which a duty ratio is constant independently of magnitude of the high DC voltage VH, respectively. Moreover, the arithmetic circuit 74 outputs drive signals SG52 and SG62 such that the connection changeover switches S52 and S62 are in the on state respectively, but outputs drive signals SG51, SG53, SG61 and SG63 such that the connection changeover switches S51, S53, S61 and S63 perform PWM operation in which a duty ratio is varied depending on magnitude of the high DC voltage VH, respectively. Therefore, when the high DC voltage VH is in this voltage range, a connection state between the first to fourth current paths is temporally changed between 2-series/2-parallel and 4-parallel depending on whether the connection changeover switches S51, S53, S61 and S63 are in the on state or off state, and thus the turn ratio is continuously changed between 2n and n.

According to such a configuration, as the control section 7, the control section 70 generates drive signals SG11 to SG14, SG21 to SG24, SG31 to SG34, and SG41 to SG44 based on a voltage depending on the low DC voltage VL outputted from the voltage detection circuit 62, and performs on/off control of the switching elements S11 to S14, S21 to S24, S31 to S34, and S41 to S44 using the drive signals, thereby the low DC voltage VL is stabilized (kept constant).

Moreover, the control section 70 generates drive signals SG51 to SG53 and SG61 to SG63 based on magnitude of the voltage depending on the high DC voltage VH outputted from the voltage detection circuit 61, and magnitude of the voltage depending on the low DC voltage VL outputted from the voltage detection circuit 62, and controls operation of the connection changeover switches S51 to S53 and S61 to S63 using the drive signals. Thereby, the control section changes a connection state between a current path (first current path) passing through the switching circuit 11 and the winding 31A, current path (second current path) passing through the switching circuit 12 and the winding 31B, current path (third current path) passing through the switching circuit 13 and the winding 31C, and current path (fourth current path) passing through the switching circuit 14 and the winding 31D. Specifically, a relative period in the 4-series connection state in which the first to fourth current paths are in 4-series connection with one another, a relative period in the 2-series/2-parallel connection state in which they are in 2-series/2-parallel connection with one another, and a relative period in the 4-parallel connection state in which they are in 4-parallel connection with one another are changed respectively, thereby the turn ratio (np/ns) between the number of turns np of the windings 31A to 31D and the number of turns ns of the windings 32A, 32B of the transformer 3 is continuously changed.

Next, description is made on connection changeover control when the high DC voltage VH being the input voltage is changed in the forward operation with reference to FIGS. 34A to 38, while being compared between the switching power supply unit of the embodiment (having the control section 70 shown in FIG. 32), and the switching power supply unit of the first embodiment (comparative example, having the control section 7 shown in FIG. 2).

Figure 38:
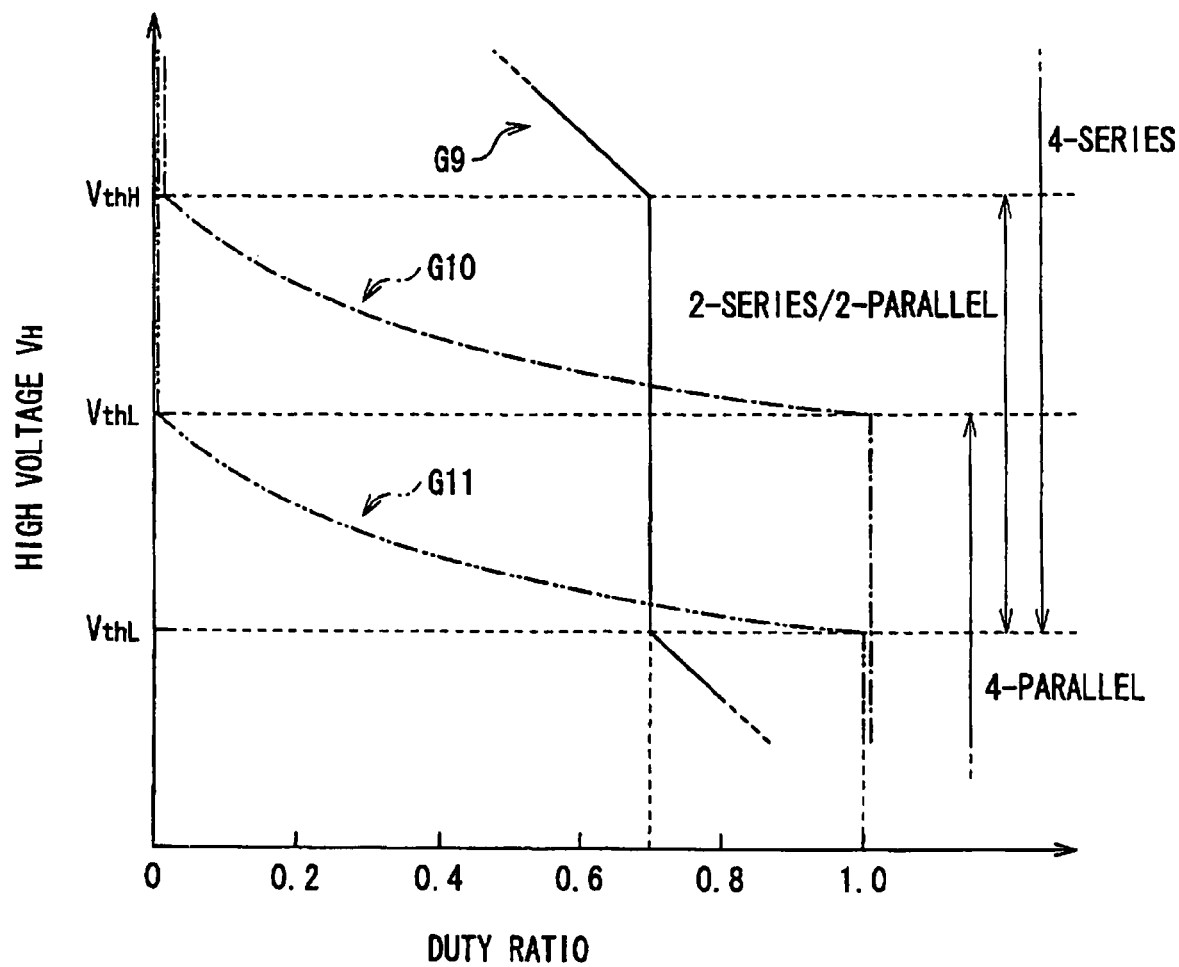
FIG. 38 is a characteristic view showing a relationship between an input voltage, a duty ratio, and a connection state in forward operation in the fifth embodiment.
Figure 39:
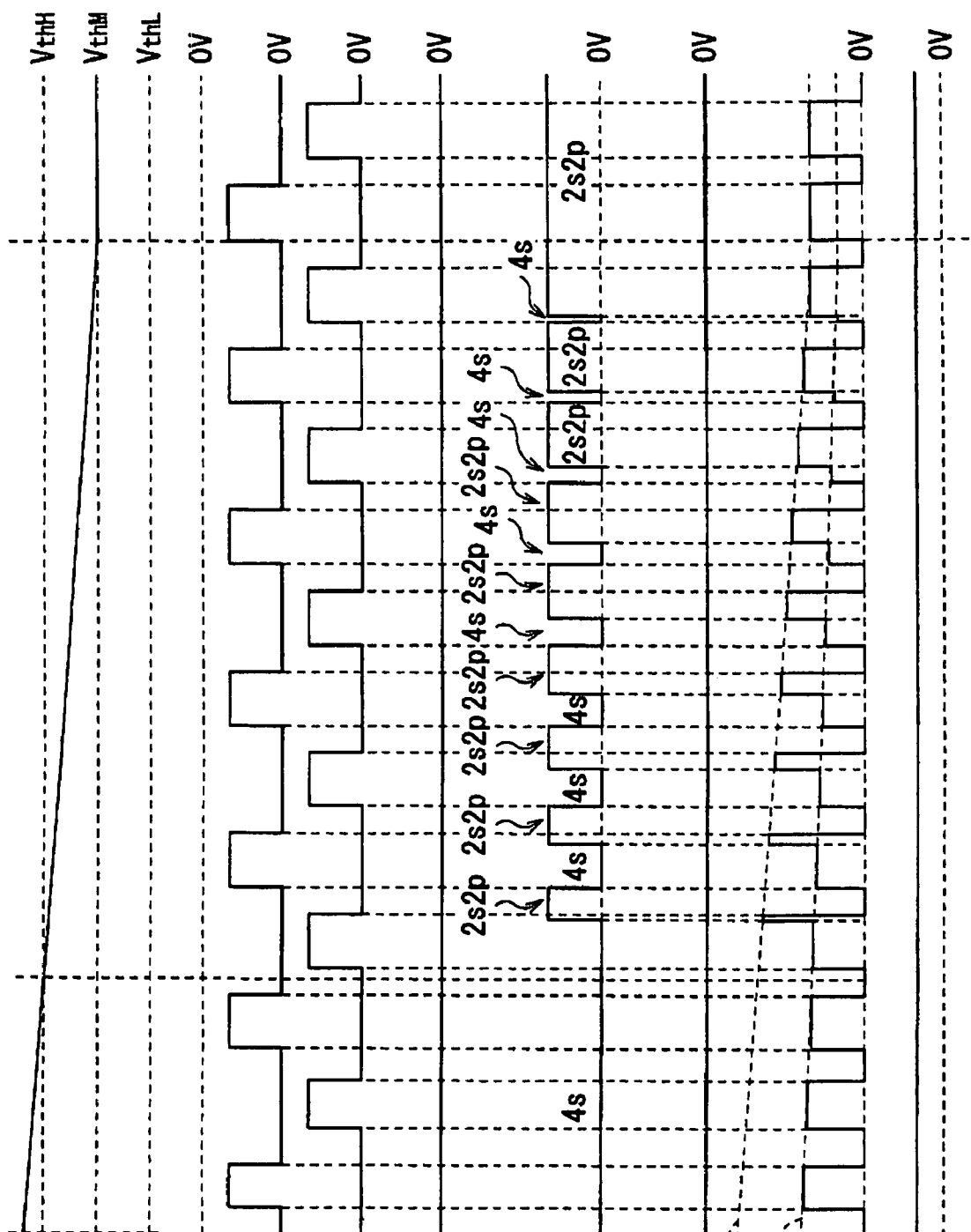
FIGS. 39A to 39H are timing waveform views for explaining connection changeover operation according to a modification of the fifth embodiment.
Figure 40:
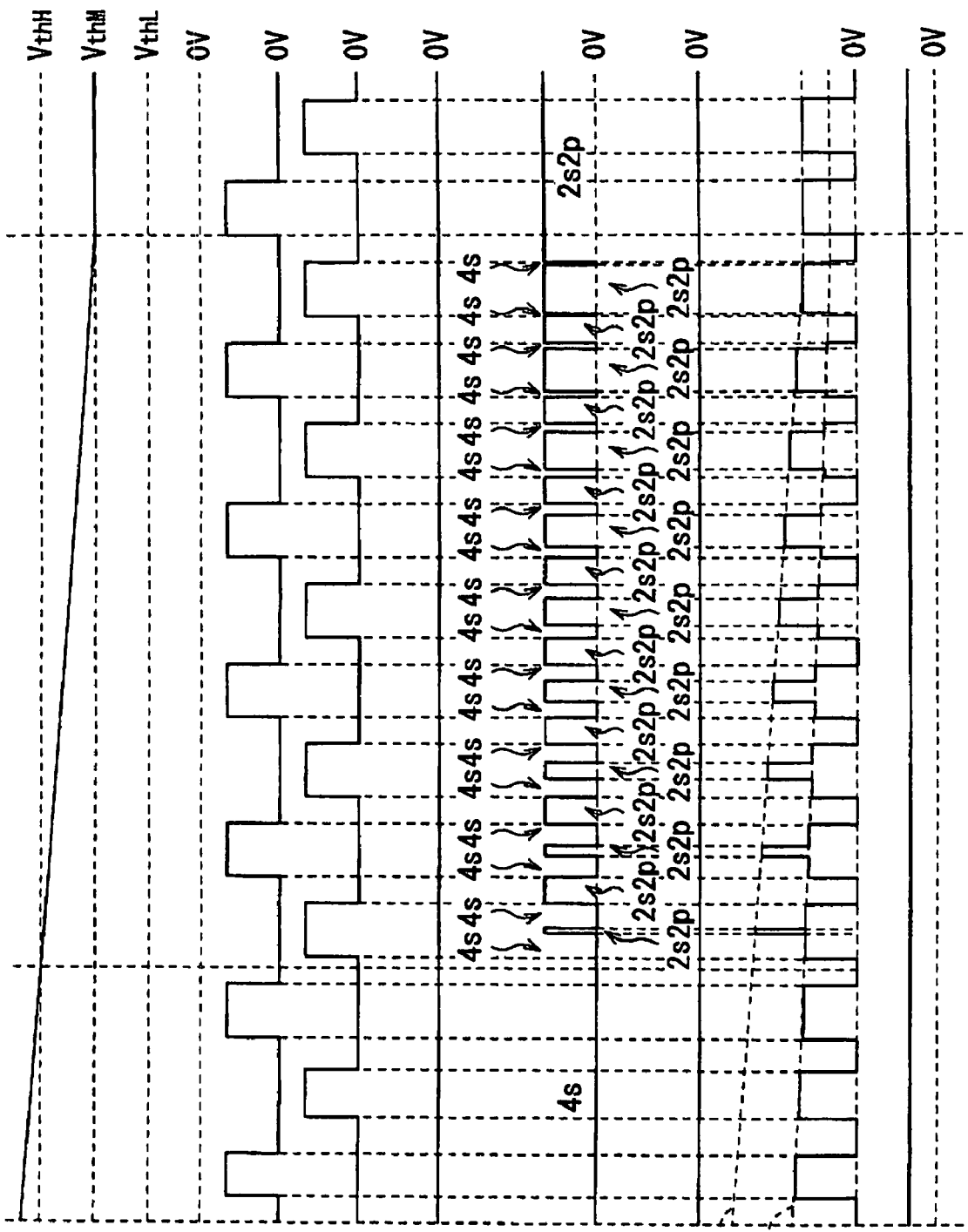
FIGS. 40A to 40H are timing waveform views for explaining connection changeover operation according to the modification of the fifth embodiment.

Here, FIGS. 34A to 34H and FIGS. 35A to 35H show timing waveforms in connection changeover control according to the comparative example, wherein FIGS. 34A to 34H show timing waveforms from a state that the high DC voltage VH is higher than a threshold voltage $V_{th12}$ to a state that the voltage VH becomes lower than the thresh voltage $V_{th12}$, and FIGS. 35A to 35H show timing waveforms from a state that the high DC voltage VH is higher than a threshold voltage $V_{th11}$ to a state that the voltage VH becomes lower than the thresh voltage $V_{th11}$, respectively. On the other hand, FIGS. 36A to 36H and FIGS. 37A to 37H show timing waveforms in connection changeover control according to the embodiment, wherein FIGS. 36A to 36H show the timing waveforms from a state that the high DC voltage VH is higher than a threshold voltage $V_{thH}$ to a state that the voltage VH is decreased to a voltage $V_{thM}$, and FIGS. 37A to 37H shows timing waveforms while the high DC voltage VH is decreased from the voltage $V_{thM}$ to a voltage lower than the voltage $V_{thL}$, respectively. Specifically, in FIGS. 34A to 37H, FIGS. 34A, 35A, 36A and 37A indicate the high DC voltage VH; FIGS. 34B, 35B, 36B and 37B indicate drive signals SGm1 and SGm3 (m=1 to 4); FIGS. 34C, 35C, 36C and 37C indicate drive signals SGm2 and SGm4 (m=1 to 4); FIGS. 34D, 35D, 36D and 37D indicate the drive signals SG51 and SG61; FIGS. 34E, 35E, 36E and 37E indicate the drive signals SG52 and SG62; FIGS. 34F, 35F, 36F and 37F indicate the drive signals SG53 and SG63; FIGS. 34G, 35G, 36G and 37G indicate electric potential $V_{CT}$ at the center-tap CT; and FIGS. 34H, 35H, 36H and 37H indicate the low DC voltage VL, respectively. FIG. 38 shows a relationship between the input voltage, duty ratios, and connection state by the control section 70 of the embodiment, which is corresponding to FIG. 10 in the comparative example (first embodiment). In FIGS. 34A to 37H, the 4-series connection state is expressed as "4s", 2-series/2-parallel connection state is expressed as "2s2p", and 4-parallel connection state is expressed as "4p".

First, in the comparative example as shown in FIGS. 34A to 34H, when the high DC voltage VH (FIG. 34A) is higher than the threshold voltage $V_{th12}$ (timing t120 to timing t121), the drive signals SG51 to SG53 and SG61 to SG63 for the connection changeover switches S51 to S53 and S61 to S63 are in the off state (FIGS. 34D to 34F), so that the first to fourth current paths are in the 4-series connection state with one another. Conversely, when the high DC voltage VH is lower than the threshold voltage $V_{th12}$ (after timing t121), the drive signals SG52 and SG62 are in the on state (FIG. 34E), so that the first to fourth current paths are in the 2-series/2-parallel connection state with one another. That is, each of the connection changeover switches S51 to S53 and S61 to S63 is controlled by the control section 7 such that an on/off state of the switch is changed depending on whether the high DC voltage VH is higher than the predetermined threshold voltage $V_{th12}$ or not.

In the comparative example as shown in FIGS. 35A to 35H, when the high DC voltage VH (FIG. 35A) is higher than the threshold voltage $V_{th11}$ (timing t123 to timing t124), the drive signals SG51, SG53, SG61 and SG63 are in the off state, and the drive signals SG52 and SG63 are in the on state (FIGS. 35D to 35F), so that the first to fourth current paths are in the 2-series/2-parallel connection state with one another. Conversely, when the high DC voltage VH is lower than the threshold voltage $V_{th11}$ (after timing t124), the drive signals SG51, SG53, SG61 and SG63 are in the on state (FIGS. 35D and 35E), so that the first to fourth current paths are in the 4-parallel connection state with one another. That is, again in this case, each of the connection changeover switches S51 to S53 and S61 to S63 is controlled by the control section 7 such that an on/off state of the switch is changed depending on whether the high DC voltage VH is higher than the predetermined threshold voltage $V_{th11}$ or not.

The drive signals SG11 to SG14, SG21 to SG24, SG31 to SG34, and SG41 to SG44 for the switching elements S11 to S14, S21 to S24, S31 to S34, and S41 to S44 (FIGS. 35B and 35C) are controlled by the control section 7 such that duty ratios of them are changed to prevent change in the low DC voltage VL due to change in the high DC voltage VH, so that the low DC voltage VL (FIG. 35H) is kept constant.

However, for example, when a connection state is changed from the 4-series connection state to the 2-series/2-parallel connection state at the timing t121, or a connection state is changed from the 2-series/2-parallel connection state to the 4-parallel connection state at the timing t124, overshoot is induced in the low DC voltage VL. Consequently, the voltage VL is not kept constant in a period between timing t121 and timing t122, and a period between timing t124 and timing t125, as shown by signs G4 and G5 respectively. The reason for this is that since the connection state is abruptly changed at the timing t121 and the timing t124, response speed of the differential amplifier Amp1 (error amplifier) in the control section 7 do not follow such change. Consequently, the duty ratios of the drive signals SG11 to SG14, SG21 to SG24, SG31 to SG34, and SG41 to SG44 can not be abruptly changed (abrupt change at the threshold voltage $V_{th11}$ and $V_{th12}$ as shown in FIG. 10), as shown by arrows in the center-tap voltage $V_{CT}$ (FIG. 35G) in a center figure. In this way, in the comparative example, since the duty ratios of the drive signals SG11 to SG14, SG21 to SG24, SG31 to SG34, and SG41 to SG44 are increased even slightly in the period between the timing t121 and the timing t122, and the period between the timing t124 and the timing t125, the overshoot is induced in the low DC voltage VL.

On the contrary, in the embodiment, when the high DC voltage VH is changed between the voltage $V_{thH}$ and the voltage $V_{thM}$ as shown in FIGS. 36A to 36H, operation of the connection changeover switches S51 to S53 and S61 to S63 is controlled depending on magnitude of the low DC voltage VL (that is, indirectly magnitude of the high DC voltage VH), so that relative periods in the 4-series connection state and the 2-series/2-parallel connection state are changed respectively. Thereby, the turn ratio (np/ns) of the number of turns np of the windings 31A to 31D and the number of turns ns of the windings 32A, 32B of the transformer 3 is continuously changed, as described before.

Similarly, when the high DC voltage VH is changed between the voltage $V_{thM}$ and the voltage $V_{thL}$ as shown in FIGS. 37A to 37H, operation of the connection changeover switches S51 to S53 and S61 to S63 is controlled depending on magnitude of the low DC voltage VL (indirectly magnitude of the high DC voltage VH), so that relative periods in the 2-series/2-parallel connection state and the 4-parallel connection state are changed respectively. Thereby, the turn ratio (np/ns) of the transformer 3 is continuously changed.

Furthermore, since a voltage supplied to the minus input terminal of the differential amplifier Amp2 is set to be slightly higher than a voltage supplied to the minus input terminal of the differential amplifier Amp1, the duty ratios of the drive signals SG11 to SG14, SG21 to SG24, SG31 to SG34 and SG41 to SG44 (FIGS. 36B and 36C and FIGS. 37B and 37C) are constant. Accordingly, a voltage waveform of the center-tap voltage $V_{CT}$ is as shown in FIG. 36G and FIG. 37G, and an integral value (area) of the waveform is constant in any period. Therefore, overshoot is not induced in the low DC voltage VL (FIG. 36H and FIG. 37H), and the voltage VL is kept constant at any time.

In this way, in the switching power supply unit of the embodiment, for example, the duty ratios of the drive signals SG11 to SG14, SG21 to SG24, SG31 to SG34 and SG41 to SG44 are constant in a range that the high DC voltage VH is between the voltage $V_{thH}$ and the voltage $V_{thL}$ as shown by a sign G9 in FIG. 38. On the other hand, the duty ratios of the drive signals SG52 and SG62 and the duty ratios of the drive signals SG51, SG53, SG61 and SG63 are continuously changed as shown by signs G10 and G11 in the figure, respectively.

While the case that the high DC voltage VH was changed between the voltage $V_{thH}$ and the voltage $V_{thL}$ was shown in FIGS. 36A to 36H and FIGS. 37A to 37H, in the case that the high DC voltage VH is equal to or higher than the voltage $V_{thH}$, or not higher than the voltage $V_{thL}$, the duty ratios of the drive signals SG11 to SG14, SG21 to SG24, SG31 to SG34 and SG41 to SG44 are also changed at a constant amount of change, for example, as shown in FIG. 38.

As hereinbefore, in the embodiment, since the relative periods in the 4-parallel connection state, 2-series/2-parallel connection state, and 4-series connection state are changed depending on magnitude of the high DC voltage VH respectively, values of them can be continuously changed, and thus avoided from being abruptly changed. Accordingly, even if an element having a slow response speed (for example, the error amplifier) exists in the switching unit, the turn ratio (np/ns) between the number of turns np of the windings 31A to 31D and the number of turns ns of the windings 32A, 32B of the transformer 3 can be continuously changed (increased or decreased). Consequently, the low DC voltage VL can be stabilized independently of response speed of each element.

The embodiment was described using the case in which a case of changing the duty ratios of the drive signals SG51 to SG53 and SG61 to SG63, and a case of changing the duty ratios of the drive signals SG11 to SG14, SG21 to SG24, SG31 to SG34 and SG41 to SG44 were separated with a range of the high DC voltage VH. However, both the duty ratios may be changed together.

Moreover, in the embodiment, change control by the control section 70 is not limited to control in the voltage waveform of the center-tap voltage $V_{CT}$ as shown in FIGS. 36A to 36H or FIGS. 37A to 37H, and for example, it may be in a voltage waveform as shown in FIGS. 39A to 39H or FIGS. 40A to 40H as a waveform corresponding to FIG. 36. Even in a case of such a configuration, the same advantages as in the embodiment can be obtained. However, in a case that the switching circuits 11 to 14 perform the phase shift operation, since they can perform the Zero Volt Switching operation in the voltage waveform as shown in FIGS. 36A to 36H or FIGS. 37A to 37H, such a voltage waveform is preferably used in the case.

In the embodiment, the comparator Comp1 and the reference power supply Ref3 were provided in the control section 70. However, when the high DC voltage VH is changed between the voltage $V_{thH}$ and the voltage $V_{thL}$, it is acceptable that they are not provided, and the arithmetic circuit 74 generates the drive signals SG51 to SG53 and SG61 to SG63 based on only the output signal from the comparator Comp3.

In the embodiment, the forward operation of generating the low DC voltage VL from the high DC voltage VH was described. However, in the case of the reverse operation of generating the high DC voltage VH from the low DC voltage VL, the same advantages can be obtained by the same effects as in the forward operation.

Furthermore, the change control by the control section 70 as described in the embodiment can be applied to other embodiments of the invention, and similar advantages can be obtained thereby.

While the first to fifth embodiments were described with the cases that the number of the switching circuits at the high-voltage side was 4, 6, 5 and 24 in the first to fifth embodiments, the number of the switching circuits is not limited to such cases. However, when the number of the switching circuits is set to be N (natural number of 4 or more), a value of N is preferably set such that at least 3 divisors of N exist. When at least 3 divisors of N exist in this way, at least 3 kinds of connection states between current paths exist, that is, a mixed connection state of series and parallel can be provided in addition to N parallel connection states and N series connection states, consequently a convertible voltage range can be widened. Accordingly, in an embodiment of the invention, the number of divisors of N is desirably set as many as possible.

Moreover, the first to fifth embodiments were described with the case that connection changeover was performed depending on the target voltage value of the output voltage (high DC voltage VH) in the reverse operation. However, connection changeover in the reverse operation may be performed depending on magnitude of the input voltage (low DC voltage VL) detected by the voltage detection circuit 62, as in the forward operation. In the case of such a configuration, for example, as in the forward operation, a range of the input voltage (low DC voltage VL) in which a constant output voltage (high DC voltage VH) can be widened compared with a usual case. In this case, oppositely to the forward operation, as the detected low DC voltage VL is increased, a plurality of current paths are subjected to connection changeover in order of the series connection state, mixed connection state of the series connection and the parallel connection, and parallel connection state, so that the turn ratio (np/ns) between the number of turns np of the primary windings and the number of turns ns of the secondary windings of the transformer is continuously decreased.

Moreover, while the first to fifth embodiments were described with the case that connection changeover is performed depending on the target value of the output voltage (high DC voltage VH) in the reverse operation, connection changeover may be performed depending on the target value of the output voltage (high DC voltage VH) similarly in the forward operation. In the case of such a configuration, for example, similarly as in the reverse operation, a range of the output voltage (high DC voltage VH) that can be generated from the constant input voltage (low DC voltage VL) is widened.

Moreover, while the first to fifth embodiments were described with a case that the switching circuit 4 was configured by a circuit of anode common connection of a center-tap type (or a circuit of a push-pull type), for example, the switching circuit may be configured by a circuit of a full-bridge type, or a circuit in cathode common connection.

Moreover, while the first to fifth embodiments were described with a case of the switching power supply unit of the step-down type, an embodiment of the invention can be applied to a switching power supply unit of a step-up type.

Sixth Embodiment

Next, a sixth embodiment of the invention is described.

Figure 41:
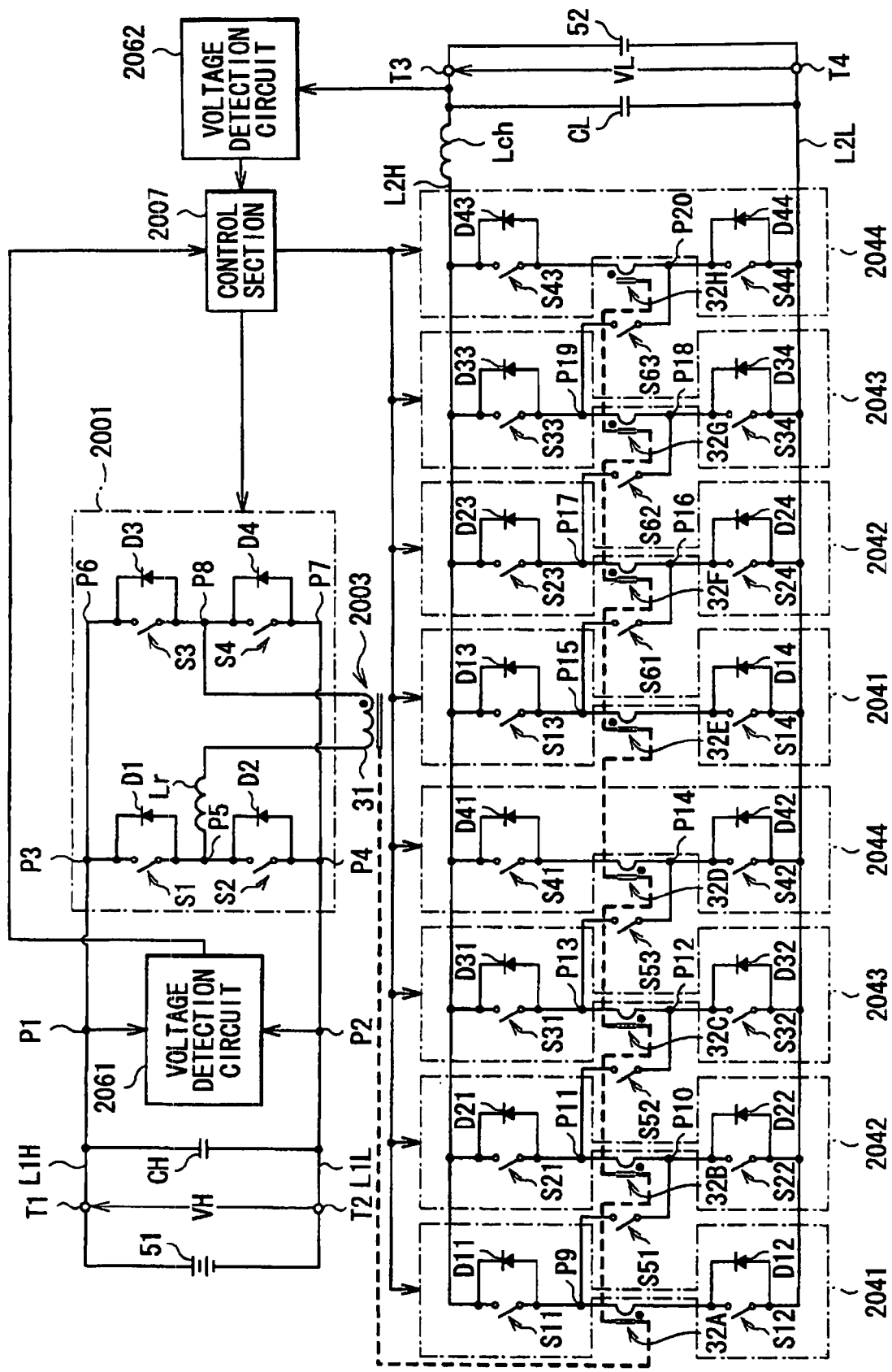
FIG. 41 is a circuit diagram showing a configuration of a switching power supply unit according to a sixth embodiment of the invention.

FIG. 41 shows a configuration of a switching power supply unit according to the embodiment. The switching power supply unit operates as a switching power supply unit of a bidirectional type (DC-DC converter) that can perform the forward operation of generating a low DC voltage VL based on a high DC voltage VH applied between input/output terminals T1 and T2 from a high-voltage battery 51, and outputting the low DC voltage from input/output terminals T3 and T4 to supply it to a low-voltage battery 52, and the reverse operation of conversely generating the high DC voltage VH based on the low DC voltage VL applied between the input/output terminals T3 and T4 from the low-voltage battery 52, and outputting the high DC voltage from the input/output terminals T1 and T2 to supply it to the high-voltage battery 51.

The switching power supply unit includes a smoothing capacitor CH provided between a high-voltage line L1H and a low-voltage line L1L at a side of the high-voltage battery 51 (high voltage side); a switching circuit 2001; an inductor Lr; a transformer 2003 having a winding 31 at the high voltage side and windings 32A to 32H at a side of the low-voltage battery 52 (low voltage side); four switching circuits 2041 to 2044 provided at the low voltage side; connection changeover switches S51 to S53 and S61 to S63; an inductor Lch; a smoothing capacitor CL; a voltage detection circuit 2061 for detecting a high DC voltage VH; a voltage detection circuit 2062 for detecting a low DC voltage VL; and a control section 2007 for controlling operation of the switching circuits 2001 and 2041 to 2044 and the connection changeover switches S51 to S53, S61 to S63 respectively.

The smoothing capacitor CH is for smoothing the high DC voltage VH.

The switching circuit 2001 has four switching elements S1 to S4, and diodes D1 to D4 connected in parallel with the switching elements S1 to S4 respectively, that is, has a circuit configuration of a full-bridge type. Specifically, one end of the switching element S1 and one end of the switching element S2 are connected to each other at a connection point P5, and one end of the switching element S3 and one end of the switching element S4 are connected to each other at a connection point P8. Moreover, the other end of the switching element S1 and the other end of the switching element S3 are connected to each other at a connection point P3 (P6), and the other end of the switching element S2 and the other end of the switching element S4 are connected to each other at a connection point P4 (P7), and the other ends of them are connected to the input terminals T1 and T2 respectively. According to such a configuration, the switching circuit 2001 operates as an inverter circuit of a full-bridge type in the forward operation, but operates as a rectifier circuit of a full-bridge type in the reverse operation according to drive signals (drive signals SG1 to SG4) supplied from the control section 2007, as described later.

The switching elements S1 to S4 include a switch element such as a field effect transistor (MOS-FET; Metal Oxide Semiconductor-Field Effect Transistor) or IGBT (Insulated Gate Bipolar Transistor). When MOS-FET is used for the switch element, the diodes D1 to D4 can be configured by a parasitic diode of the MOS-FET respectively. In such a configuration, the diodes D1 to D4 need not be provided separately from the switching elements, consequently a circuit configuration can be simplified. Moreover, when the diodes D1 to D4 are configured by the parasitic diode of the MOS-FET respectively, the MOS-FET itself is preferably in the on state in synchronization with a period while the parasitic diode of the MOS-FET is conductive. This is because rectification can be made with smaller voltage drop.

The inductor Lr is connected to the connection point P5 at one end, and connected to the connection point P8 at the other end via a winding 31A of the transformer 2003, so that it is in H-bridge connection with a bridge circuit (switching circuit 2001) including the switching elements S1 to S4. Leakage inductance of the winding 31 (not shown) may be used in place of, or in addition to the inductor Lr.

The transformer 2003 has one winding 31 at the high voltage side, and four pairs of windings 32A and 32E, 32B and 32F, 32C and 32G, and 32D and 32H at the low voltage side which are provided correspondingly to the switching circuits 2041 to 2044 as described later respectively, and have the numbers of turns equal to one another. Among them, the winding 31 at the high voltage side is disposed between the connection point P5 and the connection point P8 via the inductor Lr. On the other end, the winding 32A at the low voltage side is connected to a cathode of the diode D12 in the switching circuit 2041 as described later at one end, and connected to the connection point P9 in the switching circuit 2041 at the other end. The winding 32E is connected to a cathode of the diode D14 in the switching circuit 2041 at one end, and connected to a connection point P15 in the switching circuit 2041 at the other end. The winding 32B is connected to a connection point P10 in the switching circuit 2042 at one end, and connected to a connection point P11 in the switching circuit 2042 at the other end. The winding 32F is connected to a connection point P16 in the switching circuit 2042 at one end, and connected to a connection point P17 in the switching circuit 2042 at the other end. The winding 32C is connected to a connection point P12 in the switching circuit 2043 as described later at one end, and connected to a connection point P13 in the switching circuit 2043 at the other end. The winding 32G is connected to a connection point P18 in the switching circuit 2043 at one end, and connected to a connection point P19 in the switching circuit 2043 at the other end. The winding 32D is connected to a connection point P14 in the switching circuit 2044 at one end, and connected to an anode of a diode D41 in the switching circuit 2044 at the other end. The winding 32H is connected to a connection point P20 in the switching circuit 2044 at one end, and connected to an anode of the diode D41 in the switching circuit 2044 at the other end. According to such a configuration, the transformer 2003 steps down input AC voltages generated by the switching circuit 2001 or the switching circuits 2041 to 2044 as described later, and outputs output AC voltages different in phase by 180 degrees from one another from respective ends of the windings 32A to 32E or an end of the winding 31. A level of step-down or step-up in this case is determined by a turn ratio between the windings 31 and the windings 32A to 32H.

The four switching circuits 2041 to 2044 are disposed with being opposed to the four pairs of windings at the low voltage side 32A and 32E, 32B and 32F, 32C and 32G, and 32D and 32H respectively, and in parallel with one another between a high-voltage line L2H and a low-voltage line L2L at the low voltage side.

The switching circuit 2041 includes a circuit that is disposed with being opposed to the winding 32A, and has two switching elements S11 and S12, and diodes D11 and D12 connected in parallel with the switching elements S11 and S12 respectively, and a circuit that is disposed with being opposed to the winding 32E, and has two switching elements S13 and S14, and diodes D13 and D14 connected in parallel with the switching elements S13 and S14 respectively, so that it is in a circuit configuration of a center-tap type. Specifically, one end of the switching element S11 and an anode of the diode D11 are connected to the connection point P9 respectively, and the other end of the switching element S11 and a cathode of the diode D11 are connected to the high-voltage line L2H respectively. One end of the switching element S12 and a cathode of the diode D12 are connected to one end of the winding 32A respectively, and the other end of the switching element S12 and an anode of the diode D12 are connected to the low-voltage line L2L respectively. One end of the switching element S13 and an anode of the diode D13 are connected to the connection point P15 respectively, and the other end of the switching element S13 and a cathode of the diode D13 are connected to the high-voltage line L2H respectively. One end of the switching element S14 and a cathode of the diode D14 are connected to one end of the winding 32E respectively, and the other end of the switching element S14 and an anode of the diode D14 are connected to the low-voltage line L2L respectively. According to such a configuration, the switching circuit 2041 operates as a rectifier circuit of the center-tap type in the forward operation, but operates as an inverter circuit of the push-pull type in the reverse operation, as described later.

The switching circuit 2042 includes a circuit that is disposed with being opposed to the winding 32B, and has two switching elements S21 and S22, and diodes D21 and D22 connected in parallel with the switching elements S21 and S22 respectively, and a circuit that is disposed with being opposed to the winding 32F, and has two switching elements S23 and S24, and diodes D23 and D24 connected in parallel with the switching elements S23 and S24 respectively, so that it is in a circuit configuration of a center-tap type. Specifically, one end of the switching element S21 and an anode of the diode D21 are connected to the connection point P11 respectively, and the other end of the switching element S21 and a cathode of the diode D21 are connected to the high-voltage line L2H respectively. One end of the switching element S22 and a cathode of the diode D22 are connected to the connection point P10 respectively, and the other end of the switching element S22 and an anode of the diode D22 are connected to the low-voltage line L2L respectively. One end of the switching element S23 and an anode of the diode D23 are connected to the connection point P17 respectively, and the other end of the switching element S23 and a cathode of the diode D23 are connected to the high-voltage line L2H respectively. One end of the switching element S24 and a cathode of the diode D24 are connected to the connection point P16 respectively, and the other end of the switching element S24 and an anode of the diode D24 are connected to the low-voltage line L2L respectively. According to such a configuration, the switching circuit 2042 also operates as the rectifier circuit of the center-tap type in the forward operation, but operates as the inverter circuit of the push-pull type in the reverse operation, as described later.

The switching circuit 2043 includes a circuit that is disposed with being opposed to the winding 32C, and has two switching elements S31 and S32, and diodes D31 and D32 connected in parallel with the switching elements S31 and S32 respectively, and a circuit that is disposed with being opposed to the winding 32G, and has two switching elements S33 and S34, and diodes D33 and D34 connected in parallel with the switching elements S33 and S34 respectively, so that it is in a circuit configuration of a center-tap type. Specifically, one end of the switching element S31 and an anode of the diode D31 are connected to the connection point P13 respectively, and the other end of the switching element S31 and a cathode of the diode D31 are connected to the high-voltage line L2H respectively. One end of the switching element S32 and a cathode of the diode D32 are connected to the connection point P12 respectively, and the other end of the switching element S32 and an anode of the diode D32 are connected to the low-voltage line L2L respectively. One end of the switching element S33 and an anode of the diode D33 are connected to the connection point P19 respectively, and the other end of the switching element S33 and a cathode of the diode D33 are connected to the high-voltage line L2H respectively. One end of the switching element S34 and a cathode of the diode D34 are connected to the connection point P18 respectively, and the other end of the switching element S34 and an anode of the diode D34 are connected to the low-voltage line L2L respectively. According to such a configuration, the switching circuit 2043 also operates as the rectifier circuit of the center-tap type in the forward operation, but operates as the inverter circuit of the push-pull type in the reverse operation, as described later.

The switching circuit 2044 includes a circuit that is disposed with being opposed to the winding 32D, and has two switching elements S41 and S42, and diodes D41 and D42 connected in parallel with the switching elements S41 and S42 respectively, and a circuit that is disposed with being opposed to the winding 32H, and has two switching elements S43 and S44, and diodes D43 and D44 connected in parallel with the switching elements S43 and S44 respectively, so that it is in a circuit configuration of a center-tap type. Specifically, one end of the switching element S41 and an anode of the diode D41 are connected to one end of the winding 32D respectively, and the other end of the switching element S41 and a cathode of the diode D41 are connected to the high-voltage line L2H respectively. One end of the switching element S42 and a cathode of the diode D42 are connected to the connection point P14 respectively, and the other end of the switching element S42 and an anode of the diode D42 are connected to the low-voltage line L2L respectively. One end of the switching element S43 and an anode of the diode D43 are connected to one end of the winding 32H respectively, and the other end of the switching element S43 and a cathode of the diode D43 are connected to the high-voltage line L2H respectively. One end of the switching element S44 and a cathode of the diode D44 are connected to the connection point P20 respectively, and the other end of the switching element S44 and an anode of the diode D44 are connected to the low-voltage line L2L respectively. According to such a configuration, the switching circuit 2004 also operates as the rectifier circuit of the center-tap type in the forward operation, but operates as the inverter circuit of the push-pull type in the reverse operation, as described later.

The switching elements S11 to S14, S21 to S24, S31 to S34, and S41 to S44 also include the switch element such as MOS-FET or IGBT. When MOS-FET is used for the switch element, the diodes D11 to D14, D21 to D24, D31 to D34, and D41 to D44 can be configured by the parasitic diode of the MOS-FET respectively. Again in the case of such a configuration, the diodes D11 to D14, D21 to D24, D31 to D34, and D41 to D44 need not be provided separately from the switching elements, consequently a circuit configuration can be simplified. Moreover, when the diodes D11 to D14, D21 to D24, D31 to D34, and D41 to D44 are configured by the parasitic diode of the MOS-FET respectively, the MOS-FET itself is preferably in the on state in synchronization with the period while the parasitic diode of the MOS-FET is conductive. This is because rectification can be made with smaller voltage drop.

The connection changeover switches S51 and S61 are connected between the switching circuits 2141 and 2042, the connection changeover switches S52 and S62 are connected between the switching circuits 2142 and 2043, and the connection changeover switches S53 and S63 are connected between the switching circuits 2143 and 2044. Specifically, the connection changeover switch S51 is disposed between the connection point P9 and connection point P10, the connection changeover switch S52 is disposed between the connection point P11 and connection point P12, and the connection changeover switch S53 is disposed between the connection points P13 and P14. The connection changeover switch S61 is disposed between the connection point P15 and connection point P16, the connection changeover switch S62 is disposed between the connection point P17 and connection point P18, and the connection changeover switch S63 is disposed between the connection points P19 and P20. According to such a configuration, in the connection changeover switches S51 to S53 and S61 to S63, an on/off state is controlled by drive signals (drive signals SG51 to SG53 and SG61 to SG63) supplied from the control section 2007 so that connection between a plurality of current paths passing through the switching circuits 2041 to 2044 respectively is changed, which is described in detail later. The connection changeover switches S51 to S53 and S61 to S63 also include the switch element such as MOS-FET or IGBT.

The inductor Lch is disposed in an insertional manner on the high-voltage line L2H, specifically between the switching circuit 2044 and the input/output terminal T3. The smoothing capacitor CL is provided between the high-voltage line L2H and the low-voltage line L2L, and the input/output terminal T4 is provided at an end of the low-voltage line L2L. According to such a configuration, the inductor Lch operates as a chalk coil in the forward operation, and configures a smoothing circuit with the smoothing capacitor CL to smooth a DC voltage rectified by the switching circuits 2041 to 2044 to generate a low DC voltage VL, and supplies the low DC voltage to the low-voltage battery 52 from the input/output terminal T3 and T4.

The voltage detection circuit 2061 is disposed in an insertional manner between the connection point P1 on the high-voltage line L1H at the high-voltage side and the connection point P2 on the low-voltage line L1L, and connected to the control section 2007. According to such a configuration, the voltage detection circuit 2061 detects the high DC voltage VH and outputs a voltage corresponding to magnitude of the high DC voltage VH to the control section 2007. As a specific circuit configuration of the voltage detection circuit 2061, for example, a configuration is given, which detects the high DC voltage VH using a voltage-dividing resistance (not shown) disposed between the connection point P1 and the connection point P2, and generates a corresponding voltage.

The voltage detection circuit 2062 is disposed in an insertional manner between a connection point on a high-voltage line L2H at the low-voltage side (specifically, a connection point between the inductor Lch and the input/output terminal T3) and the control section 2007. According to such a configuration, the voltage detection circuit 2062 detects the low DC voltage VL and outputs a voltage corresponding to magnitude of the low DC voltage VL to the control section 2007. Similarly as in the case of the voltage detection circuit 2061, as a specific circuit configuration of the voltage detection circuit 2062, for example, a configuration is given, which detects the low DC voltage VL using a voltage-dividing resistance (not shown) disposed between the connection point on the high-voltage line L2H and ground, and generates a corresponding voltage.

Figures 42, 43:
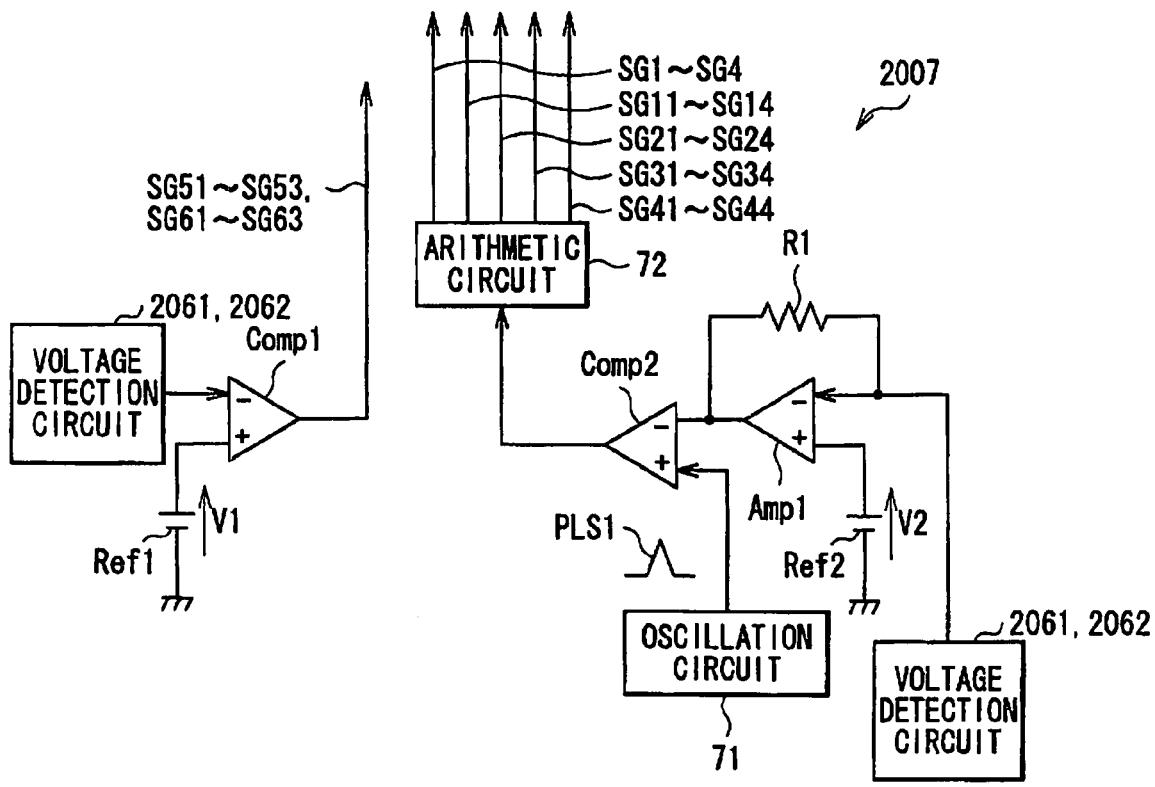
FIG. 42 is a circuit diagram showing a configuration of a control section in FIG. 41.
FIG. 43 is a view for explaining connection changeover operation by the control section of FIG. 42.

Here, the control section 2007 is described in detail with reference to FIGS. 42 and 43. FIG. 42 shows a circuit configuration of the control section 2007, and FIG. 43 shows detail of connection changeover control of a current path by the control section 2007.

As shown in FIG. 42, the control section 2007 has an oscillation circuit 71, an arithmetic circuit 72, comparators Comp1 and Comp2, a differential amplifier (error amplifier) Amp1, a reference power supply Ref1 for the comparator Comp1, a reference power supply Ref2 for the differential amplifier Amp1, and a resistor R1. A minus input terminal of the comparator Comp1 is connected to an output terminal of the voltage detection circuit 2061, a plus input terminal is connected to one end of the reference power supply Ref1, and an output terminal is connected to the connection changeover switches S51 to S53 and S61 to S63. A plus input terminal of the differential amplifier Amp1 is connected to one end of the reference power supply Ref2, a minus input terminal is connected to an output terminal of the voltage detection circuit 2062, and an output terminal is connected to a minus input terminal of the comparator Comp2. A plus input terminal of the comparator Comp2 is connected to an output terminal of the oscillator 71, and an output terminal is connected to an input terminal of the arithmetic circuit 72. Five output terminals of the arithmetic circuit 72 are connected to the switching circuits 2001 and switching circuits 2041 to 2044 respectively. The resistor R1 is disposed between the minus input terminal and output terminal of the differential amplifier Amp1, and the other end of the reference power supply Ref1 and the other end of the reference power supply Ref2 are grounded respectively.

The comparator Comp1 compares reference potential V1 from the reference power supply Ref 1 corresponding to potential of a threshold voltage $V_{th11}$ or threshold voltage $V_{th12}$, with potential of a voltage corresponding to the high DC voltage VH outputted from the voltage detection circuit 2061, and outputs drive signals SG51 to SG53 and SG61 to SG63 for the connection changeover switches S51 to S53 and S61 to S63 based on a result of the comparison respectively. Specifically, when the high DC voltage VH is higher than the threshold voltage $V_{th12}$, the drive signals SG51, SG53, SG61 and SG63 are in the "L" level. Conversely, when the high DC voltage VH is lower than the threshold voltage $V_{th12}$, the drive signals SG51, SG53, SG61 and SG63 are in the "H" level. When the high DC voltage VH is higher than the threshold voltage $V_{th11}$, the drive signals SG52 and SG62 are in the "L" level. Conversely, when the high DC voltage VH is lower than the threshold voltage $V_{th11}$, the drive signals SG52 and SG62 are in the "H" level.

The differential amplifier Amp1 amplifies potential difference between reference potential V2 from the reference power supply Ref2, and potential of a voltage corresponding to the low DC voltage VL outputted from the voltage detection circuit 2062, and outputs the amplified potential difference.

The comparator Comp2 compares potential of a pulse voltage PLS1 outputted from the oscillation circuit 71 with potential of an output voltage from the differential amplifier Amp1, and outputs a pulse voltage as an origin of drive signals SG11 to SG14, SG21 to SG24, SG31 to SG34 and SG41 to SG44 for the switching elements S11 to S14, S21 to S24, S31 to S34 and S41 to S44 based on a result of the comparison. Specifically, when the output voltage from the differential amplifier Amp1 is higher than the pulse voltage PLS1, output of the comparator is in the "L" level. Conversely, when the output voltage from the differential amplifier Amp1 is lower than the pulse voltage PLS1, the output for DC input of the comparator is in the "H" level.

The arithmetic circuit 72 performs logic operation to a signal of a pulse voltage outputted from the comparator Comp2, and outputs the drive signals SG11 to SG14, SG21 to SG24, SG31 to SG34, SG41 to SG44 for the switching elements S11 to S14, S21 to S24, S31 to S34, and S41 to S44. Furthermore, the arithmetic circuit 72 outputs the drive signals SG1 to SG4 for the switching elements S1 to S4.

According to such a configuration, the control section 2007 controls operation of the switching elements S1 to S4 in the switching circuit 2001, operation of the switching elements S11 to S14 in the switching circuit 2041, operation of the switching elements S21 to S24 in the switching circuit 2042, operation of switching elements S31 to S34 in the switching circuit 2043, and operation of switching elements S41 to S44 in the switching circuit 2044, respectively. Specifically, in the forward operation, the switching elements S1 to S4 are subjected to on/off control using the drive signals SG1 to SG4, so that the low DC voltage VL is stabilized (kept constant). More specifically, when the low DC voltage VL detected by the voltage detection circuit 2062 is increased, duty ratios of the drive signals SG1 to SG4 outputted from the control section 2007 are reduced, and when the detected low DC voltage VL is conversely decreased, the duty ratios of the drive signals SG1 to SG4 are increased. Consequently, the low DC voltage VL is kept constant. When the control section 2007 controls the switching elements S1 to S4 and the switching elements S11 to S14, S21 to S24, S31 to S34, and S41 to S44 such that the switching elements S1 to S4 and the switching elements S1 to S14, S21 to S24, S31 to S34, and S41 to S44 are in the on state in synchronization with conductive periods of the diodes D1 to D4 in the switching circuit 2001 and the diodes D11 to D14, D21 to D24, D31 to D34, and D41 to D44 in the switching circuits 2041 to 2044 (synchronous rectification), power loss in the diodes D1 to D4, D11 to D14, D21 to D24, D31 to D34, and D41 to D44 can be reduced.

Moreover, in the forward operation, the control section 2007 controls operation of the connection changeover switches S51 to S53 and S61 to S63 using the drive signals SG51 to SG53 and SG61 to SG63 according to magnitude of a voltage corresponding to the high DC voltage VH outputted from the voltage detection circuit 1061 (magnitude of the input voltage), so that a connection state between a current path (first current path) passing through the switching circuit 2041 and the winding 32A or the winding 32E, a current path (second current path) passing through the switching circuit 2042 and the winding 32B or the winding 32F, a current path (third current path) passing through the switching circuit 2043 and the winding 32C or the winding 32G, and a current path (fourth current path) passing through the switching circuit 2044 and the winding 32D or the winding 32H is changed. On the other hand, in the reverse operation, the control section 2007 changes the connection state in the same way as in the forward operation depending on magnitude of a predetermined target voltage value so that a value of the high DC voltage VH being an output voltage corresponds to the target voltage value.

FIG. 43 shows detail of the connection changeover control of the current paths by the control section 2007.

Specifically, as shown in FIG. 43, first, in the forward operation, when the high DC voltage VH detected by the input voltage detection circuit 2061 (the target voltage value of the high DC voltage VH in the reverse operation) is lower than the predetermined threshold voltage $V_{th11}$ (the predetermined threshold voltage $V_{th21}$ in the reverse operation), the control section 2007 controls the connection changeover switches S51 to S53 and S61 to S63 to be in the on state. Then, the first to fourth current paths are in a series connection state (4-series connection state) to one another. When the detected, high DC voltage VH (the target voltage value of the high DC voltage VH in the reverse operation) is equal to or higher than the predetermined threshold voltage $V_{th11}$ (the threshold voltage $V_{th21}$ in reverse operation) and lower than the predetermined threshold voltage $V_{th12}$ (the predetermined threshold voltage $V_{th22}$ in the reverse operation), the control section 2007 controls the connection changeover switches S52 and S62 to be in the off state respectively. Then, the first and second current paths, and the third and fourth current paths are in a series connection state respectively, and these series connection states are in a parallel connection state with each other. That is, the first to fourth current paths are in a mixed connection state of series and parallel with one another (2-series/2-parallel connection state). Furthermore, when the detected, high DC voltage VH (the target voltage value of the high DC voltage VH in the reverse operation) is equal to or higher than the threshold voltage $V_{th12}$ (the threshold voltage $V_{th22}$ in the reverse operation), the control section 2007 controls all the connection changeover switches S51 to S53 and S61 to S63 to be in the off state. Then, the first to fourth current paths are in a parallel connection state (4-parallel connection state) to one another. Here, when a turn ratio (np/ns) of the number of turns np of the winding 31 to the number of turns ns of the windings 32A to 32H of the transformer 2003 is compared between the 4-parallel connection state, 2-series/2-parallel connection state, and 4-series connection state, the turn ratio is four times larger in the 4-parallel connection state (turn ratio=4n) than in the 4-series connection state (turn ratio=n), and two times larger in the 2-series/2-parallel connection state (turn ratio=2n) than in the 4-series connection state. Detail of such connection changeover control by the control section 2007 is described later.

Here, the switching circuits 2041 and 2044 correspond to a specific example of the "plurality of circuits" in an embodiment of the invention. The winding 31 corresponds to a specific example of the "first winding" in an embodiment of the invention, and the windings 32A to 32H correspond to a specific example of the "plurality of second windings" in an embodiment of the invention. The control section 2007 corresponds to a specific example of the "first control section" and the "second control section" in an embodiment of the invention. The connection changeover switches S51 to S53 and S61 to S63 correspond to a specific example of the "plurality of connection changeover elements" in an embodiment of the invention. The connection changeover switches S51 to S53 and S61 to S63, voltage detection circuits 2061, 2062, and control section 2007 correspond to a specific example of the "connection changeover unit" in an embodiment of the invention. The input/output terminals T1 and T2 correspond to a specific example of the "first terminal pair" in an embodiment of the invention, and the input/output terminals T3 and T4 correspond to a specific example of the "second terminal pair" in an embodiment of the invention. The high DC voltage VH corresponds to a specific example of the "first DC voltage" in an embodiment of the invention, and the low DC voltage VL corresponds to a specific example of the "second DC voltage" in an embodiment of the invention.

Next, operation of the switching power supply unit configured as above is described. First, basic operation of the switching power supply unit is described separately in forward operation and reverse operation.

First, in the forward operation (step-down operation from the high DC voltage VH to the low DC voltage VL), the switching elements S1 to S4 in the switching circuit 2001 perform on/off operation according to the drive signals SG1 to SG4 from the control section 2007 respectively, so that the switching circuit operates as an inverter circuit. On the other hand, each of the switching elements S11 to S14, S21 to S24, S31 to S34, and S41 to S44 in the switching circuits 2041 to 2044 are in the off state according to each of the drive signals SG11 to SG14, SG21 to SG24, SG31 to SG34, and SG41 to SG44, so that the switching circuits operate as rectifier circuits. The inductor Lch operates as a chalk coil. In the case of the synchronous rectification, the switching elements S11 to S14, S21 to S24, S31 to S34, and S41 to S44 also perform on/off operation.

Accordingly, in the forward operation, the unit performs the following basic operation. First, the high-voltage battery 51 applies the high DC voltage VH between the input/output terminals T1 and T2, and then an input AC voltage is generated by the switching circuit 2001 operating as the inverter circuit.

Next, the input AC voltage is inputted into the winding 31 of the transformer 2003, the voltage is transformed (in this case, stepped-down), and output AC voltage is outputted from the windings 32A to 32H. Then, the output AC voltage is rectified by the diodes D11 to D14, D21 to D24, D31 to D34, and D41 to D44 in the switching circuits 2041 to 2044 operating as the rectifier circuits, and then smoothed by the inductor Lch operating as the chalk coil and the smoothing capacitor CL, and the smoothed voltage is outputted as the low DC voltage VL from the input/output terminals T3 and T4, and supplied to the low-voltage battery 52.

On the other hand, in reverse operation (step-up operation from the low DC voltage VL to the high DC voltage VH), all the switching elements S1 to S4 are in the off state according to the drive signals SG1 to SG4, so that the switching circuit operates as a rectifier circuit. On the other hand, the switching elements S11 to S14, S21 to S24, S31 to S34, and S41 to S44 in the switching circuits 2041 to 2044 perform on/off operation according to the drive signals SG11 to SG14, SG21 to SG24, SG31 to SG34, and SG41 to SG44 respectively, so that the switching circuits operate as inverter circuits. The inductor Lch operates as a step-up inductor. In the case of the synchronous rectification, the switching elements S1 to S4 also perform on/off operation.

Accordingly, in the reverse operation, the unit performs the following basic operation. First, the low-voltage battery 52 applies the low DC voltage VL between the input/output terminals T3 and T4, and then an input AC voltage is generated by the inductor Lch operating as the step-up inductor and the switching circuits 2041 to 2044 operating as the inverter circuits.

Next, when the input AC voltage is inputted into the windings 32A to 32H of the transformer 2003 respectively, the voltage is transformed (in this case, stepped-up), and output AC voltage is outputted from the winding 31. Then, the output AC voltage is rectified by the diodes D1 to D4 in the switching circuit 2001 operating as the rectifier circuit, then the rectified voltage is outputted as the high DC voltage VH from the input/output terminals T1 and T2, and supplied to the high-voltage battery 51.

In this way, the forward operation and reverse operation are performed in the switching power supply unit of the embodiment.

Next, connection changeover operation between current paths as a main feature of an embodiment of the invention is described in detail with reference to FIGS. 43 to 57.

Connection Changeover Operation in Forward Operation

First, connection changeover operation between current paths in the forward operation is described with reference to FIGS. 43 to 50.

Figure 44:
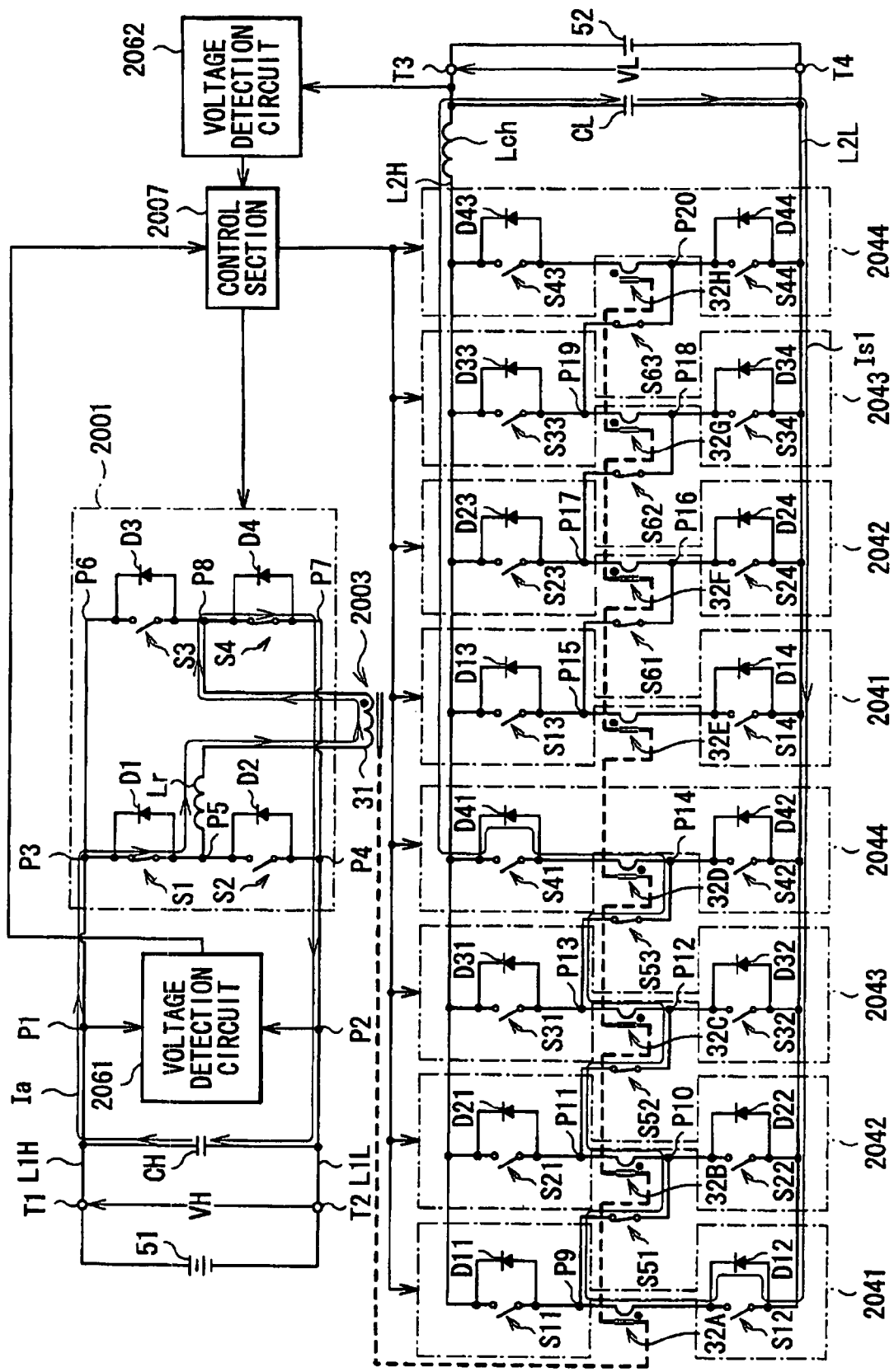
FIG. 44 is a circuit diagram for explaining operation in 4-series connection state in forward operation of the switching power supply unit of FIG. 41.
Figure 45:
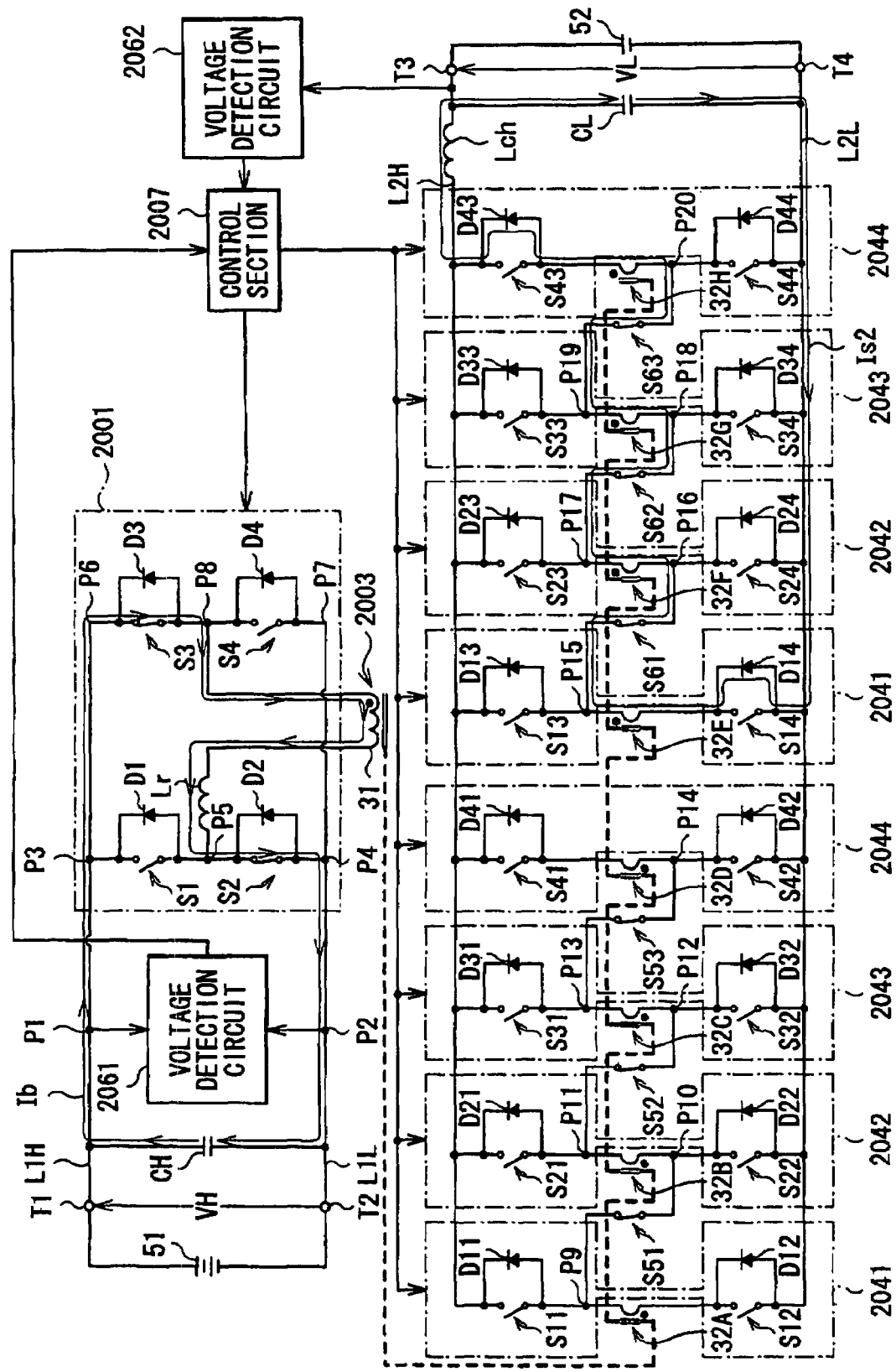
FIG. 45 is a circuit diagram for explaining operation in 4-series connection state in forward operation following FIG. 44.
Figure 46:
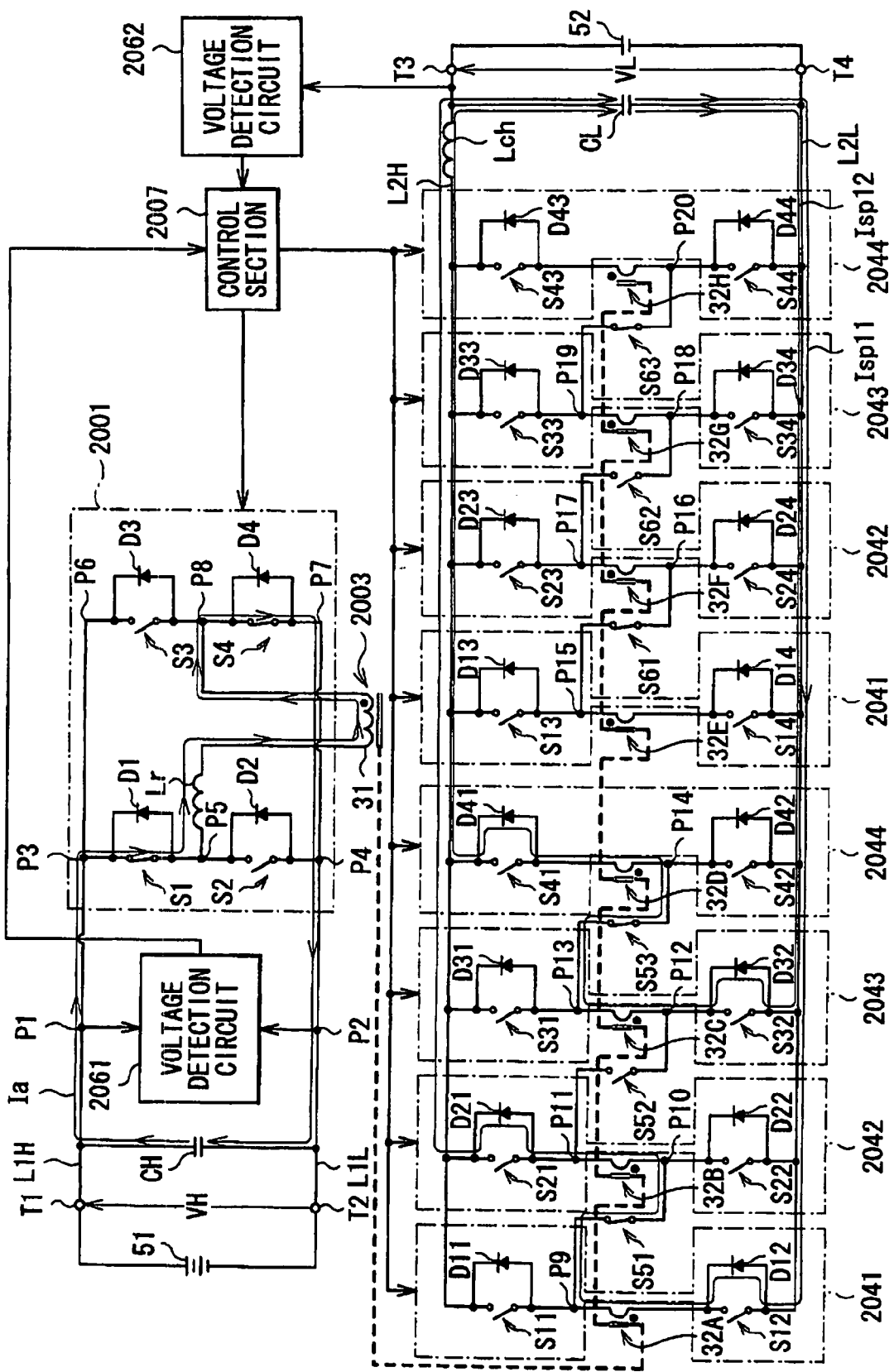
FIG. 46 is a circuit diagram for explaining operation in 2-series/2-parallel connection state in forward operation of the switching power supply unit of FIG. 41.
Figure 47:
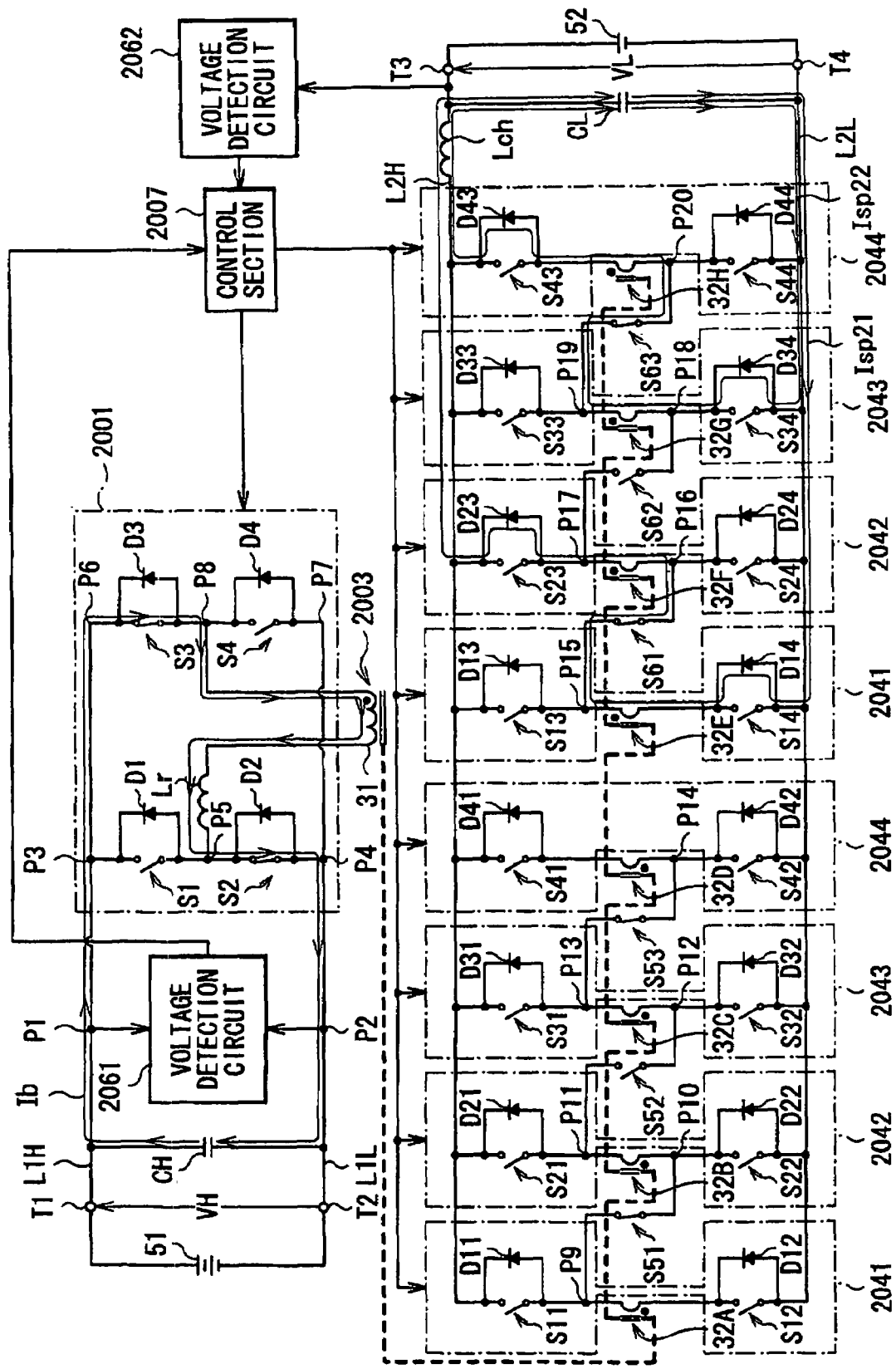
FIG. 47 is a circuit diagram for explaining operation in 2-series/2-parallel connection state in forward operation following FIG. 46.
Figure 48:
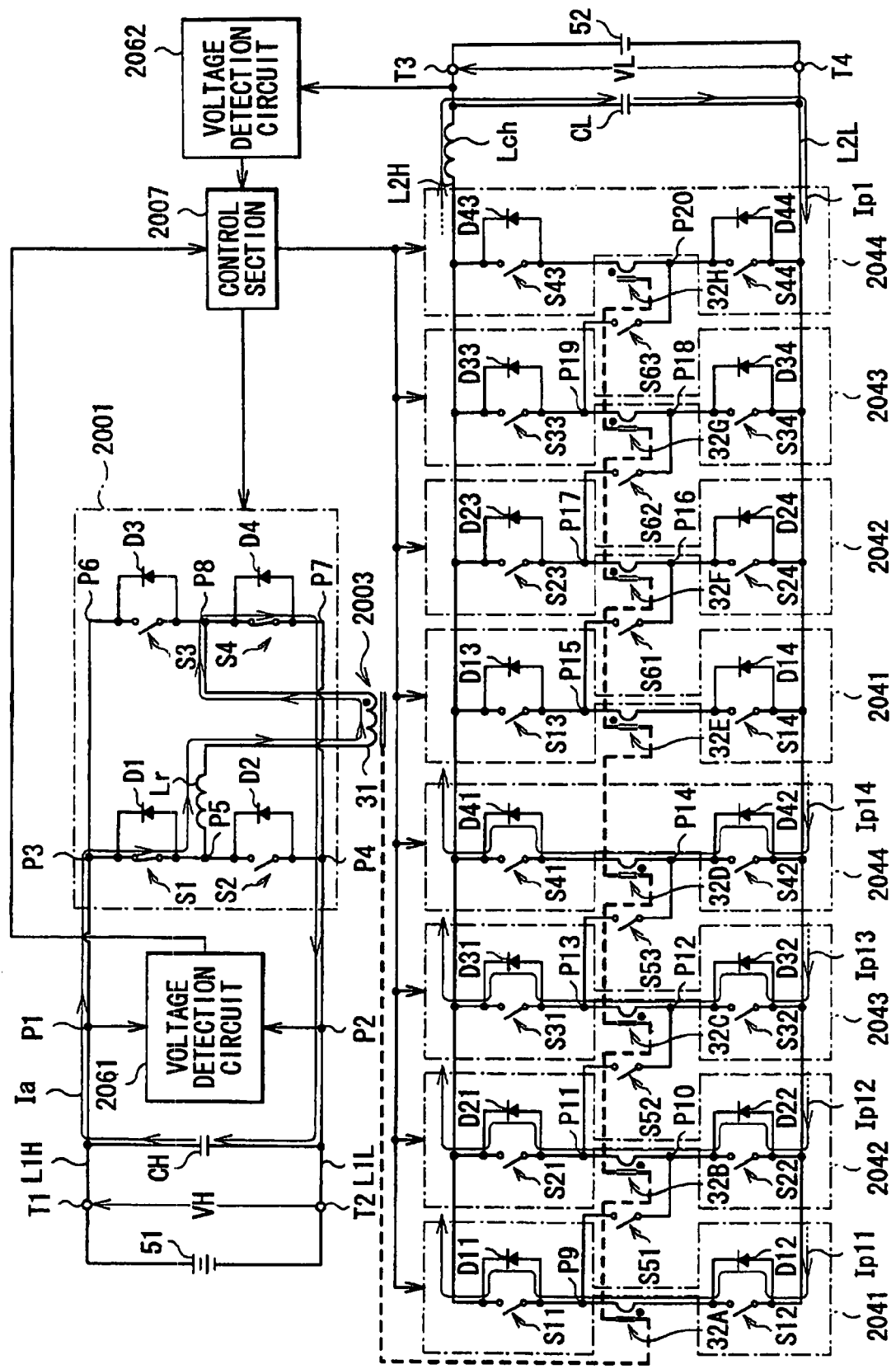
FIG. 48 is a circuit diagram for explaining operation in 4-parallel connection state in forward operation of the switching power supply unit of FIG. 41.
Figure 49:
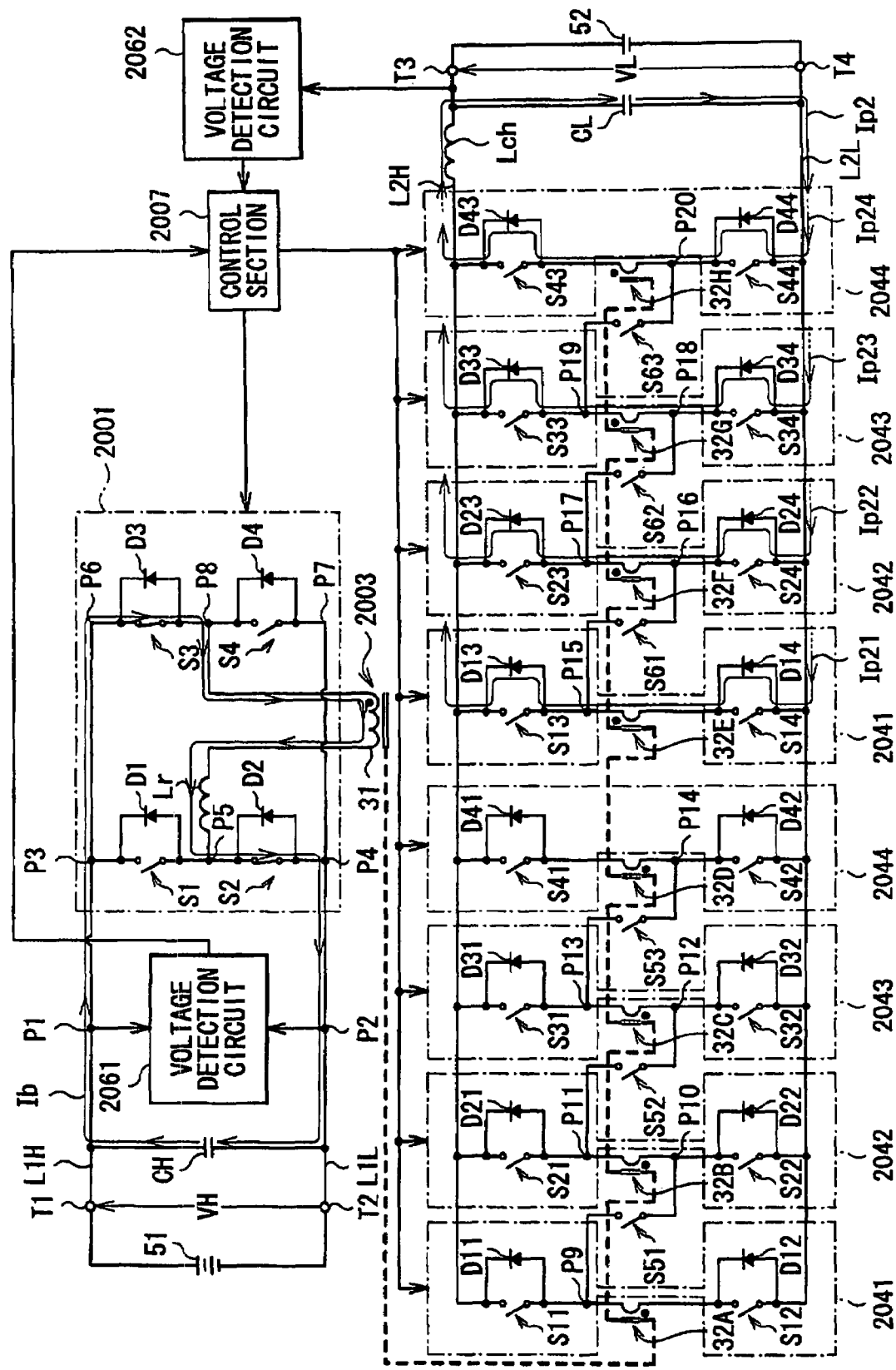
FIG. 49 is a circuit diagram for explaining operation in 4-parallel connection state in forward operation following FIG. 48.
Figure 50:
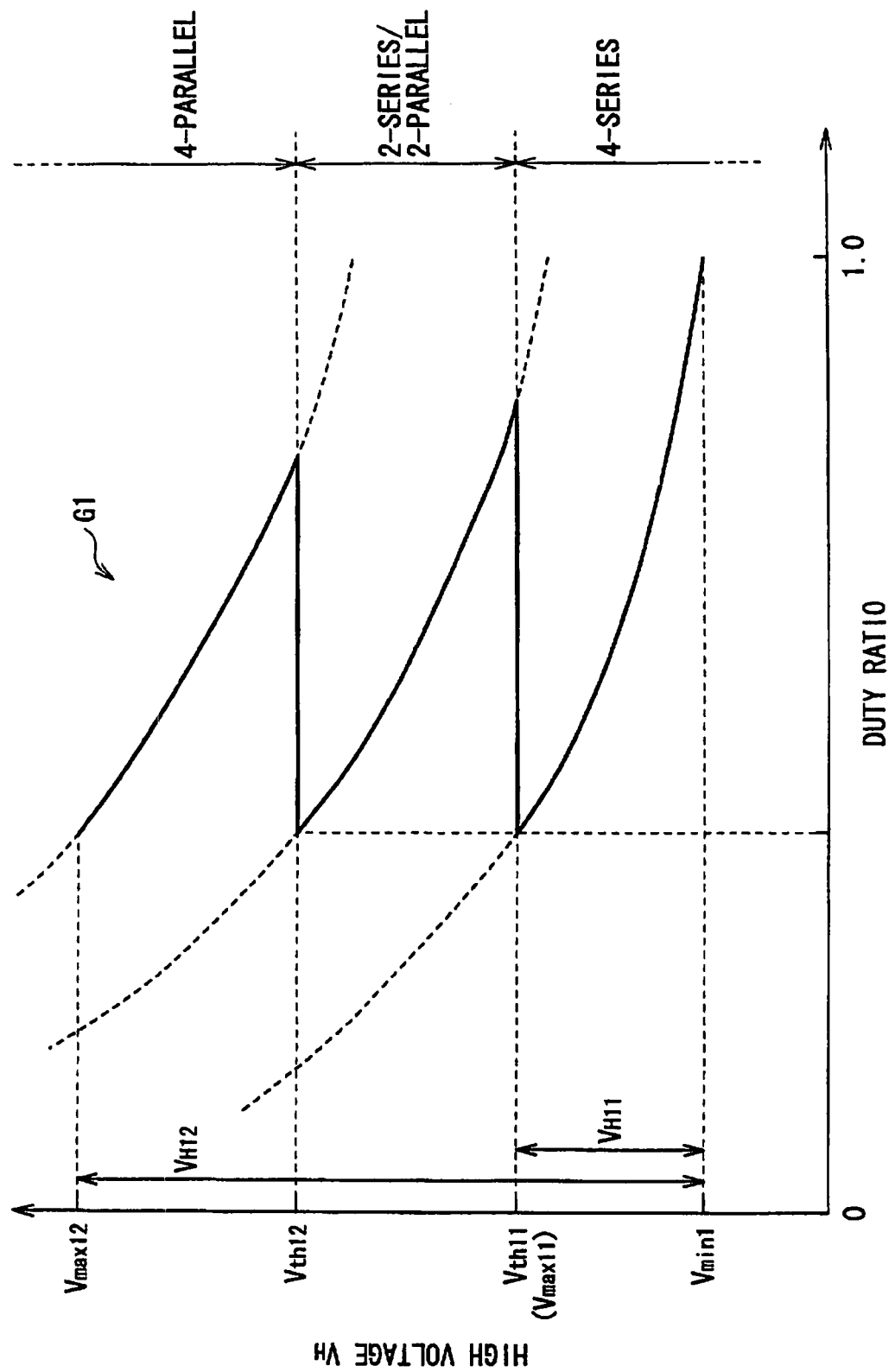
FIG. 50 is a characteristic view showing a relationship between an input voltage, a duty ratio, and a connection state in forward operation in the sixth embodiment.

FIGS. 44 to 49 show operation mode in the forward operation of the switching power supply unit of the embodiment respectively. Among them, FIG. 44 and FIG. 45 show a case that the first to fourth current paths are in the 4-series connection state with one another. FIG. 46 and FIG. 47 show a case that they are in the 2-series/2-parallel connection state with one another. FIG. 48 and FIG. 49 show a case that they are in the 4-parallel connection state with one another. FIG. 50 shows a relationship between the high DC voltage VH and duty ratios (on-duty ratios of the drive signals SG1 to SG4) in the forward operation in the 4-series connection state, 2-series/2-parallel connection state, and 4-parallel connection state.

First, the 4-series connection state as shown in FIG. 44 and FIG. 45 corresponds to a case that the high DC voltage VH detected by the voltage detection circuit 2061 is lower than the threshold voltage $V_{th11}$, for example, as shown in FIG. 50. In this case, the control section 2007 sets the connection changeover switches S51 to S53 and S61 to S63 to be in the on state respectively (see FIG. 43), so that the switching circuits 2041 to 2044 perform series operation coupled with each other.

Specifically, in an operation mode as shown in FIG. 44, a current path (corresponding to the first current path) passing through the switching circuit 2041 and winding 32A, a current path (corresponding to the second current path) passing through the switching circuit 2042 and winding 32B, a current path (corresponding to the third current path) passing through the switching circuit 2043 and winding 32C, and a current path (corresponding to the fourth current path) passing through the switching circuit 2044 and winding 32D are coupled with one another by a current path passing through the connection changeover switches S51 to S53, so that they are in the series connection state with one another. That is, a current path Is1 is formed, which passes the smoothing capacitor CL, diode D12, winding 32A, connection changeover switch S51, winding 32B, connection changeover switch S52, winding 32C, connection changeover switch S53, winding 32D, diode D41, and inductor Lch.

In an operation mode as shown in FIG. 45, a current path (corresponding to the first current path) passing through the switching circuit 2041 and winding 32E, a current path (corresponding to the second current path) passing through the switching circuit 2042 and winding 32F, a current path (corresponding to the third current path) passing through the switching circuit 2043 and winding 32G, and a current path (corresponding to the fourth current path) passing through the switching circuit 2044 and winding 32H are coupled with one another by a current path passing through the connection changeover switches S61 to S63, so that they are in the series connection state with one another. That is, a current path Is2 is formed, which passes the smoothing capacitor CL, diode D14, winding 32E, connection changeover switch S61, winding 32F, connection changeover switch S62, winding 32G, connection changeover switch S63, winding 32H, diode D43, and inductor Lch.

Here, four pairs of windings 32A and 32E, 32B and 32F, 32C and 32G, and 32D and 32H at the low-voltage side in the transformer 2003 are corresponding to the switching circuits 2041 to 2044 respectively, and have the number of turns equal to one another. Therefore, a turn ratio between the number of turns np of the winding 31 at the high voltage side and the number of turns ns of the windings 32A and 32E, 32B and 32F, 32C and 32G, and 32D and 32H at the low voltage side in the 4-series connection state can be simply expressed as (np/ns) (which is assumed as n) (see FIG. 43).

The 2-series/2-parallel connection state as shown in FIG. 46 and FIG. 47 corresponds to a case that the high DC voltage VH detected by the voltage detection circuit 2061 is equal to or higher than the threshold voltage $V_{th11}$ and lower than the threshold voltage $V_{th12}$, for example, as shown in FIG. 50. In this case, the control section 2007 sets the connection changeover switches S51, S61, S53, and S63 to be in the on state respectively, but sets the connection changeover switches S52 and S62 to be in the off state respectively (see FIG. 43), so that the switching circuits 2041, 20422 and the switching circuits 2043, 2044 perform parallel operation independently of each other.

Specifically, in an operation mode as shown in FIG. 46, the first current path and the second current path are coupled with each other by a current path passing through the connection changeover switch S51, so that they are in a series connection state with each other. Moreover, the third current path and the fourth current path are coupled with each other by a current path passing through the connection changeover switch S53, so that they are in a series connection state with each other. That is, a current path Isp11 passing through the smoothing capacitor CL, diode D12, winding 32A, connection changeover switch S51, winding 32B, diode D21, and inductor Lch, and a current path Isp12 passing through the smoothing capacitor CL, diode D32, winding 32C, connection changeover switch S53, winding 32D, diode D41, and inductor Lch are formed.

Moreover, in an operation mode as shown in FIG. 47, the first current path and the second current path are coupled with each other by a current path passing through the connection changeover switch S61, so that they are in a series connection state with each other. Moreover, the third current path and the fourth current path are coupled with each other by a current path passing through the connection changeover switch S63, so that they are in a series connection state with each other. That is, a current path Isp21 passing through the smoothing capacitor CL, diode D14, winding 32E, connection changeover switch S61, winding 32F, diode D23, and inductor Lch, and a current path Isp22 passing through the smoothing capacitor CL, diode D34, winding 32G, connection changeover switch S63, winding 32H, diode D43, and inductor Lch are formed.

Here, the windings 31A to 31H of the transformer 2003 correspond to the four switching circuits 2041 to 2044 respectively, and have the number of turns equal to one another, as described before. Therefore, a turn ratio between the number of turns np of the winding 31 at the high-voltage side and the number of turns ns of the windings 32A and 32E, 32B and 32F, 32C and 32G, and 32D and 32H at the low-voltage side in the 2-series/2-parallel connection state is $2*(np/ns)=2n$ (see FIG. 43). That is, the turn ratio in the 2-series/2-parallel connection state is twice as large as that in the case of the 4-series connection state (turn ratio=n).

The 4-parallel connection state as shown in FIG. 48 and FIG. 49 corresponds to a case that the high DC voltage VH detected by the voltage detection circuit 2061 is equal to or higher than the threshold voltage $V_{th12}$, for example, as shown in FIG. 50. In this case, the control section 2007 sets the connection changeover switches S51 to S53 and S61 to S63 to be in an off state respectively (see FIG. 43), so that the switching circuits 2041 to 2044 perform parallel operation independently of one another.

Specifically, in an operation mode as shown in FIG. 48, a current path Ip11 (corresponding to the first current path) passing through the smoothing capacitor CL, diode D12, winding 32A, diode D11, and inductor Lch, a current path Ip12 (corresponding to the second current path) passing through the smoothing capacitor CL, diode D22, winding 32B, diode D21, and inductor Lch, a current path Ip13 (corresponding to the third current path) passing through the smoothing capacitor CL, diode D32, winding 32C, diode D31, and inductor Lch, and a current path Ip14 (corresponding to the fourth current path) passing through the smoothing capacitor CL, diode D42, winding 32D, diode D41, and inductor Lch are formed, which are in a parallel condition with one another.

Moreover, in an operation mode as shown in FIG. 49, a current path Ip21 (corresponding to the first current path) passing through the smoothing capacitor CL, diode D14, winding 32E, diode D13, and inductor Lch, a current path Ip22 (corresponding to the second current path) passing through the smoothing capacitor CL, diode D24, winding 32F, diode D23, and inductor Lch, a current path Ip23 (corresponding to the third current path) passing through the smoothing capacitor CL, diode D34, winding 32G, diode D33, and inductor Lch, and a current path Ip14 (corresponding to the fourth current path) passing through the smoothing capacitor CL, diode D44, winding 32H, diode D43, and inductor Lch are formed, which are in a parallel condition with one another.

Here, the windings 31A to 31H of the transformer 2003 are corresponding to the four switching circuits 2041 to 2044 respectively, and have the number of turns equal to one another, as described before. Therefore, a turn ratio between the number of turns np of the winding 31 at the high-voltage side and the number of turns ns of the windings 32A and 32E, 32B and 32F, 32C and 32G, and 32D and 32H at the low-voltage side in the 4-parallel connection state is 4*(np/ns)=4n (see FIG. 43). That is, the turn ratio in the 4-parallel connection state is four times as large as that in the case of the 4-series connection state (turn ratio=n).

In this way, for example, as shown in a graph G1 of FIG. 50, when the high DC voltage VH being the input voltage is high in the 2-series/2-parallel connection state compared with the 4-series connection state, and high in the 4-parallel connection state compared with the 2-series/2-parallel connection state, the on-duty ratios of the drive signals SG1 to SG4 can be kept high, and a range of the input voltage (high DC voltage VH) in which a constant output voltage (low DC voltage VL) can be kept is increased through such connection changeover control (the range is widened from an input voltage range VH11 between a voltage $V_{min1}$ and a voltage $V_{max11}$ to an input voltage range VH12 between the voltage $V_{min1}$ and a voltage $V_{max12}$).

Connection Changeover Operation in Reverse Operation

Next, connection changeover operation between current paths in the reverse operation is described with reference to FIGS. 51 to 57.

Figure 51:
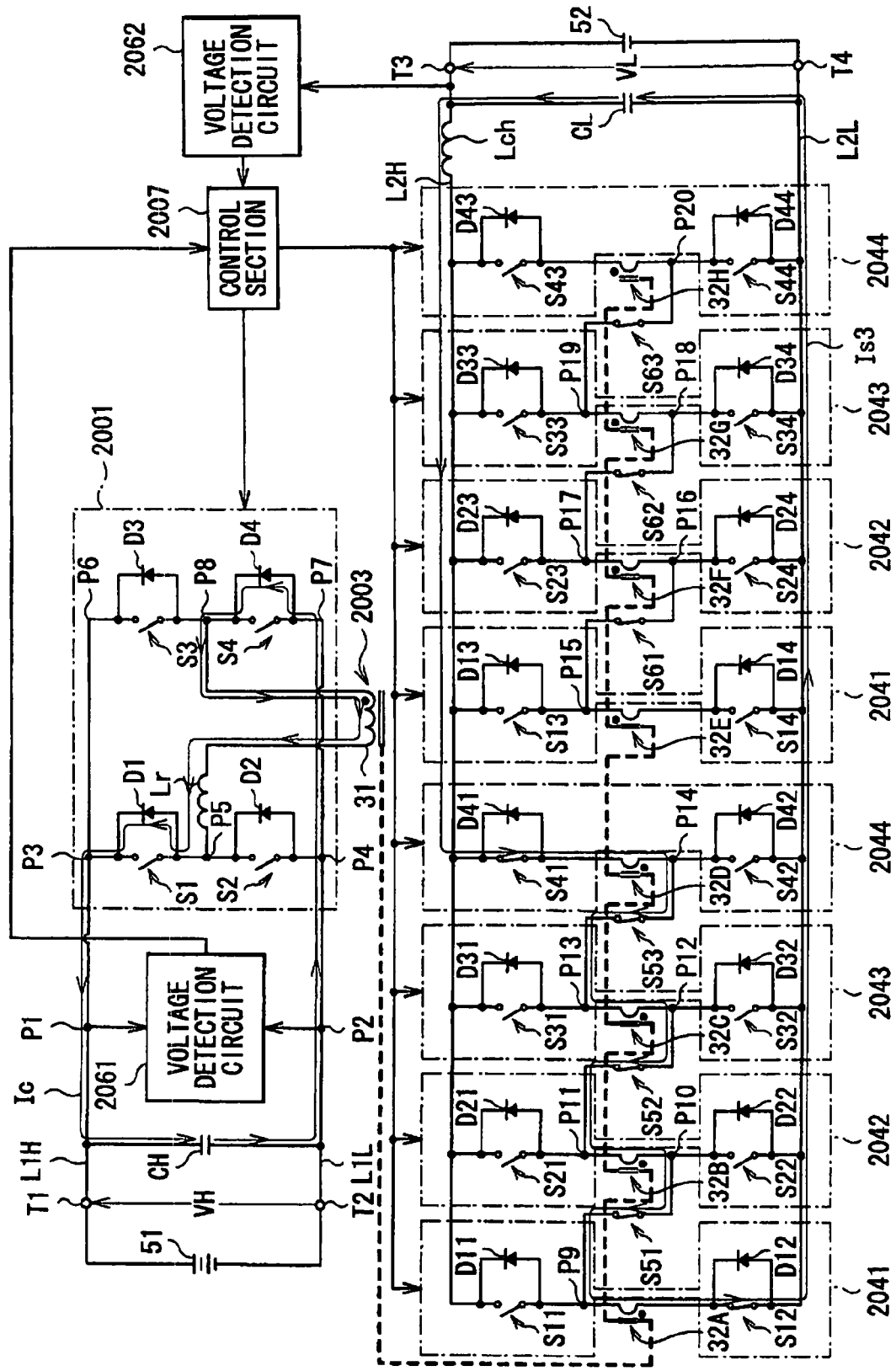
FIG. 51 is a circuit diagram for explaining operation in 4-series connection state in reverse operation of the switching power supply unit of FIG. 41.
Figure 52:
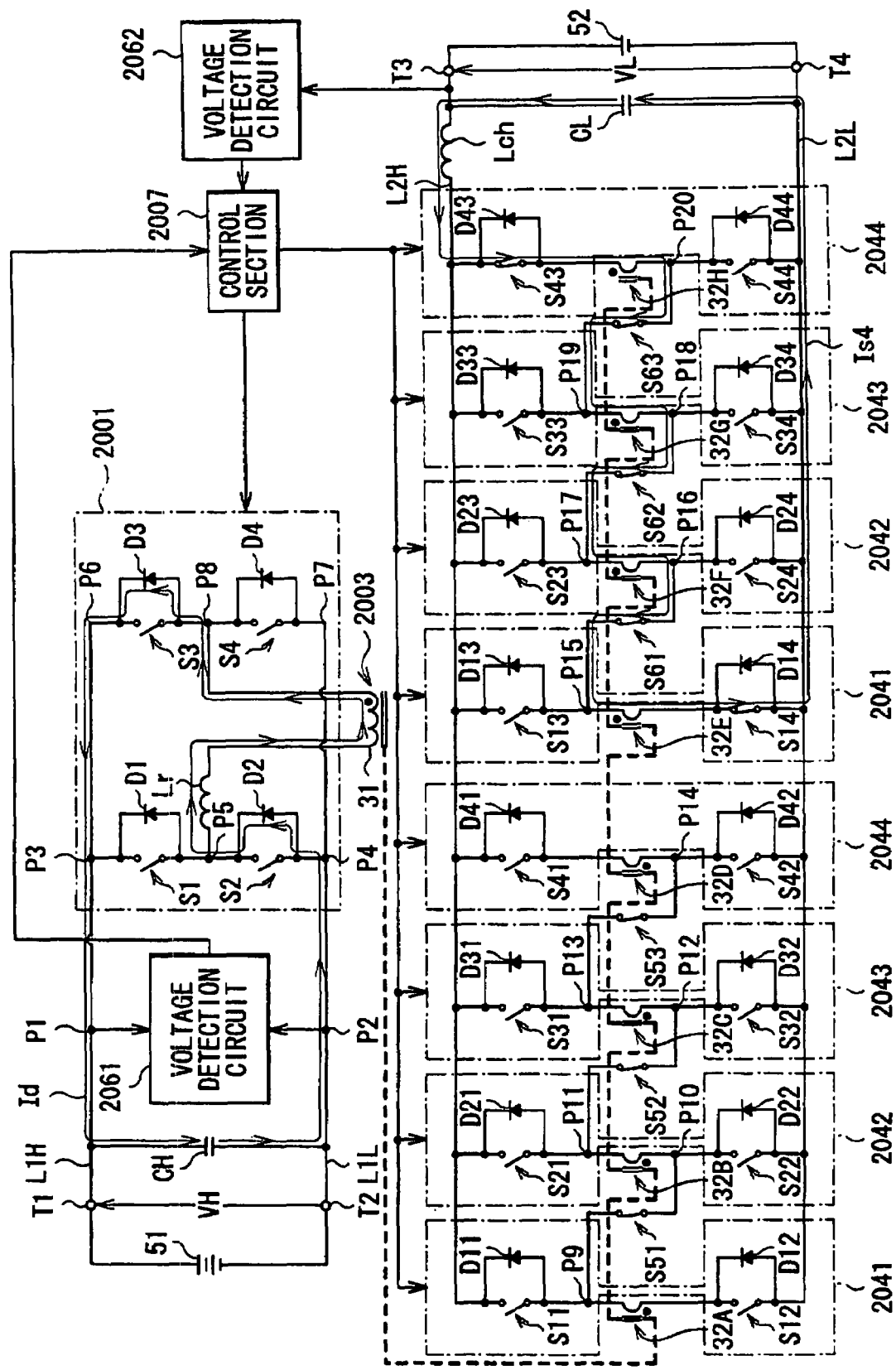
FIG. 52 is a circuit diagram for explaining operation in 4-series connection state in reverse operation following FIG. 51.
Figure 53:
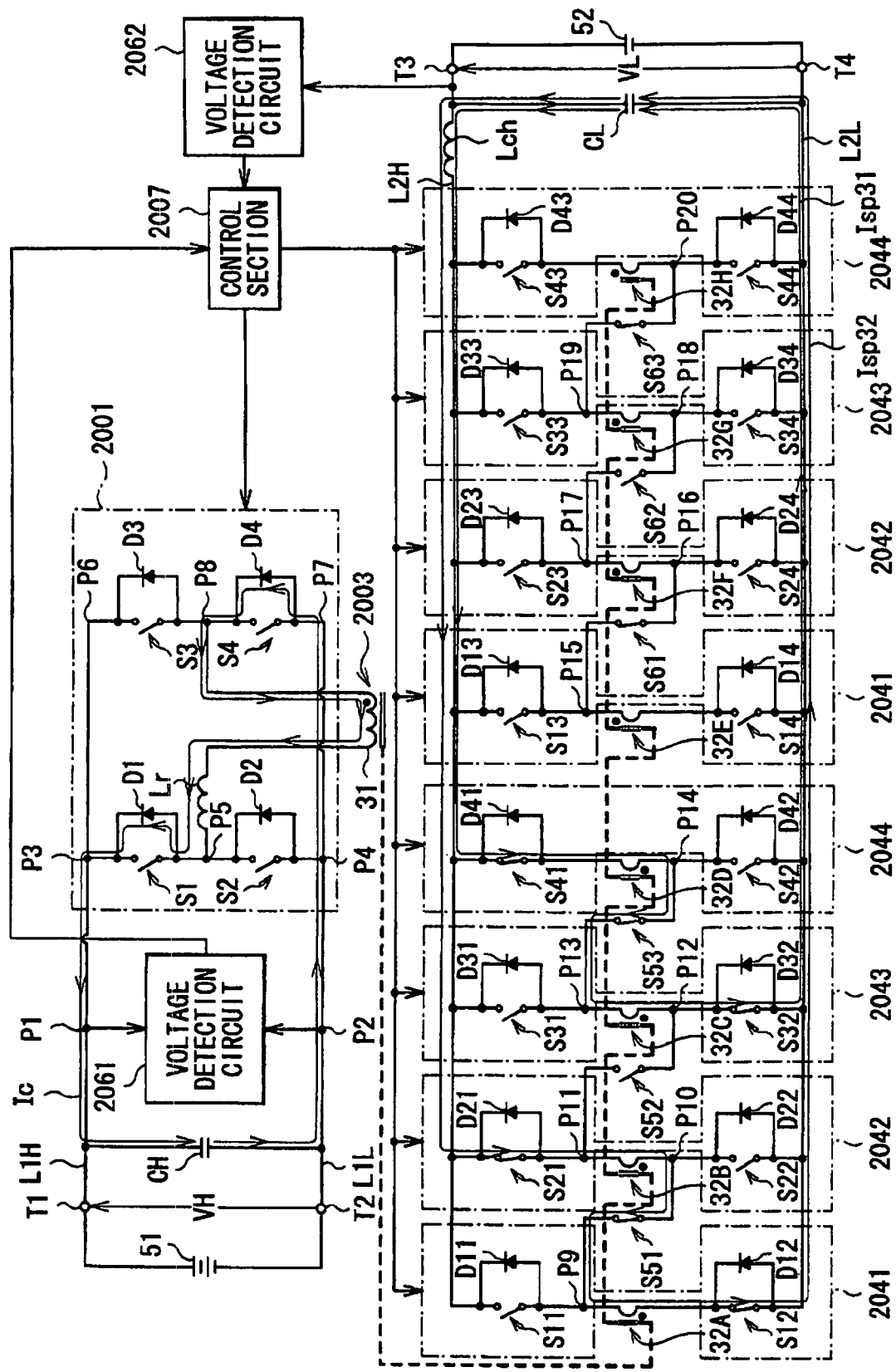
FIG. 53 is a circuit diagram for explaining operation in 2-series/2-parallel connection state in reverse operation of the switching power supply unit of FIG. 41.
Figure 54:
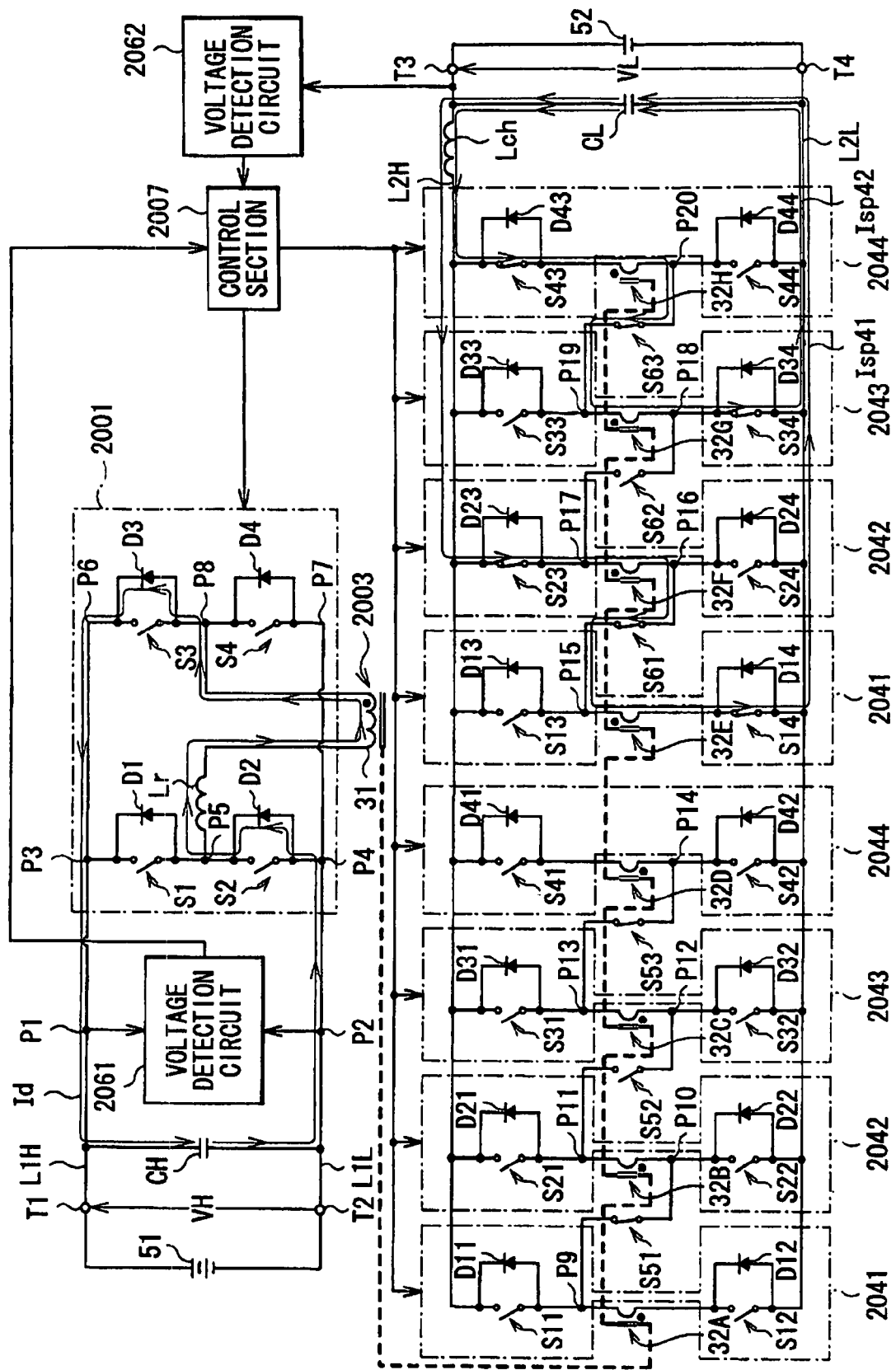
FIG. 54 is a circuit diagram for explaining operation in 2-series/2-parallel connection state in reverse operation following FIG. 53.
Figure 55:
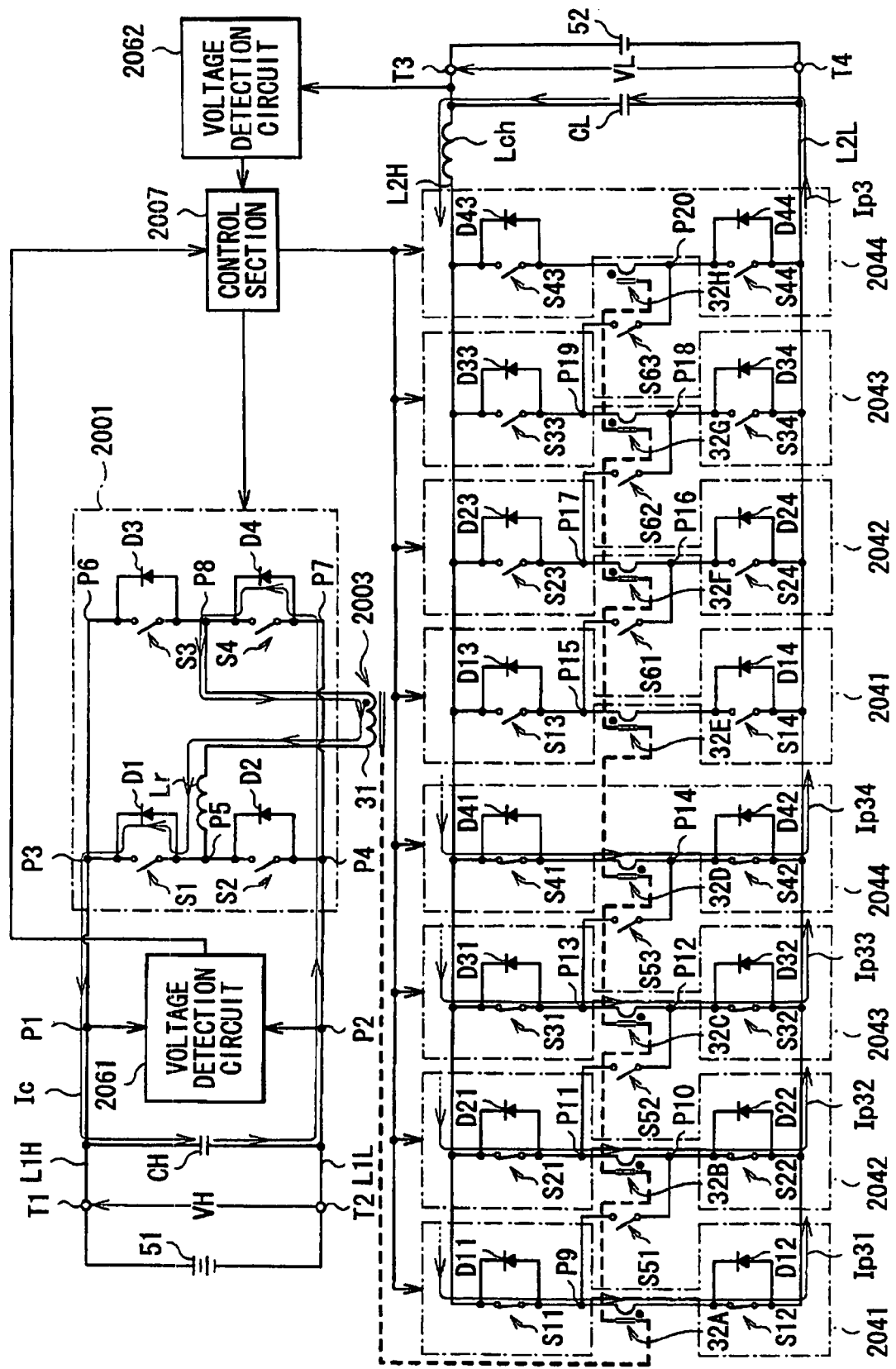
FIG. 55 is a circuit diagram for explaining operation in 4-parallel connection state in reverse operation of the switching power supply unit of FIG. 41.
Figure 56:
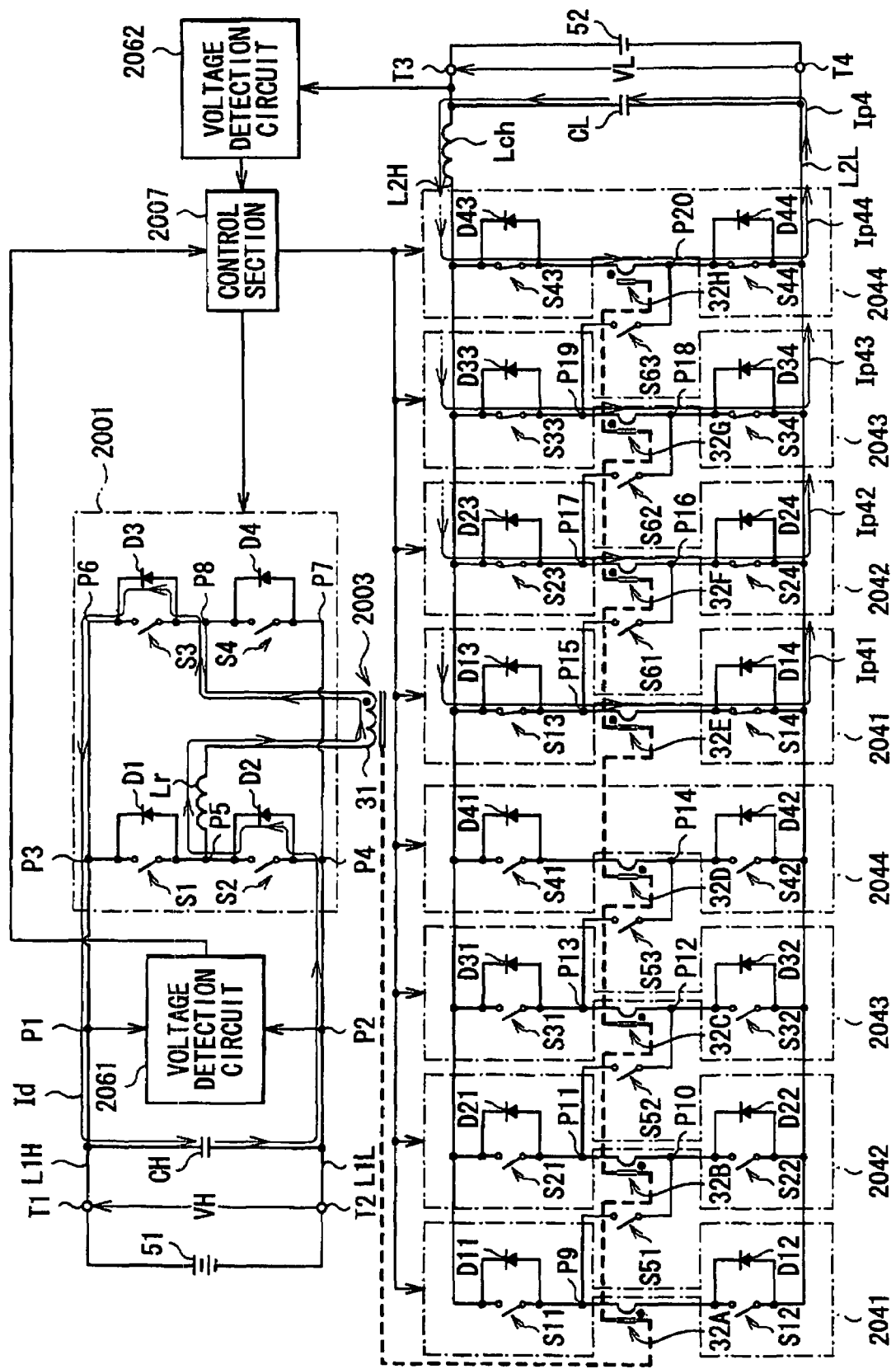
FIG. 56 is a circuit diagram for explaining operation in 4-parallel connection state in reverse operation following FIG. 55.
Figure 57:
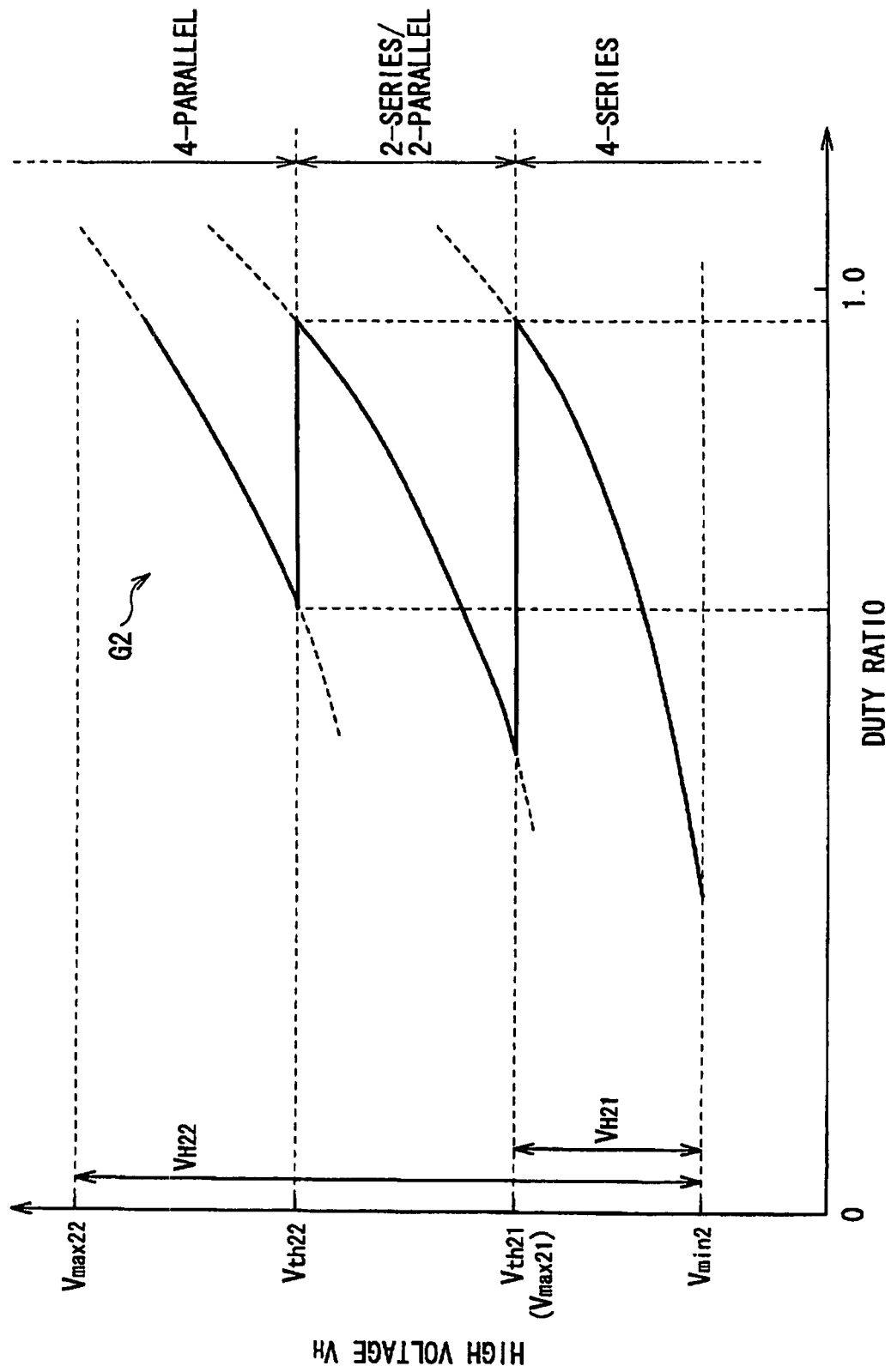
FIG. 57 is a characteristic view showing a relationship between an input voltage, a duty ratio, and a connection state in reverse operation in the sixth embodiment.

FIGS. 51 to 57 show operation mode in the reverse operation of the switching power supply unit of the embodiment respectively. Among them, FIG. 51 and FIG. 52 show a case that the first to fourth current paths are in the 4-series connection state with one another. FIG. 53 and FIG. 54 show a case that they are in the 2-series/2-parallel connection state with one another. FIG. 55 and FIG. 56 show a case that they are in the 4-parallel connection state with one another. FIG. 57 shows a relationship between the high DC voltage VH and duty ratios (on-duty ratios of the drive signals SG11 to SG14, SG21 to SG24, SG31 to SG34, and SG41 to SG44) in the reverse operation in the 4-series connection state, 2-series/2-parallel connection state, and 4-parallel connection state.

First, the 4-series connection state as shown in FIG. 51 and FIG. 52 corresponds to a case that a target voltage value of the high DC voltage VH is lower than the threshold voltage $V_{th21}$, for example, as shown in FIG. 57. In this case, the control section 2007 sets the connection changeover switches S51 to S53 and S61 to S63 to be in the on state respectively, so that the switching circuits 2041 to 2044 perform series operation coupled with one another.

Specifically, in an operation mode as shown in FIG. 51, a current path (corresponding to the first current path) passing through the switching circuit 2041 and winding 32A, a current path (corresponding to the second current path) passing through the switching circuit 2042 and winding 32B, a current path (corresponding to the third current path) passing through the switching circuit 2043 and winding 32C, and a current path (corresponding to the fourth current path) passing through the switching circuit 2044 and winding 32D are coupled with one another by a current path passing through the connection changeover switches S51 to S53, so that they are in the series connection state with one another. That is, a current path Is3 is formed, which passes the smoothing capacitor CL, inductor Lch, switching element S41, winding 32D, connection changeover switch S53, winding 32C, connection changeover switch S52, winding 32B, connection changeover switch S51, winding 32A, and switching element S12.

Moreover, in an operation mode as shown in FIG. 52, a current path (corresponding to the first current path) passing through the switching circuit 2041 and winding 32E, a current path (corresponding to the second current path) passing through the switching circuit 2042 and winding 32F, a current path (corresponding to the third current path) passing through the switching circuit 2043 and winding 32G, and a current path (corresponding to the fourth current path) passing through the switching circuit 2044 and winding 32H are coupled with one another by a current path passing through the connection changeover switches S61 to S63, so that they are in the series connection state with one another. That is, a current path Is3 is formed, which passes the smoothing capacitor CL, inductor Lch, switching element S43, winding 32H, connection changeover switch S63, winding 32G, connection changeover switch S62, winding 32F, connection changeover switch S61, winding 32E, and switching element S14.

Here, as in the forward operation, four pairs of windings 32A and 32E, 32B and 32F, 32C and 32G, and 32D and 32H are corresponding to the switching circuits 2041 to 2044 respectively, and have the number of turns equal to one another. Therefore, a turn ratio between the number of turns np of the winding 31 at the high voltage side and the number of turns ns of the windings 32A and 32E, 32B and 32F, 32C and 32G, and 32D and 32H at the low voltage side in the 4-series connection state can be simply expressed as (np/ns) (which is assumed as n) (see FIG. 43).

The 2-series/2-parallel connection state as shown in FIG. 53 and FIG. 54 corresponds to a case that the target voltage value of the high DC voltage VH is equal to or higher than the threshold voltage $V_{th21}$ and lower than the threshold voltage $V_{th22}$, for example, as shown in FIG. 57. In this case, the control section 2007 sets the connection changeover switches S51, S61, S53, and S63 to be in the on state respectively, but sets the connection changeover switches S52 and S62 to be in the off state respectively, so that the switching circuits 2041, 20422 and the switching circuits 2043, 2044 perform parallel operation independently of each other.

Specifically, in an operation mode as shown in FIG. 53, the first current path and the second current path are coupled with each other by a current path passing through the connection changeover switch S51, so that they are in a series connection state with each other. Moreover, the third current path and the fourth current path are coupled with each other by a current path passing through the connection changeover switch S53, so that they are in a series connection state with each other. That is, a current path Isp31 passing through the smoothing capacitor CL, inductor Lch, switching element S21, winding 32B, connection changeover switch S51, winding 32A, and switching element S12, and a current path Isp32 passing through the smoothing capacitor CL, switching element S41, winding 32D, connection changeover switch S53, winding 32C, and switching element S22 are formed.

Moreover, in an operation mode as shown in FIG. 54, the first current path and the second current path are coupled with each other by a current path passing through the connection changeover switch S61, so that they are in a series connection state with each other. Moreover, the third current path and the fourth current path are coupled with each other by a current path passing through the connection changeover switch S63, so that they are in a series connection state with each other. That is, a current path Isp41 passing through the smoothing capacitor CL, inductor Lch, switching element S23, winding 32F, connection changeover switch S61, winding 32E, and switching element S14, and a current path Isp42 passing through the smoothing capacitor CL, switching element S43, winding 32H, connection changeover switch S63, winding 32G, and switching element S34 are formed.

Here, the windings 32A to 32H of the transformer 2003 are corresponding to the four switching circuits 2041 to 2044 respectively, and have the number of turns equal to one another, as in the forward operation. Therefore, a turn ratio between the number of turns np of the winding 31 at the high-voltage side and the number of turns ns of the windings 32A to 32H at the low-voltage side in the 2-series/2-parallel connection state is 2*(np/ns)=2n. That is, the turn ratio in the 2-series/2-parallel connection state is twice as large as that in the case of the 4-series connection state (turn ratio=n).

The 4-parallel connection state as shown in FIG. 55 and FIG. 56 corresponds to a case that the target voltage value of the high DC voltage VH is equal to or higher than the threshold voltage $V_{th22}$, for example, as shown in FIG. 57. In this case, the control section 2007 sets the connection changeover switches S51 to S53 and S61 to S63 to be in an off state respectively, so that the switching circuits 2041 to 2044 perform parallel operation independently of one another.

Specifically, in an operation mode as shown in FIG. 55, a current path Ip31 (corresponding to the first current path) passing through the smoothing capacitor CL, inductor Lch, switching element S11, winding 32A, and switching element S12, a current path Ip32 (corresponding to the second current path) passing through the smoothing capacitor CL, inductor Lch switching element S21, winding 32B, and switching element S22, a current path Ip33 (corresponding to the third current path) passing through the smoothing capacitor CL, inductor Lch, switching element S31, winding 32C, and switching element S32, and a current path Ip34 (corresponding to the fourth current path) passing through the smoothing capacitor CL, inductor Lch, switching element S41, winding 32D, and switching element S42 are formed, which are in a parallel condition with one another.

Moreover, in an operation mode as shown in FIG. 56, a current path Ip41 (corresponding to the first current path) passing through the smoothing capacitor CL, inductor Lch, switching element S13, winding 32E, and switching element S14, a current path Ip42 (corresponding to the second current path) passing through the smoothing capacitor CL, switching element S23, winding 32F, and switching element S24, a current path Ip43 (corresponding to the third current path) passing through the smoothing capacitor CL, inductor Lch, switching element S33, and winding 32G, and a current path Ip44 (corresponding to the fourth current path) passing through the smoothing capacitor CL, inductor Lch, switching element S43, winding 32H, and switching element S44 are formed, which are in a parallel condition with one another.

Here, the windings 32A to 32H of the transformer 2003 are corresponding to the four switching circuits 2041 to 2044 respectively, and have the number of turns equal to one another, as in the forward operation. Therefore, a turn ratio between the number of turns np of the winding 31 at the high-voltage side and the number of turns ns of the windings 32A to 32H at the low-voltage side in the 4-parallel connection state is 4*(np/ns)=4n (see FIG. 43). That is, the turn ratio in the 4-parallel connection state is four times as large as that in the case of the 4-series connection state (turn ratio=n).

In this way, for example, as shown in a graph G2 of FIG. 57, similarly in the reverse operation, when the high DC voltage VH being the output voltage is set high in the 2-series/2-parallel connection state compared with the 4-parallel connection state, and high in the 4-series connection state compared with the 2-series/2-parallel connection state, the on-duty ratios of the drive signals SG1 to SG4 can be kept low, and a range of the output voltage (high DC voltage VH) that can be generated from a constant input voltage (Low DC voltage VL) is increased through such connection changeover control (the range is widened from an output voltage range VH21 between a voltage $V_{min2}$ and a voltage $V_{max21}$ to an output voltage range VH22 between the voltage $V_{min2}$ and a voltage $V_{max22}$).

As hereinbefore, in the embodiment, the transformer 2003 is provided, in which the four pairs of windings at the low voltage side 32A and 32E, 32B and 32F, 32C and 32G, and 32D and 32H are provided correspondingly to the four switching circuits 2041 to 2044, the windings having the same number of turns, and the four current paths are in the 4-parallel connection, 4-series connection, or mixed connection of series and parallel (2-series/2-parallel connection) depending on the input voltage (high DC voltage VH) in the forward operation, or the target voltage value of the output voltage (low DC voltage VL) in the reverse operation, using the voltage detection circuit 2061, control section 2007 and connection changeover switches S51 to S53 and S61 to S63. Therefore, the turn ratio between the winding 31 and the windings 32A to 32H can be increased in order of 4-series connection, 2-series/2-parallel connection, and 4-parallel connection. Consequently, a convertible voltage range (input voltage range in the forward operation, and an output voltage range in the reverse operation) can be widened compared with a usual case where connection can be changed only between the series connection and the parallel connection.

Seventh Embodiment

Next, a seventh embodiment of the invention is described. In a switching power supply unit of the embodiment, a control section 2007A is provided in place of the control section 2007 in the switching power supply unit of the sixth embodiment.

Figure 58:
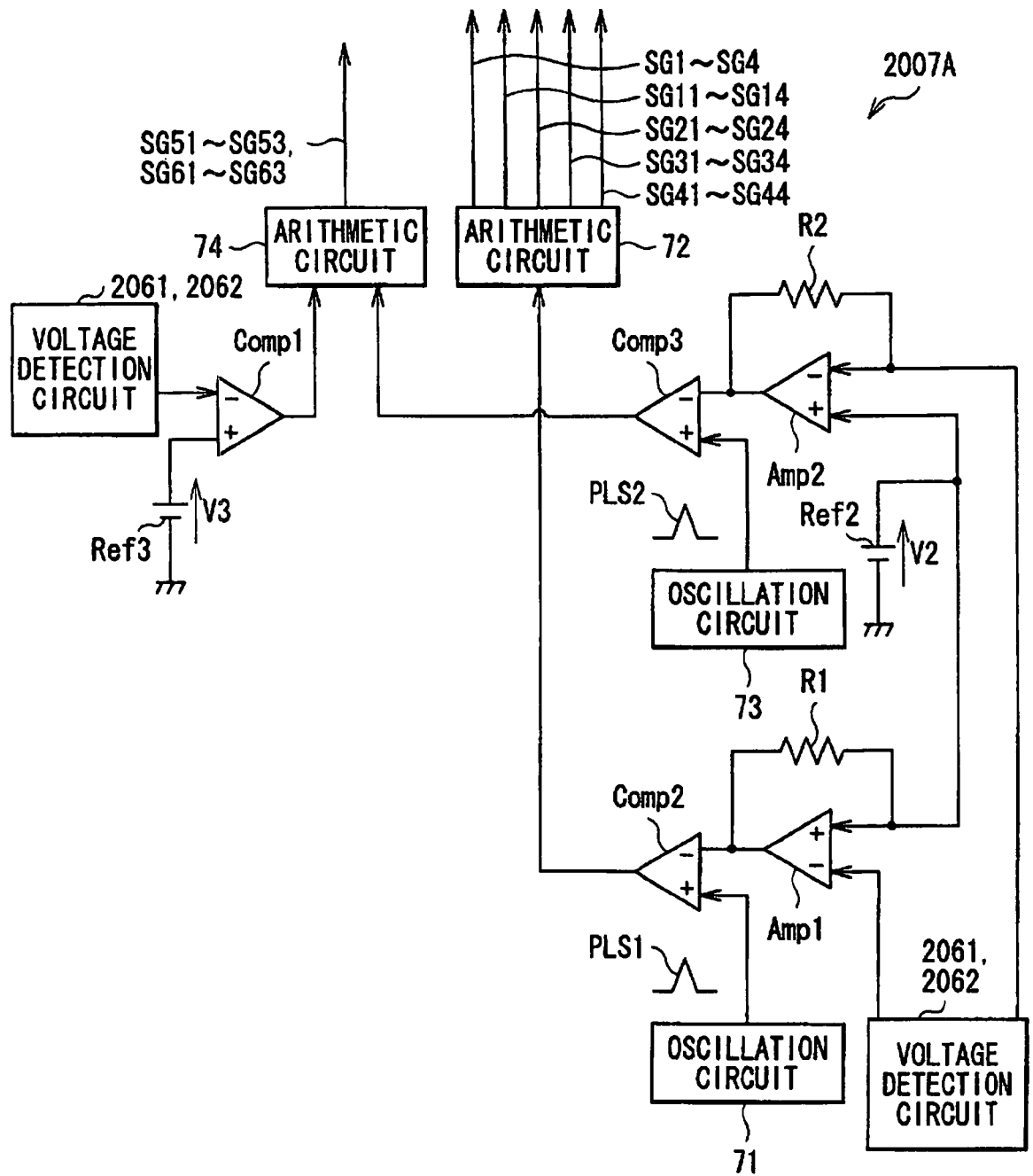
FIG. 58 is a circuit diagram showing a configuration of a control section of a switching power supply unit according to a seventh embodiment of the invention.

FIG. 58 shows a configuration of the control unit 2007A according to the embodiment. In the figure, the same components as components shown in FIG. 42 are marked with the same references, and appropriately omitted to be described. In the control section 2007A, a reference power supply Ref3, an oscillation circuit 73, a differential amplifier Amp2, a resistor R3, a comparator Comp3, and an arithmetic circuit 74 are additionally provided in the control section 2007 of the sixth embodiment.

A plus input terminal of the comparator Comp1 is connected to one end of the reference power supply Ref3 instead of the reference power supply Ref1. A plus input terminal of differential amplifier Amp2 is connected to one end of the reference power supply Ref2, a minus input terminal is connected to an output terminal of the voltage detection circuit 2062, and an output terminal is connected to a minus input terminal of the comparator Comp2. However, a voltage to be supplied to the minus input terminal of the differential amplifier Amp2 is set slightly high compared with a voltage to be supplied to the minus input terminal of the differential amplifier Amp1, for example, due to difference in voltage-drawing position from the voltage-dividing resistance in the voltage detection circuit 2062. A plus input terminal of the comparator Comp3 is connected to an output terminal of the oscillator 73, and an output terminal is connected to an input terminal of the arithmetic circuit 74. Two input terminals of the arithmetic circuit 74 are connected to the output terminal of the comparator Comp3 and the output terminal of the comparator Comp1 respectively. The resistor R2 is disposed between the minus input terminal and the output terminal of the differential amplifier Amp2.

The comparator Comp1 of the embodiment compares reference potential V3 from the reference power supply Ref3 corresponding to potential of a voltage $V_{thH}$ or voltage $V_{thL}$ described later, with potential of a voltage corresponding to the high DC voltage VH outputted from the voltage detection circuit 1061, and outputs a result of the comparison to the arithmetic circuit 74. Specifically, when the high DC voltage VH is higher than the voltage $V_{thH}$, the drive signals SG51 to SG53 and SG61 to SG63 are in the "L" level. Conversely, when the high DC voltage VH is lower than the voltage $V_{thL}$, the drive signals SG51 to SG53 and SG61 to SG63 are in the "H" level.

The differential amplifier Amp2 amplifies potential difference between the reference potential V2 from the reference power supply Ref2, and potential of a voltage corresponding to the low DC voltage VL outputted from the voltage detection circuit 2062, and outputs the amplified potential difference.

The comparator Comp3 compares potential of a pulse voltage PLS2 outputted from the oscillation circuit 73 with potential of an output voltage from the differential amplifier Amp2, and outputs a pulse voltage as an origin of the drive signals SG51 to SG53 and SG61 to SG63 for the connection changeover switches S51 to S53 and S61 to S63 based on a result of the comparison. Specifically, when the output voltage from the differential amplifier Amp2 is higher than the pulse voltage PLS2, output of the comparator is in the "L" level. Conversely, when the output voltage from the differential amplifier Amp2 is lower than the pulse voltage PLS2, the output for DC input of the comparator is in the "H" level.

The arithmetic circuit 74 performs logic operation based on an output signal ("H" or "L") from the comparator Comp1 and an output signal (pulse voltage signal) from the comparator Comp3, and outputs the drive signals SG51 to SG53 and SG61 to SG63 for the connection changeover switches S51 to S53 and S61 to S63.

Here, connection changeover operation by the control section 2007A in the forward operation is described in detail with reference to FIG. 59. FIG. 59 shows operation states of the switching elements S1 to S4, and operation states of the connection changeover switches S51 to S53 and S61 to S63, connection states of the first to fourth current paths, and the turn ratio (np/ns) between the winding 31 and the windings 32A to 32H of the transformer 2003 respectively.

First, when the high DC voltage VH is higher than a voltage $V_{thH}$ (VH≧$V_{thH}$), as in the first embodiment, the arithmetic circuit 72 outputs drive signals SG1 to SG4 such that the switching elements S1 to S4 perform PWM (Pulse Width Modulation) operation in which a duty ratio is varied depending on magnitude of the high DC voltage VH, respectively. Moreover, the arithmetic circuit 74 outputs drive signals SG51 to SG53 and SG61 to SG63 such that all the connection changeover switches S51 to S53 and S61 to S63 are in the off state, and the first to fourth current paths are in the 4-parallel connection state with one another, respectively. In this case, since the current paths are in the 4-parallel connection state, the turn ratio is 4n.

As in the first embodiment, when the high DC voltage VH is lower than the voltage $V_{thL}$ ($V_{thL}$>VH), the arithmetic circuit 72 outputs drive signals SG1 to SG4 such that the switching elements S1 to S4 perform PWM operation in which a duty ratio is varied depending on magnitude of the high DC voltage VH, respectively. Moreover, the arithmetic circuit 74 outputs drive signals SG51 to SG53 and SG61 to SG63 such that all the connection changeover switches S51 to S53 and S61 to S63 are in the on state, and the first to fourth current paths are in the 4-series connection state with one another, respectively. In this case, since the current paths are in the 4-series connection state, the turn ratio is n.

On the other hand, when the high DC voltage VH is between the voltage $V_{thH}$ and a voltage $V_{thM}$ ($V_{thH}$>VH≧$V_{thM}$), the arithmetic circuit 72 outputs drive signals SG1 to SG4 such that the switching elements S1 to S4 perform PWM operation in which a duty ratio is constant independently of magnitude of the high DC voltage VH, respectively. Moreover, the arithmetic circuit 74 outputs drive signals SG52 and SG62 such that the connection changeover switches S52 and S62 are in the off state respectively, but outputs drive signals SG51, SG53, SG61 and SG63 such that the connection changeover switches S51, S53, S61 and S63 perform PWM operation in which a duty ratio is varied depending on magnitude of the high DC voltage VH, respectively. Therefore, when the high DC voltage VH is in this voltage range, a connection state of the first to fourth current paths is temporally changed between 4-series and 2-series/2-parallel depending on whether the connection changeover switches S51, S53, S61 and S63 are in the on state or off state, and thus the turn ratio is continuously changed between 4n and 2n.

When the high DC voltage VH is between the voltage $V_{thM}$ and the voltage $V_{thL}$ ($V_{thM}$>VH≧$V_{thL}$), the arithmetic circuit 72 outputs drive signals SG1 to SG4 such that the switching elements S1 to S4 perform PWM operation in which a duty ratio is constant independently of magnitude of the high DC voltage VH, respectively. Moreover, the arithmetic circuit 74 outputs drive signals SG51, SG53, SG61 and SG63 such that the connection changeover switches S51, S53, S61 and S63 are in the on state respectively. On the other hand, the arithmetic circuit outputs drive signals SG52 and SG62 such that the connection changeover switches S52 and S62 perform PWM operation in which a duty ratio is varied depending on magnitude of the high DC voltage VH, respectively. Therefore, when the high DC voltage VH is in this voltage range, a connection state between the first to fourth current paths is temporally changed between 2-series/2-parallel and 4-parallel depending on whether the connection changeover switches S52 and S62 are in the on state or off state, and thus the turn ratio is continuously changed between 2n and n.

According to such a configuration, as the control section 2007, the control section 2007A generates drive signals SG1 to SG4 based on a voltage depending on the low DC voltage VL outputted from the voltage detection circuit 2062, and performs on/off control of the switching elements S1 to S4 using the drive signals, thereby the low DC voltage VL is stabilized (kept constant).

Moreover, the control section 2007A generates drive signals SG51 to SG53 and SG61 to SG63 based on magnitude of the voltage depending on the high DC voltage VH outputted from the voltage detection circuit 2061, and magnitude of the voltage depending on the low DC voltage VL outputted from the voltage detection circuit 2062, and controls operation of the connection changeover switches S51 to S53 and S61 to S63 using the drive signals. Thereby, the control section changes a connection state between a current path (first current path) passing through the switching circuit 2041 and the winding 32A or the winding 32E, current path (second current path) passing through the switching circuit 2042 and the winding 32B or the winding 32F, current path (third current path) passing through the switching circuit 2043 and the winding 32C or the winding 32G, and current path (fourth current path) passing through the switching circuit 2044 and the winding 32D or the winding 32H. Specifically, a relative period in the 4-series connection state in which the first to fourth current paths are in 4-series connection with one another, a relative period in the 2-series/2-parallel connection state in which they are in 2-series/2-parallel connection with one another, and a relative period in the 4-parallel connection state in which they are in 4-parallel connection with one another are changed respectively, thereby the turn ratio (np/ns) between the number of turns np of the winding 31 and the number of turns ns of the windings 32A to 32H of the transformer 2003 is continuously changed.

Next, description is made on connection changeover control when the high DC voltage VH being the input voltage is changed in the forward operation with reference to FIGS. 60A to 66H, while being compared between the switching power supply unit of the embodiment (having the control section 2007A shown in FIG. 58), and the switching power supply unit of the sixth embodiment (comparative example, having the control section 2007 shown in FIG. 42).

Figure 64:
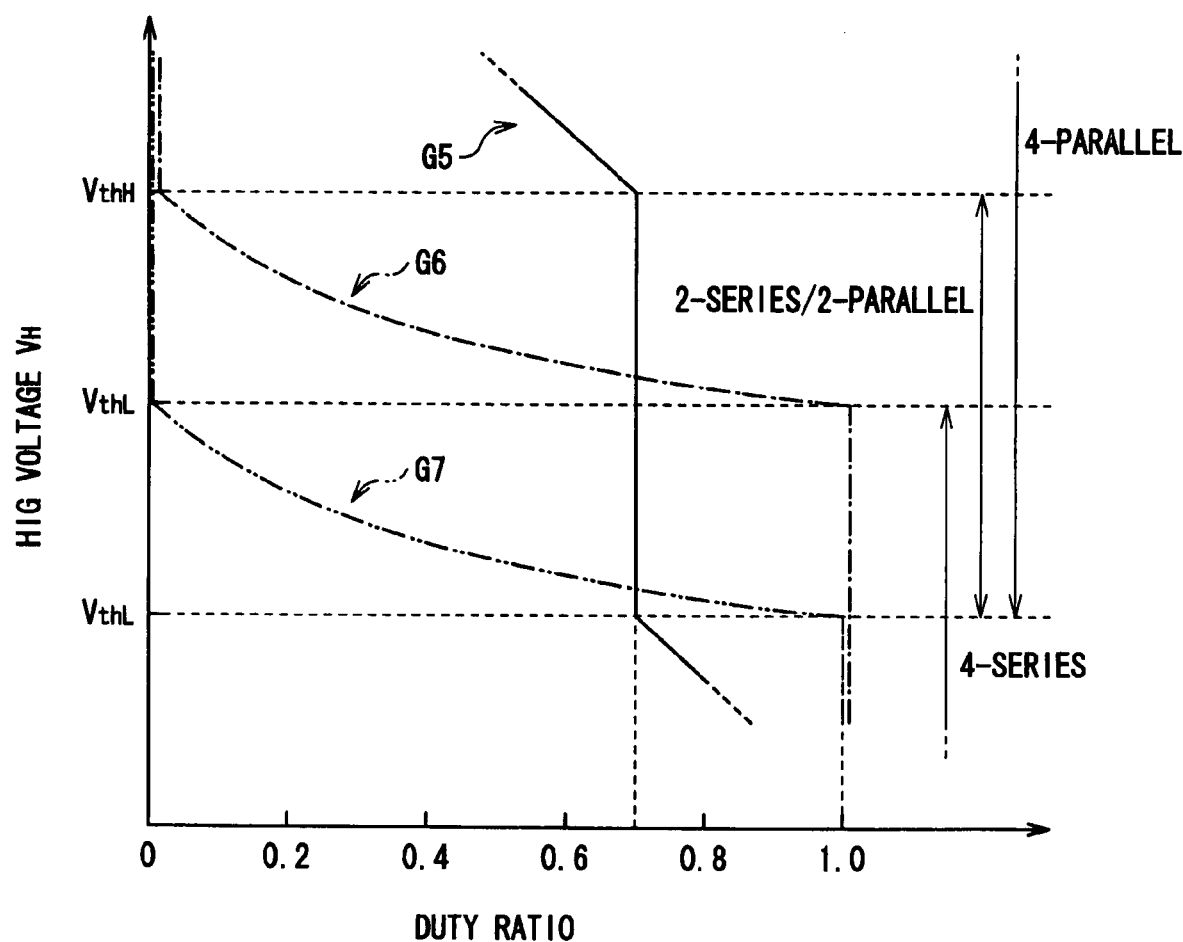
FIG. 64 is a characteristic view showing a relationship between an input voltage, a duty ratio, and a connection state in forward operation in the seventh embodiment.
Figure 65:
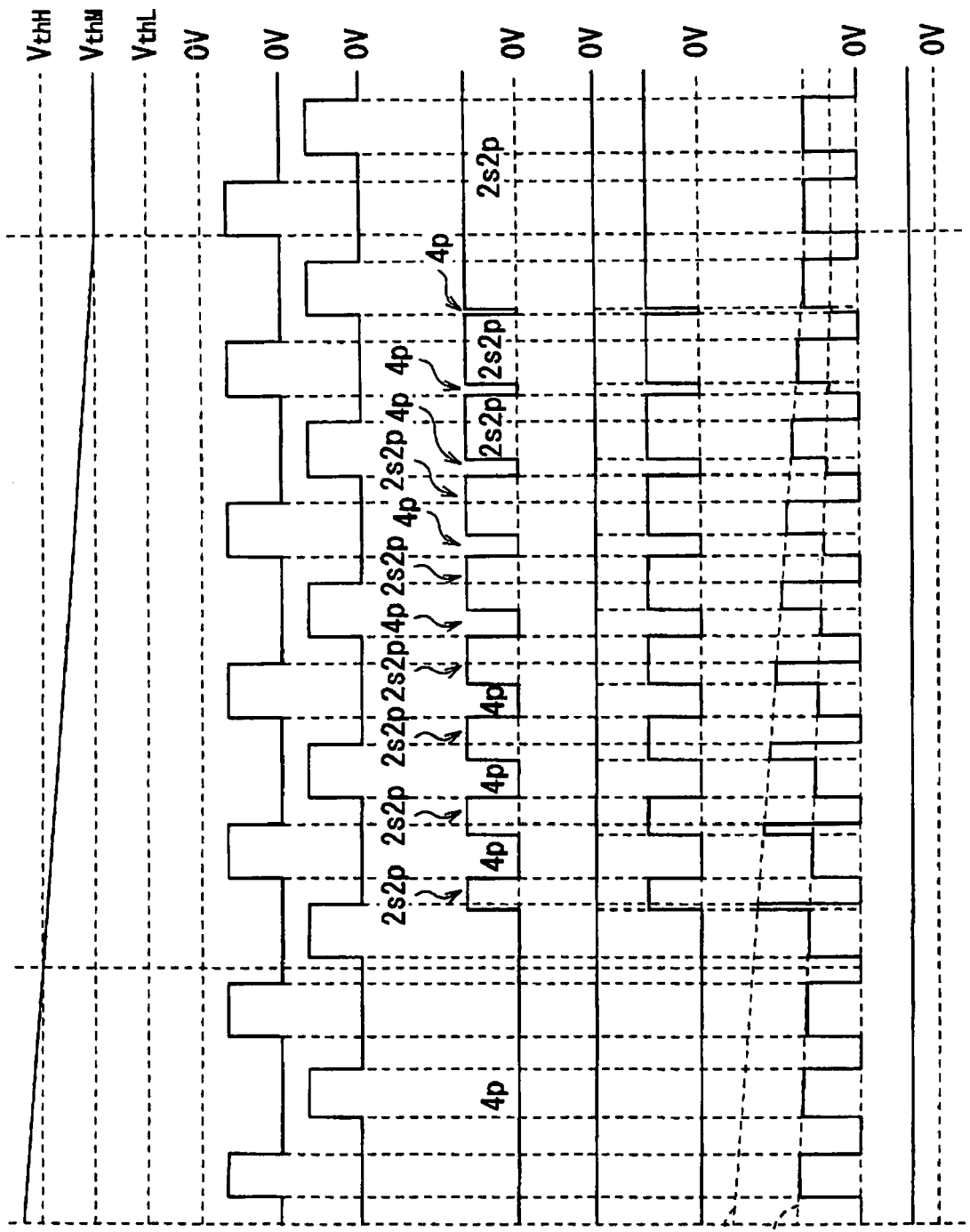
FIGS. 65A to 65H are timing waveform views for explaining connection changeover operation according to a modification of the seventh embodiment.
Figure 66:
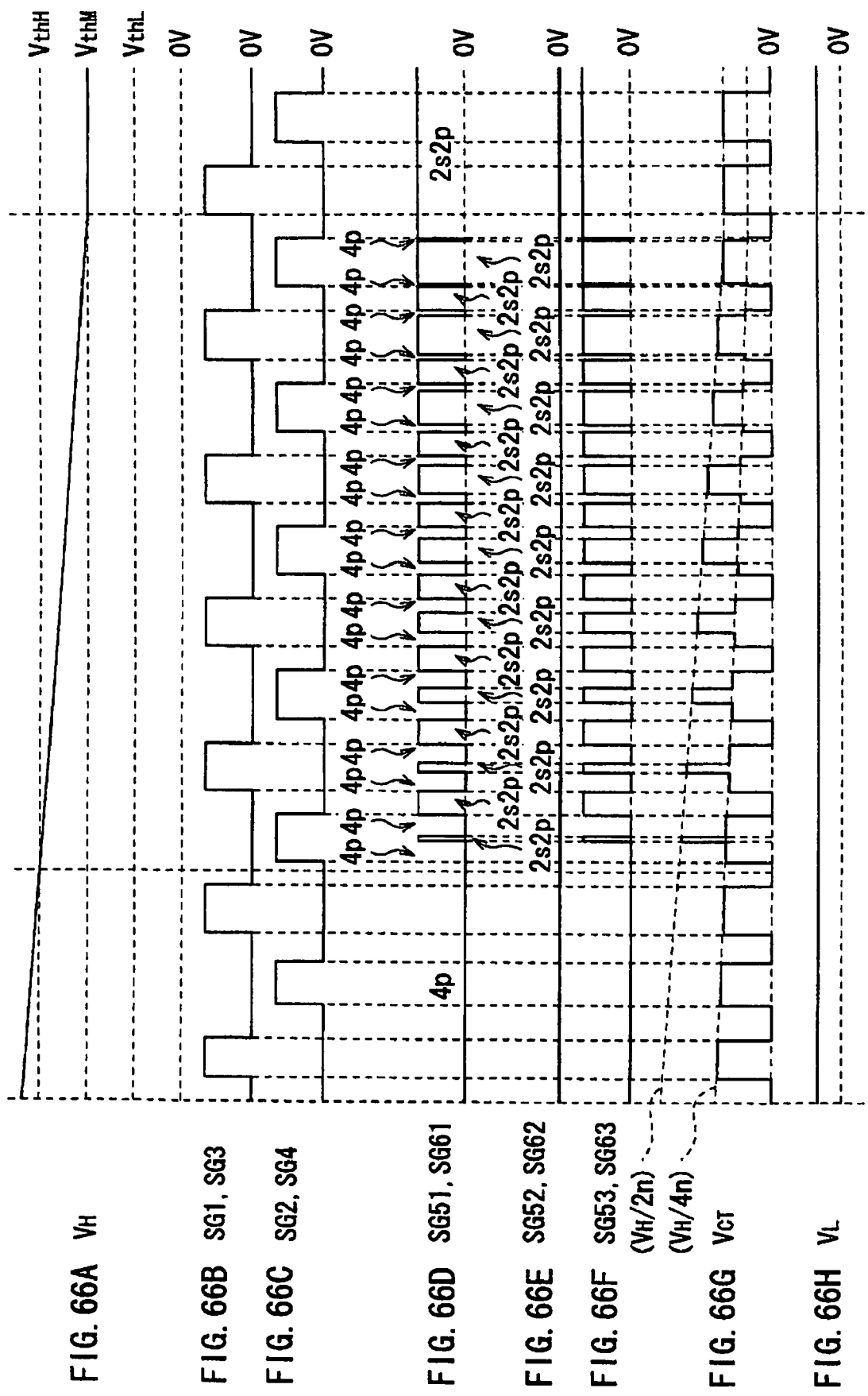
FIGS. 66A to 66H are timing waveform views for explaining connection changeover operation according to the modification of the seventh embodiment.

Here, FIGS. 60A to 60H and FIGS. 61A to 61H show timing waveforms in connection changeover control according to the comparative example, wherein FIGS. 60A to 60H show timing waveforms from a state that the high DC voltage VH is higher than a threshold voltage $V_{th12}$ to a state that the voltage VH becomes lower than the thresh voltage $V_{th12}$, and FIGS. 61A to 61H show timing waveforms from a state that the high DC voltage VH is higher than a threshold voltage $V_{th11}$ to a state that the voltage VH becomes lower than the thresh voltage Vth13, respectively. On the other hand, FIGS. 62A to 62H and FIGS. 63A to 63H show timing waveforms in connection changeover control according to the embodiment, wherein FIGS. 62A to 62H show the timing waveforms from a state that the high DC voltage VH is higher than a threshold voltage $V_{thH}$ to a state that the voltage VH is decreased to a voltage $V_{thM}$, and FIGS. 63A to 63H shows timing waveforms while the high DC voltage VH is decreased from the voltage $V_{thM}$ to a voltage lower than the voltage $V_{thL}$, respectively. Specifically, in FIGS. 60A to 63H, FIGS. 60A, 61A, 62A and 63A indicate the high DC voltage VH; FIGS. 60B, 61B, 62B and 63B indicate drive signals SG1 and SG3; FIGS. 60C, 61C, 62C and 63C indicate drive signals SG2 and SG4; FIGS. 60D, 61D, 62D and 63D indicate the drive signals SG51 and SG61; FIGS. 60E, 61E, 62E and 63E indicate the drive signals SG52 and SG62; FIGS. 60F, 61F, 62F and 63F indicate the drive signals SG53 and SG63; FIGS. 60G, 61G, 62G and 63G indicate electric potential $V_{CT}$ at a point (center-tap CT) on the high-voltage line L2H at the low-voltage side; and FIGS. 60H, 61H, 62H and 63H indicate the low DC voltage VL, respectively. FIG. 64 shows a relationship between the input voltage, duty ratio, and connection state by the control section 2007A of the embodiment, which is corresponding to FIG. 50 in the comparative example (sixth embodiment). In FIGS. 60A to 63H, the 4-series connection state is expressed as "4s", 2-series/2-parallel connection state is expressed as "2s2p", and 4-parallel connection state is expressed as "4p".

First, in the comparative example as shown in FIGS. 60A to 60H, when the high DC voltage VH (FIG. 60A) is higher than the threshold voltage $V_{th12}$ (timing t120 to timing t121), the drive signals SG51 to SG53 and SG61 to SG63 for the connection changeover switches S51 to S53 and S61 to S63 are in the off state (FIGS. 60D to 60F), so that the first to fourth current paths are in the 4-parallel connection state with one another. Conversely, when the high DC voltage VH is lower than the threshold voltage $V_{th12}$ (after timing t121), the drive signals SG51, SG53, SG61 and SG63 are in the on state (FIGS. 60D and 60F), so that the first to fourth current paths are in the 2-series/2-parallel connection state with one another. That is, each of the connection changeover switches S51 to S53 and S61 to S63 is controlled by the control section 2007 such that an on/off state of the switch is changed depending on whether the high DC voltage VH is higher than the predetermined threshold voltage $V_{th12}$ or not.

In the comparative example as shown in FIGS. 61A to 61H, when the high DC voltage VH (FIG. 61A) is higher than the threshold voltage $V_{th11}$ (timing t123 to timing t124), the drive signals SG51, SG53, SG61 and SG63 are in the on state, and the drive signals SG52 and SG62 are in the off state (FIGS. 61D to 61F), so that the first to fourth current paths are in the 2-series/2-parallel connection state with one another. Conversely, when the high DC voltage VH is lower than the threshold voltage $V_{th11}$ (after timing t124), the drive signals SG52 and SG62 are also in the on state (FIG. 61E), so that the first to fourth current paths are in the 4-series connection state with one another. That is, again in this case, each of the connection changeover switches S51 to S53 and S61 to S63 is controlled by the control section 2007 such that an on/off state of the switch is changed depending on whether the high DC voltage VH is higher than the predetermined threshold voltage $V_{th11}$ or not.

The drive signals SG1 to SG4 for the switching elements S1 to S4 (FIGS. 61B and 61C) are controlled by the control section 2007 such that duty ratios of them are changed to prevent change in the low DC voltage VL due to change in the high DC voltage VH, so that the low DC voltage VL (FIG. 61H) is kept constant.

However, for example, when a connection state is changed from the 4-parallel connection state to the 2-series/2-parallel connection state at the timing t121, or a connection state is changed from the 2-series/2-parallel connection state to the 4-series connection state at the timing t124, overshoot is induced in the low DC voltage VL. Consequently, the voltage VL is not kept constant in a period between timing t121 and timing t122, and a period between timing t124 and timing t125, as shown by signs G3 and G4 respectively. The reason for this is that since the connection state is abruptly changed at the timing t121 and the timing t124, response speed of the differential amplifier Amp1 (error amplifier) in the control section 2007 do not follow such change. Consequently, the duty ratios of the drive signals SG1 to SG4 can not be abruptly changed (abrupt change at the threshold voltage $V_{th11}$ and $V_{th12}$ as shown in FIG. 50), as shown by arrows in the center-tap voltage $V_{CT}$ (FIG. 61G) in a center figure. In this way, in the comparative example, since the duty ratios of the drive signals SG1 to SG4 are increased even slightly in the period between the timing t121 and the timing t122, and the period between the timing t124 and the timing t125, the overshoot is induced in the low DC voltage VL.

On the contrary, in the embodiment, when the high DC voltage VH is changed between the voltage $V_{thH}$ and the voltage $V_{thL}$ as shown in FIGS. 62A to 62H, operation of the connection changeover switches S51 to S53 and S61 to S63 is controlled depending on magnitude of the low DC voltage VL (that is, indirectly magnitude of the high DC voltage VH), so that relative periods in the 4-parallel connection state and the 2-series/2-parallel connection state are changed respectively. Thereby, the turn ratio (np/ns) of the number of turns np of the winding 31 and the number of turns ns of the windings 32A to 32H of the transformer 2003 is continuously changed, as described before.

Similarly, when the high DC voltage VH is changed between the voltage $V_{thM}$ and the voltage $V_{thL}$ as shown in FIGS. 63A to 63H, operation of the connection changeover switches S51 to S53 and S61 to S63 is controlled depending on magnitude of the low DC voltage VL (indirectly magnitude of the high DC voltage VH), so that relative periods in the 2-series/2-parallel connection state and the 4-series connection state are changed respectively. Thereby, the turn ratio (np/ns) of the transformer 2003 is continuously changed.

Furthermore, since a voltage supplied to the minus input terminal of the differential amplifier Amp2 is set to be slightly higher than a voltage supplied to the minus input terminal of the differential amplifier Amp1, the duty ratios of the drive signals SG1 to SG4 (FIGS. 62B and 62C and FIGS. 63B and 63C) are constant. Accordingly, since a voltage waveform of the center-tap voltage $V_{CT}$ is as shown in FIG. 62G and FIG. 63G, and an integral value (area) of the waveform is constant in any period, overshoot is not induced in the low DC voltage VL (FIG. 62H and FIG. 62H), and the voltage VL is kept constant at any time.

In this way, in the switching power supply unit of the embodiment, for example, the duty ratios of the drive signals SG1 to SG4 are constant in a range that the high DC voltage VH is between the voltage $V_{thH}$ and the voltage $V_{thL}$ as shown by a sign G5 in FIG. 64. However, the duty ratios of the drive signals SG51, SG53, SG61 and SG63 and the duty ratios of the drive signals SG52 and SG62 are continuously changed as shown by signs G6 and G7 in the figure respectively.

The case that the high DC voltage VH was changed between the voltage $V_{thH}$ and the voltage $V_{thL}$ was shown in FIGS. 62A to 62H and FIGS. 63A to 63H. However, in the case that the high DC voltage VH is equal to or higher than the voltage $V_{thH}$, or not higher than the voltage $V_{thL}$, the duty ratios of the drive signals SG1 to SG4 are also changed at a constant amount of change, for example, as shown in FIG. 64.

As hereinbefore, in the embodiment, since the relative periods in the 4-series connection state, 2-series/2-parallel connection state, and 4-parallel connection state are changed depending on magnitude of the high DC voltage VH respectively, values of them can be continuously changed, and thus avoided from being abruptly changed. Accordingly, even if an element having a slow response speed (for example, the error amplifier) exists in the switching unit, the turn ratio (np/ns) between the number of turns np of the winding 31 and the number of turns ns of the windings 32A to 32H of the transformer 2003 can be continuously changed (increased or decreased). Consequently, the low DC voltage VL can be stabilized independently of response speed of each element.

The embodiment was described using the case that a case of changing the duty ratios of the drive signals SG51 to SG53 and SG61 to SG63, and a case of changing the duty ratios of the drive signals SG1 to SG4 were separated with a range of the high DC voltage VH. However, both the duty ratios may be changed together.

Moreover, in the embodiment, change control by the control section 2007A is not limited to control in the voltage waveform of the center-tap voltage $V_{CT}$ as shown in FIGS. 62A to 62H or FIGS. 63A to 63H, and for example, it may be in a voltage waveform as shown in FIGS. 65A to 65H or FIGS. 66A to 66H as a waveform corresponding to FIG. 64.

Even in a case of such a configuration, the same advantages as in the embodiment can be obtained. However, in a case that the switching circuit 2001 performs the phase shift operation, since they can perform the Zero Volt Switching operation in the voltage waveform shown in FIGS. 65A to 65H or FIGS. 66A to 66H, such a voltage waveform is preferably used in the case.

Moreover, in the embodiment, while the comparator Comp1 and the reference power supply Ref3 were provided in the control section 2007A, when the high DC voltage VH is changed between the voltage $V_{thH}$ and the voltage $V_{thL}$, it is acceptable that they are not provided and the arithmetic circuit 74 generates the drive signals SG51 to SG53 and SG61 to SG63 based on only the output signal from the comparator Comp3.

Furthermore, the forward operation of generating the low DC voltage VL from the high DC voltage VH was described in the embodiment. However, in the case of the reverse operation of generating the high DC voltage VH from the low DC voltage VL, the same advantages can be obtained by the same effects as in the forward operation.

Figure 67:
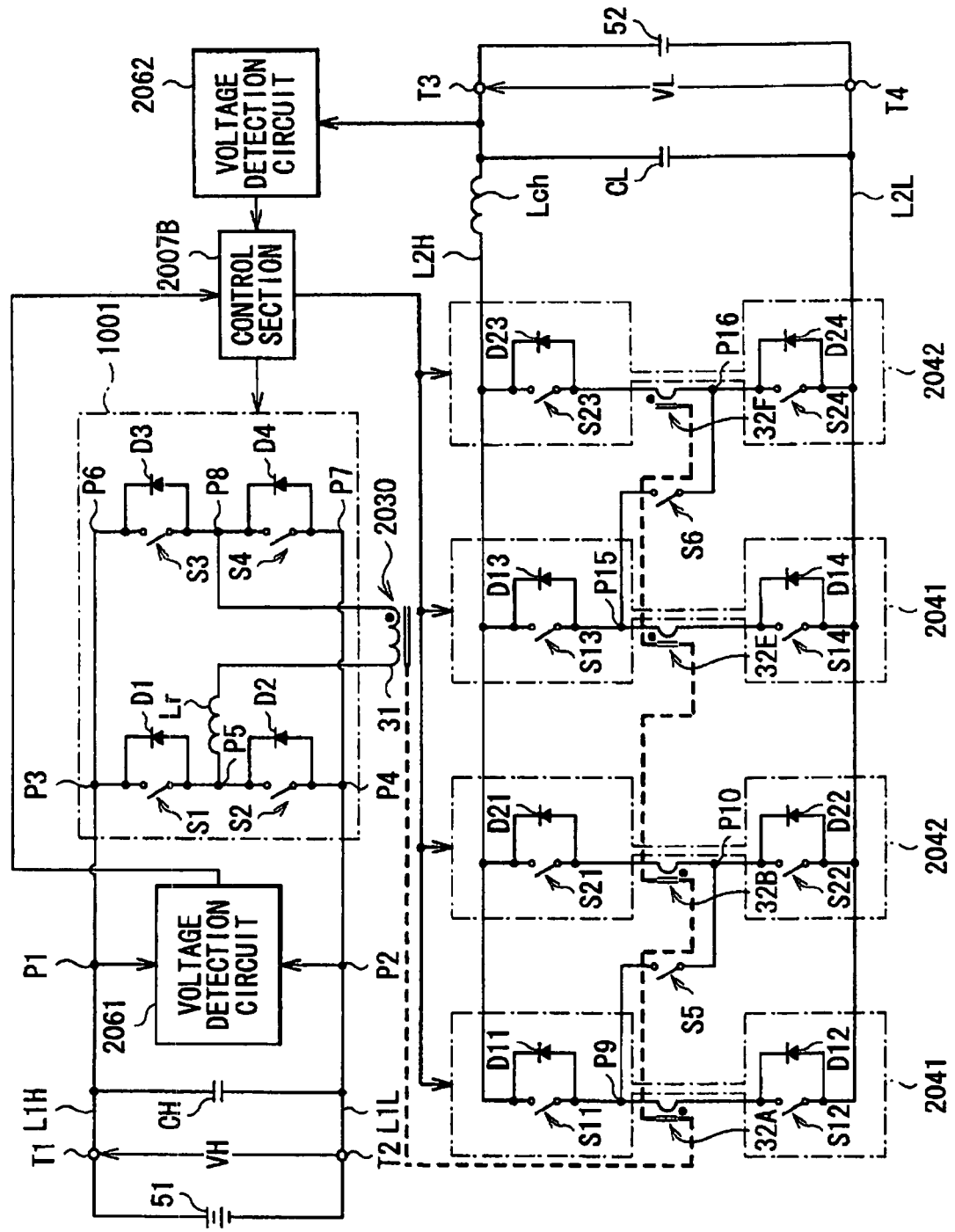
FIG. 67 is a circuit diagram showing a configuration of a switching power supply unit according to a modification of an embodiment of the invention.
Figure 68:
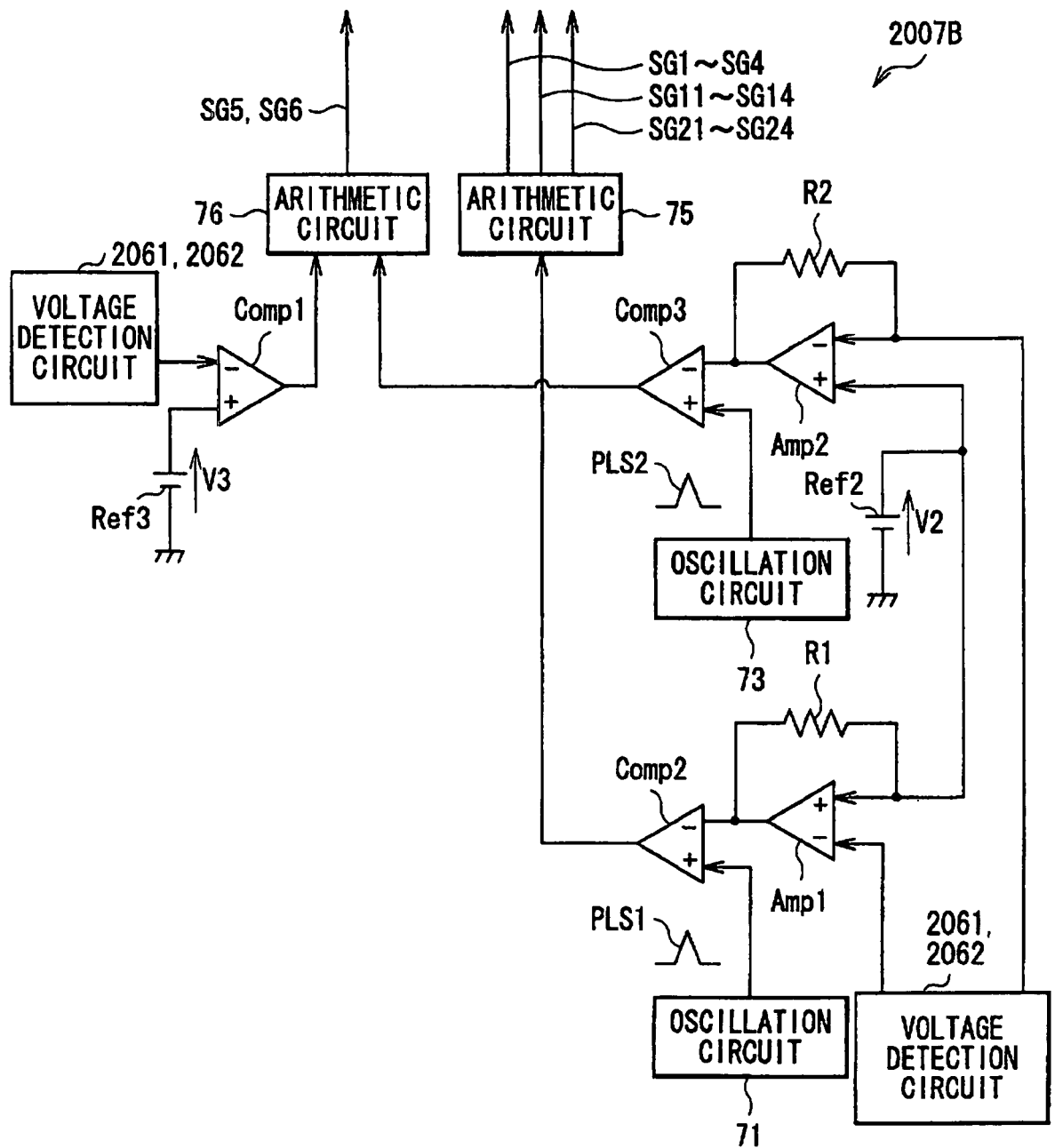
FIG. 68 is a circuit diagram showing a configuration of a control section in FIG. 67.
Figures 69, 70:
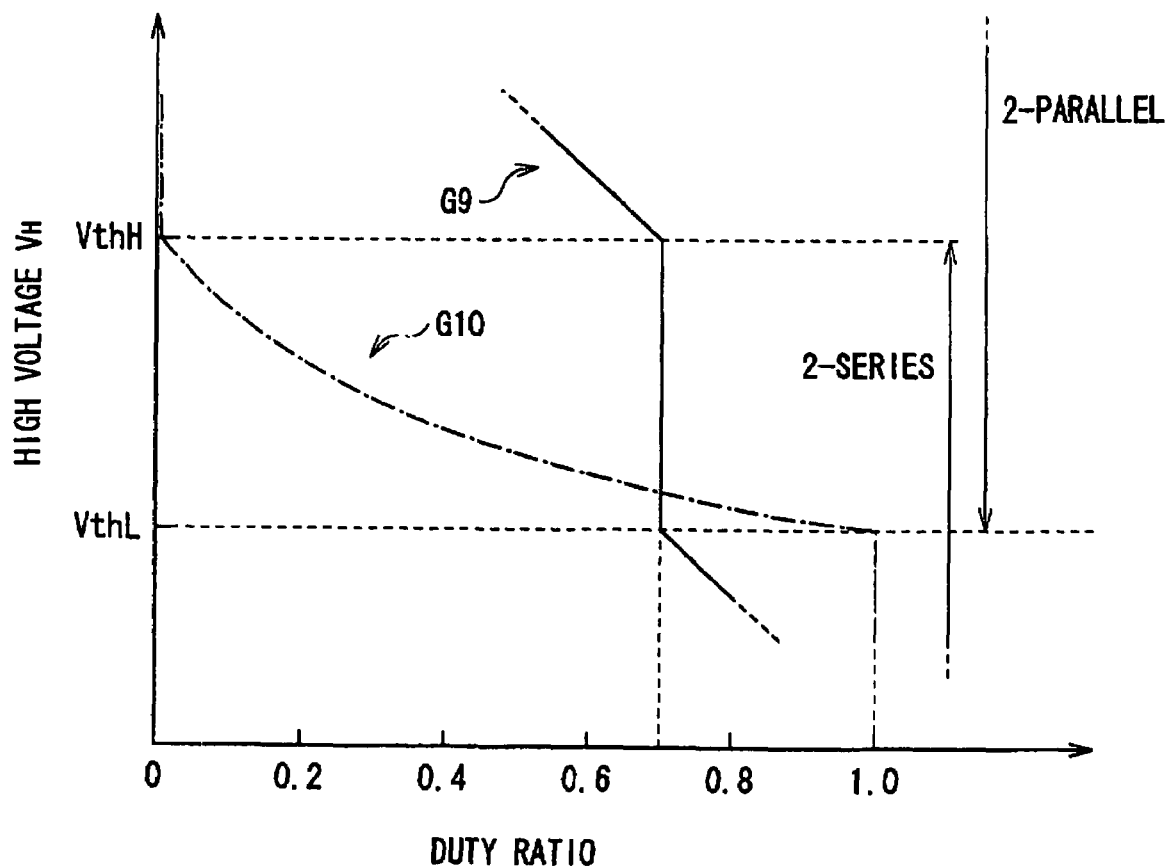
FIG. 69 is a view for explaining connection changeover operation by the control section of FIG. 68.
FIG. 70 is a characteristic view showing a relationship between an input voltage, a duty ratio, and a connection state in forward operation in the modification.
Figure 71:
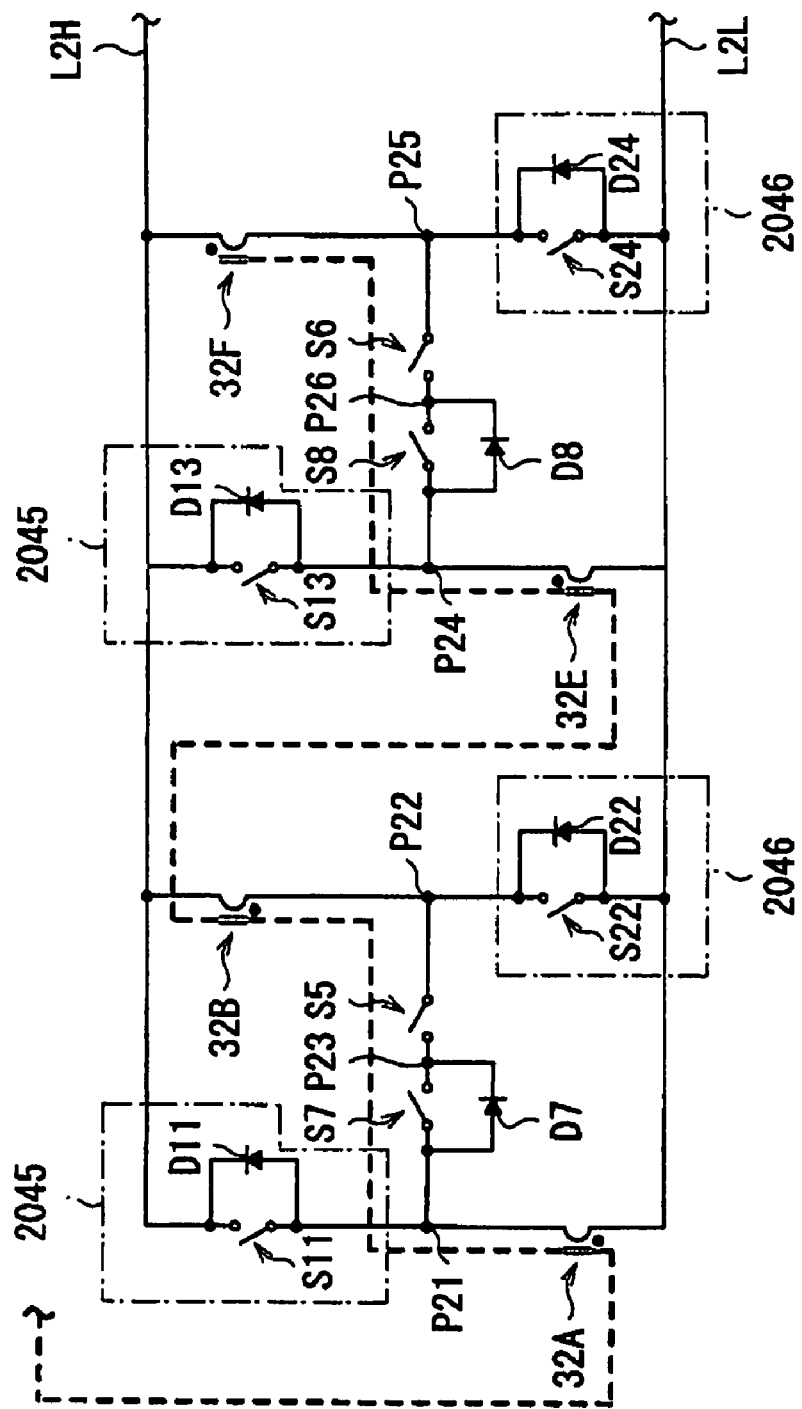
FIG. 71 is a circuit diagram showing a configuration of a switching circuit according to another modification of an embodiment of the invention.

While the sixth and seventh embodiments were described with a case that the number of the switching circuits at the lower-voltage side (switching circuits 2041 to 2044) was four, the number of the switching circuits at the lower-voltage side is not limited to such a case. For example, as shown in FIG. 67, when two switching circuits (switching circuits 2041, 2042) are provided as the switching circuits at the lower-voltage side, and two pairs of windings (windings 23A, 32E and windings 23B, 32F) having the same number of turns as each other are provided at the low-voltage side of the transformer 2003 correspondingly to the circuits respectively, for example, connection changeover can be performed using a control section 2007B having arithmetic sections 74 and 75 as shown in FIG. 68 such that two current paths at the low-voltage side including the two switching circuits 2041, 2042 and the two pairs of windings 32A, 32E and windings 32B, 32F are in 2-parallel connection or 2-series connection with each other, for example, depending on a magnitude relationship with respect to a predetermined threshold voltage Vth3 as shown in FIG. 69. Moreover, for example, as shown in FIG. 70, relative periods in a 2-series connection state and a 2-parallel connection state are changed depending on magnitude of the high DC voltage VH, as in the seventh embodiment, thereby values of them can be continuously changed so that they are prevented from being abruptly changed. Accordingly, again in this case, even if an element having slow response speed exists in a switching unit, the turn ratio between the number of turns np of the winding 31 and the number of turns of the windings 32A, 32E or the windings 32B, 32F can be continuously changed (increased or decreased), so that the low DC voltage VL can be stabilized independently of response speed of each element. When two switching circuits at the low-voltage side are provided in this way, it is acceptable that switching circuits 2045, 2046, for example, as shown in FIG. 71 are provided in place of the switching circuits 2041, 2042 as shown in FIG. 70, and connection changeover switches S7, S8 and diodes D7, D8 for 2-series connection state are provided in addition to the connection changeover switches S5, S6. In the case of such a configuration, in either case of the 2-series connection state and the 2-parallel connection state, since the number of elements to be passed is decreased in each current path, power loss in the elements are suppressed, so that efficiency of a switching power supply unit can be improved.

The sixth and seventh embodiments were described with a case that the switching elements S1, S4 or the switching elements S2, S3 are subjected to on/off operation in synchronization with each other in the switching elements S1 to S4 of the switching circuit 2001. However, it is acceptable that capacitors C1 to C4 are connected in parallel with the switching elements S1 to S4, and the switching elements perform phase shift operation (phase difference φ and dead time Td) with one another. In the case of such a configuration, an inductor Lr and the capacitors C1 to C4 configure a resonance circuit, which performs resonance operation. Accordingly, the switching elements S1 to S4 perform so-called ZVS (Zero Volt Switching) operation respectively. Consequently, short loss in the switching elements can be suppressed, and further improvement in efficiency of the unit can be obtained in addition to the advantages of the embodiments.

Moreover, the sixth and seventh embodiments were described with the case that connection changeover was performed depending on the target value of the output voltage (high DC voltage VH) in the reverse operation. However, connection changeover in the reverse operation may be performed depending on magnitude of the input voltage (low DC voltage VL), as in the forward operation. In the case of such a configuration, for example, as in the forward operation, a range of the input voltage (low DC voltage VL), in which a constant output voltage (high DC voltage VH) can be kept, can be widened compared with a usual case. In this case, a voltage detection circuit for detecting the input voltage (low DC voltage VL) can be provided at the low-voltage side of the transformer 2003 (for example, between the high-voltage line L2H and the low-voltage line L2L).

Moreover, while the sixth and seventh embodiments were described with a case that the switching circuit 2001 was configured by a circuit of the full-bridge type, and the switching circuit 2041 to 2044 were circuits of the center-tap type respectively, the switching circuit 2001 and the switching circuits 2041 to 2044 are not limited to these, and for example, the switching circuit 2001 may be a circuit of the half-bridge type, or the switching circuit 2041 to 2044 may be circuits of the full-bridge type respectively.

Moreover, while the sixth and seventh embodiments were described with a case of the switching power supply unit of the step-down type, an embodiment of the invention can be applied to a switching power supply unit of the step-up type.

It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply unit, which includes a first terminal pair and a second terminal pair, and performs voltage conversion between a first DC voltage at the first terminal pair side and a second DC voltage at the second terminal pair side, the unit comprising;
   a transformer having a plurality of first windings disposed at the first terminal pair side, and a second winding disposed at the second terminal pair side, the first windings having the number of turns equal to one another,
   a plurality of first circuits of a full-bridge type provided at the first terminal pair side in correspondence with the plurality of first windings respectively, each of the first circuits having four switching elements, and
   a connection changeover unit performing connection changeover such that a plurality of current paths are in parallel connection, series connection, or mixed connection of series and parallel with one another, each of the current paths including one of the plurality of first circuits and a corresponding first winding,
   the connection changeover unit automatically performing connection changeover based on a magnitude of the first DC voltage inputted from the first terminal pair or a magnitude of the second DC voltage inputted from the second terminal pair.

2. The switching power supply unit, according to claim 1;
   wherein the first DC voltage is inputted and converted to the second DC voltage to be outputted, and
   the connection changeover unit performs connection changeover depending on magnitude of the first DC voltage.

3. The switching power supply unit, according to claim 2;
   wherein the connection changeover unit performs connection changeover, in order, from a parallel connection state to a mixed connection state, then to a series connection state along with increase in the first DC voltage.

4. The switching power supply unit, according to claim 1;
   wherein the second DC voltage is inputted and converted to the first DC voltage to be outputted, and the connection changeover unit performs connection changeover depending on magnitude of the second DC voltage.

5. The switching power supply unit, according to claim 4;
   wherein the connection changeover unit performs connection changeover, in order, from a series connection state to a mixed connection state, then to a parallel connection state along with increase in the second DC voltage.

6. The switching power supply unit, according to claim 1;
   wherein the connection changeover unit includes
   a plurality of connection changeover elements,
   a voltage detection circuit for detecting the first DC voltage or the second DC voltage, and
   a first control section for controlling an on/off state of each of the plurality of connection changeover elements depending on magnitude of the first or second DC voltage detected by the voltage detection circuit.

7. The switching power supply unit, according to claim 1;
   wherein the connection changeover unit makes a comparison on magnitude between a value of the first or second DC voltage and a value of each of a plurality of threshold voltages, and performs connection changeover based on a result of the comparison.

8. The switching power supply unit, according to claim 1;
   wherein the connection changeover unit performs connection changeover such that at least two of a relative period in the parallel connection state, a relative period in the mixed connection state, and a relative period in the series connection state are changed depending on the magnitude of the first or second DC voltage.

9. The switching power supply unit, according to claim 1;
   wherein the connection changeover unit changes the relative periods in the relevant connection states such that a turn ratio between the first windings and the second winding is continuously increased along with increase in the first DC voltage, and the turn ratio is continuously decreased with increase in the second DC voltage.

10. The switching power supply unit, according to claim 1;
    wherein the second DC voltage is inputted and converted to the first DC voltage to be outputted,
    the connection changeover unit performs connection changeover such that a value of the first DC voltage comes to a target voltage value.

11. The switching power supply unit, according to claim 10;
    wherein the connection changeover unit includes
    a plurality of connection changeover elements, and a second control section determining an on/off state of each of the plurality of connection changeover elements depending on magnitude of the target voltage value.

12. The switching power supply unit, according to claim 10;
wherein the connection changeover unit performs connection changeover, in order, from the parallel connection state to the mixed connection state, then to the series connection state along with increase in the target voltage value.

13. The switching power supply unit, according to claim 1;
wherein four first circuits and four current paths are provided, and
the four current paths assume one of the states of a 4-parallel connection state, a mixed connection state of 2-series and 2-parallel, and a 4-series connection state.

14. The switching power supply unit, according to claim 1;
wherein six first circuits and six current paths are provided, and
the six current paths assume one of the states of a 6-parallel connection state, a mixed connection state of 2-series and 3-parallel, a mixed connection state of 3-series and 2-parallel, and a 6-series connection state.

15. The switching power supply unit, according to claim 1;
wherein the number of first circuits is N which is a natural number greater than or equal to 4 and which has at least three divisors such that there are at least three kinds of connection states between the plurality of current paths.

16. The switching power supply unit, according to claim 1;
wherein the four switching elements are set in an on/off switching operation mode at any time independently of a connection state between the plurality of current paths.

17. The switching power supply unit, according to claim 1;
wherein the four switching elements are set either in an on/off switching operation mode or in an normally-on mode depending on connection state between the plurality of current paths.

18. The switching power supply unit, according to claim 1;
wherein a second circuit of a center-tap type or push-pull type is provided at the second terminal pair side.

19. The switching power supply unit, according to claim 1;
wherein a second circuit of a full-bridge type is provided at the second terminal pair side.

20. A switching power supply unit, which includes a first terminal pair and a second terminal pair, and performs voltage conversion between a first DC voltage at the first terminal pair side and a second DC voltage at the second terminal pair side, the unit comprising;
a transformer having a plurality of first windings disposed at the first terminal pair side, and a second winding disposed at the second terminal pair side, the first windings having the number of turns equal to one another,
a plurality of first circuits of a full-bridge type provided at the first terminal pair side in correspondence with the plurality of first windings respectively, each of the first circuits having four switching elements,
a drive circuit for driving the plurality of circuits in synchronization with one another,
a plurality of inductors provided in correspondence with the plurality of circuits; and
a connection changeover unit performing connection changeover such that a plurality of current paths are in parallel connection or series connection with one another, each of the current paths including one of the plurality of circuits and a corresponding first winding.

21. A switching power supply unit, which includes a first terminal pair and a second terminal pair, and performs voltage conversion between a first DC voltage at the first terminal pair side and a second DC voltage at the second terminal pair side, comprising;
a transformer having a first winding disposed at the first terminal pair side, and a plurality pairs of second windings disposed at the second terminal pair side, the plurality pairs of second windings having the number of turns equal to one another,
a plurality pairs of circuits provided at the second terminal pair side in correspondence with the plurality pairs of second windings respectively, each of the plurality pairs of circuits having a plurality of switching elements; and
a connection changeover unit performing connection changeover such that a plurality of current paths are in parallel connection, series connection, or mixed connection of series and parallel with one another, each of the current paths including one of the plurality pairs of circuits and a corresponding pair of second windings.

22. The switching power supply unit, according to claim 21;
wherein the first DC voltage is inputted and converted to the second DC voltage to be outputted, and
the connection changeover unit performs connection changeover depending on magnitude of the first DC voltage.

23. The switching power supply unit, according to claim 22;
wherein the connection changeover unit performs connection changeover, in order, from a series connection state to a mixed connection state, then to a parallel connection state along with increase in the first DC voltage.

24. The switching power supply unit, according to claim 21;
wherein the second DC voltage is inputted and converted to the first DC voltage to be outputted, and the connection changeover unit performs connection changeover depending on magnitude of the second DC voltage.

25. The switching power supply unit, according to claim 24;
wherein the connection changeover unit performs connection changeover, in order, from a parallel connection state to a mixed connection state, then to a series connection state along with increase in the second DC voltage.

26. The switching power supply unit, according to claim 21;
wherein the connection changeover unit includes
a plurality of connection changeover elements,
a voltage detection circuit for detecting the first DC voltage or the second DC voltage, and
a first control section for controlling an on/off state of each of the plurality of connection changeover elements depending on magnitude of the first or second DC voltage detected by the voltage detection circuit.

27. The switching power supply unit, according to claim 21;
wherein the connection changeover unit makes a comparison on magnitude between a value of the first or second DC voltage and a value of each of a plurality of threshold voltages, and performs connection changeover based on a result of the comparison.

28. The switching power supply unit, according to claim 21;
wherein the connection changeover unit performs connection changeover such that at least two of a relative period in the parallel connection state, a relative period in the mixed connection state, and a relative period in the series connection state are changed depending on the magnitude of the first or second DC voltage.

29. The switching power supply unit, according to claim 28;
wherein the connection changeover unit changes the relative periods in the relevant connection states such that a turn ratio between the first winding and the second windings is continuously increased along with increase in the first DC voltage, and the turn ratio is continuously decreased with increase in the second DC voltage.

30. The switching power supply unit, according to claim 21;
wherein the second DC voltage is inputted and converted to the first DC voltage to be outputted,
the connection changeover unit performs connection changeover such that a value of the first DC voltage comes to a target voltage vale.

31. The switching power supply unit, according to claim 30;
wherein the connection changeover unit includes
a plurality of connection changeover elements, and
a second control section determining an on/off state of each of the plurality of connection changeover elements depending on magnitude of the target voltage value.

32. The switching power supply unit, according to claim 30;
wherein the connection changeover unit performs connection changeover, in order, from a series connection state to a mixed connection state, then to a parallel connection state along with increase in the target voltage value.

33. The switching power supply unit, according to claim 21;
wherein a circuit of a full-bridge type is provided at the first terminal pair side, and
each of the plurality of circuits at the second terminal pair side is a circuit of a center-tap type or push-pull type.

34. The switching power supply unit, according to claim 21;
wherein a circuit of a full-bridge type is provided at the first terminal pair side, and
each of the plurality of circuits at the second terminal pair side is a circuit of a full-bridge type.

35. The switching power supply unit, according to claim 21;
wherein a circuit of a half-bridge type is provided at the first terminal pair side, and
each of the plurality of circuits at the second terminal pair side is a circuit of a center-tap type or push-pull type.

36. The switching power supply unit, according to claim 21;
wherein a circuit of a half-bridge type is provided at the first terminal pair side, and
each of the plurality of circuits at the second terminal pair side is a circuit of a full-bridge type.

37. A switching power supply unit, which includes first terminal pair and second terminal pair, and performs voltage conversion between a first DC voltage at the first terminal pair side and a second DC voltage at the second terminal pair side, comprising;
a transformer having a first winding disposed at the first terminal pair side, and two pairs of second windings disposed at the second terminal pair side, the two pairs of second windings having the number of turns equal to each other,
two pairs of circuits provided at the second terminal pair side in correspondence with the two pairs of second windings respectively, each of the two pairs of circuits having a plurality of switching elements, and
a connection changeover unit performing connection changeover such that a relative period in a parallel connection state and a relative period in a series connection state are changed depending on magnitude of the first DC voltage, the parallel connection state being a state where two current paths are connected in parallel, the series connection state being a state where the two current paths are connected in series, each of the two current paths including one of the two pairs of circuits and a corresponding pair of second windings.

* * * * *